United States Patent
Owens

(10) Patent No.: US 7,911,648 B2
(45) Date of Patent: Mar. 22, 2011

(54) METHOD FOR CREATING A COLOR TRANSFORM RELATING COLOR REFLECTANCES PRODUCED UNDER REFERENCE AND TARGET OPERATING CONDITIONS AND DATA STRUCTURE INCORPORATING THE SAME

(75) Inventor: Aaron J. Owens, Lewes, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/694,760

(22) Filed: Jan. 27, 2010

(65) Prior Publication Data
US 2010/0149568 A1 Jun. 17, 2010

Related U.S. Application Data

(63) Continuation of application No. 11/732,972, filed on Apr. 5, 2007, now abandoned.

(60) Provisional application No. 60/791,814, filed on Apr. 13, 2006.

(51) Int. Cl.
*H04N 1/58* (2006.01)
*H04N 1/60* (2006.01)

(52) U.S. Cl. .......... 358/1.9; 358/504; 358/518; 358/523

(58) Field of Classification Search .......... 358/1.9, 358/3.21, 3.23, 504, 518, 521, 523, 406; 356/73, 300, 402, 408; 347/14, 19
See application file for complete search history.

(56) References Cited

U.S. PATENT DOCUMENTS

| 6,549,861 | B1 * | 4/2003 | Mark et al. ............. 702/179 |
| 6,654,143 | B1 | 11/2003 | Dalal et al. |
| 2007/0242295 | A1 * | 10/2007 | Owens et al. ............ 358/1.9 |
| 2007/0242296 | A1 * | 10/2007 | Owens ............. 358/1.9 |

OTHER PUBLICATIONS

Shaw et al., "Color Printer Characterization Adjustment for Different Substrates", Color Research and Application, vol. 28, No. 6, Dec. 2003.

* cited by examiner

*Primary Examiner* — Scott A Rogers
(74) *Attorney, Agent, or Firm* — George M. Medwick

(57) ABSTRACT

A printer operates under a first set of conditions to create a first set of M of samples and under a target set of conditions to create a second set of K samples. Each sample is produced using the same colorant(s). The actual spectral reflectance for each sample is measured. The actual reflectances for corresponding samples in the first and second sets are used to create a cross-validated, partial-least-squares transform that maps a reflectance from a sample produced under the first set of conditions to a reflectance from a sample produced under the target set of conditions.

The transform and reflectances produce a set of predicted reflectances, each representing a sample producible under the target set of conditions using one colorant. The predicted reflectances and the colorant(s) are used to generate a table predicting a color value when the printer operates under the target set of conditions.

9 Claims, 9 Drawing Sheets

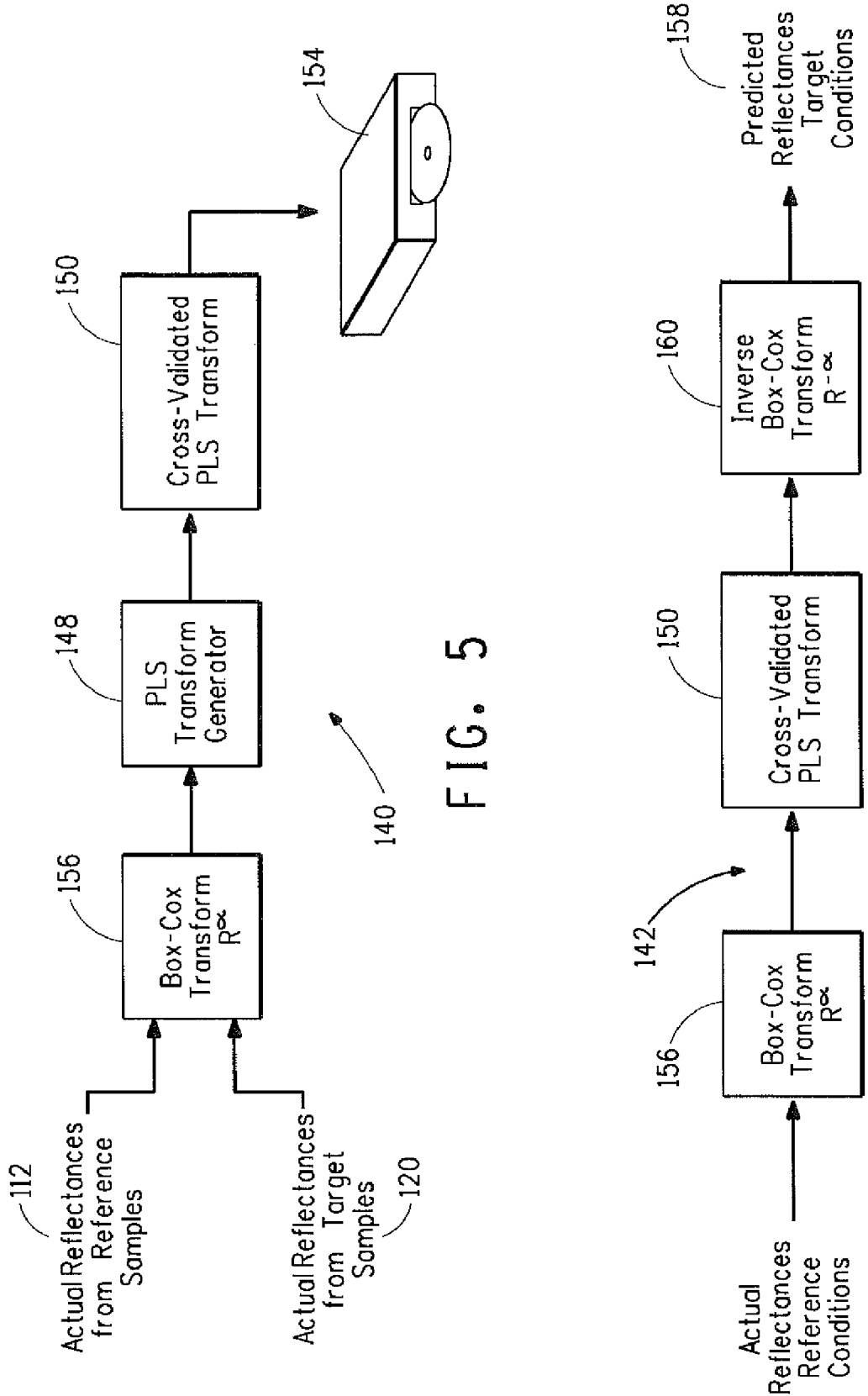

METHOD FOR CREATING A COLOR TRANSFORM RELATING COLOR REFLECTANCES PRODUCED UNDER REFERENCE AND TARGET OPERATING CONDITIONS AND DATA STRUCTURE INCORPORATING THE SAME

This application claims priority to U.S. Provisional Application No. 60/791,814, filed Apr. 13, 2006, the entire content of which is herein incorporated by reference.

FIELD OF THE INVENTION

The present invention is directed to a method for producing a table of predicted color values producible when a printer operates under a target set of operating conditions and to a data structure and a printing system that includes the table so produced.

CROSS REFERENCE TO RELATED APPLICATIONS

Subject matter disclosed herein is disclosed and claimed in following copending applications filed contemporaneously herewith and assigned to the assignee of the present invention;

Method For Producing A Table Of Predicted Reflectances Under Target Operating Conditions and Data Structure and Printing System Incorporating The Table, U.S. Ser. No. 11/784,068, filed Apr. 5, 2007 (IJ-0156); and Method For Selecting A Sample Set Useful In Relating Color Reflectances Producible Under Reference and Target Operating Conditions and the Sample Set Produced Thereby, U.S. Ser. No. 11/784,063, filed Apr. 5, 2007 (IJ-0158).

BACKGROUND OF THE INVENTION

The present invention is generally directed to printing technology and more particularly to the prediction of color values producible by a printer under a target set of operating conditions.

FIG. 1 is a stylized pictorial representation of a prior art printing system generally indicated by the reference character 10 for producing a printed image 12 on a substrate 14. The printing system 10 includes a printer device 16 operable under control of a controller 18. The printer device 16 can be any device capable of placing a colored material on a substrate. For example, the printing device may be implemented an ink jet printer, a dye sublimation printer, a color laser printer or an offset press, among others.

A predetermined set 20 of colorants is available to the printer 16 for deposition on the substrate 14. For example, in a typical instance the set 20 of colorants includes a cyan-colored (sky blue) ink ("C"), a magenta-colored (red) ink ("M"), a yellow-colored ink ("Y") and a black-colored ink ("K"). Colorants in addition to or in substitution for these aforementioned typical four colorants may also be used.

The controller 18 is the computational engine that serves to convert color information on a source image 26 rendered on a substrate 28 into a format compatible with the printer 16. To this end the controller 18 includes at least one color characterization table 30, typically referred to as a "B-to-A" table.

In addition, depending upon the color model used for the source image 26, an additional forward transform table 34, known as a "A-to-B" table, may be required. The forward transform is used to map from the color model of the source image to a device-independent color model such as CIE L*a*b* color values or X, Y, Z tri-stimulus values.

The International Committee on Illumination (CIE) L*a*b* system is a three-dimensional system for representing the color of an object in terms of color parameters arranged along three mutually orthogonal coordinate axes, viz., L*, a*, and b*. The L* axis is the lightness axis and ranges from values of 0 to 100 (black to white). The a* axis extends from red (+a) to green (−a), while the b* axis extends from yellow (+b*) to blue (−b*). A complete description of the CIE L*a*b* system is found in CIE Publication 15.2 or in various standards collections such as ASTM E-308.

The X, Y, Z tri-stimulus values define a mapping standardized by the International Committee on Illumination (CIE) that is based upon the manner in which color is seen by a human observer. The human eye has three sensors for color vision—a blue sensor, a green sensor and a red sensor. Color perception is dependent not only on the spectral curve of the reflectance from the colored object but also the spectral characteristics of the light source under which it is viewed and the spectral sensitivity of the observer. The X, Y, Z tri-stimulus space is a three-dimensional color mapping that incorporates the effect of the spectral characteristics of the colored object, the light source and the observer.

The relationships between the tri-stimulus values X, Y, Z and the CIE L*a*b* values are described by the following equations:

$$L^* = 116[f(Y/Y_0)] - 16 \tag{1}$$

$$a^* = 500[f(X/X_0) - f(Y/Y_0)] \tag{2}$$

$$b^* = 200[f(Y/Y_0) - f(Z/Z_0)] \tag{3}$$

where $X_0$, $Y_0$ and $Z_0$ define the reference white point, and where, $f(X/X_0) = (X/X_0)^{1/3}$ for $X/X_0 > 0.008856$ $f(X/X_0) = 7.787 \cdot (X/X_0) + 16/116$ for $X/X_0 \leq 0.008856$ $f(Y/Y_0) = (Y/Y_0)^{1/3}$ for $Y/Y_0 > 0.008856$ $f(Y/Y_0) = 7.787 \cdot (Y/Y_0) + 16/116$ for $Y/Y_0 \leq 0.008856$ $f(Z/Z_0) = (Z/Z_0)^{1/3}$ for $Z/Z_0 > 0.008856$ $f(Z/Z_0) = 7.787 \cdot (Z/Z_0) + 16/116$ for $Z/Z_0 \leq 0.008856$ In order to produce both an "A-to-B" table 34 and a "B-to-A" table 30 a predetermined number M of samples corresponding to various colorants or combinations of colorants are printed. As used throughout this application the term "sample" means a printed rendition of a color produced by a printer on a substrate using a predetermined colorant or combination of available colorants. Such samples may also be known as "color patches".

Once produced the spectral reflectance of each sample is measured.

Either the spectral reflectances measured from the samples or, after appropriate conversion using the above equations, their corresponding computed CIE L*a*b* values, together with the respective colorant or combinations of colorants are input to a computing device executing a color characterization program. The color characterization program generates both a forward transform relating input colorants or colorant combinations to output color values, the "A-to-B" table, and the reverse transform, the desired "B-to-A" table, relating desired output color values to device colorant or colorant combinations.

Suitable color characterization programs are commercially available from X-Rite Inc., Grandville Mich., as the Monaco PROFILER, or GretagMacbeth, New Windsor, N.Y., as the GretagMacbeth ProfileMaker. Such color characterization programs produce tables of values in a file format that complies with the specifications developed by the International Color Consortium ("ICC"), Reston, Va. and set forth in ICC.1:2004-10 Image technology colour management, Architecture, profile format, and data structure.

The number M of samples necessary to be produced is governed by the particular application program utilized to create the color characterization. Typically, the number M is on the order of several hundred to several thousand samples, depending upon the number of colorant inks used by the printing system. The requirement for such a large number of samples makes production of a color characterization a costly proposition.

Once created the "B-to-A" table is used to determine the precise colorant or combination of colorants that must be deposited by the printer 16 on predetermined areas of the substrate 14 to reproduce color values on the printed image 12 that are as close to identical as possible to the color values that appear on corresponding areas of the source image 26. The assessment of identity may be objectively measured or, perhaps more importantly, visually assessed by a viewer.

-o-0-o-

At any given time the operation of the printer 16 occurs under the influence of a host of various operating conditions. As used herein the term "operating condition" identifies a printing environment in which all the parameters and factors that influence the printer performance have been held at specified constant values.

The substrate 14/28 (FIG. 1) upon which the image 12/26 is rendered is one such parameter that influences printer performance. For example, the substrates may be paper, fabric, or vinyl. In the fabric arena alone possible fabric substrates could include fabrics made from natural materials (e.g., cotton, silk) or synthetic materials (e.g., nylon, Lycra® fiber), all in various weaves, weights and densities. The fabric substrate may be treated with any of a variety of pre- and/or post-treatments to achieve desirable properties such as pigment binding or water-fastness.

Environmental factors such as temperature and humidity are parameters that affect the printer, primarily modifying ink jetting, ink drop volume, and precision of ink deposition. Printing parameters, such as printing resolution (both along and across the substrate), uni- or bi-directional ink deposition, single or multiple carriages, and the number of nozzles passing over a given area on the substrate also affect the detailed placement of the ink drops.

-o-0-o-

As another dimension of the problem the printer 16 must be able to achieve color identity at corresponding locations between printed and source images over a wide range of the operating conditions. That is to say, the color value at the same relative location on each of two different images 12, 12' produced by the printer 16 when operating under respective differing sets of operating conditions must be as close to identical as possible to the color value at the corresponding location on the source image 26. In addition, and perhaps more importantly, the color value at the same relative location on one image 12 must be as close to identical as possible to the color value at the corresponding location on the other image 12', regardless of the operating conditions.

To achieve this color identity between or among output images produced under different operating conditions the controller 18 includes additional "B-to-A" table(s) 30', each for a different set of operating conditions. Thus, each "B-to-A" table 30, 30', as the case may be, determines for a respective set of operating conditions the precise colorant or combinations of colorants that must be deposited by the printer 16 to reproduce on respective printed images 12, 12' color values that are as close to identical as possible to the color values of the source image 26 and to each other.

-o-0-o-

One way to produce an alternative "B-to-A" table 30' is to create an entire set of M samples that characterizes the printer operation under the target set of operating conditions. The measured reflectances (or color values) from these samples are applied to the color characterization program to produce the forward and reverse transforms. Thus, an entire set of M samples is required to obtain a color characterization table for each of the multiple expected sets of target operating conditions. It is clear that production of a plurality of color characterization tables in this way is extremely costly.

An alternative way to create a color characterization for a different target set of operating conditions without printing a sample for all of the different colorants or combinations of colorants is disclosed in U.S. Pat. No. 6,654,143 (Dalal et al.) and in Shaw et al., "Color Printer Characterization Adjustment for Different Substrates", Color Research and application Volume 28, Number 6, December 2003. In this patent and article a relatively small number of samples is produced under both a first, reference, set of printer operating conditions and a second, target, set of printer operating conditions.

A principal component analysis is applied to a reflectance data set derived from a relatively large number of samples produced under the reference operating conditions. The principal component analysis performed on the large data set is used to compute a number P of principal components ("basis vectors") to be utilized in further computations.

A second, relatively small, data set is produced or selected from samples produced under the reference operating conditions. A third data set is derived from samples produced under the target operating conditions. The reflectance of each sample in the second and third set of samples is measured as a function of wavelength. The second and third data sets must include the same number of samples and must be produced using the same colorants or colorant combinations.

Thereafter, the first P number of principal components from the first (large) data set are used to project the reflectances from the second and third data sets into the P-dimensional principal component "scores" space. Multiple linear regression is used to compute a least-squares model mapping of the second data set's scores to those of the third data set. The resulting "T" matrix contains P*P coefficients to map from reference to target conditions in the P-dimensional scores space. Computed scores for the target conditions can then be transformed back to the full-dimensional reflectance space by using the inverse of the principal component projection operator.

The application of a principal component analysis tool in this way is believed to be disadvantageous because the choice of the number P of basis vectors is heuristically selected based upon the large sample set, while the mapping from reference to target conditions is derived from the smaller sample sets. It is also believed disadvantageous to perform the analysis in the non-physical "scores" space rather than in a space that correlates with human visual perception, such as a space that uses actual or scaled reflectance.

In view of the foregoing it is believed advantageous to generate a color characterization model for a printer operable under a predetermined target set of operating conditions that maps parameters when the objective function is more closely tied to human vision, as in reflectance space, and which does not arbitrarily select the number of principal factors, but instead relies upon cross-validation to obtain a model of appropriate complexity. It is believed to be of still further advantage to map parameters that are suitably scaled to better match perceived color.

In another aspect, it is believed more efficient and therefore advantageous to be able to produce a mapping from a only predetermined minimum number of samples produced under a given set of target conditions.

SUMMARY OF THE INVENTION

In a first aspect the present invention is directed to a method for producing a transform useful for predicting a reflectance value producible by a printer while operating under a predetermined target set of operating conditions using reflectance values produced by the printer while operating under a predetermined reference set of operating conditions. and to a data structure incorporating the transform.

In another aspect the invention is directed to a method that utilizes the transform to produce a table of predicted reflectances, each predicted reflectance representing a sample producible by the printer using one of the predetermined colorants or combination of colorants while operating under the target set of operating conditions and a data structure and a printing system incorporating the same. The table is generated from the set of predicted reflectances and the colorant or combinations of colorants used to create the samples under the reference set of operating conditions. The table is able to predict a reflectance producible by the printer on a substrate while operating under the target set of operating conditions using one of the colorants or combination of colorants.

In yet another aspect the invention is directed to a method for selecting an efficient sample set useful in relating color values producible under reference and target operating conditions and the sample set produced thereby. By selecting an essentially minimal required number of samples under the target operating conditions the production of a transform and a table of predicted reflectances is facilitated. Thus, a multiplicity of tables for each of a plurality of target operating conditions may be economically generated.

BRIEF DESCRIPTION OF THE DRAWINGS

This invention will be more fully understood from the following detailed description, taken in connection with the accompanying drawings, which form a part of this application and in which:

FIG. 5 is a block diagram illustrating the creation of a cross-validated partial-least-squares transform in accordance with the present invention;

FIG. 6 is a block diagram illustrating the use of the cross-validated partial-least-squares transform to generate a set of predicted reflectances;

Figure 1:
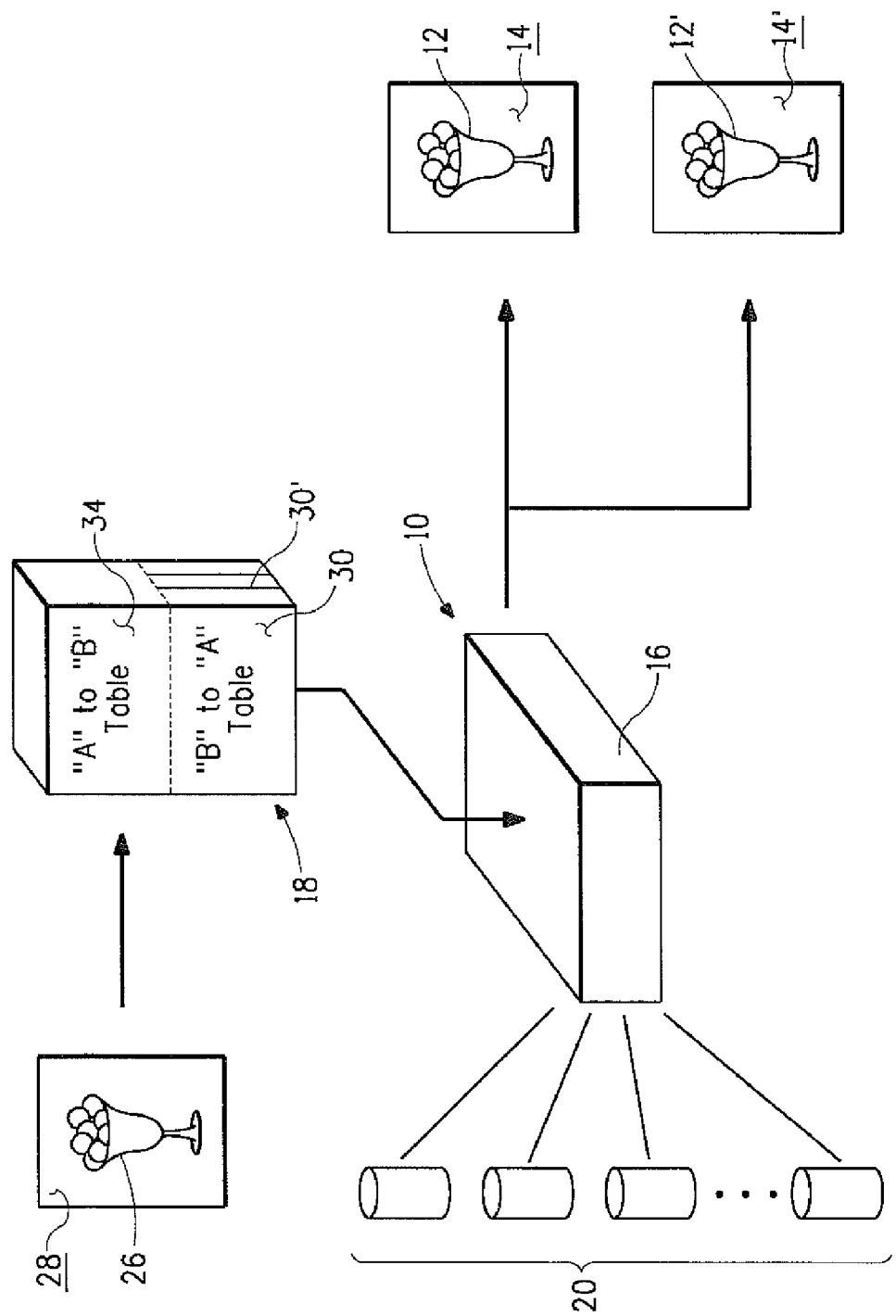
FIG. 1 is a stylized schematic drawing illustrating a typical prior art printing system.

A Data Appendix containing data Tables 1 through 4 referenced in the Example is attached to and forms part of the present application, wherein:

Data Table 1 and Data Table 4 each contain twenty-eight (28) pages and Data Table 2 and Data Table 3 each contain one (1) page.

DETAILED DESCRIPTION OF THE INVENTION

Throughout the following detailed description similar reference characters refer to similar elements in all Figures of the drawings.

Figure 2:
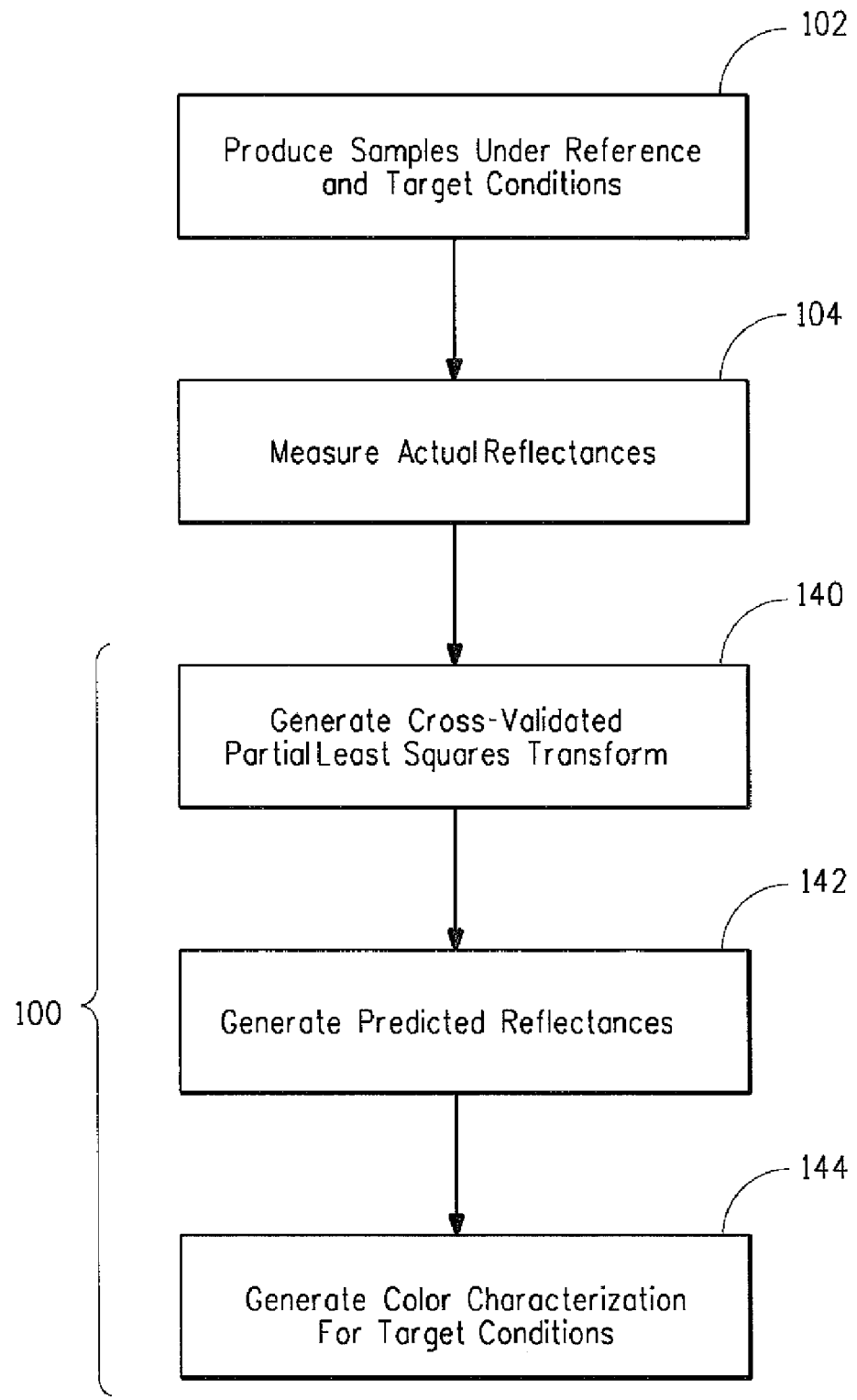
FIG. 2 is a flow chart of the method steps involved in the implementation of methods in accordance with the present invention for producing a transform useful for predicting reflectance values producible by a printer while operating under a predetermined target set of operating conditions and for the use of the transform to produce a table of predicted reflectances, both in accordance with various aspects of the present invention.

The various steps of the methods involved in various aspects of the present invention are generally indicated by reference character 100 and are illustrated in flow chart form in FIG. 2 and accompanying Figures. Steps practiced preliminarily to the practice of aspects of the present invention are indicated in blocks 102 and 104. These preliminary steps are generally similar to those utilized by the prior art when generating color characterization tables.

Figure 3:
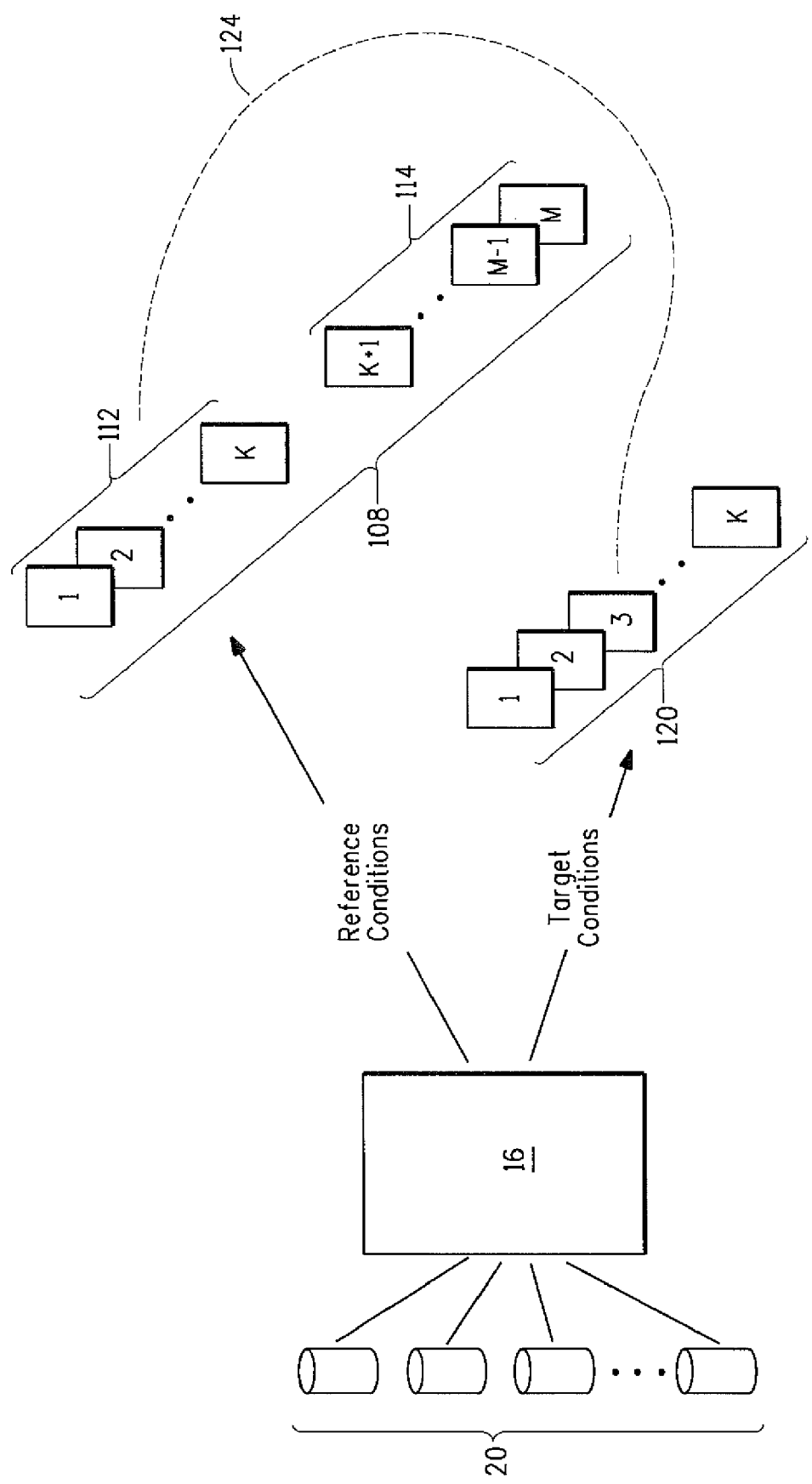
FIG. 3 is a stylized schematic drawing illustrating steps practiced preliminary to the practice of the steps included in various aspects of the present invention.

As indicated in block 102 of the flow chart of FIG. 2 and as diagrammatically illustrated in FIG. 3 the printer 16 is operated under a predetermined reference set of operating conditions to create a reference set 108 containing a total of M number of samples. Each sample in the reference set 108 is produced using either one of the colorants 20 or a predetermined combination of those colorants.

As shown in FIG. 3 the samples in the reference set 108 are subdivisible into a first subset 112 containing K number of samples and a second (non-empty) subset 114 containing (M−K) number of samples. For these groupings to exist the number M is necessarily greater than the number K (i.e., M>K). As shown pictorially the samples 1, 2, . . . K are contained in the first subset 112, while the samples (K+1), (K+2), . . . (M−1), M are included in the second subset 114.

The printer 16 is also operated under a predetermined set of target operating conditions to create a second set 120 containing K number of samples. It is important for purposes of the present invention that each sample in the target sample set 120 is produced using the same predetermined colorant or combination of colorants that is used to produce one of the samples in the first subset 112 of the reference sample set 108. This correspondence is illustrated by the dotted link 124.

As is discussed earlier the value of the number M of samples produced under the reference operating conditions is dictated by the particular application program to be utilized in generating the color characterization tables (step 144, FIG. 2). Details surrounding the selection of an optimal number K of samples produced under the target operating conditions (and under the reference set of conditions) embodies another aspect of the invention that is discussed in full detail herein.

Figure 4:
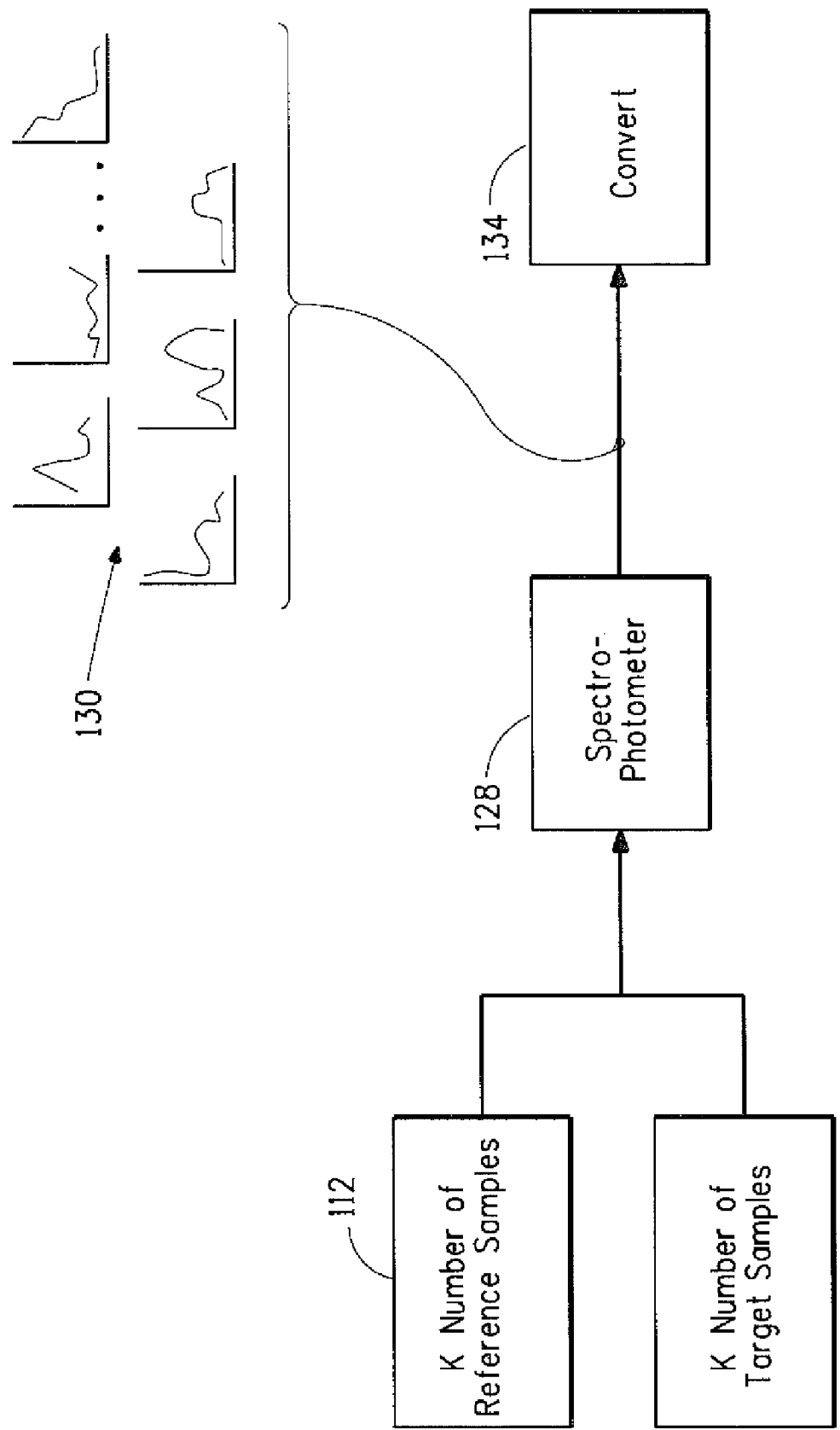
FIG. 4 is a stylized schematic drawing illustrating the preliminarily step of measuring actual spectral reflectances of the samples produced under the reference and target operating conditions.

As indicated in the block 104 of the flow chart of FIG. 2 and as illustrated diagrammatically in FIG. 4, with the K number of samples produced under each of the reference and target conditions in hand, the actual spectral reflectance for each sample is measured. The measurements are taken using a spectrophotometer 128. Representative depictions of some of the (2·K) number of spectra are suggested by reference character 130. A suitable spectrophotometer that may be used to effect these measurements is a GretagMacbeth SpectroLino spectrophotometer (available from GretagMacbeth, New Windsor, N.Y.) mounted on the SpectroScan XY table.

Depending upon the particular spectrophotometer utilized each spectrum contains reflectance information at each of a plurality of predetermined wavelengths lying within a predetermined wavelength range. Typically, spectrophotometric analysis is performed over a wavelength range from about three hundred to about eight hundred nanometers (300-800 nm) in predetermined incremental wavelength steps. As an example, for a typical wavelength range of four hundred to seven hundred nanometers (400-700 nm), sample increments of ten nanometers (10 nm) produce thirty-one (31) reflectance values. Increments of twenty nanometers (20 nm) over the same range produce sixteen (16) reflectance values. Of course, any appropriate wavelength range and any appropriate sample increment may be used. If desired, as indicated by the block 134 (FIG. 4) the actual spectra may be converted to corresponding color values.

The method steps in accordance with the aspects of the present invention 100 for producing a transform for predicting reflectances under the target conditions and for using the transform to generate a color characterization table are indicated in the blocks 140, 142 and 144 (FIG. 2).

As indicated in the block 140 of the flow chart of FIG. 2 and in the block diagram of FIG. 5 the actual spectral reflectance for each of the K number of samples produced using the reference set of operating conditions (i.e., the samples in the subset 112) and the actual spectral reflectance for each of the same K number of samples produced using the target set of operating conditions (i.e., the samples in the set 120) are applied, via a transform to be discussed, to a transform generator 148. It is important again to note that corresponding spectral reflectances from corresponding reference and target samples are produced using the same colorant or combination of colorants. The partial-least-squares ("PLS") transform generator 148 generates a cross-validated PLS transform 150. The PLS transform 150 comprises the scores, loadings, weights, and regression coefficients of a cross-validated PLS model that maps reflectances from corresponding samples in the reference and target sample sets.

The data structure representing the transform 150 is stored on any suitable computer readable medium 154.

It is important to emphasize that the partial-least-squares ("PLS") transform 150 produced in accordance with the present invention is a cross-validated transform.

All data-based modeling techniques have at least one parameter that specifies the complexity of the mapping. In a principal component analysis (as in the technique discussed in connection with the referenced Dalal et al. patent and in the Shaw et al. article), this parameter is V, the number of principal components used. If too few principal components are selected, a model is not sufficiently complex nor sufficiently accurate on fitting samples. This is known as "bias error". On the other hand, if too many components are selected the model will not accurately predict new samples because it has over-fit the noise in the fitting samples. This is called "variance error". Choosing the appropriate model complexity is a compromise between bias and variance errors. The production of the transform 150 in accordance with the present invention incorporates the standard practice from the chemometrics and neural network communities of using cross-validation to choose the appropriate model complexity.

In cross-validation the data set is split into two parts, one for parameter estimation, or fitting, and one for testing. Model parameters are derived using the first (fitting) data set and true predictions are then made on the second (test) data set. The appropriate model complexity is that which minimizes the sum of squared prediction errors in the test data set. The splitting of the total data set into fitting and testing portions can be done in several ways, including "leave-one-out" and "random" subsets. Some of these cross-validation techniques use tens or hundreds of partitions of the data to improve accuracy and robustness. In the prior art principal component analysis method discussed above the number of principal components V is selected heuristically, without cross-validation.

Suitable for use as the transform generator 148 is a computer executing a partial-least-squares application, such as that available from Eigenvector Research, Inc., Wenatchee, Wash., as PLS_Toolbox 3.5 for Use with Matlab™.

As noted earlier, in the preferred implementation of the present invention the actual reflectances 112 measured from the reference samples and the actual reflectances 120 measured from the target samples are scaled by a statistical transform 156 such as Box-Cox transform. The scaling is such that the sets 112, 120 of actual reflectances are closer to a normal statistical distribution. The preferred Box-Cox transform has the form:

$$R^\alpha, \text{ where } \alpha=1/3.$$

A cube root exponent for the Box-Cox transform mimics the cube root dependency relating tristimulus and CIE L*a*b* color values [equations (1)-(3)] and is believed to more suitably scale the reflectances to better match color perception. Thus, better results are expected for mapping parameters in reflectance space because the objective function is more closely tied to human vision perception of color.

The next step of a method of the present invention is indicated in block 142 of the flow chart (FIG. 2) and the block diagram of FIG. 6. In this step actual reflectances measured from the samples contained in the reference set 108 (FIG. 3) are applied to the cross-validated, partial-least-squares transform 150. The transform 150 utilizes these reference reflectances to produce corresponding predicted reflectances 158 for the target set of operating conditions.

For reasons similar to those discussed in connection with FIG. 5 the actual reflectances are scaled using the statistical transform 156 [Box-Cox of the form $R^\alpha$ (where $\alpha=1/3$)] before application of the transform 150. In addition, the output of the transform 150 is scaled by an inverse 160 of the statistical transformation, i.e., Box-Cox transform of the form $R^{-\alpha}$, where $\alpha=1/3$.

At least the reflectances measured for the (M−K) number of reference samples in the subset 114 shown in FIG. 3 [that is, reference samples (K+1) through M] should be applied to the transform 150. In addition, if desired, the reflectances measured for one, some or all of reference samples in the subset 112 of FIG. 3 [that is, reference samples 1, 2 . . . K] may also be applied to the transform 150. It is again noted that the operating requirements of the color characterization program dictate the number of colorants or colorant combinations applied to the transform 150 (FIG. 6).

Figure 7:
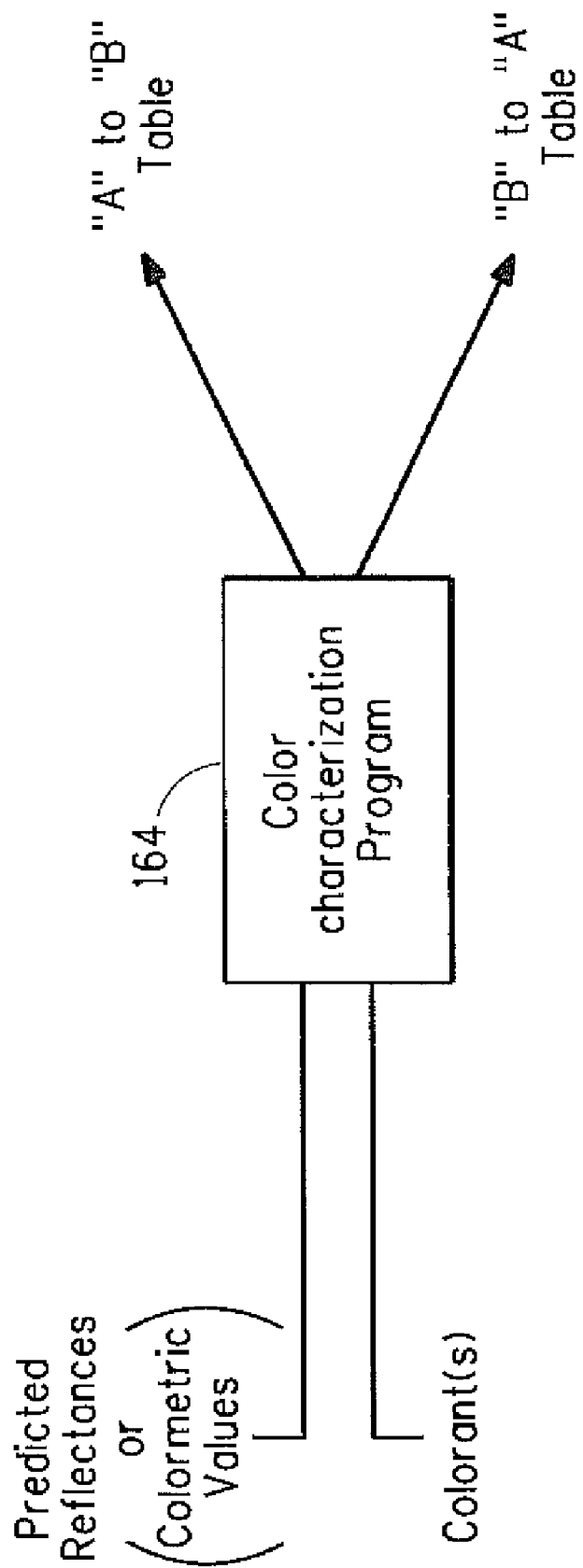
FIG. 7 is a block diagram illustrating the use of a set of predicted reflectances generated by the cross-validated partial-least-squares transform to create a color characterization.

FIG. 7 is a block diagram illustrating the next step 144 of the method of the present invention. The set 158 of predicted reflectances produced by the cross-validated partial-least-squares transform generator 150 (FIG. 6) together with the particular colorant and colorant combinations used to created the samples are applied to a computer 164 operating in accordance with a color characterization program, such as the application programs mentioned earlier. It should be understood that the set 158 of predicted reflectances may be converted to their corresponding colorimetric values prior to application to the computer 164. Using these inputs the color characterization program generates a forward transform 34 ("A-to-B" table) and a reverse transform 30 ("B-to-A" table). The "B-to-A" table 30 predicts the colorimetric output producible by the printer 16 using a predetermined colorant or combination of colorants when the printer 16 is operable under the target set of operating conditions. It should be appreciated that the present invention has application to other, proprietary, color characterization programs which may not produce tables of values compatible with the ICC format.

-o-0-o-

Figure 8:
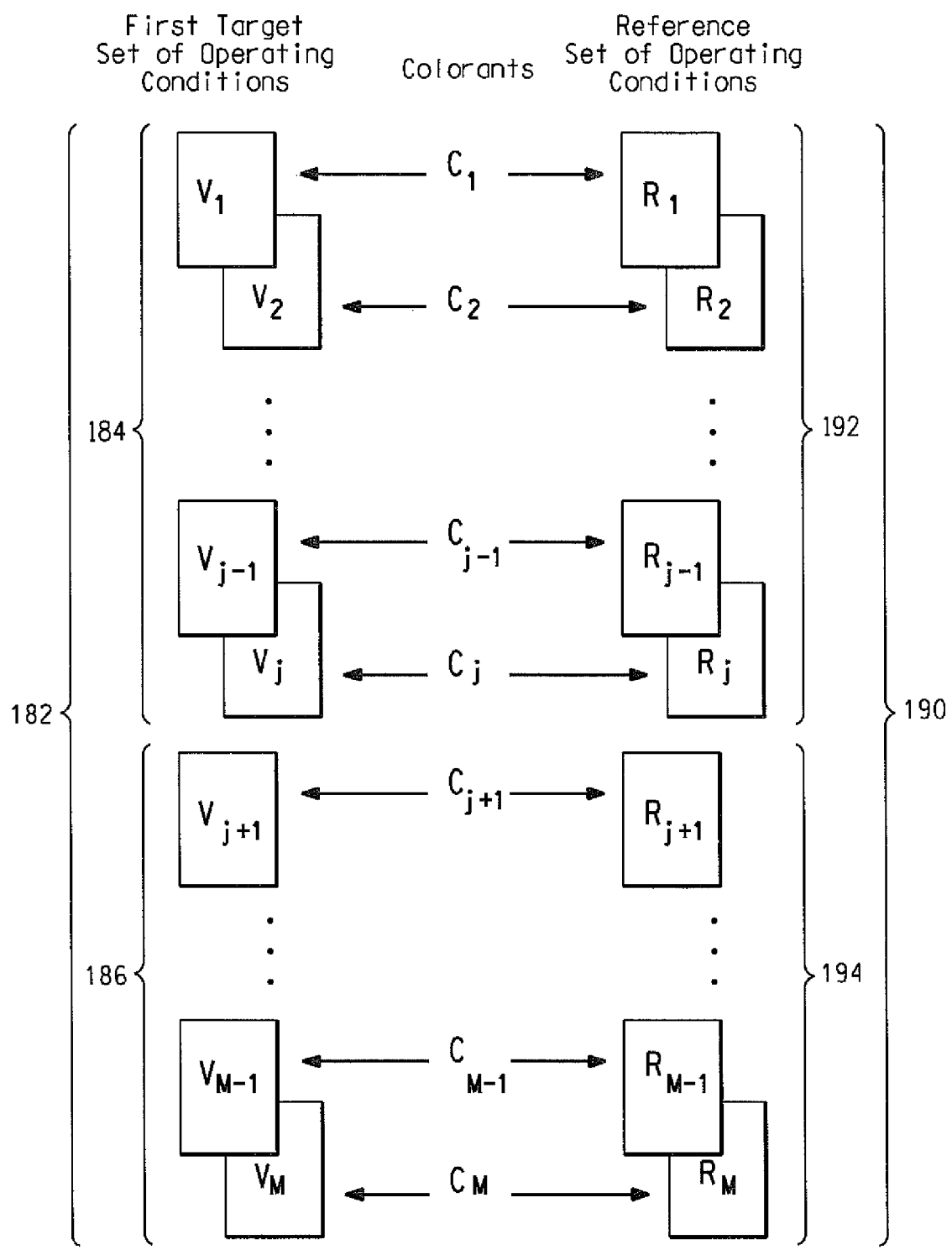
FIG. 8 is a stylized diagrammatic illustration depicting various sample collections produced in connection with another aspect of the present invention involving a method for selecting an optimal number of samples useful to produce the transform.
Figure 9:
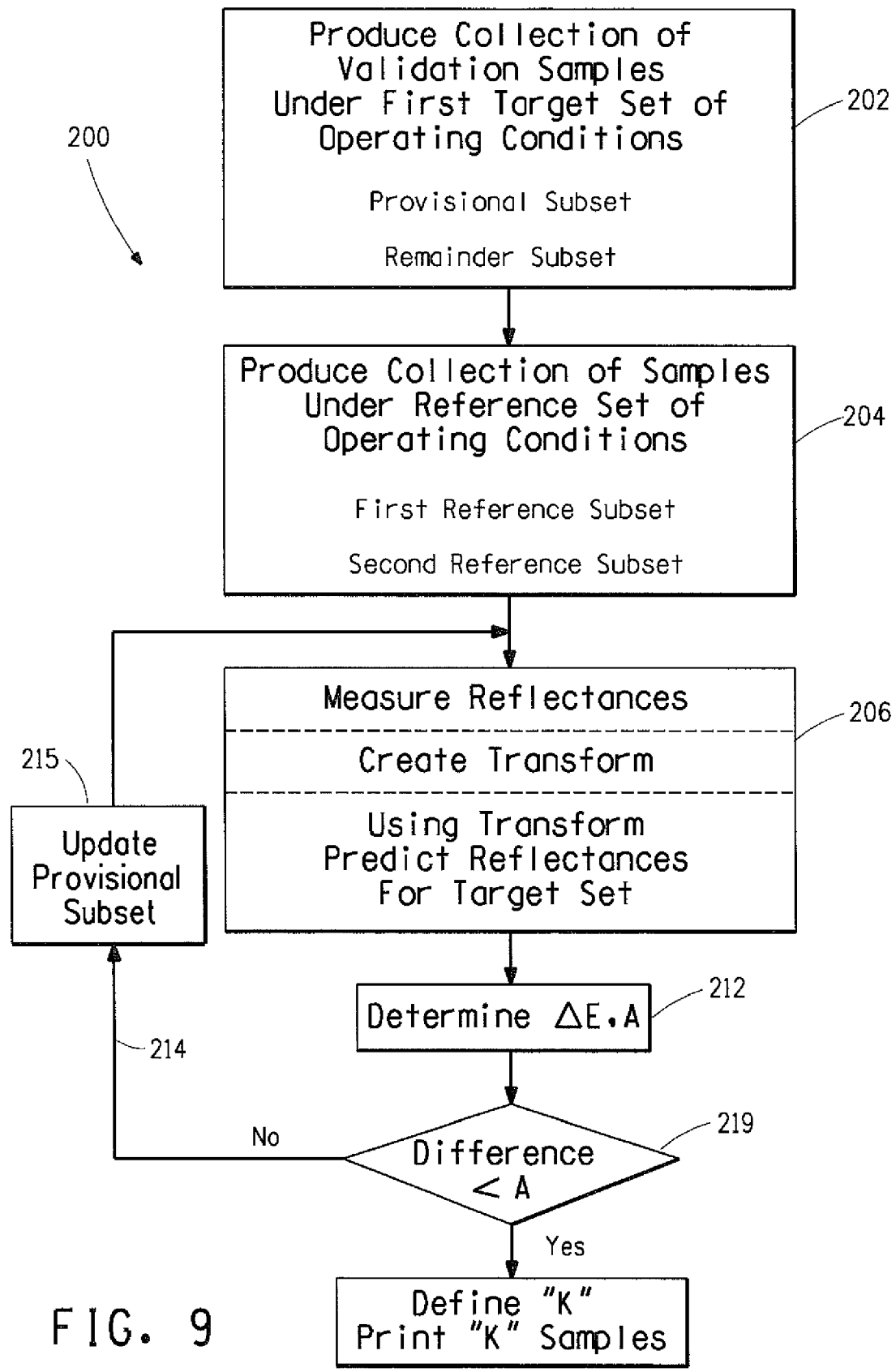
FIG. 9 is a flow chart representation of the method steps involved in accordance with the aspect of the invention using the sample collections depicted in FIG. 8.

In yet another aspect the present invention relates to a method for producing a set containing an optimal number "K" of samples useful in generating the transform 150. FIG. 8 is a stylized diagrammatic illustration depicting various sample collections produced in connection with the implementation of this method while FIG. 9 is a flow chart representation of this method 200 using the sample collections depicted in FIG. 8.

In the discussion that follows it is assumed that a printer 16 (FIG. 1) has available to it a predetermined number of colorants, one of which is a black colorant. Each of the available colorants may be characterized as a point in CIE L*a*b* color space. Each of these points in L*a*b* color space may be projected onto an a*b* plane in that space. With the color points so projected onto the a*b* plane, as one moves along any closed curve in that plane about the L* axis the projections of the color points are encountered in a predetermined order. Colors whose projections are encountered sequentially are herein termed "hue-adjacent" colors.

The various collections of reference, validation and target samples to be discussed are printed with varying degrees of "coverage", where the term "coverage" as used herein is meant to denote the percentage of a given area on a substrate that has a colorant or combination of colorants thereon. When a combination of colorants is used, a coverage value (up to one hundred percent) may be specified for each colorant in the combination. Coverage may also be determined using other metrics, as, for example, density, percent tone value, or chroma.

FIG. 8 illustrates a collection 182 of validation samples produced by the printer under a first target set of operating conditions. This collection corresponds to the action indicated in the block 202 of the flow chart of FIG. 9.

The validation collection 182 includes a total of at least M number of samples, where the number M is selected in accordance with the requirements of a color characterization program to be utilized. The validation samples are themselves ordered $V_1, V_2, \ldots V_{j-1}, V_j, V_{j+1}, \ldots V_{M-1}, V_M$. Each of the samples in the validation collection 182 is produced using a predetermined colorant or a colorant combination. The particular colorant or colorant combination used to produce a corresponding sample in the collection 182 is indicated in FIG. 8 by the reference character "C" followed by the subscript of the corresponding reference sample so produced.

The validation collection 182 is subdivisible into a first provisional subset 184 and a remainder target subset 186. The first provisional subset 184 contains "j" number of samples. Specifically, the first provisional subset 184 contains validation samples $V_1, V_2, V_3, \ldots V_{j-1}, V_j$. The remainder target subset 186 contains (M−j) number of samples, specifically validation samples $V_{j+1}, \ldots V_{M-1}, V_M$.

The colorants and colorant combinations $C_1, C_2, \ldots C_{j-1}, C_j$ used to produce first provisional subset 184 are selected such that the first provisional subset 184 includes at least the following:

A) one sample with no colorant;
B) a sample for each colorant having 100% coverage;
C) a sample for each colorant having 50% coverage;
D) for each hue-adjacent pair of printer colorants (excluding black), a sample having 100% coverage of both colorants; and
E) for each hue-adjacent pair of printer colorants (excluding black), a sample having 50% coverage of both colorants.

The colorants or colorant combinations $C_{j+1}, \ldots C_{M-1}, C_M$ used for the samples in the remainder target subset 186 are selected such that this subset includes at least one or more of the following:

F) for each hue-adjacent pair of printer colorants (excluding black), a sample having 50% coverage of a first colorant and 100% coverage of a second colorant;
G) for the same hue-adjacent pair of printer colorants (excluding black), a sample having 100% coverage of the first colorant and 50% coverage of the color colorants;
H) a sample having 50% coverage of black with 100% coverage of each single colorant; and
I) a sample having 50% coverage of black with 100% coverage of both of each hue-adjacent pair wise colorants.

In addition, colorants and colorant combinations may be selected such that the remainder target subset 186 also includes one or more of the following:

J) one or more sample(s) for each colorant having coverage ranging from 0% coverage to 100% coverage by various predetermined steps. By way of illustration and not limitation, the steps may be steps of twenty-five, steps of ten, or steps of one;
K) for any pair of printer colorants (including black as one of the pair), one or more sample(s) having coverage for each colorant ranging from 0% coverage to 100% coverage by various predetermined steps;
L) for a triplet of colorants comprising black colorant together with any pair of other colorants, one or more sample(s) having coverage for each colorant ranging from 0% coverage to 100% coverage by various predetermined steps; and/or
M) for a triplet of cyan, magenta and yellow colorants, one or more sample(s) having equal coverages of cyan, magenta and yellow ranging from 0% coverage to 100% coverage by various predetermined steps.

Still further, colorants and colorant combinations may be selected such that the remainder target subset 186 also includes one or more of the following:

N) one or more sample(s) having colorant combinations representative of regions of the color space having special significance, such as flesh tones, vignettes or gray scales;
(O) one or more sample(s) having colorant combinations representative of regions of the color space for which a difference ΔE in color space between a predicted reflectance and a measured reflectance (as will be discussed herein) is deemed as unacceptably high.

As denoted in block 204 (FIG. 9) the printer is operated under a reference set of operating conditions to produce a reference collection 190 also containing at least M number of samples. The reference collection 190 is itself subdivisible into a first reference subset 192 (FIG. 8) containing "j" number of samples (viz., samples $R_1, R_2, R_3, \ldots R_{j-1}, R_j$) and a second reference subset containing (M−j) number of samples (viz., $R_{j+1}, \ldots R_{M-1}, R_M$). The samples in the first reference subset 192 are produced from respective colorants or colorant combinations $C_1, C_2, C_3, \ldots C_{j-1}, C_j$ while the samples in the second reference subset are produced from respective colorants or colorant combinations $C_{j+1}, \ldots C_{M-1}, C_M$.

The samples in the various subsets of the various collections may be produced in any desired printing order (i.e., either collection may be printed before the other). For convenience it is expected that the entire collection 182 of validation samples and the entire collection 190 of reference samples would each be produced in a single respective contemporaneous printing under the respective operating conditions for each collection. Particular samples from the collections would then be selected for inclusion in the various subsets and used in the manner to be discussed. It should, however, be understood that the various samples contained in the various subsets of the sample collections 182, 190 may be produced in piecemeal fashion, if desired.

The next step in the method 200 is indicated in block 206. These activities are generally as discussed in connection with the description of FIG. 4 through FIG. 6.

First, the actual spectral reflectances for each sample in the provisional target subset, the remainder target subset, the first reference subset and the second reference subset are measured. This occurs as discussed in connection with FIG. 4.

Next, the measured spectral reflectances for the samples in the provisional target subset and the first reference subset are used to create a cross-validated, partial-least-squares transform. This is implemented in the same manner as discussed in connection with FIG. 5. The transform so produced maps a reflectance from a sample produced under the reference set of operating conditions to a reflectance from a corresponding sample produced under the first target set of operating conditions.

The cross-validated partial-least-squares transform is then used to generate a set of predicted reflectances for at least the samples produced in the remainder target subset. It is again noted that to generate this set of predicted reflectances the actual reflectances measured from the samples contained in the second reference subset 194 are applied to the cross-validated, partial-least-squares transform. The transform utilizes these reference reflectances to produce the corresponding predicted reflectances for the remainder target subset. This implementation is similar to that discussed in connection with FIG. 6.

Next, as shown in the block 212, the difference ΔE in color space between the predicted reflectance and the measured reflectance for each pair-wise combination of samples in the remainder target subset is determined. This action produces a set of at least (M−j) ΔE differences.

A criteria of acceptance A is determined from the descriptive statistics of this set of ΔE differences, preferably taken in view of an assessment of the color match accuracy needed for a particular application. This assessment of color match accuracy considers the reproducibility of the printing system and the quality requirements of any final printed product. For example, color match accuracy requirements are higher for proofing on a glossy substrate than for printing on a textile fabric. The descriptive statistics of the set of ΔE differences includes parameters such as average, standard deviation, maximum, minimum as well as a histogram of the ΔE difference distribution. It may be that, in some cases, some ΔE difference values are correlated with particular regions in the color space.

As indicated in the decision block 219, if the descriptive statistics of the set of ΔE differences fall outside the criteria of acceptance A, an updated provisional target subset (block 215) is defined, and as indicated by the flow arrow 214, the steps in the block 206 are repeated.

To create the updated provisional target subset one or more of the samples originally contained in the remainder target subset (viz., samples $V_{j+1}, \ldots V_{M-1}, V_M$) is(are) combined with the samples in the first provisional target subset. The activities in blocks 206, 212 and 219 are iteratively performed using the updated provisional target subset [and any subsequent updated provisional target subset(s)] until the descriptive statistics of the set of ΔE differences fall within the criteria of acceptance A. Of course, during each iteration it is only necessary to measure samples whose reflectance has not been previously measured.

Once the descriptive statistics of the set of ΔE differences fall within the criteria of acceptance A, the number of samples in the last-updated provisional target subset defines an optimal number "K" of samples. Using the respective colorants or colorant combinations corresponding to the samples in the last-updated provisional target subset the printer is operated under a second, different, target set of operating conditions to produce a optimal collection of K number of samples.

This collection of K samples produced as a result of the method discussed in connection with FIGS. 8 and 9 provides the basic and novel characteristics of this aspect of the present invention, viz., a collection of samples wherein the descriptive statistics of the set of ΔE differences fall within the criteria of acceptance A. For purposes of this application, including the claims, the phrases "consists essentially of" and "consisting essentially of" are used as a transitional phrases to limit the scope of a claim to a sample collection that contains at least that specific number of samples selected so as to result in the descriptive statistics of the set of ΔE differences falling within the criteria of acceptance A. However, it should be understood that these transitional phrases also encompass the possibility that a collection within the scope of the claim may contain additional samples, so long as the basic and novel characteristics of this aspect of invention are not compromised.

-o-0-o-

EXAMPLE

The following Example illustrates the production of a transform useful for predicting a reflectance value producible by a printer while operating under a predetermined target set of operating conditions and to the use of the transform to produce predicted reflectances. The Example also utilized a sample set substantially similar to an efficient sample set produced in accordance with another aspect of the present invention.

The various data Tables 1 through 4 referenced in the text of the Example are set forth in the Data Appendix.

A first set of 969 color samples was printed on a DuPont Artistri™ 2020 digital ink jet printer (available from E. I du Pont de Nemours and Company, Wilmington, Del.) using a DuPont Artistri™ 2020 dispersed dye ink set comprising the colors cyan, magenta, yellow, black, and violet, as indicated in the Tables under column headings "C", "M", "Y", "K" and "V", respectively.

The printing was done on Testfabrics poly730, a texturized Dacron 56T interlock knit filament polyester fabric with weight of 106 grams per square meter (available from Testfabrics Inc., West Pittston, Pa.), pre-treated with a DuPont D700 pretreatment (available from E. I du Pont de Nemours and Company, Wilmington, Del.).

The printer was operated at 540 dpi by 600 dpi in single-carriage, bi-directional printing mode. This was the reference condition. The set of 969 colorant combinations was determined by the printer color characterization module of the Artistri™ application software, as shown in the first five columns of Table 1. A first small set of 35 samples (K=35) was selected from the set of 969. The 35 samples were chosen to include the substrate only as well as solid (100% coverage) and half-tone (50% coverage) samples of each of the printer inks. The set of 35 samples also included combinations of solid (100% coverage) and half-tone (50% coverage) overprinting of hue-adjacent pairs of printer inks. The 35 selected colorant combinations are shown in the first five columns of Table 2. The tabulated values are digital counts in the range 0 to 255. The value 0 represents no ink; the value 255 represents 100% coverage. Since the relationship between digital counts and percent coverage was non-linear, the value representing 50% coverage was different from 127.

A second small set of 35 samples was printed on the Artistri™ digital ink jet printer using the same reactive dye ink set, the same fabric, and the same printer conditions except the resolution was 360 dpi by 600 dpi. This was the target condition. The 35 colorant combinations are the same as for the first set of 35 samples and are shown in the first five columns of Table 3.

The first set of 969 printed color samples were measured with a GretagMacbeth SpectroLino spectrophotometer (available from GretagMacbeth, New Windsor, N.Y.) mounted on the SpectroScan XY table. Reflectance values were captured at 20-nm intervals over the range 400-nm to 700-nm and are shown in Table 1.

The measurements of the first set of 35 printed color samples were extracted from the set of 969 measurements and are shown in Table 2.

The second set of 35 printed color samples were measured with the GretagMacbeth SpectroLino spectrophotometer mounted on the SpectroScan XY table. Reflectance values were captured at 20-nm intervals over the range 400-nm to 700-nm and are shown in Table 3.

The measured reflectances from the first set of 35 samples and the measured reflectances from the second set of 35 samples were imported into the Dell laptop computer model D600 executing a Matlab analysis application from The Mathworks. The reflectance values were pre-processed by computing the cube root of each value. The PLS Toolbox for Matlab from Eigenvector Research Inc. was used to build a cross-validated PLS model that mapped cube root of reflectances from the first set (reference condition) to cube root of reflectances from the second set (target condition). The cube root of reflectances from the first set were loaded as the X values; the cube root of reflectances from the second set were loaded as the Y values. Pre-processing was selected as "none" for both X values and Y values. Cross-validation was selected as "leave one out". The model was built, and six latent variables were chosen since six latent variables captured 99.98% of the variation in X and 99.92% of the variation in Y.

The measured reflectances from the first set of 969 samples were imported into Matlab and pre-processed by computing the cube root of each value. The "modlpred( )" function from the PLS Toolbox was used to apply the model to the cube root of reflectances from the first set of 969 samples (reference condition) in order to predict the cube root of reflectances for the set of 969 samples for the target condition. Each value from the predicted cube root of reflectances was cubed to produce the predicted reflectances for the set of 969 samples for the target condition.

As a test case, a second set of 969 color samples was printed on the Artistri™ printer using the same reactive dye ink set, the same fabric, and the same printer conditions as for the first set of 969 color samples except the resolution was 360 dpi by 600 dpi (target condition). The 969 colorant combinations were the same as for the first set of 969 samples. This second set of 969 printed color samples were measured with the GretagMacbeth SpectroLino spectrophotometer mounted on the SpectroScan XY table. Reflectance values were captured at 20-nm intervals over the range 400-nm to 700-nm and are shown in Table 4.

The measured reflectances from the second set of 969 printed color samples (target condition) were compared with the predicted reflectances from the model for the target condition.

Two comparisons are made: a root mean square difference in percent reflectance between corresponding pair of reflectances, and a $\Delta E_{ab}$ for each corresponding pair of reflectances converted to CIELAB colorimetry.

Descriptive statistics for these comparisons are tabulated below.

|  | Average | St. Dev. |
|---|---|---|
| RMS difference | 2.5 | 1.6 |
| Delta E | 3.1 | 1.9 |

To show that the present invention is an improvement, two different methods for transforming the first set of conditions (540 dpi×600 dpi) to the second set of conditions (360 dpi×600 dpi), using reflectance data from 35 matched color patches have been investigated, viz.:
1. Comparison Method ("PCA") A principal component analysis in accordance with the method disclosed in U.S. Pat. No. 6,656,143 (Dalal et al.);
2. Invention Method ("PLS") A cross-validated partial-least-squares method in accordance with invention described in the present application, with (reflectance)$^{1/3}$ scaling.

Results of these two methods as a function of number of components are set forth in the following Results Table. The Results Table includes the number of components selected (latent vectors for PLS, principal components for PCA), mean color difference of ΔE for the PLS method, and mean color difference of ΔE for the PCA method. For the PCA method the principal components are selected visually from the large 969-sample set; For the PLS method the latent vectors are selected by cross-validation on the small 35-sample set. The mean color difference of ΔE is for predicting the patch's color under the second set of conditions (360 dpi×600 dpi) for the large 969-sample data set:

Results Table

| | Mean Delta-E | |
|---|---|---|
| LVs/PCs | PLS | PCA |
| 1.0000 | 35.8591 | 34.6452 |
| 2.0000 | 27.5733 | 27.9546 |
| 3.0000 | 7.2140 | 11.0560 |

-continued

Results Table

Mean Delta-E

| LVs/PCs | PLS | PCA | |
|---|---|---|---|
| 4.0000 | 3.6518 | 7.4938 | |
| 5.0000 | 3.2047 | 6.5394 | |
| 6.0000 | 3.1465 | 6.0587 | <--- PLS |
| 7.0000 | 3.0338 | 5.9605 | |
| 8.0000 | 2.9545 | 10.9236 | |
| 9.0000 | 2.9348 | 8.8822 | |
| 10.0000 | 3.0007 | 9.0040 | <--- PCA |
| 11.0000 | 3.1106 | 8.8996 | |
| 12.0000 | 3.2633 | 7.6127 | |
| 13.0000 | 3.1305 | 9.3217 | |
| 14.0000 | 3.1486 | 9.3940 | |
| 15.0000 | 3.2523 | 9.5525 | |
| 16.0000 | 3.2562 | 10.7492 | |

In particular for the present example, 6 latent vectors were chosen with the PLS method for comparison with 10 principal components chosen with the PCA method. The PLS method with reflectance scaling gives a mean color error Delta-E (3.1), almost three times better than the PCA method (9.0).

Figure 10:
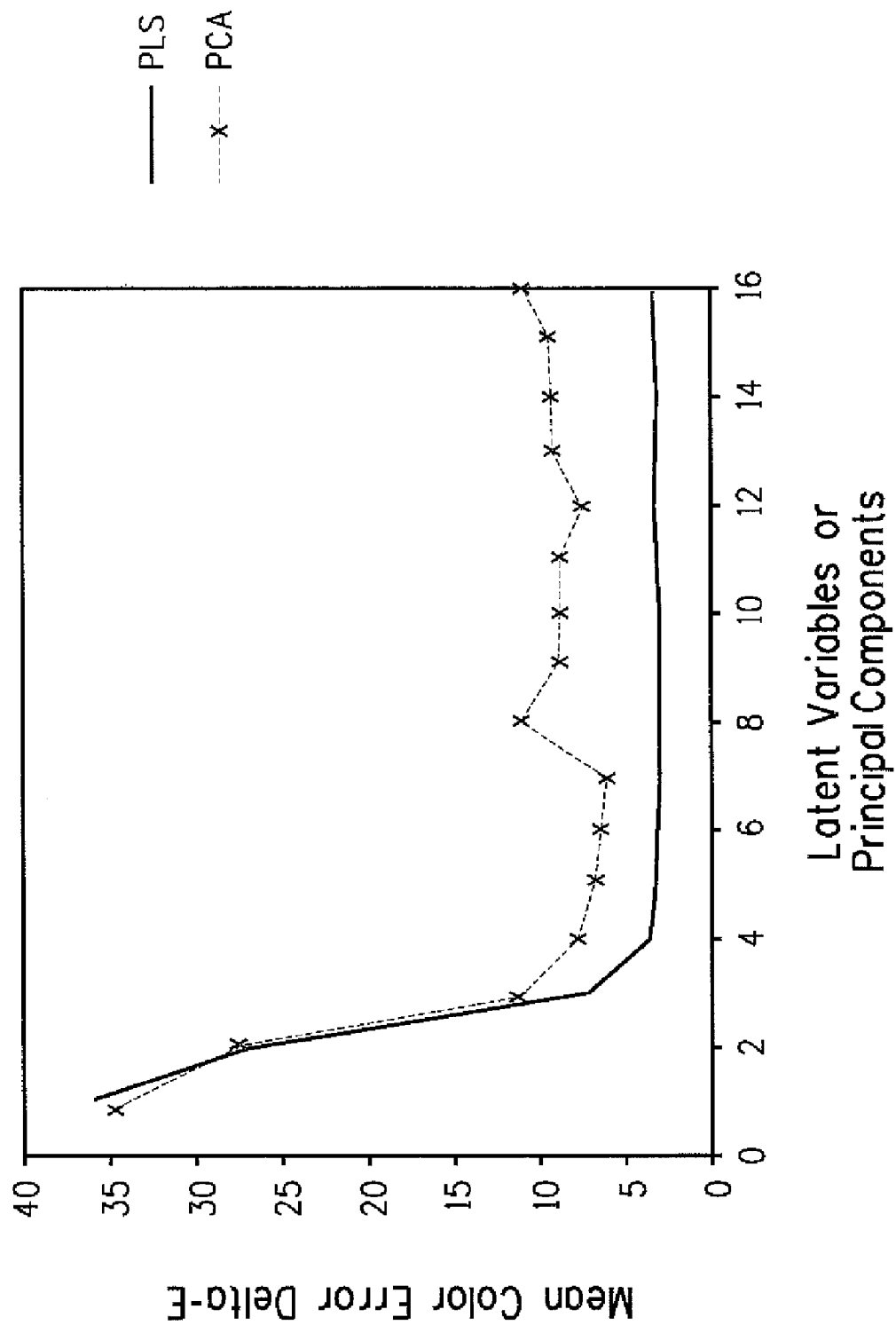
FIG. 10 is a graphical depiction of the results of the Example.

FIG. 10 shows that the PLS method [solid line] gives a lower Mean Delta-E than the PCA method [dashed line with "x"] for every value of the number of components greater than one. The PLS method is also more robust: it's Mean Delta-E error varies from about 2.9 to 3.2 for all numbers of latent variables from five through 16, while in this range the PCA model gives errors from 6.0 to >10.

-o-0-o-

Those skilled in the art, having the benefits of the teachings of the invention as hereinabove set forth, may effect modifications thereto. It is to be understood that such modifications are to be construed as lying within the scope of the present invention as defined by the appended claims.

TABLE 1

First set of 969 patches
(reference condition)

| Colorant digital count (0-255) | | | | | Percent reflectance at wavelength | | | | | | | | | | | | | | | | |
|---|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 0 | 0 | 255 | 0 | 3.35 | 3.13 | 2.93 | 2.91 | 2.87 | 2.75 | 2.46 | 2.18 | 1.99 | 1.92 | 1.94 | 1.98 | 2.06 | 2.4 | 4.14 | 10.85 |
| 0 | 0 | 0 | 0 | 0 | 62.32 | 73.54 | 77.06 | 78.8 | 79.66 | 79.86 | 79.49 | 78.87 | 77.9 | 77.68 | 77.52 | 77.38 | 77.34 | 77.74 | 77.95 | 78.58 |
| 0 | 0 | 255 | 0 | 0 | 3.24 | 2.62 | 2.52 | 2.91 | 7.54 | 39.24 | 70.03 | 77.05 | 78.27 | 78.88 | 79.07 | 79.03 | 78.91 | 79.06 | 78.77 | 79.21 |
| 255 | 0 | 255 | 0 | 0 | 4.01 | 3.17 | 3.07 | 3.72 | 9.43 | 25.25 | 24.84 | 19.21 | 13.87 | 9.91 | 7.13 | 5.2 | 4.22 | 3.8 | 3.51 | 3.94 |
| 255 | 0 | 0 | 0 | 0 | 21.87 | 29.58 | 35.39 | 42.51 | 36.99 | 28.41 | 20.9 | 14.75 | 9.9 | 6.65 | 4.61 | 3.35 | 2.79 | 2.55 | 2.41 | 2.66 |
| 255 | 0 | 0 | 0 | 255 | 15.23 | 16.83 | 15.68 | 12.44 | 8.4 | 5.49 | 3.68 | 2.86 | 2.47 | 2.47 | 2.69 | 2.94 | 3.21 | 3.25 | 3.1 | 3.46 |
| 0 | 0 | 0 | 0 | 255 | 14.61 | 14.55 | 12.1 | 8.22 | 5.05 | 3.23 | 2.37 | 2.08 | 1.97 | 2.03 | 2.3 | 3.3 | 8.59 | 26.35 | 53.31 | 70.27 |
| 0 | 255 | 0 | 0 | 255 | 17.29 | 16.22 | 12.09 | 7.87 | 5.03 | 3.59 | 2.73 | 2.49 | 2.33 | 2.59 | 3.58 | 5.82 | 13.28 | 29.99 | 50.99 | 66.51 |
| 0 | 255 | 0 | 0 | 0 | 28.47 | 25.36 | 16.91 | 10.68 | 7.07 | 5.51 | 4.46 | 4.94 | 5.04 | 9.98 | 31.6 | 57.25 | 66.65 | 70.23 | 72.99 | 76.05 |
| 0 | 255 | 255 | 0 | 0 | 4.27 | 3.15 | 2.93 | 3.39 | 5.81 | 7.42 | 6.22 | 6.92 | 7.05 | 13.01 | 32.08 | 46.39 | 51.52 | 55.91 | 62.11 | 70.12 |
| 0 | 0 | 0 | 62 | 0 | 27.92 | 27.96 | 27.15 | 27.48 | 28.15 | 27.98 | 25.7 | 22.45 | 19.01 | 17.43 | 17.44 | 18.17 | 19.79 | 25.64 | 39.88 | 59.45 |
| 0 | 0 | 255 | 26 | 0 | 3.05 | 2.5 | 2.45 | 2.77 | 7.04 | 32.1 | 47.01 | 46.53 | 42.99 | 41.07 | 41.06 | 41.96 | 43.88 | 49.82 | 60.85 | 71.6 |
| 255 | 0 | 255 | 26 | 0 | 3.71 | 2.94 | 2.82 | 3.42 | 8.76 | 23.22 | 22.84 | 17.72 | 12.76 | 9.11 | 6.57 | 4.79 | 3.88 | 3.49 | 3.26 | 3.67 |
| 0 | 0 | 15 | 0 | 0 | 23.84 | 21.69 | 21.51 | 25.03 | 42.2 | 72.74 | 79.78 | 80.49 | 80 | 79.67 | 79.07 | 78.32 | 77.59 | 77.36 | 76.89 | 77.47 |
| 58 | 0 | 15 | 0 | 0 | 19.86 | 17.4 | 17.13 | 21.06 | 38.47 | 63.54 | 61.97 | 53.23 | 42.82 | 33.66 | 26.23 | 20.25 | 16.77 | 15 | 13.8 | 15.56 |
| 58 | 0 | 255 | 0 | 0 | 3.1 | 2.59 | 2.46 | 2.83 | 7.58 | 36.64 | 57.16 | 54.23 | 45.73 | 37.5 | 30.56 | 24.8 | 21.3 | 19.47 | 18.16 | 19.94 |
| 255 | 0 | 0 | 26 | 0 | 21.04 | 26.97 | 30.81 | 35.38 | 32.05 | 25.83 | 19.5 | 13.94 | 9.42 | 6.4 | 4.51 | 3.34 | 2.82 | 2.62 | 2.51 | 2.73 |
| 58 | 0 | 0 | 0 | 0 | 51.17 | 64.2 | 70.32 | 75.16 | 74.06 | 69.47 | 62.05 | 52.53 | 41.9 | 32.66 | 25.15 | 19.16 | 15.7 | 13.93 | 12.76 | 14.56 |
| 255 | 0 | 15 | 0 | 0 | 14.63 | 14.58 | 15.05 | 18.75 | 26.9 | 27.82 | 20.99 | 14.8 | 9.9 | 6.63 | 4.6 | 3.38 | 2.83 | 2.6 | 2.5 | 2.74 |
| 255 | 0 | 0 | 26 | 255 | 13.86 | 15.19 | 13.94 | 10.9 | 7.3 | 4.73 | 3.2 | 2.56 | 2.29 | 2.28 | 2.45 | 2.67 | 2.91 | 2.95 | 2.83 | 3.2 |
| 58 | 0 | 0 | 0 | 50 | 42.96 | 49.6 | 45.45 | 37.32 | 28.81 | 23.82 | 19.67 | 19.91 | 18.14 | 20.69 | 20.48 | 16.29 | 13.5 | 12.08 | 11.13 | 12.52 |
| 255 | 0 | 0 | 0 | 50 | 23 | 29.41 | 32.04 | 32.37 | 26.25 | 20.81 | 16.02 | 12.91 | 9.42 | 7.09 | 5.17 | 3.74 | 3.07 | 2.78 | 2.62 | 2.92 |
| 0 | 0 | 0 | 26 | 255 | 13.93 | 13.52 | 11.26 | 7.79 | 4.84 | 3.14 | 2.34 | 2.07 | 1.98 | 2.03 | 2.28 | 3.18 | 7.95 | 22.64 | 45.18 | 65.07 |
| 0 | 0 | 0 | 0 | 50 | 49.84 | 56.02 | 49.24 | 38.94 | 29.95 | 24.98 | 20.89 | 22.18 | 21.52 | 29.6 | 37.36 | 33.01 | 28.8 | 26.42 | 24.72 | 26.85 |
| 58 | 0 | 0 | 0 | 255 | 16.15 | 16.23 | 13.85 | 9.78 | 6.17 | 3.93 | 2.74 | 2.31 | 2.13 | 2.2 | 2.56 | 3.66 | 7.73 | 14.33 | 16.94 | 19.35 |
| 0 | 255 | 0 | 26 | 255 | 17.88 | 16.74 | 12.67 | 8.4 | 5.44 | 3.88 | 2.95 | 2.67 | 2.49 | 2.79 | 3.86 | 6.18 | 13.42 | 27.69 | 44.55 | 60.64 |
| 0 | 40 | 0 | 0 | 50 | 47.19 | 51.15 | 42.17 | 31.5 | 23.34 | 19.08 | 15.71 | 16.97 | 16.67 | 25.15 | 36.37 | 33.2 | 29.04 | 26.66 | 24.93 | 27.05 |
| 0 | 40 | 0 | 0 | 255 | 15.89 | 15.67 | 13.02 | 8.93 | 5.53 | 3.55 | 2.53 | 2.17 | 2.03 | 2.11 | 2.49 | 3.7 | 9.6 | 27.65 | 54.19 | 70.93 |
| 0 | 255 | 0 | 26 | 0 | 26.78 | 23.94 | 16.42 | 10.59 | 7.05 | 5.45 | 4.37 | 4.84 | 4.9 | 9.47 | 25.7 | 37.17 | 41.04 | 46.59 | 56.89 | 68.19 |
| 0 | 40 | 0 | 0 | 0 | 57.66 | 64.6 | 58.83 | 48.74 | 39.22 | 33.7 | 29.05 | 31.45 | 31.86 | 47.94 | 73.86 | 79.54 | 79.05 | 78.36 | 77.6 | 77.85 |
| 0 | 255 | 0 | 0 | 50 | 29.05 | 26.33 | 18.03 | 11.67 | 7.76 | 6.01 | 4.81 | 5.35 | 5.42 | 10.45 | 26.57 | 33.47 | 32.11 | 30.74 | 29.66 | 31.81 |
| 0 | 255 | 255 | 26 | 0 | 3.93 | 2.92 | 2.74 | 3.16 | 5.49 | 7.06 | 5.92 | 6.56 | 6.63 | 11.94 | 26.88 | 35.33 | 38.36 | 43.01 | 51.71 | 63.13 |
| 0 | 40 | 15 | 0 | 0 | 22.55 | 19.82 | 18.52 | 19.77 | 26.77 | 32.37 | 28.97 | 31.55 | 31.97 | 47.99 | 73.36 | 78.8 | 78.36 | 77.72 | 77.04 | 77.31 |
| 0 | 255 | 15 | 0 | 0 | 18.52 | 15.01 | 11.27 | 8.51 | 6.51 | 5.23 | 4.22 | 4.69 | 4.78 | 9.64 | 31.09 | 56.15 | 64.83 | 68.05 | 70.56 | 73.82 |
| 0 | 40 | 255 | 0 | 0 | 3.27 | 2.63 | 2.58 | 2.95 | 7.48 | 27.57 | 33.16 | 36.37 | 36.93 | 50.85 | 72.62 | 77.37 | 77.12 | 76.9 | 76.61 | 77.43 |
| 0 | 0 | 0 | 139 | 0 | 13.9 | 12.84 | 12.09 | 12.06 | 12.22 | 11.9 | 10.49 | 8.71 | 7.03 | 6.29 | 6.3 | 6.6 | 7.31 | 10.14 | 18.46 | 35.53 |
| 0 | 255 | 0 | 58 | 0 | 3.1 | 2.48 | 2.41 | 2.76 | 6.86 | 25.94 | 32.36 | 30.19 | 26.8 | 25.07 | 25.03 | 25.79 | 27.4 | 32.78 | 45.13 | 61.81 |
| 255 | 0 | 255 | 58 | 0 | 3.83 | 3.01 | 2.9 | 3.57 | 8.9 | 21.58 | 20.92 | 16.45 | 12.05 | 8.8 | 6.49 | 4.8 | 3.93 | 3.57 | 3.35 | 3.79 |
| 0 | 0 | 15 | 47 | 0 | 16.68 | 14.15 | 13.61 | 15.98 | 25.6 | 35.84 | 34.93 | 31.36 | 27.23 | 25.24 | 25.17 | 25.97 | 27.86 | 34.36 | 48.19 | 64 |
| 58 | 0 | 15 | 47 | 0 | 16.25 | 13.82 | 13.4 | 16.08 | 26.06 | 35.13 | 32.71 | 27.82 | 22.56 | 18.89 | 16.29 | 13.94 | 12.53 | 12.38 | 12.69 | 15.09 |
| 58 | 0 | 255 | 26 | 0 | 3.01 | 2.43 | 2.36 | 2.73 | 7.27 | 30.92 | 41.89 | 38.54 | 32.72 | 27.98 | 24.21 | 20.73 | 18.52 | 17.68 | 17.22 | 19.33 |
| 0 | 0 | 0 | 21 | 0 | 46.94 | 50.6 | 51.12 | 52.17 | 53.15 | 53.13 | 50.92 | 47.31 | 42.96 | 40.82 | 40.71 | 41.57 | 43.64 | 50.08 | 61.44 | 71.7 |
| 0 | 0 | 5 | 0 | 0 | 41.97 | 42.9 | 43.6 | 47.74 | 61.15 | 76.65 | 79.36 | 79.42 | 78.79 | 78.46 | 77.92 | 77.28 | 76.7 | 76.55 | 76.17 | 76.75 |
| 17 | 0 | 5 | 0 | 0 | 36.89 | 37.01 | 37.6 | 42.42 | 57.49 | 72.85 | 73.06 | 69.24 | 63.16 | 56.39 | 49.28 | 42.32 | 37.61 | 35.06 | 33.11 | 35.79 |
| 0 | 0 | 5 | 21 | 0 | 32.47 | 31.35 | 31.04 | 34.02 | 43.36 | 51.61 | 50.66 | 47.22 | 42.86 | 40.67 | 40.51 | 41.34 | 43.39 | 49.89 | 61.42 | 71.81 |
| 17 | 0 | 5 | 21 | 0 | 31.16 | 30.19 | 29.94 | 33.15 | 42.68 | 50.23 | 48.33 | 43.82 | 38.3 | 34.43 | 31.84 | 29.47 | 28.15 | 29.05 | 30.98 | 35.55 |
| 17 | 0 | 15 | 0 | 0 | 23.71 | 21.67 | 21.51 | 25.13 | 41.7 | 69.27 | 73.13 | 69.95 | 64.19 | 57.72 | 50.91 | 44.25 | 39.74 | 37.27 | 35.36 | 37.86 |
| 0 | 0 | 255 | 10 | 0 | 3.1 | 2.52 | 2.46 | 2.81 | 7.5 | 36.29 | 58.26 | 60.36 | 57.97 | 56.43 | 56.23 | 56.71 | 57.97 | 62.03 | 68.09 | 73.37 |

TABLE 1-continued

First set of 969 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 0 | 37 | 0 | 0 | 11.81 | 9.75 | 9.51 | 11.59 | 25.38 | 64.86 | 77.9 | 79.5 | 79.17 | 78.96 | 78.46 | 77.94 | 77.67 | 77.61 | 77.22 | 77.67 |
| 17 | 0 | 255 | 0 | 0 | 3.13 | 2.61 | 2.46 | 2.85 | 7.6 | 38.64 | 66.51 | 69.5 | 65.41 | 59.58 | 53.15 | 46.63 | 42.17 | 39.76 | 37.88 | 40.2 |
| 0 | 0 | 37 | 10 | 0 | 11.31 | 9.23 | 8.91 | 10.92 | 23.47 | 54.69 | 62.14 | 60.64 | 57.23 | 55.33 | 54.96 | 55.33 | 56.62 | 61.1 | 68.07 | 73.93 |
| 17 | 0 | 255 | 10 | 0 | 3.19 | 2.52 | 2.47 | 2.82 | 7.34 | 35.57 | 55.98 | 56.1 | 51.36 | 46.93 | 43.09 | 39.28 | 36.74 | 36.07 | 35.97 | 39.23 |
| 17 | 0 | 37 | 0 | 0 | 11.04 | 8.81 | 8.59 | 10.72 | 24.59 | 62.61 | 72.6 | 70.19 | 64.43 | 57.92 | 51.01 | 44.37 | 40.09 | 37.63 | 35.68 | 38.23 |
| 255 | 0 | 255 | 10 | 0 | 3.87 | 3.04 | 2.91 | 3.56 | 9.17 | 24.24 | 23.75 | 18.35 | 13.21 | 9.4 | 6.76 | 4.9 | 3.97 | 3.56 | 3.31 | 3.74 |
| 137 | 0 | 37 | 0 | 0 | 11.36 | 9.18 | 8.93 | 11.38 | 24.21 | 46.03 | 41.93 | 32.55 | 23.88 | 17.44 | 12.78 | 9.38 | 7.49 | 6.6 | 6.07 | 6.93 |
| 137 | 0 | 255 | 0 | 0 | 3.49 | 2.71 | 2.69 | 3.18 | 8.68 | 33.25 | 41.9 | 35.18 | 27.2 | 20.9 | 16.11 | 12.39 | 10.21 | 9.12 | 8.38 | 9.44 |
| 137 | 0 | 37 | 10 | 0 | 10.85 | 8.62 | 8.35 | 10.73 | 22.85 | 41.35 | 37.51 | 29.4 | 21.79 | 16.11 | 11.95 | 8.86 | 7.14 | 6.34 | 5.85 | 6.72 |
| 137 | 0 | 255 | 10 | 0 | 3.41 | 2.61 | 2.55 | 3.08 | 8.4 | 31.26 | 38.48 | 32.47 | 25.31 | 19.66 | 15.31 | 11.83 | 9.82 | 8.83 | 8.14 | 9.19 |
| 58 | 0 | 37 | 0 | 0 | 11.28 | 8.77 | 8.44 | 10.89 | 24.96 | 57.28 | 60.58 | 52.88 | 42.99 | 34.19 | 26.95 | 21.06 | 17.57 | 15.78 | 14.54 | 16.28 |
| 17 | 0 | 15 | 21 | 0 | 19.12 | 16.62 | 16.22 | 19.25 | 32.27 | 48.84 | 48.69 | 44.33 | 38.74 | 34.8 | 32.09 | 29.57 | 28.15 | 28.93 | 30.7 | 35.22 |
| 255 | 0 | 0 | 58 | 0 | 19.17 | 23.16 | 25.24 | 27.88 | 26.04 | 22.01 | 17.16 | 12.57 | 8.68 | 6.08 | 4.39 | 3.29 | 2.78 | 2.59 | 2.48 | 2.74 |
| 58 | 0 | 0 | 47 | 0 | 32.07 | 34.85 | 35.21 | 36.46 | 36.79 | 35.43 | 31.52 | 26.46 | 21.22 | 17.65 | 15.14 | 12.87 | 11.54 | 11.4 | 11.69 | 14.01 |
| 255 | 0 | 15 | 26 | 0 | 14.48 | 14.3 | 14.64 | 17.9 | 24.6 | 25.15 | 19.53 | 14.14 | 9.68 | 6.67 | 4.76 | 3.56 | 3.01 | 2.79 | 2.67 | 2.93 |
| 17 | 0 | 0 | 0 | 0 | 58.9 | 70.19 | 74.65 | 77.37 | 77.69 | 76.58 | 73.93 | 69.77 | 63.66 | 57.09 | 50.11 | 43.15 | 38.44 | 35.84 | 33.87 | 36.59 |
| 17 | 0 | 0 | 21 | 0 | 44.84 | 49.4 | 50.39 | 51.74 | 52.41 | 51.72 | 48.52 | 43.84 | 38.23 | 34.38 | 31.74 | 29.27 | 27.88 | 28.74 | 30.58 | 35.24 |
| 58 | 0 | 5 | 0 | 0 | 32.8 | 33.1 | 33.95 | 39.16 | 53.58 | 64.61 | 59.95 | 51.46 | 41.53 | 32.82 | 25.62 | 19.79 | 16.37 | 14.63 | 13.45 | 15.2 |
| 255 | 0 | 37 | 0 | 0 | 9.66 | 8.18 | 8.05 | 10.51 | 19.93 | 26.71 | 20.97 | 14.95 | 10.04 | 6.73 | 4.66 | 3.39 | 2.83 | 2.62 | 2.5 | 2.73 |
| 255 | 0 | 37 | 10 | 0 | 9.9 | 8.53 | 8.42 | 10.84 | 19.72 | 25.83 | 20.46 | 14.73 | 9.98 | 6.75 | 4.69 | 3.41 | 2.84 | 2.62 | 2.48 | 2.74 |
| 137 | 0 | 15 | 0 | 0 | 17.81 | 15.61 | 15.52 | 19.42 | 34.18 | 48.17 | 41.14 | 31.58 | 23.02 | 16.74 | 12.18 | 8.86 | 7.09 | 6.24 | 5.7 | 6.52 |
| 255 | 0 | 0 | 10 | 0 | 22.37 | 29.26 | 34.1 | 40.02 | 35.59 | 28.2 | 21.26 | 15.33 | 10.49 | 7.19 | 5.06 | 3.69 | 3.05 | 2.8 | 2.63 | 2.91 |
| 137 | 0 | 0 | 0 | 0 | 37.02 | 49.05 | 56.62 | 64.47 | 60.96 | 52.21 | 41.7 | 31.51 | 22.66 | 16.22 | 11.7 | 8.42 | 6.71 | 5.91 | 5.37 | 6.16 |
| 255 | 0 | 5 | 0 | 0 | 18.91 | 22.22 | 24.57 | 29.77 | 32.86 | 28.44 | 21.25 | 15.13 | 10.23 | 6.91 | 4.8 | 3.49 | 2.87 | 2.63 | 2.49 | 2.74 |
| 137 | 0 | 0 | 10 | 0 | 34.29 | 43.85 | 49.2 | 54.91 | 52.66 | 46.08 | 37.27 | 28.41 | 20.57 | 14.88 | 10.85 | 7.91 | 6.34 | 5.63 | 5.19 | 5.97 |
| 255 | 0 | 5 | 10 | 0 | 18.9 | 22.02 | 24.01 | 28.68 | 31.59 | 27.64 | 20.88 | 14.97 | 10.19 | 6.94 | 4.87 | 3.56 | 2.94 | 2.7 | 2.55 | 2.82 |
| 137 | 0 | 5 | 0 | 0 | 28.03 | 30.16 | 31.79 | 37.59 | 48.65 | 51.47 | 42.07 | 31.91 | 22.98 | 16.47 | 11.84 | 8.51 | 6.75 | 5.93 | 5.4 | 6.2 |
| 58 | 0 | 5 | 21 | 0 | 29.57 | 29.91 | 30.18 | 33.57 | 42.22 | 47.87 | 43.77 | 37.24 | 30.08 | 24.61 | 20.3 | 16.54 | 14.27 | 13.43 | 12.99 | 15.01 |
| 255 | 0 | 0 | 58 | 255 | 14.65 | 15.87 | 14.76 | 11.97 | 8.34 | 5.53 | 3.69 | 2.83 | 2.42 | 2.42 | 2.65 | 2.91 | 3.21 | 3.28 | 3.16 | 3.57 |
| 58 | 0 | 0 | 47 | 50 | 32.49 | 34.73 | 32.46 | 28.93 | 24.49 | 21.2 | 17.8 | 17.26 | 15.3 | 16.28 | 16.12 | 13.84 | 12.24 | 11.76 | 11.62 | 13.39 |
| 255 | 0 | 0 | 26 | 50 | 22.66 | 27.88 | 29.74 | 30.14 | 25.41 | 20.8 | 16.41 | 13.44 | 10.05 | 7.74 | 5.79 | 4.25 | 3.48 | 3.15 | 2.97 | 3.32 |
| 17 | 0 | 0 | 0 | 12 | 55.86 | 66.69 | 66.66 | 61.87 | 54.34 | 48.7 | 43.02 | 43 | 40.04 | 43.5 | 43.32 | 36.92 | 32.18 | 29.54 | 27.61 | 30.09 |
| 17 | 0 | 0 | 21 | 12 | 43.52 | 47.96 | 46.98 | 44.74 | 41.05 | 37.65 | 33.21 | 31.76 | 28.41 | 29.2 | 29.12 | 26.43 | 24.55 | 24.64 | 25.51 | 29.33 |
| 58 | 0 | 0 | 0 | 12 | 47.64 | 59.07 | 61.07 | 58.59 | 51.05 | 44.5 | 37.72 | 35 | 29.64 | 27.33 | 23.15 | 17.8 | 14.57 | 12.92 | 11.79 | 13.36 |
| 255 | 0 | 0 | 0 | 12 | 21.96 | 29.21 | 34.03 | 38.61 | 32.51 | 25.12 | 18.7 | 13.75 | 9.4 | 6.5 | 4.53 | 3.29 | 2.72 | 2.51 | 2.39 | 2.62 |
| 255 | 0 | 0 | 10 | 12 | 21.12 | 27.88 | 31.91 | 35.81 | 30.62 | 23.98 | 17.93 | 13.21 | 9.05 | 6.28 | 4.42 | 3.21 | 2.66 | 2.44 | 2.31 | 2.55 |
| 137 | 0 | 0 | 0 | 12 | 35.54 | 46.11 | 50.73 | 52.46 | 45.29 | 37.6 | 29.89 | 24.64 | 18.55 | 14.39 | 10.68 | 7.63 | 6.01 | 5.26 | 4.8 | 5.51 |
| 255 | 0 | 0 | 10 | 255 | 14.45 | 15.77 | 14.54 | 11.34 | 7.52 | 4.84 | 3.24 | 2.55 | 2.25 | 2.26 | 2.47 | 2.72 | 3.03 | 3.1 | 2.99 | 3.34 |
| 137 | 0 | 0 | 0 | 137 | 28.85 | 32.62 | 30.34 | 24.8 | 18.25 | 13.62 | 9.95 | 8.26 | 6.77 | 6.9 | 7.35 | 6.98 | 6.63 | 6.21 | 5.73 | 6.57 |
| 255 | 0 | 0 | 0 | 137 | 21.93 | 26.43 | 26.92 | 24.52 | 18.75 | 14.09 | 10.29 | 8.11 | 6.23 | 5.45 | 4.77 | 3.91 | 3.37 | 3.1 | 2.92 | 3.27 |
| 137 | 0 | 0 | 10 | 137 | 27.51 | 30.7 | 28.54 | 23.54 | 17.52 | 13.13 | 9.6 | 7.94 | 6.48 | 6.56 | 6.98 | 6.65 | 6.33 | 5.97 | 5.53 | 6.35 |
| 255 | 0 | 0 | 10 | 137 | 21.72 | 25.96 | 26.38 | 24.24 | 18.82 | 14.31 | 10.54 | 8.35 | 6.42 | 5.56 | 4.84 | 3.93 | 3.39 | 3.1 | 2.92 | 3.27 |
| 137 | 0 | 0 | 0 | 50 | 33.95 | 41.34 | 40.96 | 36.29 | 28.62 | 22.39 | 17.42 | 14.5 | 13.34 | 10.97 | 8.06 | 6.41 | 5.62 | 5.13 | 5.62 |  |
| 58 | 0 | 0 | 21 | 12 | 38.86 | 43.74 | 43.89 | 42.75 | 39.17 | 35.47 | 30.79 | 28.41 | 24.34 | 22.68 | 20.19 | 16.72 | 14.5 | 13.6 | 13.1 | 14.99 |
| 0 | 0 | 0 | 58 | 255 | 14.51 | 14.04 | 11.94 | 8.7 | 5.67 | 3.7 | 2.63 | 2.22 | 2.06 | 2.13 | 2.48 | 3.59 | 8.26 | 19.96 | 37.36 | 57.42 |
| 0 | 0 | 0 | 47 | 50 | 33.62 | 34.53 | 31.29 | 27.14 | 22.76 | 19.71 | 16.57 | 16.54 | 15.19 | 18.01 | 20.53 | 19.51 | 18.62 | 19.41 | 21.09 | 24.92 |
| 58 | 0 | 0 | 26 | 255 | 16.17 | 16.13 | 13.77 | 9.92 | 6.35 | 4.08 | 2.84 | 2.37 | 2.18 | 2.25 | 2.63 | 3.75 | 7.76 | 14.1 | 17.08 | 19.86 |
| 0 | 0 | 0 | 0 | 12 | 59.62 | 69.78 | 68.69 | 62.98 | 55.53 | 50.36 | 45.37 | 46.82 | 45.81 | 54.96 | 62.65 | 59.4 | 55.53 | 53.14 | 51.19 | 53.37 |
| 0 | 0 | 0 | 21 | 12 | 45.04 | 49.12 | 47.71 | 45.02 | 41.38 | 38.31 | 34.25 | 33.51 | 30.98 | 33.87 | 36.67 | 36.13 | 35.91 | 38.62 | 43.5 | 49.95 |
| 17 | 0 | 0 | 0 | 50 | 47.97 | 54.87 | 48.74 | 38.75 | 29.48 | 24.28 | 20.03 | 21.03 | 19.94 | 26.06 | 30.06 | 25.13 | 21.25 | 19.14 | 17.67 | 19.55 |
| 137 | 0 | 0 | 0 | 255 | 16.73 | 17.24 | 15.05 | 11.05 | 7.13 | 4.55 | 3.05 | 2.45 | 2.2 | 2.26 | 2.65 | 3.55 | 5.65 | 7.38 | 7.46 | 8.55 |
| 137 | 0 | 0 | 10 | 255 | 16.75 | 17.1 | 15.08 | 11.18 | 7.25 | 4.65 | 3.11 | 2.47 | 2.21 | 2.28 | 2.69 | 3.61 | 5.7 | 7.39 | 7.54 | 8.67 |
| 58 | 0 | 0 | 0 | 137 | 33.04 | 36.15 | 31.83 | 24.77 | 17.87 | 13.33 | 9.81 | 8.41 | 7.16 | 8.04 | 9.83 | 10.85 | 11.98 | 12.02 | 11.34 | 12.72 |
| 0 | 0 | 0 | 10 | 255 | 14.28 | 14.02 | 11.64 | 8 | 4.91 | 3.2 | 2.41 | 2.13 | 2.04 | 2.09 | 2.34 | 3.24 | 8.18 | 24.51 | 49.47 | 67.75 |
| 0 | 0 | 0 | 0 | 137 | 34.49 | 36.5 | 30.86 | 22.84 | 15.97 | 11.64 | 8.38 | 7.23 | 6.24 | 7.43 | 10.19 | 13.11 | 17.56 | 19.95 | 19.52 | 21.62 |
| 17 | 0 | 0 | 0 | 255 | 14.74 | 14.5 | 12.08 | 8.24 | 5.06 | 3.25 | 2.38 | 2.1 | 1.99 | 2.04 | 2.31 | 3.24 | 7.86 | 20.16 | 30.81 | 37.05 |
| 0 | 0 | 0 | 10 | 137 | 32.52 | 33.95 | 28.94 | 21.76 | 15.48 | 11.35 | 8.19 | 7.07 | 6.08 | 7.17 | 9.78 | 12.5 | 16.6 | 19.12 | 19.22 | 21.51 |
| 17 | 0 | 0 | 10 | 255 | 14.5 | 14.18 | 11.84 | 8.11 | 4.99 | 3.23 | 2.37 | 2.09 | 2 | 2.04 | 2.29 | 3.22 | 7.67 | 19.25 | 29.57 | 36.21 |
| 17 | 0 | 0 | 0 | 137 | 32.79 | 35.03 | 29.72 | 21.97 | 15.31 | 11.07 | 7.93 | 6.79 | 5.8 | 6.79 | 9.12 | 11.35 | 14.39 | 15.67 | 15.1 | 16.88 |
| 17 | 0 | 0 | 21 | 50 | 39.03 | 42.1 | 37.78 | 31.36 | 24.86 | 20.84 | 17.21 | 17.58 | 16.28 | 20.14 | 22.73 | 19.89 | 17.57 | 16.69 | 16.29 | 18.6 |
| 0 | 255 | 0 | 58 | 255 | 16.32 | 15.1 | 11.52 | 7.71 | 5.01 | 3.62 | 2.76 | 2.5 | 2.33 | 2.59 | 3.53 | 5.58 | 11.84 | 23.74 | 38.66 | 55.72 |
| 0 | 40 | 0 | 47 | 50 | 33.45 | 33.66 | 29.24 | 23.95 | 19.03 | 16.03 | 13.24 | 13.62 | 12.8 | 16.82 | 21.22 | 20.62 | 19.78 | 20.53 | 22.08 | 25.85 |
| 0 | 40 | 0 | 26 | 255 | 14.07 | 13.67 | 11.26 | 7.74 | 4.85 | 3.19 | 2.37 | 2.1 | 2 | 2.06 | 2.32 | 3.28 | 8.05 | 22.57 | 44.86 | 64.54 |
| 0 | 13 | 0 | 0 | 12 | 58.14 | 66.1 | 62.19 | 53.51 | 44.27 | 38.51 | 33.42 | 35.44 | 35.05 | 47.31 | 60.61 | 58.18 | 53.95 | 51.3 | 49.18 | 51.52 |
| 0 | 13 | 0 | 21 | 12 | 44.34 | 47.42 | 44.53 | 40.07 | 34.86 | 31.08 | 26.79 | 27.15 | 25.5 | 30.6 | 35.92 | 35.84 | 35.7 | 38.28 | 42.79 | 49.14 |
| 0 | 13 | 0 | 0 | 50 | 48.29 | 53.07 | 44.79 | 33.91 | 25.08 | 20.38 | 16.63 | 17.87 | 17.39 | 25.62 | 35.19 | 31.47 | 27.34 | 24.99 | 23.28 | 25.44 |
| 0 | 13 | 0 | 0 | 255 | 14.39 | 14.15 | 11.69 | 7.87 | 4.79 | 3.1 | 2.31 | 2.06 | 1.97 | 2.02 | 2.26 | 3.21 | 8.39 | 25.97 | 53.17 | 70.79 |
| 0 | 13 | 0 | 10 | 255 | 15.01 | 14.81 | 12.43 | 8.6 | 5.35 | 3.42 | 2.43 | 2.08 | 1.95 | 2.01 | 2.35 | 3.47 | 8.91 | 25.38 | 50.02 | 68.17 |
| 0 | 13 | 0 | 0 | 137 | 34.9 | 36.75 | 31.06 | 23.08 | 16.29 | 12.02 | 8.78 | 7.71 | 6.72 | 8.09 | 11.08 | 14.08 | 18.56 | 20.98 | 20.58 | 22.63 |
| 0 | 255 | 0 | 10 | 255 | 17.47 | 16.32 | 12.22 | 7.98 | 5.11 | 3.63 | 2.75 | 2.5 | 2.32 | 2.64 | 3.72 | 6.01 | 13.3 | 28.53 | 47.01 | 62.69 |
| 0 | 93 | 0 | 0 | 137 | 34.8 | 35.57 | 28.83 | 21 | 14.93 | 11.33 | 8.56 | 8 | 7.22 | 9.3 | 13.35 | 16.82 | 21.53 | 23.85 | 23.38 | 25.37 |
| 0 | 93 | 0 | 0 | 255 | 17.73 | 17.33 | 14.31 | 9.96 | 6.34 | 4.14 | 2.89 | 2.42 | 2.2 | 2.33 | 2.91 | 4.58 | 11.39 | 29.64 | 55.1 | 70.78 |
| 0 | 93 | 0 | 10 | 137 | 34 | 34.28 | 28.04 | 20.78 | 14.94 | 11.41 | 8.65 | 8.09 | 7.29 | 9.35 | 13.26 | 16.46 | 20.72 | 23.08 | 23.11 | 25.35 |

TABLE 1-continued

First set of 969 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 93 | 0 | 10 | 255 | 17.71 | 17.32 | 14.32 | 10.04 | 6.43 | 4.23 | 2.94 | 2.45 | 2.23 | 2.36 | 2.95 | 4.66 | 11.35 | 28.46 | 52.19 | 69.21 |
| 0 | 40 | 0 | 0 | 137 | 34.39 | 35.58 | 29.43 | 21.51 | 15.06 | 11.09 | 8.1 | 7.18 | 6.3 | 7.73 | 10.84 | 14 | 18.68 | 21.2 | 20.82 | 22.87 |
| 0 | 13 | 0 | 21 | 50 | 39.95 | 42.72 | 37.44 | 30.38 | 23.82 | 19.94 | 16.53 | 17.23 | 16.36 | 21.79 | 27.23 | 25.18 | 22.96 | 22.4 | 22.41 | 25.37 |
| 0 | 255 | 0 | 58 | 0 | 24.21 | 21.68 | 15.51 | 10.39 | 7.1 | 5.56 | 4.47 | 4.9 | 4.91 | 8.94 | 20.35 | 26.04 | 28.24 | 33.24 | 44.6 | 60.47 |
| 0 | 40 | 0 | 47 | 0 | 34.9 | 35.51 | 32.74 | 29.61 | 26.14 | 23.47 | 20.22 | 20 | 18.41 | 21.74 | 25.89 | 27.43 | 29.37 | 35.99 | 50.42 | 66.85 |
| 0 | 255 | 0 | 26 | 50 | 26.48 | 23.94 | 16.69 | 10.91 | 7.35 | 5.72 | 4.6 | 5.07 | 5.11 | 9.5 | 22.38 | 27.17 | 26.77 | 26.95 | 27.57 | 30.57 |
| 0 | 13 | 0 | 0 | 0 | 62.18 | 72.13 | 71.72 | 67.06 | 60.77 | 56.33 | 52.03 | 54.19 | 54.38 | 66.41 | 79.31 | 81.22 | 80.79 | 80.49 | 80.06 | 80.2 |
| 0 | 13 | 0 | 21 | 0 | 46.36 | 49.96 | 48.7 | 46.64 | 43.88 | 41.34 | 37.63 | 36.74 | 34.23 | 37.25 | 41.04 | 42.55 | 44.61 | 51.06 | 62.69 | 73.14 |
| 0 | 40 | 0 | 0 | 12 | 54.19 | 60.13 | 52.55 | 41.29 | 31.56 | 26.24 | 21.92 | 23.87 | 23.89 | 37.23 | 57.92 | 58.23 | 54.32 | 51.71 | 49.63 | 51.83 |
| 0 | 255 | 0 | 0 | 137 | 25.93 | 23.7 | 16.7 | 10.92 | 7.29 | 5.56 | 4.37 | 4.54 | 4.4 | 7.03 | 13.69 | 18.27 | 22.64 | 24.85 | 24.73 | 26.83 |
| 0 | 255 | 0 | 10 | 137 | 25.63 | 23.39 | 16.48 | 10.74 | 7.1 | 5.37 | 4.2 | 4.37 | 4.23 | 6.83 | 13.49 | 18.06 | 22.39 | 24.85 | 25.12 | 27.41 |
| 0 | 93 | 0 | 0 | 50 | 42.97 | 43.55 | 33.11 | 23.34 | 16.68 | 13.38 | 10.86 | 11.93 | 11.91 | 19.84 | 34.71 | 33.76 | 29.79 | 27.4 | 25.67 | 27.72 |
| 0 | 255 | 0 | 10 | 0 | 26.66 | 23.49 | 15.57 | 9.74 | 6.4 | 4.99 | 4.04 | 4.47 | 4.54 | 8.95 | 28.24 | 48.24 | 55.08 | 60.49 | 67.93 | 74.48 |
| 0 | 93 | 0 | 0 | 0 | 47.9 | 48.94 | 37.44 | 26.09 | 18.46 | 14.74 | 11.94 | 13.34 | 13.62 | 25.43 | 61.08 | 78.45 | 80.02 | 80.17 | 79.74 | 79.68 |
| 0 | 255 | 0 | 0 | 12 | 26.96 | 23.85 | 15.62 | 9.68 | 6.31 | 4.88 | 3.94 | 4.37 | 4.45 | 8.89 | 28.36 | 46.82 | 50.02 | 49.92 | 49.51 | 52.3 |
| 0 | 93 | 0 | 10 | 0 | 44.3 | 44.52 | 34.71 | 24.9 | 17.93 | 14.42 | 11.71 | 12.97 | 13.11 | 23.24 | 48.77 | 59.55 | 62.03 | 66.44 | 72.76 | 77.37 |
| 0 | 255 | 0 | 10 | 12 | 26.87 | 23.79 | 15.8 | 9.88 | 6.46 | 4.97 | 4 | 4.44 | 4.51 | 8.97 | 26.84 | 40.7 | 43.36 | 45.15 | 47.6 | 52.12 |
| 0 | 93 | 0 | 0 | 12 | 47.01 | 48.46 | 37.38 | 26.62 | 19.27 | 15.6 | 12.76 | 14.13 | 14.3 | 24.93 | 51.64 | 58.44 | 55.32 | 52.74 | 50.66 | 52.7 |
| 0 | 40 | 0 | 21 | 12 | 43.41 | 45.8 | 41.22 | 34.94 | 28.74 | 24.85 | 21.15 | 22.02 | 21.16 | 28.11 | 36.6 | 37.27 | 37.14 | 39.79 | 44.5 | 50.78 |
| 0 | 255 | 255 | 58 | 0 | 4.24 | 3.12 | 2.88 | 3.36 | 5.77 | 7.34 | 6.15 | 6.75 | 6.78 | 11.63 | 22.89 | 27.75 | 29.92 | 34.4 | 44.26 | 59 |
| 0 | 40 | 15 | 47 | 0 | 19.15 | 16.5 | 15.44 | 16.74 | 21.92 | 25.02 | 22.4 | 22.23 | 20.63 | 23.84 | 27.74 | 29.19 | 31.06 | 37.44 | 51.41 | 67.38 |
| 0 | 255 | 15 | 26 | 0 | 19.09 | 15.78 | 12.02 | 9.11 | 6.95 | 5.58 | 4.47 | 4.95 | 5.03 | 9.79 | 26.48 | 38.2 | 42.11 | 47.7 | 58.04 | 69.27 |
| 0 | 13 | 5 | 0 | 0 | 41.46 | 42.43 | 41.79 | 42.89 | 49.18 | 54.7 | 51.9 | 54.2 | 54.43 | 66.12 | 78.56 | 80.47 | 80.1 | 79.93 | 79.59 | 79.74 |
| 0 | 13 | 5 | 21 | 0 | 32.31 | 31.94 | 31.01 | 32.32 | 37.6 | 41.07 | 38.16 | 37.43 | 34.99 | 37.92 | 41.51 | 42.89 | 44.81 | 51.09 | 62.47 | 72.71 |
| 0 | 40 | 5 | 0 | 0 | 38.11 | 37.7 | 35.14 | 33.55 | 34.34 | 33.7 | 29.48 | 31.98 | 32.4 | 48.49 | 74.44 | 80.45 | 80.34 | 80.01 | 79.56 | 79.65 |
| 0 | 255 | 5 | 0 | 0 | 24.3 | 20.74 | 14.62 | 9.96 | 5.49 | 4.42 | 4.91 | 5.02 | 9.97 | 31.74 | 57.72 | 67.09 | 70.71 | 73.6 | 76.69 |
| 0 | 255 | 5 | 10 | 0 | 23.44 | 20.1 | 14.21 | 9.67 | 6.7 | 5.25 | 4.2 | 4.67 | 4.75 | 9.5 | 28.68 | 46.61 | 52.71 | 58.07 | 65.88 | 73.31 |
| 0 | 93 | 5 | 0 | 0 | 34.36 | 32.07 | 26.72 | 21.96 | 18.43 | 15.74 | 12.88 | 14.38 | 14.67 | 26.79 | 62.44 | 79.43 | 80.84 | 80.16 | 79.82 | 79.76 |
| 0 | 255 | 255 | 10 | 0 | 4.31 | 3.23 | 3.04 | 3.47 | 5.84 | 7.47 | 6.27 | 6.97 | 7.06 | 12.85 | 30.8 | 43.09 | 47.49 | 52.47 | 60.49 | 70.01 |
| 0 | 93 | 37 | 0 | 0 | 11.58 | 8.66 | 7.9 | 9.06 | 13.78 | 16.1 | 13.66 | 15.19 | 15.46 | 27.24 | 61.72 | 78.5 | 79.96 | 79.81 | 79.06 | 79.14 |
| 0 | 255 | 37 | 0 | 0 | 12.7 | 9.63 | 7.82 | 6.94 | 6.36 | 5.44 | 4.4 | 4.9 | 5 | 10.03 | 32.15 | 59.26 | 69.21 | 72.63 | 74.95 | 77.48 |
| 0 | 93 | 37 | 10 | 0 | 11.58 | 8.72 | 7.88 | 9.03 | 13.58 | 15.73 | 13.36 | 14.7 | 14.81 | 24.78 | 48.22 | 57.58 | 59.76 | 64.11 | 71.04 | 76.42 |
| 0 | 255 | 37 | 10 | 0 | 12.69 | 9.62 | 7.86 | 6.98 | 6.38 | 5.45 | 4.41 | 4.9 | 4.98 | 9.79 | 29.36 | 48.3 | 54.68 | 60 | 67.48 | 74.22 |
| 0 | 93 | 15 | 0 | 0 | 19.76 | 16.03 | 14.15 | 14.13 | 15.66 | 15.01 | 12.38 | 13.84 | 14.11 | 25.93 | 61.54 | 79.01 | 80.61 | 80.49 | 80 | 80.01 |
| 0 | 40 | 5 | 21 | 0 | 31.02 | 29.42 | 27.4 | 26.85 | 28.1 | 27.61 | 24.08 | 24.93 | 23.99 | 31.18 | 40.26 | 42.82 | 44.83 | 51.19 | 62.89 | 73.32 |
| 0 | 40 | 255 | 26 | 0 | 3.08 | 2.53 | 2.47 | 2.81 | 7.05 | 24.6 | 28.36 | 29.63 | 28.69 | 34.21 | 40.88 | 42.97 | 44.86 | 50.73 | 61.88 | 72.69 |
| 0 | 13 | 15 | 0 | 0 | 21.51 | 18.98 | 18.34 | 21.1 | 34.03 | 50.8 | 50.09 | 52.77 | 53.13 | 65.32 | 78.32 | 80.32 | 79.93 | 79.73 | 79.34 | 79.42 |
| 0 | 13 | 255 | 0 | 0 | 2.84 | 2.42 | 2.33 | 2.61 | 6.74 | 32.85 | 48.22 | 53.44 | 54.51 | 65.99 | 77.79 | 79.64 | 79.4 | 79.31 | 78.88 | 79.25 |
| 0 | 13 | 255 | 10 | 0 | 2.93 | 2.43 | 2.37 | 2.65 | 6.69 | 30.81 | 43.16 | 45.86 | 44.93 | 50.21 | 55.75 | 57.33 | 58.89 | 63.47 | 70.49 | 76.24 |
| 0 | 13 | 37 | 0 | 0 | 10.34 | 8 | 7.66 | 9.57 | 21.58 | 47.19 | 49.83 | 52.93 | 53.38 | 65.54 | 78.2 | 80.01 | 79.55 | 79.28 | 78.8 | 78.97 |
| 0 | 93 | 255 | 0 | 0 | 3.88 | 2.94 | 2.83 | 3.39 | 8.27 | 20.14 | 19.92 | 21.75 | 22.05 | 33.72 | 63.9 | 76.83 | 77.48 | 76.9 | 76.05 | 76.58 |
| 0 | 93 | 255 | 10 | 0 | 3.67 | 2.82 | 2.7 | 3.23 | 8.12 | 19.91 | 19.74 | 21.36 | 21.44 | 31.2 | 51.53 | 58.88 | 60.43 | 63.85 | 69.13 | 73.88 |
| 0 | 40 | 37 | 0 | 0 | 11.24 | 8.83 | 8.32 | 9.97 | 19.1 | 31.57 | 29.57 | 32.17 | 32.56 | 48.04 | 72.84 | 78.04 | 77.43 | 76.84 | 76.25 | 76.78 |
| 0 | 13 | 15 | 21 | 0 | 20.26 | 17.93 | 17.28 | 19.46 | 29.03 | 39.31 | 37.6 | 36.93 | 34.47 | 37.16 | 40.51 | 41.72 | 43.5 | 49.52 | 60.5 | 70.71 |
| 0 | 0 | 0 | 178 | 0 | 7.53 | 7.03 | 6.58 | 6.55 | 6.6 | 6.37 | 5.54 | 4.57 | 3.75 | 3.43 | 3.43 | 3.57 | 3.88 | 5.24 | 10.41 | 23.92 |
| 0 | 0 | 255 | 105 | 0 | 3.37 | 2.57 | 2.46 | 3 | 7.5 | 19.76 | 21 | 18.71 | 16.1 | 14.83 | 14.86 | 15.46 | 16.69 | 20.81 | 31.17 | 49.02 |
| 255 | 0 | 255 | 105 | 0 | 4.39 | 3.37 | 3.22 | 4.02 | 9.44 | 19.25 | 18.16 | 14.6 | 11.02 | 8.43 | 6.57 | 5.12 | 4.31 | 4 | 3.83 | 4.38 |
| 0 | 0 | 15 | 88 | 0 | 13.79 | 11.64 | 11.02 | 12.42 | 16.96 | 19.8 | 18.28 | 15.74 | 13.13 | 11.92 | 11.91 | 12.42 | 13.59 | 17.93 | 29.44 | 48.88 |
| 58 | 0 | 15 | 88 | 0 | 14.58 | 12.53 | 11.95 | 13.57 | 18.32 | 20.97 | 19.14 | 16.31 | 13.41 | 11.75 | 10.99 | 10.42 | 10.28 | 11.44 | 13.59 | 17.14 |
| 58 | 0 | 255 | 58 | 0 | 3.37 | 2.6 | 2.47 | 3 | 8.09 | 27.34 | 32.55 | 29.56 | 25.45 | 22.59 | 20.68 | 18.89 | 17.81 | 18 | 18.72 | 21.35 |
| 0 | 0 | 0 | 92 | 0 | 20.02 | 19.34 | 18.48 | 18.6 | 18.97 | 18.71 | 16.88 | 14.39 | 11.88 | 10.75 | 10.77 | 11.28 | 12.42 | 16.7 | 28.24 | 48.22 |
| 0 | 0 | 5 | 54 | 0 | 24.67 | 23.18 | 22.56 | 24.34 | 29.7 | 33.22 | 31.33 | 27.94 | 24.14 | 22.31 | 22.3 | 23.08 | 24.87 | 31.15 | 45.46 | 63.27 |
| 17 | 0 | 5 | 54 | 0 | 23.79 | 22.48 | 21.9 | 23.74 | 29.01 | 32.16 | 29.92 | 26.15 | 22.02 | 19.69 | 18.78 | 18.25 | 18.45 | 21.16 | 26.23 | 33.23 |
| 0 | 0 | 5 | 77 | 0 | 18.56 | 17.03 | 16.22 | 17.3 | 20.23 | 21.54 | 19.73 | 17 | 14.15 | 12.84 | 12.82 | 13.35 | 14.64 | 19.39 | 31.96 | 52.11 |
| 17 | 0 | 5 | 77 | 0 | 18.69 | 17.1 | 16.36 | 17.56 | 20.69 | 22.02 | 20.12 | 17.25 | 14.27 | 12.75 | 12.42 | 12.46 | 13.08 | 16.09 | 22.5 | 31.5 |
| 17 | 0 | 15 | 47 | 0 | 16.75 | 14.43 | 13.9 | 16.34 | 25.98 | 35.75 | 34.4 | 30.44 | 25.91 | 23.21 | 21.98 | 21.12 | 21.04 | 23.4 | 27.71 | 34.06 |
| 0 | 0 | 255 | 44 | 0 | 2.96 | 2.4 | 2.34 | 2.65 | 6.75 | 28.83 | 38.88 | 37.23 | 33.62 | 31.71 | 31.7 | 32.57 | 34.43 | 40.29 | 53.1 | 67.77 |
| 0 | 0 | 37 | 35 | 0 | 9.53 | 7.36 | 7.03 | 8.83 | 19.4 | 38.78 | 40.56 | 37.35 | 33.14 | 31.09 | 31.07 | 31.97 | 34.04 | 40.8 | 54.36 | 68.58 |
| 17 | 0 | 255 | 26 | 0 | 3.14 | 2.62 | 2.5 | 2.92 | 7.29 | 31.95 | 45.2 | 43.65 | 39.23 | 36.01 | 33.98 | 32.12 | 31.1 | 32.05 | 33.95 | 38.33 |
| 0 | 0 | 37 | 53 | 0 | 8.95 | 6.66 | 6.39 | 8.03 | 17.27 | 31.63 | 31.94 | 28.75 | 24.95 | 23.06 | 23.01 | 23.81 | 25.6 | 31.89 | 46.07 | 63.35 |
| 17 | 0 | 255 | 44 | 0 | 2.73 | 2.33 | 2.2 | 2.54 | 6.78 | 28.81 | 38.22 | 36.08 | 31.98 | 29.35 | 28.05 | 27.04 | 26.75 | 28.56 | 31.84 | 37.22 |
| 17 | 0 | 37 | 35 | 0 | 9.72 | 7.49 | 7.19 | 9.06 | 19.83 | 38.94 | 40.18 | 36.35 | 31.47 | 28.37 | 26.73 | 25.37 | 24.87 | 26.78 | 30.13 | 35.72 |
| 255 | 0 | 255 | 44 | 0 | 3.79 | 3.02 | 2.9 | 3.54 | 8.8 | 22.16 | 21.54 | 16.77 | 12.13 | 8.71 | 6.32 | 4.65 | 3.8 | 3.45 | 3.24 | 3.62 |
| 137 | 0 | 37 | 35 | 0 | 11.18 | 8.97 | 8.67 | 10.94 | 21.58 | 35.06 | 31.99 | 25.84 | 19.82 | 15.33 | 11.97 | 9.27 | 7.73 | 7.07 | 6.67 | 7.62 |
| 137 | 0 | 255 | 26 | 0 | 3.77 | 3 | 2.92 | 3.45 | 9.16 | 31.09 | 36.68 | 31.35 | 25.05 | 20.08 | 16.15 | 12.86 | 10.92 | 9.99 | 9.33 | 10.5 |
| 137 | 0 | 37 | 53 | 0 | 11.19 | 9.02 | 8.69 | 10.86 | 20.27 | 30.85 | 28.04 | 22.8 | 17.64 | 13.85 | 11.04 | 8.75 | 7.4 | 6.87 | 6.58 | 7.56 |
| 137 | 0 | 255 | 44 | 0 | 3.86 | 3.04 | 2.82 | 3.51 | 9.27 | 29.79 | 34.13 | 29.36 | 23.75 | 19.32 | 15.79 | 12.82 | 11 | 10.14 | 9.64 | 10.89 |
| 58 | 0 | 37 | 35 | 0 | 10.46 | 7.98 | 7.61 | 9.74 | 20.54 | 38.07 | 37.73 | 32.72 | 27.01 | 22.79 | 19.64 | 16.82 | 15.04 | 14.61 | 14.61 | 16.82 |
| 17 | 0 | 15 | 66 | 0 | 15.91 | 13.45 | 12.85 | 14.8 | 21.37 | 26.53 | 24.67 | 21.65 | 18.22 | 16.36 | 15.83 | 15.72 | 16.18 | 19.18 | 25.2 | 33.22 |
| 0 | 0 | 0 | 8 | 0 | 55.76 | 63.79 | 65.67 | 67.01 | 67.92 | 68.03 | 66.7 | 64.18 | 60.87 | 59.15 | 58.83 | 59.32 | 60.7 | 65.03 | 71.51 | 76.61 |
| 0 | 0 | 0 | 2 | 0 | 53.42 | 60.05 | 62.15 | 65.2 | 72.36 | 79.27 | 80.33 | 80.17 | 79.55 | 79.3 | 78.89 | 78.53 | 78.22 | 78.33 | 78.19 | 78.61 |
| 7 | 0 | 0 | 2 | 0 | 50.85 | 56.67 | 58.81 | 62.26 | 69.86 | 76.68 | 76.78 | 74.98 | 71.85 | 68.2 | 63.89 | 59.19 | 55.64 | 53.65 | 51.94 | 54.03 |
| 0 | 0 | 0 | 2 | 8 | 46.32 | 50.14 | 51.15 | 53.65 | 59.43 | 64.27 | 63.8 | 61.65 | 58.62 | 57.06 | 56.77 | 57.24 | 58.52 | 62.61 | 68.6 | 73.33 |

TABLE 1-continued

First set of 969 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 7 | 0 | 2 | 8 | 0 | 45.54 | 50 | 51.17 | 53.93 | 60.06 | 64.78 | 63.64 | 60.42 | 55.96 | 52.5 | 49.85 | 47.32 | 45.91 | 46.73 | 48.42 | 52.48 |
| 7 | 0 | 5 | 0 | 0 | 40.88 | 42.39 | 43.18 | 47.36 | 60.86 | 75.89 | 77.46 | 75.72 | 72.36 | 68.48 | 63.91 | 58.94 | 55.23 | 53.17 | 51.45 | 53.7 |
| 0 | 0 | 0 | 41 | 0 | 37.49 | 39.22 | 38.76 | 39.49 | 40.41 | 40.39 | 38.05 | 34.33 | 30.14 | 28.12 | 28.02 | 28.91 | 30.9 | 37.6 | 51.72 | 67.07 |
| 0 | 0 | 2 | 41 | 0 | 32.85 | 32.8 | 32.34 | 33.78 | 37.54 | 39.74 | 37.62 | 33.95 | 29.72 | 27.67 | 27.64 | 28.51 | 30.51 | 37.32 | 51.43 | 66.71 |
| 7 | 0 | 2 | 41 | 0 | 32.82 | 33.09 | 32.59 | 34.16 | 37.96 | 39.99 | 37.72 | 33.83 | 29.38 | 26.99 | 26.26 | 26.15 | 27 | 31.2 | 39.11 | 48.62 |
| 0 | 0 | 2 | 21 | 0 | 39.69 | 41.2 | 41.3 | 43.37 | 48.69 | 52.58 | 50.92 | 47.34 | 42.96 | 40.75 | 40.6 | 41.46 | 43.53 | 50.07 | 61.86 | 72.48 |
| 7 | 0 | 2 | 21 | 0 | 39.45 | 41.19 | 41.35 | 43.55 | 48.62 | 52.08 | 50.05 | 45.99 | 41.02 | 37.96 | 36.45 | 35.44 | 35.43 | 38.39 | 43.5 | 50.17 |
| 7 | 0 | 5 | 21 | 0 | 31.71 | 31.14 | 30.91 | 33.96 | 43.33 | 51.33 | 49.98 | 46.02 | 41.09 | 38.01 | 36.52 | 35.5 | 35.49 | 38.46 | 43.57 | 50.3 |
| 0 | 0 | 8 | 0 | 0 | 34.42 | 33.85 | 33.97 | 38.2 | 54.39 | 76.01 | 80.15 | 80.48 | 79.98 | 79.81 | 79.41 | 79.03 | 78.7 | 78.8 | 78.63 | 79.05 |
| 0 | 0 | 8 | 8 | 0 | 29.25 | 27.84 | 27.7 | 31.53 | 46.02 | 63.43 | 65.11 | 63.02 | 59.77 | 58.01 | 57.72 | 58.26 | 59.69 | 64.17 | 70.84 | 75.96 |
| 7 | 0 | 15 | 0 | 0 | 20.66 | 17.81 | 17.57 | 21.24 | 39.27 | 70.33 | 76.02 | 74.77 | 71.5 | 67.73 | 63.3 | 58.3 | 54.51 | 52.36 | 50.51 | 52.9 |
| 0 | 0 | 5 | 8 | 0 | 36.84 | 36.86 | 36.97 | 40.61 | 52.34 | 64.37 | 64.93 | 62.65 | 59.33 | 57.66 | 57.48 | 58.14 | 59.7 | 64.21 | 70.8 | 75.89 |
| 7 | 0 | 8 | 0 | 0 | 31.32 | 29.97 | 30.01 | 34.42 | 51.55 | 73.97 | 77.2 | 75.86 | 72.75 | 69.06 | 64.55 | 59.56 | 55.77 | 53.61 | 51.8 | 54.05 |
| 7 | 0 | 8 | 8 | 0 | 31.65 | 31.06 | 31.06 | 34.65 | 47.97 | 63.76 | 64.63 | 61.53 | 56.96 | 53.35 | 50.5 | 47.78 | 46.14 | 46.8 | 48.33 | 52.43 |
| 33 | 0 | 8 | 0 | 0 | 30.68 | 29.95 | 30.27 | 34.76 | 51.19 | 70.38 | 69.86 | 63.84 | 55.43 | 46.95 | 39.09 | 32.14 | 27.78 | 25.47 | 23.78 | 26.03 |
| 33 | 0 | 8 | 8 | 0 | 29.46 | 28.49 | 28.51 | 32.46 | 46.18 | 60.77 | 59.34 | 53.59 | 46.18 | 39.7 | 34.1 | 29 | 25.76 | 24.39 | 23.58 | 26.22 |
| 33 | 0 | 15 | 0 | 0 | 21.69 | 19.46 | 19.24 | 22.94 | 40.08 | 67.39 | 69.33 | 63.73 | 55.5 | 47.15 | 39.39 | 32.49 | 28.17 | 25.89 | 24.2 | 26.46 |
| 17 | 0 | 5 | 8 | 0 | 35.88 | 36.94 | 37.39 | 41.2 | 52.78 | 63.6 | 62.54 | 58.16 | 52.19 | 46.97 | 42.41 | 37.98 | 35.09 | 34.25 | 34.08 | 37.46 |
| 17 | 0 | 8 | 0 | 0 | 31.3 | 30.62 | 30.8 | 35.27 | 52.13 | 73.16 | 74.71 | 71.09 | 65.14 | 58.47 | 51.53 | 44.75 | 40.13 | 37.63 | 35.7 | 38.2 |
| 17 | 0 | 8 | 8 | 0 | 30.5 | 29.86 | 29.91 | 33.77 | 47.32 | 62.04 | 61.69 | 57.3 | 51.27 | 46.03 | 41.47 | 37.06 | 34.17 | 33.39 | 33.27 | 36.66 |
| 7 | 0 | 5 | 8 | 0 | 37.22 | 38.27 | 38.6 | 42.15 | 53.46 | 64.91 | 64.82 | 61.6 | 57.04 | 53.48 | 50.73 | 48.11 | 46.57 | 47.33 | 48.93 | 53.05 |
| 0 | 0 | 255 | 4 | 0 | 3.12 | 2.5 | 2.44 | 2.83 | 7.54 | 37.88 | 64.8 | 69.55 | 68.85 | 68.09 | 67.92 | 68.12 | 68.81 | 71.23 | 74.25 | 76.96 |
| 0 | 0 | 73 | 0 | 0 | 5.99 | 4.66 | 4.45 | 5.55 | 15.14 | 54.91 | 73.89 | 76.71 | 76.86 | 76.9 | 76.66 | 76.36 | 76.06 | 76.07 | 75.79 | 76.22 |
| 7 | 0 | 255 | 0 | 0 | 3.11 | 2.47 | 2.39 | 2.78 | 7.47 | 38.28 | 66.81 | 71.79 | 70.33 | 67.16 | 62.91 | 58.05 | 54.32 | 52.21 | 50.42 | 52.65 |
| 0 | 0 | 73 | 4 | 0 | 5.93 | 4.51 | 4.32 | 5.46 | 14.87 | 52.24 | 68.55 | 69.57 | 67.75 | 66.52 | 66.01 | 65.95 | 66.43 | 68.83 | 72.08 | 75.04 |
| 7 | 0 | 255 | 4 | 0 | 3.1 | 2.52 | 2.44 | 2.8 | 7.25 | 37.08 | 62.78 | 66.12 | 63.6 | 60.38 | 57.13 | 53.58 | 51.04 | 50.35 | 50.05 | 53.05 |
| 7 | 0 | 73 | 0 | 0 | 5.72 | 4.28 | 4.12 | 5.22 | 14.65 | 54.53 | 72.77 | 73.8 | 71.1 | 67.37 | 62.78 | 57.65 | 53.77 | 51.58 | 49.71 | 52.03 |
| 0 | 0 | 255 | 18 | 0 | 2.92 | 2.43 | 2.37 | 2.68 | 6.93 | 33.56 | 51.47 | 51.96 | 48.72 | 46.76 | 46.53 | 47.14 | 48.77 | 53.99 | 62.94 | 71.33 |
| 0 | 0 | 73 | 18 | 0 | 5.49 | 4.05 | 3.87 | 4.92 | 13.72 | 43.47 | 52.46 | 50.58 | 46.64 | 44.49 | 44.24 | 44.94 | 46.74 | 52.57 | 62.67 | 71.82 |
| 7 | 0 | 255 | 18 | 0 | 2.97 | 2.48 | 2.42 | 2.76 | 7.03 | 33.85 | 51.35 | 51.3 | 47.42 | 44.53 | 42.93 | 41.62 | 41.14 | 43.09 | 46.43 | 51.77 |
| 0 | 0 | 73 | 10 | 0 | 5.55 | 4.16 | 3.98 | 5.08 | 14.37 | 48.54 | 60.94 | 60.17 | 56.86 | 54.95 | 54.6 | 55.04 | 56.44 | 61.03 | 68.07 | 74.04 |
| 7 | 0 | 255 | 10 | 0 | 2.99 | 2.53 | 2.46 | 2.78 | 7.06 | 35.53 | 57.01 | 58.39 | 54.9 | 51.78 | 49.45 | 47.21 | 45.88 | 46.71 | 48.36 | 52.58 |
| 7 | 0 | 73 | 10 | 0 | 5.71 | 4.29 | 4.13 | 5.23 | 14.4 | 47.76 | 59.21 | 57.45 | 52.95 | 49.43 | 46.91 | 44.52 | 43.16 | 44.1 | 46.01 | 50.5 |
| 0 | 0 | 22 | 0 | 0 | 17.25 | 14.68 | 14.33 | 17.33 | 33.73 | 69.43 | 78.89 | 80.01 | 79.7 | 79.46 | 78.96 | 78.4 | 77.87 | 77.76 | 77.42 | 77.88 |
| 0 | 0 | 22 | 4 | 0 | 15.98 | 13.25 | 12.88 | 15.85 | 31.97 | 64.31 | 71.46 | 70.89 | 68.67 | 67.41 | 67.06 | 67.21 | 67.95 | 70.69 | 74.26 | 77.24 |
| 7 | 0 | 22 | 0 | 0 | 15.75 | 13.07 | 12.71 | 15.75 | 32.53 | 68.26 | 76.53 | 75.82 | 72.73 | 68.82 | 64.08 | 58.82 | 54.83 | 52.58 | 50.72 | 53.11 |
| 0 | 0 | 37 | 4 | 0 | 11.33 | 9.22 | 8.94 | 10.95 | 24.13 | 60.05 | 70.76 | 70.88 | 68.96 | 67.83 | 67.5 | 67.67 | 68.41 | 71.06 | 74.54 | 77.37 |
| 7 | 0 | 37 | 0 | 0 | 11.52 | 9.37 | 9.1 | 11.25 | 24.91 | 63.41 | 75.25 | 75 | 71.93 | 67.96 | 63.2 | 58.01 | 54.12 | 51.92 | 50.08 | 52.34 |
| 7 | 0 | 37 | 4 | 0 | 11.84 | 9.62 | 9.27 | 11.47 | 24.99 | 59.92 | 69.22 | 67.78 | 63.77 | 59.99 | 56.42 | 52.76 | 50.24 | 49.73 | 49.77 | 52.9 |
| 33 | 0 | 255 | 0 | 0 | 3.14 | 2.52 | 2.44 | 2.88 | 7.72 | 38.03 | 62.95 | 63.2 | 56.65 | 49.03 | 41.72 | 35.18 | 31.04 | 28.86 | 27.24 | 29.28 |
| 33 | 0 | 255 | 4 | 0 | 3.25 | 2.58 | 2.51 | 2.94 | 7.8 | 37.02 | 59.27 | 58.7 | 52.32 | 45.61 | 39.4 | 33.73 | 30.06 | 28.24 | 26.94 | 29.15 |
| 33 | 0 | 73 | 0 | 0 | 6.35 | 4.81 | 4.61 | 5.89 | 15.98 | 53.79 | 67.54 | 63.88 | 56.09 | 47.84 | 40.13 | 33.3 | 29 | 26.72 | 25.05 | 27.23 |
| 17 | 0 | 255 | 4 | 0 | 3.13 | 2.52 | 2.43 | 2.87 | 7.63 | 37.53 | 61.83 | 63.35 | 58.88 | 53.61 | 48.38 | 43.14 | 39.54 | 37.9 | 36.76 | 39.43 |
| 17 | 0 | 73 | 0 | 0 | 6.35 | 4.83 | 4.67 | 5.91 | 15.85 | 54.83 | 71.21 | 70.18 | 64.95 | 58.55 | 51.71 | 44.95 | 40.34 | 37.82 | 35.91 | 38.36 |
| 17 | 0 | 73 | 4 | 0 | 6 | 4.59 | 4.39 | 5.57 | 15.09 | 51.16 | 64.63 | 62.65 | 57.14 | 51.5 | 46.1 | 40.8 | 37.22 | 35.66 | 34.65 | 37.49 |
| 7 | 0 | 73 | 4 | 0 | 6.05 | 4.68 | 4.49 | 5.63 | 15.15 | 52.05 | 67.02 | 66.59 | 62.82 | 59.1 | 55.58 | 51.91 | 49.38 | 48.83 | 48.84 | 52.08 |
| 255 | 0 | 255 | 4 | 0 | 3.87 | 3.01 | 2.88 | 3.61 | 9.21 | 24.76 | 24.38 | 18.76 | 13.46 | 9.54 | 6.8 | 4.91 | 3.96 | 3.53 | 3.29 | 3.67 |
| 205 | 0 | 73 | 0 | 0 | 6.46 | 4.95 | 4.75 | 6.2 | 15.38 | 34.36 | 31.15 | 23.35 | 16.48 | 11.56 | 8.17 | 5.79 | 4.6 | 4.07 | 3.72 | 4.22 |
| 205 | 0 | 255 | 0 | 0 | 3.38 | 2.64 | 2.6 | 3.11 | 8.29 | 28.96 | 32.8 | 26.19 | 19.39 | 14.21 | 10.43 | 7.65 | 6.12 | 5.41 | 4.93 | 5.59 |
| 205 | 0 | 73 | 4 | 0 | 6.28 | 4.79 | 4.57 | 6 | 15.01 | 33.36 | 30.25 | 22.7 | 15.99 | 11.19 | 7.89 | 5.63 | 4.47 | 3.97 | 3.66 | 4.16 |
| 205 | 0 | 255 | 4 | 0 | 3.16 | 2.54 | 2.47 | 2.94 | 7.81 | 28.19 | 31.97 | 25.51 | 18.81 | 13.73 | 10.04 | 7.33 | 5.86 | 5.17 | 4.73 | 5.35 |
| 137 | 0 | 73 | 0 | 0 | 6.58 | 4.86 | 4.63 | 6.1 | 16.19 | 42.34 | 42 | 33 | 24.31 | 17.86 | 13.13 | 9.63 | 7.73 | 6.82 | 6.21 | 7.08 |
| 255 | 0 | 255 | 18 | 0 | 3.59 | 2.84 | 2.75 | 3.32 | 8.32 | 22.62 | 22.24 | 17.07 | 12.16 | 8.58 | 6.13 | 4.45 | 3.61 | 3.25 | 3.05 | 3.4 |
| 205 | 0 | 73 | 18 | 0 | 6.34 | 4.84 | 4.64 | 6.02 | 14.7 | 30.84 | 28.01 | 21.33 | 15.24 | 10.85 | 7.79 | 5.63 | 4.53 | 4.06 | 3.77 | 4.29 |
| 205 | 0 | 255 | 18 | 0 | 3.25 | 2.59 | 2.52 | 2.99 | 7.73 | 26.42 | 29.32 | 23.54 | 17.49 | 12.88 | 9.52 | 7.04 | 5.69 | 5.08 | 4.69 | 5.32 |
| 205 | 0 | 73 | 10 | 0 | 5.96 | 4.54 | 4.4 | 5.73 | 14.52 | 31.84 | 28.88 | 21.76 | 15.36 | 10.78 | 7.62 | 5.43 | 4.31 | 3.83 | 3.53 | 4.03 |
| 205 | 0 | 255 | 10 | 0 | 3.22 | 2.6 | 2.5 | 2.98 | 7.53 | 26.76 | 30.05 | 24.02 | 17.7 | 12.9 | 9.43 | 6.9 | 5.54 | 4.91 | 4.54 | 5.13 |
| 137 | 0 | 73 | 10 | 0 | 6.76 | 5.08 | 4.81 | 6.3 | 16.16 | 38.86 | 38.19 | 30.46 | 22.86 | 17.12 | 12.85 | 9.57 | 7.75 | 6.91 | 6.33 | 7.27 |
| 90 | 0 | 22 | 0 | 0 | 14.94 | 11.95 | 11.61 | 14.89 | 30.87 | 55.28 | 52.01 | 42.47 | 32.73 | 25.04 | 19.18 | 14.63 | 12.04 | 10.73 | 9.82 | 11.13 |
| 90 | 0 | 22 | 4 | 0 | 16.38 | 13.69 | 13.34 | 16.59 | 31.34 | 52.69 | 49.44 | 40.68 | 31.77 | 24.8 | 19.44 | 15.18 | 12.71 | 11.48 | 10.65 | 11.96 |
| 58 | 0 | 22 | 0 | 0 | 15.93 | 13.31 | 12.95 | 16.08 | 32 | 60.86 | 61.35 | 53.16 | 43.15 | 34.34 | 27.14 | 21.31 | 17.87 | 16.12 | 14.89 | 16.59 |
| 137 | 0 | 37 | 4 | 0 | 11.55 | 9.37 | 9.07 | 11.55 | 24.11 | 44.77 | 40.83 | 31.96 | 23.74 | 17.61 | 13.13 | 9.79 | 7.94 | 7.05 | 6.48 | 7.35 |
| 90 | 0 | 37 | 0 | 0 | 11.19 | 8.72 | 8.37 | 10.8 | 24.45 | 52.89 | 52.21 | 42.9 | 33.18 | 25.47 | 19.59 | 15.02 | 12.39 | 11.08 | 10.15 | 11.44 |
| 90 | 0 | 37 | 4 | 0 | 11.4 | 8.87 | 8.51 | 11 | 24.41 | 50.52 | 49.5 | 40.89 | 31.85 | 24.7 | 19.22 | 14.91 | 12.39 | 11.13 | 10.28 | 11.58 |
| 90 | 0 | 255 | 0 | 0 | 3.51 | 2.72 | 2.6 | 3.17 | 8.86 | 36.59 | 50.96 | 45.29 | 36.64 | 29.35 | 23.58 | 18.94 | 16.16 | 14.71 | 13.67 | 15.05 |
| 90 | 0 | 255 | 4 | 0 | 3.56 | 2.75 | 2.68 | 3.21 | 8.88 | 35.86 | 49.03 | 43.63 | 35.51 | 28.68 | 23.24 | 18.78 | 16.07 | 14.7 | 13.7 | 15.11 |
| 58 | 0 | 73 | 0 | 0 | 6.67 | 5.04 | 4.83 | 6.2 | 16.49 | 51.38 | 60.56 | 54.02 | 44.57 | 36 | 28.91 | 23.08 | 19.61 | 17.81 | 16.53 | 18.24 |
| 137 | 0 | 255 | 4 | 0 | 3.67 | 2.8 | 2.69 | 3.29 | 9.13 | 33.76 | 41.87 | 35.46 | 27.83 | 21.75 | 17.02 | 13.24 | 11.02 | 9.91 | 9.12 | 10.24 |
| 90 | 0 | 73 | 0 | 0 | 6.89 | 5.13 | 4.88 | 6.35 | 16.71 | 47.35 | 51.33 | 43.03 | 33.74 | 26.25 | 20.47 | 15.93 | 13.28 | 11.94 | 11.01 | 12.3 |
| 90 | 0 | 73 | 4 | 0 | 7 | 5.15 | 4.92 | 6.4 | 16.71 | 45.35 | 48.5 | 40.86 | 32.25 | 25.31 | 19.91 | 15.57 | 13.01 | 11.76 | 10.87 | 12.21 |
| 137 | 0 | 73 | 4 | 0 | 7.02 | 5.38 | 5.12 | 6.6 | 16.53 | 40.26 | 39.87 | 31.9 | 24.01 | 18 | 13.53 | 10.13 | 8.22 | 7.32 | 6.69 | 7.62 |
| 7 | 0 | 5 | 41 | 0 | 27.17 | 25.86 | 25.36 | 27.58 | 34.1 | 38.78 | 36.88 | 33.09 | 28.72 | 26.29 | 25.55 | 25.4 | 26.13 | 30.16 | 37.72 | 46.75 |
| 0 | 0 | 8 | 30 | 0 | 25.73 | 23.88 | 23.38 | 26.1 | 35.82 | 45.19 | 44.26 | 40.71 | 36.37 | 34.18 | 34.02 | 34.84 | 36.84 | 43.4 | 56.12 | 68.76 |

TABLE 1-continued

First set of 969 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 7 | 0 | 15 | 30 | 0 | 18.63 | 16.19 | 15.73 | 18.42 | 29.84 | 43.69 | 43.41 | 39.61 | 34.86 | 32.1 | 31.03 | 30.51 | 30.96 | 34.61 | 41.13 | 49.07 |
| 7 | 0 | 8 | 21 | 0 | 26.44 | 24.7 | 24.33 | 27.51 | 39.02 | 50.76 | 50.04 | 46.16 | 41.23 | 38.16 | 36.67 | 35.64 | 35.6 | 38.5 | 43.53 | 50.15 |
| 0 | 0 | 22 | 23 | 0 | 14.9 | 12.25 | 11.81 | 14.33 | 26.89 | 46.65 | 48.3 | 45.11 | 40.77 | 38.56 | 38.42 | 39.27 | 41.32 | 47.89 | 59.86 | 70.99 |
| 7 | 0 | 37 | 23 | 0 | 9.69 | 7.49 | 7.13 | 9.08 | 20.63 | 44.45 | 47.65 | 44.3 | 39.57 | 36.67 | 35.39 | 34.59 | 34.73 | 37.84 | 43.14 | 49.99 |
| 0 | 0 | 15 | 15 | 0 | 18.7 | 16.18 | 15.76 | 18.84 | 33.02 | 53.5 | 55.49 | 52.71 | 48.66 | 46.51 | 46.24 | 46.92 | 48.7 | 54.43 | 63.94 | 72.09 |
| 7 | 0 | 15 | 8 | 0 | 20.28 | 17.68 | 17.28 | 20.66 | 36.45 | 60.4 | 63.01 | 59.99 | 55.29 | 51.72 | 49.02 | 46.38 | 44.81 | 45.5 | 47.04 | 51.3 |
| 33 | 0 | 37 | 8 | 0 | 9.76 | 7.41 | 7.08 | 9.21 | 22.22 | 52.54 | 57.13 | 52.14 | 44.86 | 38.41 | 32.84 | 27.78 | 24.58 | 23.22 | 22.39 | 24.99 |
| 17 | 0 | 37 | 15 | 0 | 9.42 | 7.16 | 6.87 | 8.85 | 21.1 | 48.42 | 52.59 | 48.87 | 43.34 | 39.15 | 35.99 | 32.98 | 31.14 | 31.33 | 32.3 | 36.26 |
| 17 | 0 | 22 | 8 | 0 | 14.72 | 11.93 | 11.57 | 14.53 | 30.02 | 57.83 | 61.29 | 57.48 | 51.56 | 46.36 | 41.82 | 37.39 | 34.48 | 33.68 | 33.5 | 36.95 |
| 7 | 0 | 22 | 15 | 0 | 17.44 | 15.06 | 14.66 | 17.35 | 30.54 | 53.08 | 55.7 | 52.45 | 47.7 | 44.45 | 42.5 | 40.93 | 40.31 | 42.4 | 46 | 51.48 |
| 17 | 0 | 8 | 21 | 0 | 26.92 | 25.35 | 25.02 | 28.15 | 39.2 | 50.17 | 48.9 | 44.4 | 38.85 | 34.97 | 32.4 | 30.1 | 28.87 | 29.89 | 31.96 | 36.59 |
| 17 | 0 | 22 | 0 | 0 | 17.08 | 14.6 | 14.25 | 17.23 | 33.46 | 67.14 | 73.54 | 70.58 | 64.73 | 58.12 | 51.2 | 44.45 | 39.87 | 37.37 | 35.48 | 37.97 |
| 33 | 0 | 15 | 8 | 0 | 21.22 | 18.97 | 18.67 | 22.15 | 37.38 | 58.82 | 59.07 | 53.48 | 46.12 | 39.64 | 34.04 | 28.92 | 25.67 | 24.28 | 23.41 | 26 |
| 33 | 0 | 22 | 0 | 0 | 16.34 | 13.77 | 13.42 | 16.59 | 33.03 | 65.02 | 68.95 | 63.44 | 55.05 | 46.55 | 38.7 | 31.77 | 27.45 | 25.17 | 23.49 | 25.7 |
| 33 | 0 | 37 | 0 | 0 | 11.23 | 8.96 | 8.64 | 10.91 | 24.92 | 60.9 | 68.19 | 63.23 | 55.02 | 46.59 | 38.78 | 31.88 | 27.53 | 25.25 | 23.59 | 25.82 |
| 33 | 0 | 22 | 8 | 0 | 15.8 | 13.4 | 13.04 | 15.96 | 30.8 | 56.68 | 58.5 | 53.09 | 45.68 | 39.08 | 33.36 | 28.17 | 24.86 | 23.46 | 22.58 | 25.15 |
| 17 | 0 | 15 | 8 | 0 | 20.79 | 18.61 | 18.32 | 21.76 | 37.33 | 60.27 | 62.01 | 57.91 | 51.89 | 46.61 | 42 | 37.54 | 34.67 | 33.84 | 33.64 | 36.97 |
| 33 | 0 | 8 | 30 | 0 | 25.92 | 24.73 | 24.44 | 27.3 | 36.62 | 44.51 | 42.25 | 37.36 | 31.71 | 27.72 | 24.94 | 22.39 | 20.89 | 21.13 | 22.09 | 25.53 |
| 33 | 0 | 15 | 30 | 0 | 18.63 | 16.17 | 15.7 | 18.62 | 30.38 | 43.31 | 41.98 | 37.24 | 31.65 | 27.7 | 24.92 | 22.35 | 20.82 | 21.05 | 21.95 | 25.39 |
| 90 | 0 | 22 | 23 | 0 | 14.98 | 12.52 | 12.15 | 15.02 | 27.65 | 42.66 | 39.62 | 32.88 | 25.91 | 20.6 | 16.51 | 13.11 | 11.09 | 10.22 | 9.66 | 11.05 |
| 90 | 0 | 37 | 23 | 0 | 10.16 | 7.81 | 7.44 | 9.65 | 21.16 | 39.67 | 38.24 | 32 | 25.35 | 20.22 | 16.22 | 12.91 | 10.93 | 10.07 | 9.53 | 10.86 |
| 58 | 0 | 15 | 15 | 0 | 18.79 | 16.35 | 15.97 | 19.26 | 32.89 | 49 | 46.89 | 40.39 | 32.98 | 27.01 | 22.25 | 18.12 | 15.6 | 14.55 | 13.92 | 15.84 |
| 58 | 0 | 37 | 15 | 0 | 10.01 | 7.72 | 7.39 | 9.53 | 21.86 | 46.59 | 47.67 | 41.42 | 33.9 | 27.84 | 23.01 | 18.84 | 16.29 | 15.2 | 14.56 | 16.49 |
| 58 | 0 | 22 | 15 | 0 | 14.66 | 11.94 | 11.55 | 14.45 | 28.27 | 48.63 | 47.63 | 41.18 | 33.71 | 27.75 | 22.99 | 18.87 | 16.34 | 15.29 | 14.67 | 16.63 |
| 33 | 0 | 255 | 18 | 0 | 2.85 | 2.32 | 2.28 | 2.66 | 6.98 | 32.58 | 47.68 | 45.76 | 40.31 | 35.62 | 31.84 | 28.23 | 25.9 | 25.19 | 24.96 | 27.66 |
| 90 | 0 | 255 | 18 | 0 | 3.21 | 2.59 | 2.5 | 2.92 | 7.92 | 31.9 | 41.48 | 36.81 | 30.15 | 24.68 | 20.31 | 16.57 | 14.27 | 13.17 | 12.44 | 13.86 |
| 58 | 0 | 255 | 10 | 0 | 2.85 | 2.26 | 2.22 | 2.6 | 7.21 | 33.64 | 49.23 | 45.94 | 38.87 | 32.53 | 27.29 | 22.73 | 19.87 | 18.52 | 17.59 | 19.42 |
| 33 | 0 | 37 | 23 | 0 | 9.49 | 7.19 | 6.85 | 8.84 | 20.6 | 43.47 | 45.29 | 40.67 | 34.73 | 30.25 | 26.86 | 23.74 | 21.76 | 21.55 | 21.88 | 25.04 |
| 255 | 0 | 0 | 105 | 0 | 16.91 | 18.65 | 19.22 | 20.29 | 19.63 | 17.57 | 14.34 | 10.95 | 7.91 | 5.89 | 4.51 | 3.53 | 3.03 | 2.86 | 2.76 | 3.15 |
| 58 | 0 | 0 | 88 | 0 | 21.39 | 20.98 | 20.31 | 20.56 | 20.82 | 20.25 | 18.07 | 15.24 | 12.39 | 10.8 | 10.07 | 9.52 | 9.38 | 10.5 | 12.56 | 16.07 |
| 255 | 0 | 15 | 58 | 0 | 13.13 | 12.75 | 12.89 | 15.59 | 21.07 | 21.56 | 17.13 | 12.58 | 8.69 | 6.08 | 4.4 | 3.3 | 2.78 | 2.59 | 2.49 | 2.75 |
| 17 | 0 | 0 | 54 | 0 | 31.67 | 32.47 | 31.93 | 32.54 | 33.25 | 32.91 | 30.29 | 26.48 | 22.37 | 20.07 | 19.18 | 18.67 | 18.9 | 21.62 | 26.64 | 33.68 |
| 17 | 0 | 0 | 77 | 0 | 24.69 | 24.25 | 23.42 | 23.66 | 24.12 | 23.8 | 21.64 | 18.68 | 15.64 | 14.09 | 13.72 | 13.76 | 14.37 | 17.42 | 23.8 | 32.61 |
| 58 | 0 | 5 | 47 | 0 | 26 | 25.16 | 24.87 | 27.44 | 33.87 | 37.24 | 34.07 | 29.2 | 24.02 | 20.42 | 17.88 | 15.58 | 14.19 | 14.12 | 14.5 | 16.94 |
| 255 | 0 | 37 | 26 | 0 | 11.4 | 10.13 | 9.98 | 12.53 | 21 | 26.02 | 21.04 | 15.6 | 10.94 | 7.66 | 5.47 | 4.01 | 3.31 | 3.02 | 2.84 | 3.15 |
| 255 | 0 | 37 | 44 | 0 | 10.61 | 9.29 | 9.12 | 11.5 | 19.46 | 24.13 | 19.58 | 14.51 | 10.15 | 7.14 | 5.13 | 3.8 | 3.16 | 2.9 | 2.74 | 3.04 |
| 137 | 0 | 15 | 35 | 0 | 17.52 | 15.89 | 15.74 | 18.84 | 28.84 | 35.86 | 31.15 | 24.73 | 18.65 | 14.19 | 10.91 | 8.34 | 6.9 | 6.28 | 5.9 | 6.81 |
| 255 | 0 | 0 | 44 | 0 | 20.2 | 25.37 | 28.41 | 32.12 | 29.49 | 24.29 | 18.66 | 13.59 | 9.35 | 6.49 | 4.64 | 3.43 | 2.85 | 2.64 | 2.49 | 2.77 |
| 137 | 0 | 0 | 35 | 0 | 29.97 | 35.4 | 37.76 | 40.75 | 39.97 | 36.3 | 30.25 | 23.67 | 17.59 | 13.19 | 10.01 | 7.55 | 6.2 | 5.62 | 5.27 | 6.13 |
| 255 | 0 | 5 | 26 | 0 | 17.97 | 20.53 | 22.1 | 26.07 | 28.57 | 25.22 | 19.22 | 13.83 | 9.42 | 6.46 | 4.58 | 3.38 | 2.82 | 2.61 | 2.48 | 2.72 |
| 137 | 0 | 0 | 53 | 0 | 27.36 | 30.89 | 32.1 | 34.07 | 33.71 | 31.19 | 26.42 | 21.01 | 15.91 | 12.26 | 9.62 | 7.49 | 6.27 | 5.83 | 5.58 | 6.52 |
| 255 | 0 | 5 | 44 | 0 | 17.51 | 19.6 | 20.96 | 24.41 | 26.71 | 23.91 | 18.52 | 13.5 | 9.31 | 6.48 | 4.66 | 3.48 | 2.93 | 2.71 | 2.59 | 2.84 |
| 137 | 0 | 5 | 35 | 0 | 23.14 | 23.84 | 24.34 | 27.77 | 34.14 | 35.51 | 30.1 | 23.7 | 17.7 | 13.35 | 10.18 | 7.72 | 6.34 | 5.78 | 5.43 | 6.37 |
| 58 | 0 | 5 | 66 | 0 | 21.43 | 20.27 | 19.78 | 21.32 | 25.02 | 26.51 | 24.01 | 20.42 | 16.7 | 14.41 | 13.09 | 11.93 | 11.35 | 12.02 | 13.35 | 16.33 |
| 7 | 0 | 0 | 0 | 0 | 60.83 | 72.06 | 76.21 | 78.44 | 78.91 | 78.49 | 77.28 | 75.06 | 71.53 | 67.48 | 62.72 | 57.56 | 53.7 | 51.52 | 49.71 | 51.98 |
| 7 | 0 | 0 | 8 | 0 | 54.22 | 62.61 | 65.06 | 66.8 | 67.54 | 67.21 | 65.1 | 61.5 | 56.71 | 52.93 | 49.91 | 47.05 | 45.3 | 45.92 | 47.44 | 51.58 |
| 17 | 0 | 2 | 0 | 0 | 49.02 | 54.87 | 57.23 | 61.36 | 69.88 | 76.49 | 75.06 | 70.89 | 64.7 | 57.92 | 50.9 | 44.02 | 39.36 | 36.81 | 34.84 | 37.41 |
| 7 | 0 | 0 | 41 | 0 | 36.45 | 38.39 | 38.07 | 38.81 | 39.64 | 39.43 | 36.8 | 32.79 | 28.3 | 25.83 | 25.05 | 24.84 | 25.51 | 29.45 | 36.87 | 45.98 |
| 7 | 0 | 0 | 21 | 0 | 45.46 | 49.73 | 50.39 | 51.57 | 52.47 | 52.25 | 49.62 | 45.43 | 40.39 | 37.22 | 35.62 | 34.49 | 34.37 | 37.26 | 42.28 | 48.96 |
| 17 | 0 | 2 | 21 | 0 | 38.26 | 39.96 | 40.21 | 42.79 | 48.34 | 51.66 | 49.08 | 44.4 | 38.82 | 34.92 | 32.29 | 29.89 | 28.55 | 29.41 | 31.29 | 35.81 |
| 58 | 0 | 8 | 0 | 0 | 27.23 | 26.08 | 26.32 | 31.12 | 48.01 | 65.22 | 61.54 | 52.73 | 42.46 | 33.45 | 26.09 | 20.17 | 16.72 | 14.96 | 13.74 | 15.47 |
| 33 | 0 | 5 | 0 | 0 | 34.36 | 34.92 | 35.66 | 40.65 | 55.97 | 70.39 | 68.5 | 62.09 | 53.39 | 44.7 | 36.72 | 29.72 | 25.39 | 23.12 | 21.47 | 23.74 |
| 33 | 0 | 5 | 8 | 0 | 32.65 | 32.71 | 33.04 | 37.28 | 49.81 | 60.35 | 57.93 | 51.93 | 44.41 | 37.84 | 32.18 | 27.04 | 23.8 | 22.42 | 21.57 | 24.19 |
| 33 | 0 | 0 | 0 | 0 | 55.68 | 68.06 | 73.29 | 76.72 | 76.36 | 73.79 | 69.11 | 62.31 | 53.66 | 45.2 | 37.41 | 30.49 | 26.15 | 23.85 | 22.19 | 24.5 |
| 33 | 0 | 0 | 8 | 0 | 49.88 | 58.77 | 61.85 | 64.42 | 64.69 | 63.05 | 58.85 | 52.64 | 45.06 | 38.49 | 32.83 | 27.7 | 24.47 | 23.09 | 22.29 | 24.96 |
| 58 | 0 | 2 | 0 | 0 | 42.17 | 47.86 | 50.73 | 56.22 | 64.83 | 68.23 | 62.34 | 53.43 | 43.37 | 34.57 | 27.36 | 21.52 | 18.09 | 16.33 | 15.1 | 16.87 |
| 17 | 0 | 0 | 8 | 0 | 53.29 | 61.51 | 64.11 | 66.13 | 66.64 | 65.76 | 62.75 | 57.97 | 51.82 | 46.52 | 41.92 | 37.51 | 34.65 | 33.89 | 33.78 | 37.23 |
| 33 | 0 | 2 | 0 | 0 | 46.72 | 52.27 | 54.71 | 59.43 | 68.37 | 74 | 70.69 | 64.18 | 55.61 | 47.04 | 39.15 | 32.2 | 27.84 | 25.56 | 23.88 | 26.15 |
| 33 | 0 | 2 | 8 | 0 | 43.33 | 47.7 | 49.25 | 52.96 | 59.75 | 63.5 | 60.06 | 53.95 | 46.43 | 39.88 | 34.25 | 29.13 | 25.89 | 24.57 | 23.75 | 26.38 |
| 17 | 0 | 2 | 8 | 0 | 45.19 | 49.31 | 50.57 | 53.67 | 60.46 | 64.62 | 62.72 | 58.09 | 52 | 46.82 | 42.41 | 38.2 | 35.49 | 34.93 | 34.98 | 38.44 |
| 255 | 0 | 73 | 0 | 0 | 7.24 | 5.69 | 5.48 | 7.18 | 15.88 | 26.92 | 22.32 | 16.25 | 11.14 | 7.6 | 5.3 | 3.82 | 3.12 | 2.84 | 2.66 | 2.94 |
| 255 | 0 | 73 | 4 | 0 | 7.2 | 5.72 | 5.53 | 7.24 | 15.8 | 26.37 | 21.89 | 15.97 | 10.97 | 7.5 | 5.24 | 3.78 | 3.08 | 2.78 | 2.64 | 2.92 |
| 205 | 0 | 37 | 0 | 0 | 10.4 | 8.67 | 8.49 | 10.86 | 22.18 | 37.09 | 31.36 | 23.22 | 16.28 | 11.34 | 7.97 | 5.67 | 4.49 | 4 | 3.67 | 4.14 |
| 255 | 0 | 73 | 18 | 0 | 7.36 | 5.95 | 5.79 | 7.47 | 15.74 | 25.36 | 21.17 | 15.58 | 10.77 | 7.44 | 5.23 | 3.8 | 3.1 | 2.83 | 2.67 | 2.96 |
| 255 | 0 | 73 | 10 | 0 | 7.21 | 5.75 | 5.58 | 7.22 | 15.63 | 25.95 | 21.62 | 15.87 | 10.96 | 7.55 | 5.33 | 3.91 | 3.21 | 2.93 | 2.78 | 3.08 |
| 205 | 0 | 37 | 10 | 0 | 9.99 | 8.29 | 8.09 | 10.34 | 21.06 | 34.25 | 29.08 | 21.7 | 15.28 | 10.74 | 7.65 | 5.51 | 4.43 | 3.96 | 3.66 | 4.14 |
| 90 | 0 | 15 | 0 | 0 | 19.95 | 17.58 | 17.4 | 21.37 | 37.68 | 57.13 | 52.21 | 42.5 | 32.75 | 25.05 | 19.2 | 14.68 | 12.06 | 10.77 | 9.88 | 11.11 |
| 137 | 0 | 22 | 0 | 0 | 14.71 | 12.61 | 12.38 | 15.66 | 30.03 | 47.83 | 41.63 | 31.87 | 23.1 | 16.66 | 12.07 | 8.75 | 6.96 | 6.13 | 5.57 | 6.37 |
| 137 | 0 | 22 | 4 | 0 | 13.81 | 11.72 | 11.49 | 14.58 | 28.26 | 44.7 | 38.88 | 29.71 | 21.44 | 15.42 | 11.13 | 8.04 | 6.39 | 5.64 | 5.14 | 5.88 |
| 255 | 0 | 22 | 0 | 0 | 12.41 | 11.5 | 11.64 | 14.83 | 24.12 | 27.75 | 21.29 | 15.12 | 10.16 | 6.82 | 4.74 | 3.44 | 2.87 | 2.65 | 2.52 | 2.76 |
| 255 | 0 | 22 | 4 | 0 | 12.49 | 11.82 | 12.01 | 15.14 | 23.68 | 26.59 | 20.32 | 14.37 | 9.61 | 6.43 | 4.43 | 3.22 | 2.67 | 2.46 | 2.36 | 2.58 |
| 205 | 0 | 15 | 0 | 0 | 15.59 | 14.64 | 14.86 | 18.64 | 30.69 | 38.08 | 30.2 | 21.84 | 14.97 | 10.19 | 7.05 | 4.96 | 3.95 | 3.51 | 3.28 | 3.67 |
| 255 | 0 | 37 | 4 | 0 | 9.85 | 8.49 | 8.39 | 10.85 | 20.07 | 26.65 | 20.99 | 14.99 | 10.09 | 6.77 | 4.66 | 3.37 | 2.79 | 2.56 | 2.43 | 2.65 |

TABLE 1-continued

First set of 969 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 205 | 0 | 22 | 0 | 0 | 12.36 | 10.79 | 10.73 | 13.77 | 25.98 | 36.9 | 29.76 | 21.51 | 14.7 | 10.01 | 6.91 | 4.85 | 3.86 | 3.44 | 3.18 | 3.59 |
| 205 | 0 | 22 | 4 | 0 | 13.16 | 11.75 | 11.75 | 14.89 | 26.46 | 36.23 | 29.43 | 21.48 | 14.8 | 10.15 | 7.03 | 4.95 | 3.92 | 3.48 | 3.22 | 3.66 |
| 205 | 0 | 37 | 4 | 0 | 9.28 | 7.56 | 7.38 | 9.63 | 20.56 | 34.74 | 29.31 | 21.58 | 14.97 | 10.3 | 7.17 | 5.07 | 4.02 | 3.57 | 3.31 | 3.74 |
| 255 | 0 | 0 | 4 | 0 | 21.22 | 28.53 | 33.84 | 40.37 | 35.49 | 27.48 | 20.22 | 14.21 | 9.45 | 6.32 | 4.39 | 3.22 | 2.7 | 2.5 | 2.39 | 2.61 |
| 205 | 0 | 0 | 0 | 0 | 28.9 | 38.99 | 46.14 | 54.41 | 49.75 | 40.25 | 30.41 | 21.82 | 14.87 | 10.1 | 6.96 | 4.9 | 3.92 | 3.5 | 3.25 | 3.66 |
| 255 | 0 | 2 | 0 | 0 | 21.38 | 26.77 | 30.73 | 37.23 | 36.27 | 29.24 | 21.6 | 15.26 | 10.26 | 6.95 | 4.84 | 3.53 | 2.95 | 2.71 | 2.57 | 2.78 |
| 205 | 0 | 0 | 4 | 0 | 29.36 | 39.08 | 45.7 | 53.44 | 49.1 | 40.02 | 30.56 | 22.18 | 15.31 | 10.59 | 7.45 | 5.3 | 4.28 | 3.84 | 3.58 | 3.98 |
| 255 | 0 | 2 | 4 | 0 | 20.84 | 26.18 | 29.94 | 36.01 | 35.28 | 28.58 | 21.13 | 14.93 | 10.02 | 6.78 | 4.75 | 3.47 | 2.9 | 2.67 | 2.54 | 2.76 |
| 205 | 0 | 2 | 0 | 0 | 26.73 | 33.42 | 37.9 | 45.14 | 47.17 | 41.06 | 31.26 | 22.51 | 15.41 | 10.52 | 7.29 | 5.15 | 4.1 | 3.66 | 3.39 | 3.82 |
| 255 | 0 | 0 | 18 | 0 | 21.67 | 28.4 | 33.02 | 38.55 | 34.44 | 27.25 | 20.32 | 14.43 | 9.72 | 6.57 | 4.61 | 3.39 | 2.83 | 2.61 | 2.47 | 2.75 |
| 205 | 0 | 0 | 18 | 0 | 27.61 | 35.29 | 39.93 | 45.29 | 42.54 | 35.9 | 28.03 | 20.69 | 14.47 | 10.15 | 7.22 | 5.22 | 4.22 | 3.78 | 3.53 | 4.03 |
| 255 | 0 | 2 | 18 | 0 | 20.37 | 25.15 | 28.25 | 33.25 | 32.75 | 27.1 | 20.37 | 14.53 | 9.82 | 6.67 | 4.69 | 3.44 | 2.87 | 2.64 | 2.52 | 2.77 |
| 205 | 0 | 0 | 10 | 0 | 28.68 | 37.53 | 43.16 | 49.67 | 46.21 | 38.39 | 29.66 | 21.71 | 15.12 | 10.52 | 7.44 | 5.36 | 4.29 | 3.88 | 3.61 | 4.1 |
| 255 | 0 | 2 | 10 | 0 | 20.89 | 26.2 | 29.8 | 35.46 | 34.39 | 28.06 | 20.94 | 14.86 | 10.01 | 6.78 | 4.73 | 3.43 | 2.85 | 2.63 | 2.47 | 2.71 |
| 205 | 0 | 2 | 10 | 0 | 24.89 | 30.04 | 33.24 | 39.06 | 41.74 | 37.14 | 28.68 | 20.83 | 14.34 | 9.88 | 6.91 | 4.91 | 3.91 | 3.53 | 3.25 | 3.68 |
| 90 | 0 | 0 | 0 | 0 | 44.69 | 58.01 | 65.34 | 71.95 | 69.78 | 62.86 | 53.06 | 42.17 | 31.69 | 23.52 | 17.44 | 12.86 | 10.36 | 9.12 | 8.31 | 9.52 |
| 90 | 0 | 0 | 4 | 0 | 43.12 | 54.91 | 61.02 | 66.73 | 65.03 | 59.02 | 50.05 | 39.89 | 30.08 | 22.49 | 16.8 | 12.46 | 10.09 | 8.96 | 8.17 | 9.39 |
| 90 | 0 | 2 | 0 | 0 | 37.83 | 44.61 | 48.28 | 54.7 | 62.14 | 62.16 | 53.2 | 42.43 | 32 | 23.83 | 17.71 | 13.14 | 10.59 | 9.34 | 8.53 | 9.76 |
| 137 | 0 | 0 | 4 | 0 | 36.22 | 47.44 | 54.26 | 61.43 | 58.49 | 50.48 | 40.39 | 30.49 | 21.92 | 15.72 | 11.32 | 8.15 | 6.48 | 5.72 | 5.22 | 6.02 |
| 137 | 0 | 2 | 0 | 0 | 32.04 | 38.09 | 41.82 | 48.94 | 55.31 | 52.4 | 42.09 | 31.67 | 22.67 | 16.14 | 11.56 | 8.3 | 6.57 | 5.77 | 5.28 | 6.06 |
| 137 | 0 | 2 | 4 | 0 | 31.63 | 37.54 | 41.01 | 47.33 | 52.51 | 49.66 | 40.13 | 30.37 | 21.87 | 15.69 | 11.32 | 8.18 | 6.5 | 5.72 | 5.23 | 6.02 |
| 255 | 0 | 8 | 0 | 0 | 17.69 | 19.58 | 21.05 | 25.79 | 31.52 | 28.82 | 21.42 | 15.07 | 10.07 | 6.74 | 4.68 | 3.4 | 2.84 | 2.61 | 2.5 | 2.74 |
| 255 | 0 | 8 | 4 | 0 | 16.56 | 18.01 | 19.23 | 23.77 | 29.75 | 27.45 | 20.37 | 14.24 | 9.44 | 6.29 | 4.36 | 3.17 | 2.65 | 2.45 | 2.33 | 2.56 |
| 205 | 0 | 8 | 0 | 0 | 19.97 | 20.9 | 21.99 | 26.99 | 37.58 | 39.71 | 30.78 | 22.16 | 15.15 | 10.32 | 7.1 | 4.98 | 3.95 | 3.51 | 3.25 | 3.69 |
| 255 | 0 | 5 | 4 | 0 | 18.84 | 21.93 | 24.1 | 29.17 | 32.54 | 28.18 | 20.93 | 14.77 | 9.88 | 6.65 | 4.63 | 3.42 | 2.87 | 2.67 | 2.56 | 2.78 |
| 205 | 0 | 5 | 0 | 0 | 23.03 | 26.05 | 28.25 | 34.03 | 41.71 | 40.28 | 30.96 | 22.32 | 15.3 | 10.45 | 7.23 | 5.11 | 4.1 | 3.68 | 3.42 | 3.84 |
| 205 | 0 | 5 | 4 | 0 | 22.73 | 25.37 | 27.33 | 32.77 | 39.99 | 38.65 | 29.93 | 21.74 | 15.02 | 10.32 | 7.18 | 5.07 | 4.04 | 3.59 | 3.35 | 3.79 |
| 205 | 0 | 2 | 4 | 0 | 25.94 | 31.68 | 35.66 | 42.33 | 44.38 | 38.86 | 29.82 | 21.64 | 14.95 | 10.28 | 7.16 | 5.07 | 4.06 | 3.61 | 3.37 | 3.8 |
| 17 | 0 | 2 | 41 | 0 | 33.46 | 34.26 | 34.05 | 35.78 | 39.51 | 41.28 | 38.52 | 34.13 | 29.21 | 26.22 | 24.75 | 23.63 | 23.38 | 25.65 | 29.74 | 35.92 |
| 58 | 0 | 8 | 30 | 0 | 23.63 | 22.4 | 22.29 | 25.64 | 35.86 | 43.32 | 39.9 | 33.93 | 27.47 | 22.69 | 19.1 | 15.92 | 14.01 | 13.47 | 13.35 | 15.57 |
| 33 | 0 | 5 | 21 | 0 | 30.58 | 30.23 | 30.3 | 33.28 | 43.69 | 51.03 | 48.26 | 42.74 | 36.25 | 31.33 | 27.55 | 24.08 | 21.91 | 21.58 | 21.85 | 25.08 |
| 137 | 0 | 22 | 23 | 0 | 14.31 | 12.33 | 12.11 | 14.99 | 26.63 | 38.4 | 33.51 | 26.09 | 19.17 | 14.13 | 10.51 | 7.79 | 6.32 | 5.69 | 5.28 | 6.09 |
| 58 | 0 | 8 | 8 | 0 | 27.12 | 26.06 | 26.24 | 30.58 | 44.91 | 58.24 | 54.48 | 46.52 | 37.49 | 29.92 | 23.81 | 18.71 | 15.67 | 14.29 | 13.37 | 15.27 |
| 137 | 0 | 8 | 8 | 0 | 23.06 | 22.91 | 23.55 | 28.3 | 40.47 | 46.48 | 38.69 | 29.52 | 21.34 | 15.41 | 11.18 | 8.13 | 6.51 | 5.77 | 5.3 | 6.08 |
| 137 | 0 | 15 | 15 | 0 | 17.68 | 15.89 | 15.82 | 19.45 | 32.08 | 42.48 | 36.41 | 28.21 | 20.68 | 15.2 | 11.22 | 8.29 | 6.7 | 5.97 | 5.54 | 6.37 |
| 90 | 0 | 8 | 8 | 0 | 24.72 | 24.05 | 24.4 | 28.85 | 42.48 | 52.74 | 46.71 | 37.76 | 28.82 | 21.9 | 16.64 | 12.59 | 10.28 | 9.21 | 8.51 | 9.73 |
| 90 | 0 | 15 | 15 | 0 | 18.69 | 16.66 | 16.47 | 19.96 | 33.5 | 47.47 | 43.1 | 35.22 | 27.25 | 21.11 | 16.42 | 12.68 | 10.5 | 9.53 | 8.88 | 10.19 |
| 33 | 0 | 2 | 21 | 0 | 37.79 | 40.14 | 40.78 | 43.59 | 48.95 | 51.58 | 48.08 | 42.45 | 35.92 | 31.01 | 27.23 | 23.77 | 21.64 | 21.33 | 21.66 | 24.91 |
| 90 | 0 | 8 | 0 | 0 | 25.32 | 24.6 | 25.02 | 30.04 | 46.34 | 59.43 | 52.45 | 41.94 | 31.54 | 23.41 | 17.34 | 12.79 | 10.28 | 9.06 | 8.25 | 9.41 |
| 58 | 0 | 2 | 8 | 0 | 38.87 | 43.37 | 45.39 | 49.96 | 57.12 | 59.66 | 54.11 | 46 | 36.97 | 29.47 | 23.4 | 18.35 | 15.39 | 13.99 | 13.11 | 14.99 |
| 90 | 0 | 5 | 0 | 0 | 29.92 | 31.83 | 33.3 | 39.13 | 52.66 | 60.09 | 52.13 | 41.44 | 30.96 | 22.81 | 16.77 | 12.27 | 9.82 | 8.62 | 7.84 | 8.96 |
| 137 | 0 | 8 | 0 | 0 | 23.3 | 23.56 | 24.33 | 29.46 | 43.4 | 50.98 | 41.95 | 31.52 | 22.42 | 15.86 | 11.28 | 8.05 | 6.36 | 5.59 | 5.09 | 5.84 |
| 90 | 0 | 5 | 8 | 0 | 29.38 | 30.59 | 31.62 | 36.64 | 48.14 | 53.76 | 46.85 | 37.62 | 28.52 | 21.51 | 16.22 | 12.14 | 9.85 | 8.78 | 8.07 | 9.3 |
| 58 | 0 | 5 | 8 | 0 | 31.75 | 32.52 | 33.22 | 37.82 | 50.13 | 58.85 | 54.14 | 46.13 | 37.13 | 29.66 | 23.6 | 18.52 | 15.52 | 14.11 | 13.21 | 15.08 |
| 33 | 0 | 0 | 30 | 0 | 39.52 | 43.73 | 44.56 | 45.98 | 46.58 | 45.57 | 41.76 | 36.44 | 30.52 | 26.37 | 23.41 | 20.67 | 19.06 | 19.21 | 20.05 | 23.61 |
| 58 | 0 | 2 | 30 | 0 | 32.12 | 34.25 | 34.87 | 37.68 | 42.3 | 43.54 | 39.14 | 33.04 | 26.54 | 21.77 | 18.16 | 14.97 | 13.06 | 12.49 | 12.34 | 14.52 |
| 90 | 0 | 0 | 23 | 0 | 36.17 | 42.98 | 45.76 | 48.84 | 48.24 | 44.7 | 38.36 | 31.07 | 23.89 | 18.53 | 14.45 | 11.15 | 9.27 | 8.45 | 7.96 | 9.27 |
| 137 | 0 | 2 | 23 | 0 | 28.33 | 31.89 | 33.79 | 38.02 | 41.64 | 39.66 | 32.69 | 25.19 | 18.41 | 13.51 | 10 | 7.37 | 5.97 | 5.36 | 4.98 | 5.81 |
| 58 | 0 | 0 | 15 | 0 | 42.8 | 50.32 | 53.17 | 56.01 | 55.93 | 53.36 | 47.75 | 40.5 | 32.61 | 26.33 | 21.3 | 16.99 | 14.44 | 13.34 | 12.68 | 14.63 |
| 137 | 0 | 5 | 15 | 0 | 25.22 | 26.54 | 27.61 | 32.11 | 40.53 | 42.37 | 35.2 | 27.13 | 19.84 | 14.53 | 10.68 | 7.84 | 6.3 | 5.6 | 5.17 | 5.99 |
| 90 | 0 | 2 | 15 | 0 | 33.62 | 36.96 | 38.64 | 43.08 | 49.14 | 49.52 | 42.91 | 34.85 | 26.9 | 20.82 | 16.16 | 12.44 | 10.29 | 9.3 | 8.66 | 9.95 |
| 255 | 0 | 22 | 18 | 0 | 13.25 | 12.41 | 12.52 | 15.63 | 24.05 | 26.75 | 20.85 | 15.06 | 10.32 | 7.1 | 5.03 | 3.71 | 3.08 | 2.82 | 2.68 | 2.97 |
| 255 | 0 | 8 | 18 | 0 | 17.24 | 18.72 | 19.88 | 24.02 | 29.12 | 26.98 | 20.51 | 14.73 | 10.02 | 6.86 | 4.85 | 3.57 | 2.96 | 2.74 | 2.6 | 2.85 |
| 255 | 0 | 15 | 10 | 0 | 14.96 | 15.07 | 15.57 | 19.26 | 27.07 | 27.63 | 21.02 | 14.97 | 10.09 | 6.82 | 4.78 | 3.48 | 2.87 | 2.65 | 2.52 | 2.75 |
| 137 | 0 | 8 | 23 | 0 | 22.15 | 22.04 | 22.44 | 26.28 | 35.41 | 39.38 | 33.12 | 25.59 | 18.73 | 13.76 | 10.22 | 7.56 | 6.15 | 5.54 | 5.15 | 5.95 |
| 255 | 0 | 0 | 105 | 255 | 14.35 | 15.21 | 14.21 | 11.93 | 8.72 | 6 | 4.06 | 3.08 | 2.58 | 2.57 | 2.83 | 3.1 | 3.43 | 3.57 | 3.48 | 3.98 |
| 58 | 0 | 0 | 88 | 50 | 24.46 | 24.1 | 22.67 | 21.45 | 19.58 | 17.75 | 15.2 | 13.96 | 11.99 | 11.84 | 11.67 | 10.8 | 10.29 | 10.84 | 11.94 | 14.51 |
| 255 | 0 | 0 | 58 | 50 | 21.74 | 25.65 | 26.91 | 27.24 | 23.81 | 19.98 | 15.97 | 13.09 | 9.84 | 7.66 | 5.82 | 4.34 | 3.58 | 3.26 | 3.1 | 3.46 |
| 17 | 0 | 0 | 54 | 12 | 31.88 | 32.89 | 31.7 | 30.84 | 29.43 | 27.65 | 24.36 | 22.26 | 19.16 | 18.67 | 18.58 | 17.72 | 17.42 | 19.23 | 22.6 | 28.03 |
| 17 | 0 | 0 | 77 | 12 | 23.39 | 22.91 | 21.9 | 21.54 | 21.04 | 20.06 | 17.65 | 15.59 | 13.08 | 12.32 | 12.28 | 12.16 | 12.51 | 14.91 | 19.83 | 26.87 |
| 58 | 0 | 0 | 47 | 12 | 32.79 | 35.75 | 35.21 | 34.63 | 32.67 | 30.06 | 26.06 | 23.38 | 19.55 | 17.91 | 16.2 | 13.83 | 12.34 | 12.12 | 12.26 | 14.46 |
| 255 | 0 | 0 | 26 | 12 | 21.44 | 27.39 | 30.74 | 33.98 | 29.81 | 24.02 | 18.36 | 13.76 | 9.6 | 6.81 | 4.88 | 3.58 | 2.97 | 2.72 | 2.59 | 2.86 |
| 255 | 0 | 0 | 44 | 12 | 20.81 | 25.79 | 28.41 | 30.95 | 27.68 | 22.74 | 17.55 | 13.23 | 9.33 | 6.66 | 4.85 | 3.62 | 2.99 | 2.76 | 2.63 | 2.91 |
| 137 | 0 | 0 | 35 | 12 | 30.17 | 35.41 | 36.82 | 37.79 | 34.88 | 30.66 | 25.31 | 20.99 | 16.12 | 12.85 | 10.05 | 7.58 | 6.24 | 5.68 | 5.3 | 6.17 |
| 255 | 0 | 0 | 44 | 255 | 14.1 | 15.43 | 14.27 | 11.26 | 7.61 | 4.92 | 3.26 | 2.55 | 2.21 | 2.21 | 2.44 | 2.68 | 2.96 | 3.04 | 2.91 | 3.29 |
| 137 | 0 | 0 | 35 | 137 | 27.83 | 30.33 | 28.42 | 24.3 | 18.89 | 14.63 | 10.98 | 9.18 | 7.57 | 7.65 | 8.09 | 7.76 | 7.49 | 7.17 | 6.77 | 7.77 |
| 255 | 0 | 0 | 26 | 137 | 20.86 | 24.8 | 25.19 | 23.16 | 18.1 | 13.79 | 10.14 | 8.01 | 6.17 | 5.35 | 4.68 | 3.85 | 3.31 | 3.06 | 2.88 | 3.22 |
| 137 | 0 | 0 | 53 | 137 | 25.18 | 27.08 | 25.41 | 21.98 | 17.34 | 13.58 | 10.24 | 8.54 | 7.03 | 7.03 | 7.36 | 7.04 | 6.78 | 6.53 | 6.29 | 7.26 |
| 255 | 0 | 0 | 44 | 137 | 20.1 | 23.56 | 23.74 | 21.93 | 17.35 | 13.33 | 9.88 | 7.83 | 6.06 | 5.29 | 4.66 | 3.84 | 3.34 | 3.08 | 2.91 | 3.28 |
| 137 | 0 | 0 | 35 | 50 | 29.91 | 34.19 | 33.44 | 30.89 | 25.93 | 22.02 | 18.11 | 16.59 | 13.75 | 12.67 | 10.74 | 8.25 | 6.81 | 6.16 | 5.76 | 6.65 |
| 58 | 0 | 0 | 66 | 12 | 25.62 | 26.37 | 25.65 | 25.39 | 24.53 | 23.04 | 20.09 | 17.64 | 14.62 | 13.28 | 12.31 | 11.06 | 10.33 | 10.75 | 11.71 | 14.31 |
| 7 | 0 | 0 | 0 | 5 | 58.86 | 69.65 | 71.75 | 70.29 | 66.31 | 62.79 | 58.77 | 58.56 | 55.95 | 58.3 | 57.78 | 52.28 | 47.84 | 45.27 | 43.23 | 45.81 |
| 7 | 0 | 0 | 8 | 5 | 52.36 | 59.85 | 60.7 | 59.72 | 57 | 54.25 | 50.28 | 48.84 | 45.36 | 46.1 | 45.77 | 42.53 | 40.11 | 39.88 | 40.37 | 44.23 |

TABLE 1-continued

First set of 969 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 17 | 0 | 0 | 0 | 5 | 58.59 | 69.61 | 71.99 | 70.9 | 66.55 | 62.43 | 57.56 | 56.09 | 51.83 | 51.22 | 47.67 | 40.83 | 35.97 | 33.28 | 31.28 | 33.84 |
| 7 | 0 | 0 | 41 | 5 | 37.97 | 40.08 | 39.42 | 39.22 | 38.62 | 37.28 | 33.98 | 31.03 | 27.14 | 26.03 | 25.88 | 25.43 | 25.75 | 29.04 | 35.04 | 42.8 |
| 7 | 0 | 0 | 21 | 5 | 46.23 | 50.83 | 50.81 | 50.28 | 48.75 | 46.73 | 42.99 | 40.56 | 36.64 | 36.17 | 35.89 | 34.31 | 33.5 | 35.28 | 38.53 | 44.04 |
| 17 | 0 | 0 | 21 | 5 | 45.24 | 50.13 | 50.35 | 50 | 48.4 | 46.12 | 42.03 | 39.1 | 34.59 | 33.07 | 31.53 | 28.88 | 27.19 | 27.67 | 29.05 | 33.32 |
| 58 | 0 | 0 | 0 | 5 | 50.31 | 62.91 | 67.33 | 68.59 | 63.94 | 58.14 | 50.92 | 45.44 | 37.62 | 31.86 | 25.69 | 19.75 | 16.24 | 14.46 | 13.23 | 14.93 |
| 33 | 0 | 0 | 0 | 5 | 55.05 | 67.15 | 70.35 | 70.01 | 65.42 | 60.53 | 54.6 | 51.37 | 45.28 | 41.83 | 36.39 | 29.56 | 25.15 | 22.81 | 21.14 | 23.36 |
| 33 | 0 | 0 | 8 | 5 | 49.62 | 58.42 | 60.27 | 60.23 | 57.24 | 53.54 | 48.23 | 44.57 | 38.72 | 35.46 | 31.32 | 26.14 | 22.75 | 21.28 | 20.37 | 22.91 |
| 33 | 0 | 0 | 0 | 24 | 50.89 | 60.62 | 58.86 | 51.85 | 42.55 | 36.32 | 30.66 | 30.79 | 28.08 | 31.19 | 30.63 | 24.71 | 20.66 | 18.55 | 17.03 | 19 |
| 33 | 0 | 0 | 8 | 24 | 46.58 | 53.78 | 51.89 | 46.45 | 38.96 | 33.65 | 28.43 | 28.11 | 25.31 | 27.47 | 26.95 | 22.23 | 18.97 | 17.44 | 16.46 | 18.61 |
| 58 | 0 | 0 | 0 | 24 | 46.49 | 57.21 | 56.74 | 50.94 | 41.78 | 35.36 | 29.44 | 28.58 | 25.01 | 25.37 | 22.78 | 17.59 | 14.36 | 12.7 | 11.58 | 13.1 |
| 17 | 0 | 0 | 8 | 12 | 50.66 | 58.65 | 58.25 | 54.89 | 49.32 | 44.79 | 39.68 | 38.86 | 35.55 | 37.43 | 37.08 | 32.45 | 29.04 | 27.61 | 26.84 | 29.8 |
| 33 | 0 | 0 | 0 | 12 | 53.19 | 64.67 | 65.62 | 61.81 | 54.3 | 48.32 | 42.19 | 41.05 | 36.85 | 37.16 | 34.14 | 27.66 | 23.37 | 21.09 | 19.48 | 21.61 |
| 33 | 0 | 0 | 8 | 12 | 47.96 | 56.44 | 56.64 | 53.86 | 48.34 | 43.53 | 38.02 | 36.35 | 32.19 | 31.94 | 29.6 | 24.58 | 21.19 | 19.64 | 18.67 | 21.02 |
| 17 | 0 | 0 | 8 | 5 | 52.59 | 61.08 | 62.42 | 61.78 | 58.87 | 55.68 | 51.08 | 48.64 | 44 | 42.71 | 40.17 | 35.48 | 32.21 | 31.05 | 30.52 | 33.75 |
| 255 | 0 | 0 | 0 | 5 | 22.57 | 30.55 | 36.27 | 42.68 | 36.57 | 28.08 | 20.71 | 14.91 | 10.09 | 6.86 | 4.79 | 3.48 | 2.88 | 2.66 | 2.51 | 2.77 |
| 255 | 0 | 0 | 4 | 5 | 22.33 | 29.98 | 35.31 | 41.2 | 35.49 | 27.42 | 20.25 | 14.5 | 9.75 | 6.62 | 4.61 | 3.36 | 2.79 | 2.58 | 2.45 | 2.69 |
| 205 | 0 | 0 | 0 | 5 | 29.39 | 39.53 | 46.01 | 52.24 | 46.1 | 37.04 | 28.18 | 21.09 | 14.83 | 10.5 | 7.4 | 5.24 | 4.17 | 3.68 | 3.42 | 3.85 |
| 255 | 0 | 0 | 18 | 5 | 21.24 | 27.72 | 31.84 | 36.42 | 32.12 | 25.48 | 19.11 | 13.84 | 9.43 | 6.46 | 4.56 | 3.34 | 2.79 | 2.57 | 2.46 | 2.68 |
| 255 | 0 | 0 | 10 | 5 | 21.73 | 28.72 | 33.38 | 38.48 | 33.55 | 26.28 | 19.6 | 14.15 | 9.6 | 6.56 | 4.6 | 3.37 | 2.81 | 2.6 | 2.47 | 2.72 |
| 205 | 0 | 0 | 10 | 5 | 28.41 | 36.74 | 41.61 | 46.31 | 41.79 | 34.49 | 26.74 | 20.26 | 14.36 | 10.28 | 7.33 | 5.24 | 4.2 | 3.76 | 3.49 | 3.96 |
| 90 | 0 | 0 | 0 | 5 | 42.86 | 55.56 | 61.05 | 63.98 | 58.66 | 51.35 | 42.76 | 35.7 | 27.54 | 21.57 | 16.29 | 11.92 | 9.49 | 8.32 | 7.53 | 8.65 |
| 137 | 0 | 0 | 0 | 5 | 36.28 | 47.72 | 54.11 | 59.11 | 53.37 | 44.91 | 35.65 | 27.99 | 20.45 | 15.07 | 10.9 | 7.78 | 6.13 | 5.38 | 4.91 | 5.63 |
| 137 | 0 | 0 | 4 | 5 | 34.86 | 45.07 | 50.47 | 54.77 | 49.77 | 42.15 | 33.54 | 26.35 | 19.26 | 14.24 | 10.33 | 7.4 | 5.86 | 5.14 | 4.72 | 5.43 |
| 255 | 0 | 0 | 0 | 24 | 21.58 | 28.58 | 32.66 | 35.56 | 29.17 | 22.58 | 16.91 | 12.85 | 8.96 | 6.35 | 4.48 | 3.23 | 2.67 | 2.44 | 2.31 | 2.53 |
| 255 | 0 | 0 | 4 | 24 | 23.26 | 30.19 | 34.23 | 37.26 | 31.21 | 24.6 | 18.75 | 14.42 | 10.24 | 7.39 | 5.29 | 3.84 | 3.15 | 2.86 | 2.69 | 3 |
| 205 | 0 | 0 | 0 | 24 | 29.37 | 38.37 | 42.25 | 43.17 | 35.58 | 28.52 | 22.17 | 18.19 | 13.55 | 10.47 | 7.73 | 5.52 | 4.4 | 3.9 | 3.59 | 4.06 |
| 255 | 0 | 0 | 4 | 12 | 22.5 | 29.97 | 34.79 | 39.41 | 33.46 | 26.03 | 19.49 | 14.42 | 9.96 | 6.96 | 4.91 | 3.56 | 2.93 | 2.68 | 2.55 | 2.79 |
| 205 | 0 | 0 | 0 | 12 | 29.9 | 39.57 | 44.91 | 48.58 | 41.49 | 33.31 | 25.63 | 20.06 | 14.47 | 10.65 | 7.68 | 5.46 | 4.36 | 3.89 | 3.58 | 4.03 |
| 205 | 0 | 0 | 4 | 12 | 29.36 | 38.38 | 43.2 | 46.57 | 40.19 | 32.55 | 25.15 | 19.69 | 14.21 | 10.47 | 7.55 | 5.37 | 4.29 | 3.82 | 3.52 | 3.99 |
| 205 | 0 | 0 | 4 | 5 | 29.2 | 38.46 | 44.2 | 49.78 | 44.39 | 36.08 | 27.68 | 20.79 | 14.62 | 10.34 | 7.3 | 5.17 | 4.11 | 3.66 | 3.37 | 3.82 |
| 255 | 0 | 0 | 4 | 255 | 15.21 | 16.67 | 15.43 | 12.13 | 8.13 | 5.3 | 3.57 | 2.8 | 2.43 | 2.44 | 2.69 | 2.94 | 3.26 | 3.32 | 3.18 | 3.56 |
| 205 | 0 | 0 | 0 | 201 | 19.67 | 22.33 | 21.21 | 17.11 | 11.67 | 7.59 | 4.91 | 3.6 | 2.93 | 2.89 | 3.19 | 3.46 | 3.75 | 3.77 | 3.56 | 4.05 |
| 255 | 0 | 0 | 0 | 201 | 17.66 | 21.11 | 21.13 | 18.3 | 13.01 | 8.74 | 5.78 | 4.2 | 3.33 | 3.11 | 3.14 | 3.01 | 2.9 | 2.78 | 2.65 | 2.92 |
| 205 | 0 | 0 | 4 | 201 | 19.91 | 22.54 | 21.41 | 17.33 | 11.9 | 7.8 | 5.08 | 3.76 | 3.08 | 3.04 | 3.35 | 3.65 | 4.01 | 4.03 | 3.82 | 4.33 |
| 255 | 0 | 0 | 4 | 201 | 18.52 | 21.75 | 21.8 | 18.96 | 13.58 | 9.18 | 6.07 | 4.41 | 3.48 | 3.27 | 3.31 | 3.19 | 3.1 | 2.96 | 2.83 | 3.13 |
| 205 | 0 | 0 | 0 | 137 | 25.46 | 29.99 | 28.88 | 24.45 | 18.11 | 13.5 | 9.82 | 8 | 6.38 | 6.07 | 5.89 | 5.17 | 4.62 | 4.24 | 3.91 | 4.47 |
| 255 | 0 | 0 | 18 | 255 | 15.32 | 16.69 | 15.47 | 12.23 | 8.23 | 5.36 | 3.6 | 2.81 | 2.45 | 2.46 | 2.69 | 2.97 | 3.29 | 3.36 | 3.23 | 3.61 |
| 205 | 0 | 0 | 18 | 201 | 18.94 | 21.18 | 20.06 | 16.35 | 11.31 | 7.42 | 4.81 | 3.54 | 2.89 | 2.84 | 3.17 | 3.45 | 3.79 | 3.83 | 3.64 | 4.18 |
| 255 | 0 | 0 | 18 | 201 | 17.26 | 20.27 | 20.13 | 17.53 | 12.59 | 8.48 | 5.59 | 4.06 | 3.21 | 3.02 | 3.07 | 2.96 | 2.87 | 2.76 | 2.62 | 2.88 |
| 205 | 0 | 0 | 10 | 201 | 19.28 | 21.75 | 20.66 | 16.82 | 11.61 | 7.63 | 4.96 | 3.66 | 2.99 | 2.95 | 3.27 | 3.58 | 3.9 | 3.91 | 3.72 | 4.25 |
| 255 | 0 | 0 | 10 | 201 | 17.31 | 20.43 | 20.36 | 17.66 | 12.62 | 8.48 | 5.59 | 4.04 | 3.2 | 2.99 | 3.03 | 2.94 | 2.82 | 2.71 | 2.6 | 2.88 |
| 205 | 0 | 0 | 10 | 137 | 23.9 | 27.8 | 26.74 | 22.77 | 17.03 | 12.74 | 9.3 | 7.56 | 6.08 | 5.8 | 5.69 | 5.03 | 4.56 | 4.22 | 3.93 | 4.46 |
| 90 | 0 | 0 | 0 | 110 | 36.61 | 41.23 | 36.99 | 29.61 | 22.42 | 18.04 | 14.41 | 13.86 | 12.32 | 13.83 | 14.45 | 12.46 | 10.94 | 9.99 | 9.19 | 10.35 |
| 90 | 0 | 0 | 4 | 110 | 34.72 | 38.96 | 35.24 | 28.66 | 21.99 | 17.86 | 14.36 | 13.86 | 12.34 | 13.74 | 14.22 | 12.21 | 10.68 | 9.78 | 9.06 | 10.17 |
| 90 | 0 | 0 | 0 | 50 | 39.05 | 46.62 | 44.58 | 38.11 | 29.82 | 24.67 | 20.26 | 19.77 | 17.3 | 17.7 | 15.91 | 12.26 | 10.01 | 8.87 | 8.13 | 9.21 |
| 137 | 0 | 0 | 4 | 137 | 28.52 | 32.23 | 30.12 | 24.83 | 18.48 | 13.9 | 10.21 | 8.45 | 6.94 | 7 | 7.42 | 7.04 | 6.69 | 6.27 | 5.81 | 6.61 |
| 137 | 0 | 0 | 0 | 110 | 31.91 | 36.99 | 34.48 | 28.79 | 22.08 | 17.79 | 14.16 | 13.22 | 11.34 | 11.57 | 10.87 | 8.74 | 7.34 | 6.56 | 5.99 | 6.82 |
| 137 | 0 | 0 | 4 | 110 | 33.01 | 38.3 | 36.13 | 30.56 | 23.63 | 19.05 | 15.18 | 14.04 | 11.98 | 12.03 | 11.22 | 9.08 | 7.69 | 6.91 | 6.35 | 7.2 |
| 255 | 0 | 0 | 0 | 110 | 23.83 | 29.5 | 30.64 | 28.9 | 22.83 | 18.14 | 14.1 | 11.9 | 9.22 | 7.64 | 6.03 | 4.52 | 3.68 | 3.31 | 3.1 | 3.46 |
| 255 | 0 | 0 | 4 | 110 | 24.35 | 29.94 | 31.02 | 29.18 | 23.24 | 18.54 | 14.47 | 12.27 | 9.53 | 7.94 | 6.32 | 4.73 | 3.9 | 3.55 | 3.29 | 3.65 |
| 205 | 0 | 0 | 0 | 50 | 29.54 | 37.26 | 38.7 | 36.33 | 28.72 | 23.09 | 18.23 | 15.99 | 12.53 | 10.52 | 8.15 | 5.91 | 4.73 | 4.19 | 3.87 | 4.38 |
| 255 | 0 | 0 | 4 | 137 | 22.52 | 27.34 | 27.97 | 25.76 | 19.95 | 15.13 | 11.15 | 8.85 | 6.8 | 5.9 | 5.11 | 4.15 | 3.58 | 3.27 | 3.05 | 3.43 |
| 205 | 0 | 0 | 0 | 110 | 28.63 | 34.41 | 33.47 | 28.88 | 22.19 | 17.62 | 13.8 | 12.4 | 10.19 | 9.59 | 8.37 | 6.47 | 5.34 | 4.79 | 4.39 | 5 |
| 205 | 0 | 0 | 4 | 110 | 29.01 | 34.56 | 33.62 | 29.41 | 22.92 | 18.45 | 14.66 | 13.28 | 10.98 | 10.29 | 8.92 | 6.89 | 5.68 | 5.08 | 4.68 | 5.29 |
| 205 | 0 | 0 | 4 | 137 | 25.06 | 29.41 | 28.33 | 24.16 | 18.03 | 13.5 | 9.87 | 8.04 | 6.44 | 6.14 | 5.95 | 5.24 | 4.72 | 4.33 | 4.02 | 4.61 |
| 17 | 0 | 0 | 41 | 5 | 36.34 | 38.67 | 38.24 | 38.18 | 37.53 | 36.07 | 32.55 | 29.34 | 25.21 | 23.54 | 22.65 | 21.38 | 20.81 | 22.55 | 25.74 | 31.13 |
| 58 | 0 | 0 | 30 | 5 | 37.39 | 42.11 | 42.8 | 43.33 | 41.91 | 39.17 | 34.36 | 30.02 | 24.62 | 21.27 | 18.27 | 15.1 | 13.14 | 12.57 | 12.38 | 14.44 |
| 33 | 0 | 0 | 21 | 5 | 43.01 | 48.51 | 49.01 | 48.97 | 47.22 | 44.6 | 40.04 | 36.4 | 31.24 | 28.62 | 25.9 | 22.38 | 20.11 | 19.62 | 19.7 | 22.71 |
| 137 | 0 | 0 | 23 | 5 | 32.04 | 38.97 | 41.85 | 44.49 | 41.79 | 36.73 | 30.05 | 24 | 17.9 | 13.6 | 10.24 | 7.57 | 6.11 | 5.49 | 5.09 | 5.92 |
| 58 | 0 | 0 | 8 | 5 | 45.57 | 55.37 | 58.06 | 58.86 | 55.44 | 50.78 | 44.38 | 39.33 | 32.42 | 27.72 | 22.84 | 17.89 | 14.94 | 13.56 | 12.63 | 14.46 |
| 137 | 0 | 0 | 8 | 24 | 34.34 | 42.7 | 44.87 | 43.87 | 37.13 | 31.1 | 25.12 | 21.88 | 17.25 | 14.39 | 11.29 | 8.33 | 6.67 | 5.94 | 5.48 | 6.19 |
| 137 | 0 | 0 | 15 | 12 | 32.53 | 40.45 | 43.26 | 44.53 | 39.87 | 34.09 | 27.59 | 22.79 | 17.29 | 13.57 | 10.3 | 7.55 | 6.09 | 5.44 | 4.99 | 5.79 |
| 90 | 0 | 0 | 8 | 12 | 39.66 | 48.95 | 51.33 | 51.22 | 45.56 | 39.64 | 33.06 | 29 | 23.35 | 19.8 | 15.88 | 12.04 | 9.81 | 8.73 | 8.05 | 9.25 |
| 90 | 0 | 0 | 15 | 5 | 38.15 | 46.25 | 49.08 | 50.93 | 47.95 | 43.08 | 36.39 | 30.54 | 23.91 | 19.2 | 15.1 | 11.5 | 9.45 | 8.52 | 7.91 | 9.12 |
| 33 | 0 | 0 | 21 | 12 | 41.28 | 46.49 | 46.04 | 44.21 | 40.39 | 36.74 | 31.98 | 30 | 26.13 | 25.64 | 24.1 | 20.64 | 18.31 | 17.65 | 17.48 | 20.21 |
| 90 | 0 | 0 | 0 | 12 | 42.14 | 53.51 | 57.01 | 56.59 | 49.22 | 42.16 | 34.85 | 30.67 | 24.59 | 20.64 | 16.21 | 11.99 | 9.6 | 8.44 | 7.68 | 8.77 |
| 58 | 0 | 0 | 8 | 24 | 43.02 | 50.64 | 49.7 | 45.13 | 37.73 | 32.32 | 27.02 | 26.02 | 22.7 | 22.87 | 20.79 | 16.44 | 13.64 | 12.31 | 11.45 | 13.02 |
| 90 | 0 | 0 | 0 | 24 | 41.19 | 50.98 | 51.99 | 48.21 | 39.54 | 33.02 | 26.98 | 24.94 | 20.71 | 18.87 | 15.58 | 11.61 | 9.32 | 8.2 | 7.47 | 8.52 |
| 137 | 0 | 0 | 0 | 24 | 34.92 | 44.68 | 47.43 | 46.1 | 38.11 | 31.38 | 25.14 | 21.91 | 17.2 | 14.28 | 11.04 | 8 | 6.34 | 5.58 | 5.08 | 5.81 |
| 90 | 0 | 0 | 8 | 24 | 38.24 | 46.1 | 46.71 | 43.91 | 37.01 | 31.43 | 25.97 | 23.89 | 19.89 | 18.12 | 15.13 | 11.49 | 9.33 | 8.3 | 7.64 | 8.74 |
| 58 | 0 | 0 | 8 | 12 | 45.3 | 53.82 | 54.89 | 53.09 | 47.4 | 42.08 | 36.1 | 33.44 | 28.5 | 26.38 | 22.84 | 18.23 | 15.39 | 14.02 | 13.13 | 14.83 |
| 33 | 0 | 0 | 30 | 24 | 38.42 | 41.76 | 40.12 | 37.14 | 32.74 | 29.12 | 24.93 | 23.94 | 21.19 | 21.97 | 21.59 | 18.86 | 16.97 | 16.58 | 16.69 | 19.26 |
| 58 | 0 | 0 | 30 | 24 | 36.85 | 40.96 | 39.88 | 37.35 | 32.95 | 29.12 | 24.71 | 23.2 | 20.01 | 19.66 | 18.21 | 15.19 | 13.23 | 12.53 | 12.22 | 14.09 |

TABLE 1-continued

First set of 969 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 90 | 0 | 0 | 23 | 110 | 34.5 | 37.69 | 34.41 | 28.85 | 22.75 | 18.7 | 15.16 | 14.42 | 12.76 | 13.83 | 14.16 | 12.39 | 11.07 | 10.32 | 9.73 | 10.92 |
| 137 | 0 | 0 | 23 | 110 | 30.91 | 34.7 | 32.66 | 28.07 | 22.18 | 18.13 | 14.54 | 13.47 | 11.53 | 11.6 | 10.92 | 8.99 | 7.71 | 7.03 | 6.57 | 7.46 |
| 58 | 0 | 0 | 15 | 50 | 39.4 | 44.57 | 41.53 | 35.45 | 28.45 | 23.93 | 19.8 | 19.68 | 17.62 | 19.37 | 18.99 | 15.41 | 13.01 | 11.91 | 11.19 | 12.68 |
| 137 | 0 | 0 | 15 | 50 | 32.43 | 38.61 | 38.39 | 35.2 | 28.88 | 24.19 | 19.8 | 18.23 | 15.1 | 13.82 | 11.54 | 8.74 | 7.12 | 6.37 | 5.87 | 6.71 |
| 90 | 0 | 0 | 15 | 50 | 36.48 | 42.11 | 40.52 | 35.88 | 29.32 | 24.79 | 20.62 | 19.89 | 17.37 | 17.51 | 15.91 | 12.65 | 10.6 | 9.61 | 8.99 | 10.18 |
| 255 | 0 | 0 | 18 | 24 | 21.35 | 27.52 | 30.71 | 33.13 | 28.22 | 22.53 | 17.23 | 13.24 | 9.38 | 6.76 | 4.86 | 3.54 | 2.91 | 2.66 | 2.52 | 2.79 |
| 255 | 0 | 0 | 18 | 110 | 21.79 | 26.49 | 27.37 | 25.91 | 20.98 | 16.92 | 13.3 | 11.3 | 8.82 | 7.4 | 5.9 | 4.45 | 3.68 | 3.32 | 3.1 | 3.48 |
| 255 | 0 | 0 | 10 | 50 | 21.53 | 27.12 | 29.45 | 29.98 | 24.99 | 20.31 | 16 | 13.16 | 9.85 | 7.6 | 5.67 | 4.17 | 3.44 | 3.11 | 2.94 | 3.26 |
| 137 | 0 | 0 | 23 | 24 | 31.59 | 37.73 | 38.89 | 38.19 | 33.2 | 28.36 | 23.18 | 20.13 | 15.95 | 13.43 | 10.73 | 8.11 | 6.62 | 5.97 | 5.55 | 6.36 |
| 0 | 0 | 0 | 105 | 255 | 14.09 | 13.5 | 11.76 | 9.19 | 6.42 | 4.32 | 2.99 | 2.43 | 2.19 | 2.26 | 2.7 | 3.89 | 7.83 | 15.63 | 27.63 | 45.62 |
| 0 | 0 | 0 | 88 | 50 | 23.35 | 22.63 | 20.98 | 19.59 | 17.91 | 16.31 | 14.01 | 13.07 | 11.4 | 11.82 | 12.49 | 12.43 | 12.73 | 14.87 | 19.07 | 24.98 |
| 58 | 0 | 0 | 58 | 255 | 15.47 | 15.19 | 13.08 | 9.68 | 6.37 | 4.13 | 2.85 | 2.35 | 2.15 | 2.21 | 2.61 | 3.71 | 7.41 | 12.99 | 16.25 | 19.53 |
| 0 | 0 | 0 | 54 | 12 | 32.01 | 32.63 | 31.23 | 30.14 | 28.79 | 27.17 | 24.11 | 22.35 | 19.6 | 19.81 | 20.7 | 20.97 | 21.88 | 26.07 | 34.57 | 45.17 |
| 0 | 0 | 0 | 77 | 12 | 23.4 | 22.93 | 21.78 | 21.34 | 20.9 | 19.98 | 17.69 | 15.74 | 13.35 | 12.83 | 13.16 | 13.53 | 14.51 | 18.43 | 27.53 | 40.54 |
| 17 | 0 | 0 | 47 | 50 | 33.11 | 34.6 | 31.66 | 27.67 | 23.17 | 20.02 | 16.81 | 16.69 | 15.18 | 17.48 | 19.03 | 17.36 | 16.04 | 16.12 | 16.71 | 19.52 |
| 137 | 0 | 0 | 26 | 255 | 15.76 | 16.05 | 14.06 | 10.38 | 6.74 | 4.3 | 2.9 | 2.35 | 2.11 | 2.16 | 2.52 | 3.32 | 5.21 | 6.8 | 6.93 | 8.05 |
| 137 | 0 | 0 | 44 | 255 | 16.33 | 16.59 | 14.63 | 11.05 | 7.36 | 4.79 | 3.26 | 2.63 | 2.37 | 2.43 | 2.83 | 3.71 | 5.69 | 7.35 | 7.59 | 8.8 |
| 58 | 0 | 0 | 35 | 137 | 29.04 | 30.32 | 27.17 | 22.12 | 16.72 | 12.73 | 9.4 | 7.94 | 6.71 | 7.33 | 8.87 | 9.92 | 11.09 | 11.56 | 11.4 | 13.01 |
| 0 | 0 | 0 | 44 | 255 | 13.46 | 13.11 | 11.01 | 7.75 | 4.88 | 3.17 | 2.32 | 2.02 | 1.92 | 1.98 | 2.24 | 3.16 | 7.62 | 20.43 | 39.52 | 58.48 |
| 0 | 0 | 0 | 35 | 137 | 29.34 | 29.62 | 25.87 | 20.52 | 15.26 | 11.52 | 8.46 | 7.21 | 6.16 | 7.04 | 9.28 | 11.7 | 15.26 | 17.89 | 18.95 | 21.78 |
| 17 | 0 | 0 | 26 | 255 | 15.01 | 14.79 | 12.49 | 8.81 | 5.59 | 3.62 | 2.61 | 2.24 | 2.1 | 2.17 | 2.51 | 3.55 | 8.16 | 18.98 | 28.8 | 35.88 |
| 0 | 0 | 0 | 53 | 137 | 27.54 | 27.72 | 24.52 | 20 | 15.29 | 11.72 | 8.69 | 7.44 | 6.35 | 7.16 | 9.18 | 11.26 | 14.34 | 17.03 | 18.76 | 22.03 |
| 17 | 0 | 0 | 44 | 255 | 13.96 | 13.62 | 11.49 | 8.1 | 5.13 | 3.31 | 2.37 | 2.03 | 1.91 | 1.96 | 2.26 | 3.22 | 7.32 | 17.18 | 26.95 | 34.78 |
| 17 | 0 | 0 | 35 | 137 | 28.91 | 29.64 | 26.28 | 21.16 | 15.94 | 12.17 | 9.04 | 7.77 | 6.66 | 7.49 | 9.49 | 11.29 | 13.74 | 15.35 | 15.82 | 18.07 |
| 17 | 0 | 0 | 66 | 50 | 27.86 | 27.89 | 25.86 | 23.63 | 20.91 | 18.64 | 15.88 | 15.19 | 13.44 | 14.38 | 15.13 | 14.33 | 13.85 | 14.83 | 16.68 | 20.2 |
| 0 | 0 | 0 | 0 | 5 | 61.48 | 71.86 | 73.34 | 71.25 | 67.13 | 63.8 | 60.2 | 61.09 | 60.12 | 66.2 | 70.5 | 68.41 | 65.84 | 64.3 | 62.87 | 64.47 |
| 0 | 0 | 0 | 8 | 5 | 54.38 | 61.84 | 62.5 | 61.17 | 58.53 | 56.04 | 52.49 | 51.8 | 49.34 | 52.17 | 54.71 | 54.07 | 53.68 | 55.68 | 58.88 | 63.24 |
| 7 | 0 | 0 | 0 | 12 | 58.79 | 69.22 | 68.69 | 63.31 | 55.64 | 50.17 | 44.79 | 45.76 | 43.95 | 50.64 | 54.06 | 48.62 | 43.87 | 41.13 | 39.04 | 41.54 |
| 0 | 0 | 0 | 41 | 5 | 37.37 | 39.01 | 38.13 | 37.71 | 37.1 | 35.86 | 32.76 | 30.21 | 26.7 | 26.22 | 26.89 | 27.4 | 28.75 | 34.1 | 44.69 | 56.63 |
| 0 | 0 | 0 | 21 | 5 | 44.76 | 48.97 | 48.73 | 48.11 | 46.76 | 45.03 | 41.66 | 39.78 | 36.46 | 37.1 | 38.42 | 38.58 | 39.46 | 43.83 | 51.34 | 59.41 |
| 7 | 0 | 0 | 21 | 12 | 43.85 | 47.93 | 46.74 | 44.39 | 40.87 | 37.77 | 33.67 | 32.7 | 29.89 | 31.8 | 33.1 | 31.42 | 30.28 | 31.44 | 33.7 | 38.48 |
| 33 | 0 | 0 | 0 | 50 | 46.47 | 53.75 | 48.65 | 39.36 | 30.37 | 25.24 | 20.95 | 21.66 | 20.24 | 24.77 | 26.51 | 21.74 | 18.31 | 16.5 | 15.23 | 16.87 |
| 17 | 0 | 0 | 0 | 24 | 53.35 | 62.72 | 59.91 | 52.01 | 42.68 | 36.72 | 31.35 | 32.23 | 30.41 | 36.32 | 38.79 | 32.97 | 28.5 | 26.05 | 24.25 | 26.45 |
| 17 | 0 | 0 | 8 | 24 | 46.77 | 53.31 | 50.97 | 45.15 | 37.9 | 32.94 | 28.15 | 28.47 | 26.49 | 30.71 | 32.58 | 28.43 | 25.15 | 23.7 | 22.85 | 25.37 |
| 0 | 0 | 0 | 0 | 24 | 55.08 | 63.85 | 59.98 | 51.15 | 41.69 | 35.86 | 30.73 | 32.3 | 31.41 | 41.28 | 50.14 | 45.71 | 41.01 | 38.21 | 36.09 | 38.57 |
| 0 | 0 | 0 | 8 | 24 | 49.19 | 55.15 | 51.82 | 45.13 | 37.64 | 32.76 | 28.11 | 28.99 | 27.67 | 34.7 | 40.85 | 38.15 | 35.35 | 34.58 | 34.48 | 37.86 |
| 7 | 0 | 0 | 0 | 50 | 48.37 | 55.01 | 48.57 | 38.45 | 29.46 | 24.48 | 20.38 | 21.58 | 20.8 | 28.12 | 34.27 | 29.62 | 25.53 | 23.29 | 21.67 | 23.69 |
| 0 | 0 | 0 | 8 | 12 | 52.33 | 59.44 | 58.23 | 54.3 | 48.84 | 44.66 | 40.04 | 40.34 | 38.41 | 43.97 | 48.53 | 46.75 | 44.97 | 45.41 | 46.78 | 50.84 |
| 7 | 0 | 0 | 0 | 24 | 54.59 | 63.43 | 59.71 | 51.07 | 41.55 | 35.64 | 30.42 | 31.68 | 30.4 | 38.44 | 44.11 | 38.74 | 34.01 | 31.3 | 29.31 | 31.72 |
| 7 | 0 | 0 | 8 | 24 | 48.97 | 55.47 | 52.41 | 45.85 | 38.34 | 33.35 | 28.59 | 29.21 | 27.58 | 33.31 | 37.18 | 33.49 | 30.29 | 28.97 | 28.22 | 31.14 |
| 7 | 0 | 0 | 8 | 12 | 51.12 | 57.93 | 56.79 | 52.8 | 47.04 | 42.53 | 37.57 | 37.33 | 34.82 | 38.77 | 41.1 | 37.96 | 35.35 | 34.7 | 34.72 | 38.16 |
| 205 | 0 | 0 | 0 | 255 | 14.15 | 14.94 | 13.22 | 9.71 | 6.19 | 3.89 | 2.63 | 2.16 | 1.96 | 2 | 2.24 | 2.71 | 3.57 | 4.07 | 3.96 | 4.55 |
| 205 | 0 | 0 | 4 | 255 | 14.22 | 14.94 | 13.24 | 9.75 | 6.2 | 3.92 | 2.67 | 2.2 | 2 | 2.03 | 2.26 | 2.7 | 3.51 | 3.97 | 3.86 | 4.03 |
| 137 | 0 | 0 | 0 | 201 | 22.72 | 25 | 23.3 | 18.52 | 12.82 | 8.51 | 5.6 | 4.16 | 3.4 | 3.42 | 4.03 | 4.8 | 5.86 | 6.24 | 5.93 | 6.77 |
| 205 | 0 | 0 | 18 | 255 | 14.36 | 15.07 | 13.37 | 9.97 | 6.48 | 4.18 | 2.9 | 2.38 | 2.15 | 2.2 | 2.46 | 2.94 | 3.84 | 4.4 | 4.32 | 4.93 |
| 205 | 0 | 0 | 10 | 255 | 14.57 | 15.4 | 13.67 | 10.12 | 6.52 | 4.17 | 2.87 | 2.34 | 2.12 | 2.17 | 2.43 | 2.93 | 3.87 | 4.46 | 4.36 | 4.98 |
| 137 | 0 | 0 | 10 | 201 | 22.1 | 24.15 | 22.42 | 17.86 | 12.35 | 8.16 | 5.28 | 3.88 | 3.19 | 3.77 | 4.57 | 5.7 | 6.14 | 5.88 | 6.7 |
| 58 | 0 | 0 | 0 | 110 | 38.85 | 43.22 | 38.13 | 30.13 | 22.77 | 18.38 | 14.77 | 14.42 | 13.06 | 15.28 | 16.81 | 15.03 | 13.53 | 12.52 | 11.62 | 12.93 |
| 90 | 0 | 0 | 0 | 137 | 32.71 | 36.22 | 33.1 | 26.74 | 19.93 | 15.17 | 11.36 | 9.69 | 8.18 | 8.7 | 9.85 | 10.09 | 10.29 | 9.98 | 9.32 | 10.46 |
| 90 | 0 | 0 | 4 | 137 | 32.03 | 35.4 | 32.35 | 26.16 | 19.5 | 14.82 | 11.04 | 9.39 | 7.9 | 8.41 | 9.52 | 9.74 | 9.94 | 9.65 | 9.03 | 10.16 |
| 90 | 0 | 0 | 0 | 255 | 17.01 | 17.17 | 14.84 | 10.7 | 6.86 | 4.35 | 2.93 | 2.37 | 2.15 | 2.22 | 2.67 | 3.82 | 7.26 | 11.21 | 12.1 | 13.74 |
| 90 | 0 | 0 | 4 | 255 | 17.13 | 17.3 | 14.93 | 10.8 | 6.93 | 4.41 | 3 | 2.45 | 2.22 | 2.29 | 2.74 | 3.88 | 7.29 | 11.26 | 12.17 | 13.83 |
| 58 | 0 | 0 | 0 | 201 | 23.05 | 24.61 | 21.91 | 16.37 | 10.81 | 6.94 | 4.52 | 3.43 | 2.92 | 3.04 | 3.86 | 5.61 | 9.84 | 13.71 | 14.21 | 16.11 |
| 137 | 0 | 0 | 4 | 255 | 16.49 | 17.02 | 14.93 | 11.03 | 7.15 | 4.56 | 3.08 | 2.48 | 2.22 | 2.28 | 2.68 | 3.56 | 5.58 | 7.23 | 7.32 | 8.37 |
| 90 | 0 | 0 | 0 | 201 | 24.29 | 26.07 | 23.66 | 18.28 | 12.47 | 8.23 | 5.37 | 4 | 3.3 | 3.42 | 4.28 | 5.76 | 8.45 | 10.03 | 9.83 | 11.15 |
| 90 | 0 | 0 | 4 | 201 | 23.22 | 24.94 | 22.71 | 17.6 | 12.04 | 7.95 | 5.21 | 3.89 | 3.21 | 3.32 | 4.15 | 5.58 | 8.23 | 9.85 | 9.72 | 11.03 |
| 137 | 0 | 0 | 4 | 201 | 22.51 | 24.71 | 23 | 18.3 | 12.67 | 8.4 | 5.47 | 4.03 | 3.27 | 3.31 | 3.93 | 4.77 | 5.95 | 6.37 | 6.07 | 6.96 |
| 0 | 0 | 0 | 4 | 255 | 14 | 13.91 | 11.58 | 7.93 | 4.88 | 3.14 | 2.3 | 2 | 1.89 | 1.96 | 2.23 | 3.19 | 8.18 | 24.66 | 49.39 | 66.11 |
| 0 | 0 | 0 | 0 | 201 | 23.97 | 25.1 | 21.88 | 15.9 | 10.28 | 6.53 | 4.27 | 3.31 | 2.88 | 3.03 | 3.97 | 6.54 | 16.54 | 39.7 | 58.78 | 66.51 |
| 7 | 0 | 0 | 0 | 255 | 14.51 | 14.4 | 12.01 | 8.16 | 5.01 | 3.23 | 2.37 | 2.08 | 1.97 | 2.03 | 2.3 | 3.26 | 8.3 | 23.57 | 41.01 | 51.07 |
| 0 | 0 | 0 | 4 | 201 | 23.52 | 24.55 | 21.49 | 15.74 | 10.23 | 6.52 | 4.25 | 3.28 | 2.84 | 3 | 3.95 | 6.52 | 16.23 | 38.11 | 57.28 | 66.22 |
| 7 | 0 | 0 | 4 | 255 | 14.82 | 14.68 | 12.28 | 8.45 | 5.22 | 3.37 | 2.47 | 2.17 | 2.06 | 2.12 | 2.41 | 3.4 | 8.51 | 23.42 | 40.39 | 50.67 |
| 7 | 0 | 0 | 0 | 201 | 24.1 | 25.19 | 22.08 | 16.17 | 10.55 | 6.73 | 4.41 | 3.39 | 2.94 | 3.12 | 4.08 | 6.64 | 15.75 | 33.22 | 43.8 | 49.19 |
| 0 | 0 | 0 | 18 | 255 | 13.93 | 13.68 | 11.43 | 7.9 | 4.93 | 3.21 | 2.38 | 2.09 | 1.99 | 2.03 | 2.3 | 3.23 | 8.07 | 23.26 | 46.78 | 66.05 |
| 0 | 0 | 0 | 18 | 201 | 22.12 | 22.66 | 19.85 | 14.81 | 9.83 | 6.31 | 4.11 | 3.15 | 2.73 | 2.87 | 3.76 | 6.18 | 14.74 | 32.75 | 50.84 | 62.85 |
| 7 | 0 | 0 | 18 | 255 | 14.75 | 14.45 | 12.14 | 8.46 | 5.29 | 3.42 | 2.49 | 2.16 | 2.04 | 2.1 | 2.4 | 3.44 | 8.43 | 22.06 | 37.81 | 48.96 |
| 0 | 0 | 0 | 10 | 201 | 24.16 | 24.88 | 21.94 | 16.47 | 11.09 | 7.27 | 4.85 | 3.76 | 3.25 | 3.43 | 4.48 | 7.15 | 16.57 | 36.77 | 55.48 | 65.8 |
| 7 | 0 | 0 | 10 | 255 | 15 | 14.84 | 12.42 | 8.57 | 5.31 | 3.41 | 2.46 | 2.12 | 2.01 | 2.07 | 2.39 | 3.42 | 8.48 | 22.91 | 39.44 | 50.06 |
| 7 | 0 | 0 | 10 | 201 | 23.21 | 24.04 | 21.08 | 15.65 | 10.33 | 6.62 | 4.32 | 3.3 | 2.83 | 3 | 3.94 | 6.33 | 14.54 | 29.7 | 40.08 | 46.61 |
| 0 | 0 | 0 | 0 | 110 | 41.15 | 44.61 | 37.31 | 27.93 | 20.42 | 16.19 | 12.84 | 12.88 | 12 | 15.84 | 20.37 | 19.81 | 18.88 | 17.86 | 16.69 | 18.41 |
| 0 | 0 | 0 | 4 | 110 | 39.68 | 42.87 | 36.01 | 27.19 | 19.99 | 15.87 | 12.57 | 12.53 | 11.6 | 15.16 | 19.45 | 19.06 | 18.34 | 17.56 | 16.57 | 18.33 |
| 7 | 0 | 0 | 0 | 110 | 40.91 | 44.56 | 37.37 | 28.1 | 20.55 | 16.32 | 12.96 | 13.01 | 12.1 | 15.84 | 20 | 19.17 | 18.08 | 17.07 | 15.96 | 17.57 |
| 0 | 0 | 0 | 4 | 137 | 34.03 | 36.03 | 30.77 | 23.08 | 16.34 | 12.01 | 8.72 | 7.57 | 6.55 | 7.76 | 10.51 | 13.37 | 17.76 | 20.24 | 20.07 | 22.25 |

TABLE 1-continued

First set of 969 patches
(reference condition)

| Colorant digital count (0-255) | | | | | Percent reflectance at wavelength | | | | | | | | | | | | | | | |
| --- | --- | --- | --- | --- | --- | --- | --- | --- | --- | --- | --- | --- | --- | --- | --- | --- | --- | --- | --- | --- |
| C | M | Y | K | V | 400 | 420 | 440 | 460 | 480 | 500 | 520 | 540 | 560 | 580 | 600 | 620 | 640 | 660 | 680 | 700 |
| 7 | 0 | 0 | 0 | 137 | 32.99 | 35.48 | 30.39 | 22.7 | 15.98 | 11.66 | 8.42 | 7.28 | 6.27 | 7.39 | 9.95 | 12.51 | 16.32 | 18.21 | 17.71 | 19.64 |
| 7 | 0 | 0 | 4 | 137 | 33.77 | 35.9 | 30.83 | 23.27 | 16.57 | 12.23 | 8.92 | 7.72 | 6.67 | 7.79 | 10.35 | 12.92 | 16.66 | 18.58 | 18.24 | 20.21 |
| 33 | 0 | 0 | 0 | 255 | 15.25 | 15.21 | 12.78 | 8.8 | 5.42 | 3.43 | 2.44 | 2.09 | 1.97 | 2.02 | 2.34 | 3.35 | 7.84 | 17.48 | 23.32 | 27.18 |
| 33 | 0 | 0 | 4 | 255 | 15.07 | 15.04 | 12.63 | 8.71 | 5.37 | 3.41 | 2.43 | 2.09 | 1.96 | 2.02 | 2.33 | 3.32 | 7.7 | 17.13 | 23.03 | 27.04 |
| 33 | 0 | 0 | 0 | 201 | 23.55 | 24.96 | 21.95 | 16.13 | 10.47 | 6.65 | 4.32 | 3.32 | 2.85 | 3 | 3.85 | 5.9 | 11.97 | 19.67 | 21.88 | 24.65 |
| 17 | 0 | 0 | 4 | 255 | 14.78 | 14.79 | 12.37 | 8.53 | 5.3 | 3.43 | 2.5 | 2.18 | 2.05 | 2.13 | 2.41 | 3.42 | 8.16 | 20.4 | 30.93 | 37.22 |
| 17 | 0 | 0 | 0 | 201 | 23.8 | 25.01 | 21.91 | 15.98 | 10.3 | 6.48 | 4.17 | 3.15 | 2.7 | 2.85 | 3.76 | 6.08 | 13.79 | 26.09 | 31.46 | 35.37 |
| 17 | 0 | 0 | 4 | 201 | 23.29 | 24.56 | 21.54 | 15.83 | 10.3 | 6.5 | 4.18 | 3.16 | 2.7 | 2.85 | 3.77 | 6.08 | 13.63 | 25.54 | 31.13 | 35.31 |
| 7 | 0 | 0 | 4 | 201 | 23.53 | 24.55 | 21.52 | 15.8 | 10.33 | 6.57 | 4.28 | 3.28 | 2.82 | 2.98 | 3.92 | 6.36 | 14.96 | 31.13 | 41.44 | 47.33 |
| 7 | 0 | 0 | 41 | 12 | 36.64 | 38.47 | 37.06 | 35.55 | 33.39 | 31.13 | 27.57 | 25.96 | 23.04 | 23.6 | 24.39 | 23.77 | 23.72 | 26.2 | 30.68 | 37.1 |
| 33 | 0 | 0 | 30 | 50 | 36.32 | 39.12 | 35.68 | 30.52 | 24.91 | 21.18 | 17.64 | 17.65 | 16.05 | 18.56 | 19.66 | 17.06 | 15.1 | 14.4 | 14.13 | 16.19 |
| 17 | 0 | 0 | 21 | 24 | 41.98 | 45.9 | 43.48 | 39.22 | 33.76 | 29.74 | 25.47 | 25.2 | 23.02 | 25.69 | 26.94 | 24.17 | 22.03 | 21.58 | 21.73 | 24.75 |
| 90 | 0 | 0 | 23 | 137 | 30.84 | 33.05 | 30.2 | 25.06 | 19.2 | 14.86 | 11.22 | 9.57 | 8.09 | 8.62 | 9.84 | 10.2 | 10.5 | 10.38 | 9.92 | 11.21 |
| 33 | 0 | 0 | 8 | 50 | 43.31 | 48.68 | 44.05 | 36.3 | 28.5 | 23.86 | 19.86 | 20.34 | 18.91 | 22.76 | 24.37 | 20.48 | 17.59 | 16.17 | 15.23 | 17.01 |
| 33 | 0 | 0 | 8 | 137 | 32.62 | 34.6 | 30.17 | 23.32 | 16.92 | 12.58 | 9.19 | 7.85 | 6.7 | 7.63 | 9.82 | 11.7 | 14.03 | 14.9 | 14.44 | 16.12 |
| 58 | 0 | 0 | 15 | 137 | 32.23 | 34.13 | 30.45 | 24.43 | 18.28 | 13.91 | 10.32 | 8.8 | 7.48 | 8.3 | 10.15 | 11.42 | 12.78 | 13.13 | 12.68 | 14.24 |
| 33 | 0 | 0 | 8 | 110 | 38.34 | 41.49 | 35.95 | 28.15 | 21.18 | 17.02 | 13.62 | 13.42 | 12.27 | 14.94 | 17.35 | 16.11 | 14.94 | 14.09 | 13.28 | 14.77 |
| 58 | 0 | 0 | 15 | 110 | 35.92 | 39.07 | 34.67 | 27.91 | 21.38 | 17.31 | 13.87 | 13.43 | 12.06 | 13.98 | 15.37 | 13.87 | 12.64 | 11.84 | 11.17 | 12.54 |
| 7 | 0 | 0 | 21 | 24 | 43.4 | 47.04 | 44.5 | 40.05 | 34.6 | 30.64 | 26.38 | 26.37 | 24.39 | 28.06 | 30.67 | 28.48 | 26.68 | 26.89 | 27.91 | 31.73 |
| 33 | 0 | 0 | 0 | 110 | 40.11 | 44.15 | 37.95 | 29.21 | 21.76 | 17.45 | 14 | 13.85 | 12.69 | 15.61 | 18.18 | 16.68 | 15.27 | 14.19 | 13.18 | 14.64 |
| 7 | 0 | 0 | 8 | 50 | 45.33 | 50.15 | 44.77 | 36.31 | 28.34 | 23.69 | 19.69 | 20.62 | 19.61 | 25.67 | 30.53 | 26.89 | 23.68 | 22.15 | 21.18 | 23.49 |
| 17 | 0 | 0 | 0 | 110 | 40.39 | 44.15 | 37.37 | 28.34 | 20.8 | 16.51 | 13.09 | 12.97 | 11.96 | 15.18 | 18.56 | 17.6 | 16.51 | 15.49 | 14.48 | 15.97 |
| 33 | 0 | 0 | 0 | 137 | 33.65 | 36.34 | 31.55 | 24.04 | 17.17 | 12.67 | 9.25 | 7.92 | 6.78 | 7.76 | 9.95 | 11.74 | 13.94 | 14.6 | 13.98 | 15.54 |
| 17 | 0 | 0 | 8 | 110 | 38.71 | 41.58 | 35.72 | 27.79 | 20.91 | 16.85 | 13.48 | 13.33 | 12.24 | 15.25 | 18.37 | 17.46 | 16.46 | 15.68 | 14.82 | 16.43 |
| 17 | 0 | 0 | 8 | 50 | 43.81 | 48.85 | 43.9 | 35.93 | 28.09 | 23.5 | 19.54 | 20.3 | 19.15 | 24.22 | 27.49 | 23.67 | 20.57 | 19.08 | 18.1 | 20.1 |
| 0 | 0 | 0 | 30 | 24 | 38.99 | 41.62 | 39.22 | 35.66 | 31.32 | 28.01 | 24.21 | 24 | 22.1 | 25.33 | 28.22 | 27.35 | 26.7 | 28.43 | 31.68 | 37.1 |
| 7 | 0 | 0 | 30 | 50 | 37.86 | 40.1 | 36.27 | 30.93 | 25.41 | 21.8 | 18.33 | 18.61 | 17.27 | 20.97 | 23.83 | 21.85 | 20.12 | 19.98 | 20.42 | 23.33 |
| 0 | 0 | 0 | 23 | 110 | 35.24 | 36.89 | 31.78 | 25.13 | 19.2 | 15.55 | 12.47 | 12.32 | 11.34 | 14.33 | 17.77 | 17.59 | 17.2 | 17.01 | 16.7 | 18.76 |
| 7 | 0 | 0 | 23 | 137 | 31.39 | 32.58 | 28.45 | 22.32 | 16.47 | 12.44 | 9.21 | 7.99 | 6.9 | 7.94 | 10.32 | 12.64 | 15.93 | 18.04 | 18.47 | 20.86 |
| 0 | 0 | 0 | 15 | 50 | 42.89 | 46.26 | 41.06 | 33.54 | 26.4 | 22.15 | 18.38 | 19.17 | 18.2 | 23.97 | 29.28 | 26.65 | 24.04 | 23.14 | 22.78 | 25.54 |
| 17 | 0 | 0 | 15 | 137 | 31.5 | 33.08 | 28.81 | 22.33 | 16.19 | 12.03 | 8.75 | 7.49 | 6.4 | 7.31 | 9.56 | 11.7 | 14.57 | 16.09 | 16.02 | 18 |
| 7 | 0 | 0 | 15 | 110 | 36.92 | 39.14 | 33.39 | 25.87 | 19.48 | 15.64 | 12.5 | 12.36 | 11.35 | 14.35 | 17.71 | 17.21 | 16.55 | 16.01 | 15.42 | 17.23 |
| 90 | 0 | 0 | 18 | 255 | 16.4 | 16.35 | 14.14 | 10.25 | 6.61 | 4.25 | 2.91 | 2.41 | 2.2 | 2.25 | 2.67 | 3.7 | 6.86 | 10.62 | 11.63 | 13.35 |
| 33 | 0 | 0 | 18 | 255 | 14.13 | 13.97 | 11.65 | 8.06 | 4.94 | 3.14 | 2.27 | 1.95 | 1.85 | 1.9 | 2.15 | 3.05 | 6.96 | 15.43 | 21.22 | 25.44 |
| 58 | 0 | 0 | 10 | 255 | 15.16 | 15.01 | 12.68 | 8.91 | 5.58 | 3.61 | 2.58 | 2.21 | 2.06 | 2.13 | 2.44 | 3.37 | 7.02 | 13.17 | 15.81 | 18.32 |
| 33 | 0 | 0 | 23 | 137 | 30.6 | 31.81 | 28.07 | 22.26 | 16.57 | 12.55 | 9.29 | 7.96 | 6.78 | 7.64 | 9.64 | 11.3 | 13.36 | 14.34 | 14.23 | 16.06 |
| 0 | 255 | 0 | 105 | 255 | 15.4 | 14.29 | 11.26 | 7.96 | 5.38 | 3.91 | 2.94 | 2.62 | 2.4 | 2.69 | 3.65 | 5.56 | 10.57 | 18.99 | 30.66 | 47.55 |
| 0 | 40 | 0 | 88 | 50 | 23.94 | 22.96 | 20.96 | 18.98 | 16.75 | 14.93 | 12.71 | 12.2 | 10.91 | 12.01 | 13.27 | 13.37 | 13.71 | 15.89 | 20.04 | 25.83 |
| 0 | 40 | 0 | 58 | 255 | 14.45 | 13.93 | 11.75 | 8.4 | 5.44 | 3.56 | 2.56 | 2.21 | 2.05 | 2.12 | 2.48 | 3.58 | 8.37 | 20.27 | 37.9 | 58.4 |
| 0 | 13 | 0 | 54 | 12 | 33.3 | 33.95 | 32.05 | 30.21 | 27.92 | 25.77 | 22.65 | 21.64 | 19.44 | 20.78 | 22.51 | 22.88 | 23.76 | 27.87 | 36.13 | 46.37 |
| 0 | 13 | 0 | 77 | 12 | 24.96 | 24.27 | 22.98 | 22.14 | 21.26 | 20.05 | 17.67 | 16.12 | 13.92 | 13.86 | 14.47 | 14.89 | 15.9 | 19.89 | 28.99 | 41.94 |
| 0 | 13 | 0 | 47 | 50 | 34.72 | 35.59 | 32.04 | 27.55 | 22.85 | 19.72 | 16.6 | 16.79 | 15.58 | 18.96 | 22.05 | 21.07 | 20.14 | 20.98 | 22.7 | 26.54 |
| 0 | 13 | 0 | 26 | 255 | 14.01 | 13.75 | 11.37 | 7.8 | 4.81 | 3.13 | 2.3 | 2 | 1.91 | 1.97 | 2.24 | 3.18 | 7.91 | 22.86 | 45.79 | 65.23 |
| 0 | 13 | 0 | 44 | 255 | 14 | 13.48 | 11.33 | 7.93 | 4.98 | 3.27 | 2.37 | 2.08 | 1.97 | 2.03 | 2.32 | 3.26 | 7.84 | 21.35 | 41.91 | 62.13 |
| 0 | 13 | 0 | 35 | 137 | 29.63 | 30.07 | 26.11 | 20.47 | 15.11 | 11.41 | 8.39 | 7.28 | 6.27 | 7.28 | 9.66 | 12.05 | 15.62 | 18.33 | 19.42 | 22.28 |
| 0 | 255 | 0 | 44 | 255 | 16.64 | 15.61 | 11.87 | 7.84 | 5.05 | 3.56 | 2.68 | 2.42 | 2.23 | 2.51 | 3.51 | 5.65 | 12.4 | 25.89 | 42.52 | 59.26 |
| 0 | 93 | 0 | 35 | 137 | 30.31 | 30.21 | 25.28 | 19.26 | 14.09 | 10.81 | 8.18 | 7.48 | 6.65 | 8.26 | 11.44 | 14.23 | 18.01 | 20.72 | 21.76 | 24.54 |
| 0 | 93 | 0 | 26 | 255 | 16.8 | 16.4 | 13.65 | 9.64 | 6.21 | 4.08 | 2.87 | 2.41 | 2.2 | 2.31 | 2.86 | 4.44 | 10.63 | 26.03 | 47.19 | 64.96 |
| 0 | 93 | 0 | 53 | 137 | 28.87 | 28.58 | 24.41 | 19.21 | 14.45 | 11.32 | 8.66 | 7.96 | 7.09 | 8.68 | 11.69 | 14.18 | 17.49 | 20.22 | 21.88 | 25.07 |
| 0 | 93 | 0 | 44 | 255 | 17.01 | 16.56 | 13.78 | 9.85 | 6.37 | 4.17 | 2.87 | 2.36 | 2.13 | 2.25 | 2.83 | 4.48 | 10.62 | 24.89 | 44.3 | 62.94 |
| 0 | 40 | 0 | 35 | 137 | 29.25 | 29.65 | 25.26 | 19.5 | 14.26 | 10.75 | 7.95 | 6.98 | 6.07 | 7.23 | 9.79 | 12.36 | 16.06 | 18.85 | 19.97 | 22.77 |
| 0 | 13 | 0 | 66 | 50 | 27.42 | 27.37 | 24.88 | 22.24 | 19.27 | 16.98 | 14.36 | 14.01 | 12.64 | 14.34 | 16.01 | 15.72 | 15.63 | 17.35 | 20.54 | 25.43 |
| 0 | 6 | 0 | 0 | 5 | 60.9 | 71.17 | 70.85 | 66.18 | 59.67 | 54.96 | 50.35 | 52.04 | 51.54 | 61.57 | 70.71 | 69.46 | 66.9 | 65.29 | 63.87 | 65.33 |
| 0 | 6 | 0 | 8 | 5 | 53.52 | 60.73 | 60.02 | 56.73 | 52.05 | 48.41 | 44.14 | 44.44 | 42.68 | 48.51 | 54.07 | 53.94 | 53.6 | 55.7 | 59.13 | 63.5 |
| 0 | 6 | 0 | 0 | 12 | 58.64 | 67.87 | 65.8 | 58.79 | 50.39 | 44.83 | 39.68 | 41.5 | 40.87 | 51.8 | 62.06 | 59.23 | 55.3 | 52.83 | 50.77 | 52.93 |
| 0 | 6 | 0 | 41 | 5 | 36.4 | 37.78 | 36.44 | 35.29 | 33.8 | 32.03 | 28.75 | 26.96 | 24 | 24.56 | 25.94 | 26.57 | 27.98 | 33.39 | 44.23 | 56.37 |
| 0 | 6 | 0 | 21 | 5 | 45.74 | 49.3 | 48.13 | 46.06 | 43.14 | 40.44 | 36.57 | 35.64 | 33.04 | 35.73 | 38.76 | 39.33 | 40.38 | 45.04 | 53.13 | 61.48 |
| 0 | 6 | 0 | 21 | 12 | 44.5 | 48 | 45.92 | 42.46 | 38.14 | 34.75 | 30.66 | 30.45 | 28.41 | 32.34 | 36.15 | 35.9 | 35.82 | 38.6 | 43.41 | 49.75 |
| 0 | 6 | 0 | 0 | 50 | 49.79 | 55.37 | 47.67 | 36.88 | 27.85 | 22.98 | 19.04 | 20.38 | 19.86 | 28.26 | 36.9 | 32.6 | 28.3 | 25.88 | 24.15 | 26.3 |
| 0 | 6 | 0 | 0 | 24 | 55.34 | 62.84 | 57.86 | 48.31 | 38.76 | 33.13 | 28.28 | 30.01 | 29.45 | 40.04 | 50.63 | 46.67 | 42.02 | 39.24 | 37.15 | 39.63 |
| 0 | 6 | 0 | 8 | 24 | 49.82 | 55.14 | 50.97 | 43.6 | 35.87 | 31.02 | 26.55 | 27.67 | 26.68 | 34.54 | 42.02 | 39.62 | 36.81 | 35.94 | 35.74 | 39.07 |
| 0 | 24 | 0 | 0 | 24 | 54.05 | 59.95 | 52.75 | 41.76 | 32.16 | 26.84 | 22.5 | 24.27 | 24 | 35.33 | 49.46 | 46.4 | 41.67 | 38.81 | 36.63 | 39.08 |
| 0 | 24 | 0 | 8 | 24 | 49.56 | 53.91 | 48.25 | 39.46 | 31.26 | 26.45 | 22.26 | 23.65 | 23.08 | 32.13 | 42.3 | 40.48 | 37.64 | 36.69 | 36.45 | 39.71 |
| 0 | 24 | 0 | 0 | 50 | 49.28 | 53.84 | 45.47 | 34.56 | 25.79 | 21.17 | 17.45 | 18.82 | 18.44 | 27.08 | 37.09 | 33.25 | 29 | 26.6 | 24.86 | 26.94 |
| 0 | 13 | 0 | 8 | 12 | 51.78 | 57.77 | 54.62 | 48.25 | 41.09 | 36.31 | 31.72 | 32.91 | 31.92 | 40.41 | 48.92 | 47.92 | 46.15 | 46.49 | 47.79 | 51.67 |
| 0 | 13 | 0 | 0 | 24 | 55.01 | 62.15 | 56.61 | 46.52 | 36.82 | 31.18 | 26.39 | 28.21 | 27.76 | 38.9 | 51.08 | 47.59 | 42.99 | 40.23 | 38.12 | 40.5 |
| 0 | 13 | 0 | 8 | 24 | 47.91 | 53.03 | 48.7 | 41.06 | 33.28 | 28.48 | 24.16 | 25.36 | 24.52 | 32.71 | 41.07 | 39.03 | 36.39 | 35.64 | 35.56 | 38.98 |
| 0 | 6 | 0 | 8 | 12 | 52.11 | 58.46 | 56.05 | 50.92 | 44.39 | 39.77 | 35.06 | 35.89 | 34.49 | 41.73 | 48.34 | 47 | 45.26 | 45.7 | 47.07 | 51.09 |
| 0 | 6 | 0 | 0 | 255 | 14.79 | 14.74 | 12.3 | 8.4 | 5.19 | 3.32 | 2.41 | 2.1 | 1.98 | 2.06 | 2.36 | 3.41 | 8.89 | 26.73 | 53.5 | 70.57 |
| 0 | 6 | 0 | 4 | 255 | 14.62 | 14.41 | 12.01 | 8.23 | 5.11 | 3.33 | 2.46 | 2.16 | 2.06 | 2.12 | 2.41 | 3.41 | 8.61 | 25.26 | 52.3 | 70.24 |
| 0 | 6 | 0 | 0 | 201 | 24.24 | 25.27 | 21.98 | 15.95 | 10.37 | 6.64 | 4.37 | 3.41 | 2.96 | 3.14 | 4.14 | 6.79 | 16.9 | 40.18 | 59.88 | 67.8 |
| 0 | 6 | 0 | 18 | 255 | 14.4 | 14.22 | 11.87 | 8.21 | 5.12 | 3.32 | 2.44 | 2.14 | 2.03 | 2.1 | 2.37 | 3.35 | 8.38 | 24.13 | 48.09 | 67.24 |
| 0 | 6 | 0 | 10 | 255 | 14.23 | 14.06 | 11.74 | 8.09 | 5.04 | 3.3 | 2.45 | 2.16 | 2.05 | 2.11 | 2.39 | 3.35 | 8.36 | 24.57 | 49.34 | 67.65 |

TABLE 1-continued

First set of 969 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 6 | 0 | 10 | 201 | 22.41 | 23.16 | 20.14 | 14.79 | 9.73 | 6.28 | 4.18 | 3.28 | 2.85 | 3.01 | 3.91 | 6.27 | 15.06 | 34.93 | 53.91 | 64.42 |
| 0 | 6 | 0 | 0 | 110 | 40.16 | 43.56 | 36.12 | 26.88 | 19.58 | 15.5 | 12.28 | 12.31 | 11.45 | 15.21 | 19.92 | 19.66 | 18.97 | 18.08 | 16.95 | 18.63 |
| 0 | 6 | 0 | 0 | 137 | 33.94 | 36.17 | 30.5 | 22.43 | 15.61 | 11.35 | 8.18 | 7.07 | 6.11 | 7.26 | 10 | 12.97 | 17.63 | 20.2 | 19.82 | 21.86 |
| 0 | 6 | 0 | 4 | 137 | 33.62 | 35.48 | 30.07 | 22.34 | 15.7 | 11.46 | 8.27 | 7.15 | 6.17 | 7.32 | 10.05 | 12.95 | 17.41 | 19.94 | 19.72 | 21.86 |
| 0 | 24 | 0 | 0 | 255 | 14.5 | 14.36 | 11.8 | 7.99 | 4.87 | 3.12 | 2.28 | 1.99 | 1.89 | 1.95 | 2.24 | 3.24 | 8.53 | 26.12 | 52.95 | 69.95 |
| 0 | 24 | 0 | 4 | 255 | 14.65 | 14.39 | 11.91 | 8.11 | 5.02 | 3.28 | 2.44 | 2.15 | 2.04 | 2.11 | 2.39 | 3.4 | 8.61 | 25.69 | 51.87 | 69.83 |
| 0 | 24 | 0 | 0 | 201 | 24.16 | 24.82 | 21.23 | 15.17 | 9.76 | 6.26 | 4.14 | 3.25 | 2.84 | 3.04 | 4.05 | 6.72 | 16.86 | 40.28 | 60.01 | 67.88 |
| 0 | 13 | 0 | 4 | 255 | 14.68 | 14.52 | 11.99 | 8.17 | 5.01 | 3.22 | 2.35 | 2.05 | 1.96 | 2.02 | 2.3 | 3.32 | 8.66 | 25.98 | 52.49 | 70.65 |
| 0 | 13 | 0 | 0 | 201 | 24.07 | 24.79 | 21.41 | 15.47 | 10 | 6.36 | 4.12 | 3.17 | 2.73 | 2.91 | 3.93 | 6.64 | 16.7 | 39.7 | 59.36 | 67.3 |
| 0 | 13 | 0 | 4 | 201 | 23.65 | 24.27 | 20.96 | 15.21 | 9.89 | 6.29 | 4.09 | 3.15 | 2.72 | 2.89 | 3.9 | 6.55 | 16.34 | 38.27 | 57.95 | 67.17 |
| 0 | 6 | 0 | 4 | 201 | 23.61 | 24.33 | 21.09 | 15.34 | 9.96 | 6.34 | 4.12 | 3.18 | 2.75 | 2.92 | 3.88 | 6.49 | 16.26 | 38.44 | 58.12 | 67.24 |
| 0 | 255 | 0 | 4 | 255 | 17.05 | 15.83 | 11.74 | 7.57 | 4.81 | 3.41 | 2.6 | 2.37 | 2.2 | 2.46 | 3.4 | 5.59 | 13.09 | 30.56 | 54.19 | 70.62 |
| 0 | 160 | 0 | 0 | 201 | 24.67 | 23.78 | 18.42 | 12.43 | 8.03 | 5.56 | 3.95 | 3.45 | 3.07 | 3.67 | 5.52 | 9.07 | 19.87 | 42.02 | 60.28 | 67.61 |
| 0 | 160 | 0 | 0 | 255 | 17.61 | 16.97 | 13.52 | 9.13 | 5.77 | 3.87 | 2.8 | 2.42 | 2.23 | 2.4 | 3.03 | 4.78 | 11.75 | 30.17 | 55.69 | 71.66 |
| 0 | 160 | 0 | 4 | 201 | 24.41 | 23.57 | 18.27 | 12.38 | 8.04 | 5.58 | 3.96 | 3.46 | 3.07 | 3.67 | 5.54 | 9.09 | 19.62 | 40.52 | 58.28 | 66.52 |
| 0 | 160 | 0 | 4 | 255 | 17.34 | 16.78 | 13.38 | 9.1 | 5.75 | 3.86 | 2.78 | 2.41 | 2.23 | 2.37 | 3.01 | 4.72 | 11.54 | 29.44 | 54.14 | 70.32 |
| 0 | 93 | 0 | 0 | 201 | 25.32 | 25.32 | 20.75 | 14.64 | 9.69 | 6.61 | 4.56 | 3.78 | 3.29 | 3.75 | 5.34 | 8.69 | 19.31 | 41.68 | 59.95 | 67.35 |
| 0 | 255 | 0 | 18 | 255 | 17.38 | 16.34 | 12.32 | 8.13 | 5.24 | 3.72 | 2.8 | 2.53 | 2.34 | 2.64 | 3.67 | 5.91 | 13.19 | 28.65 | 47.58 | 63.45 |
| 0 | 160 | 0 | 18 | 201 | 23.3 | 22.42 | 17.57 | 12.09 | 7.91 | 5.5 | 3.91 | 3.39 | 3.01 | 3.58 | 5.37 | 8.73 | 18.29 | 36.03 | 53.11 | 64.24 |
| 0 | 160 | 0 | 18 | 255 | 16.94 | 16.32 | 13.13 | 9 | 5.77 | 3.92 | 2.87 | 2.5 | 2.32 | 2.46 | 3.09 | 4.77 | 11.31 | 27.63 | 49.98 | 67.4 |
| 0 | 160 | 0 | 10 | 201 | 23.77 | 22.93 | 17.83 | 12.12 | 7.89 | 5.5 | 3.95 | 3.46 | 3.09 | 3.66 | 5.46 | 8.88 | 18.91 | 38.23 | 55.66 | 65.37 |
| 0 | 160 | 0 | 10 | 255 | 16.87 | 16.28 | 13 | 8.8 | 5.58 | 3.76 | 2.73 | 2.38 | 2.2 | 2.34 | 2.95 | 4.6 | 11.16 | 28.1 | 51.6 | 68.6 |
| 0 | 93 | 0 | 10 | 201 | 24.12 | 24.01 | 19.69 | 13.98 | 9.25 | 6.28 | 4.3 | 3.53 | 3.06 | 3.47 | 4.96 | 8.1 | 17.83 | 37.09 | 54.26 | 63.75 |
| 0 | 58 | 0 | 0 | 110 | 39.22 | 41.14 | 33.02 | 24.14 | 17.52 | 13.94 | 11.14 | 11.46 | 10.9 | 15.32 | 21.36 | 21.4 | 20.59 | 19.6 | 18.44 | 20.09 |
| 0 | 58 | 0 | 4 | 110 | 39.18 | 40.75 | 32.8 | 24.12 | 17.54 | 13.96 | 11.12 | 11.46 | 10.9 | 15.35 | 21.29 | 21.32 | 20.56 | 19.7 | 18.65 | 20.35 |
| 0 | 40 | 0 | 0 | 110 | 40.05 | 42.51 | 34.55 | 25.5 | 18.58 | 14.82 | 11.82 | 12.07 | 11.4 | 15.64 | 21.12 | 20.89 | 19.99 | 18.97 | 17.8 | 19.48 |
| 0 | 93 | 0 | 4 | 137 | 33.62 | 34.31 | 27.79 | 20.2 | 14.3 | 10.79 | 8.09 | 7.49 | 6.71 | 8.62 | 12.44 | 15.8 | 20.38 | 22.77 | 22.48 | 24.55 |
| 0 | 58 | 0 | 0 | 137 | 34.64 | 35.98 | 29.43 | 21.42 | 15.13 | 11.34 | 8.46 | 7.72 | 6.87 | 8.6 | 12.11 | 15.33 | 19.87 | 22.18 | 21.73 | 23.75 |
| 0 | 58 | 0 | 4 | 137 | 33.62 | 34.41 | 28.18 | 20.6 | 14.53 | 10.86 | 8.05 | 7.28 | 6.44 | 8.01 | 11.29 | 14.37 | 18.77 | 21.11 | 20.85 | 22.96 |
| 0 | 58 | 0 | 0 | 255 | 15.37 | 15 | 12.3 | 8.34 | 5.15 | 3.36 | 2.46 | 2.16 | 2.04 | 2.11 | 2.45 | 3.57 | 9.21 | 26.96 | 53.73 | 70.86 |
| 0 | 58 | 0 | 4 | 255 | 15.43 | 15.04 | 12.38 | 8.48 | 5.32 | 3.51 | 2.61 | 2.31 | 2.18 | 2.25 | 2.57 | 3.69 | 9.31 | 26.65 | 52.63 | 70.44 |
| 0 | 40 | 0 | 0 | 201 | 23.88 | 24.34 | 20.61 | 14.61 | 9.35 | 5.99 | 3.94 | 3.09 | 2.69 | 2.89 | 3.97 | 6.68 | 16.78 | 39.75 | 59.26 | 67.15 |
| 0 | 93 | 0 | 4 | 255 | 17.05 | 16.63 | 13.64 | 9.52 | 6.04 | 3.97 | 2.83 | 2.41 | 2.23 | 2.35 | 2.86 | 4.42 | 10.93 | 28.4 | 53.25 | 70.24 |
| 0 | 58 | 0 | 0 | 201 | 24.98 | 25.21 | 21.16 | 15.05 | 9.81 | 6.43 | 4.3 | 3.43 | 2.97 | 3.25 | 4.5 | 7.55 | 18.11 | 41.2 | 60.58 | 68.4 |
| 0 | 58 | 0 | 4 | 201 | 24.01 | 24.05 | 20.18 | 14.37 | 9.37 | 6.17 | 4.13 | 3.29 | 2.86 | 3.12 | 4.29 | 7.15 | 17.01 | 38.36 | 57.2 | 66.08 |
| 0 | 93 | 0 | 4 | 201 | 26.44 | 26.12 | 21.46 | 15.27 | 10.18 | 6.96 | 4.8 | 3.96 | 3.43 | 3.91 | 5.57 | 9.04 | 19.73 | 41.16 | 59.2 | 67.46 |
| 0 | 6 | 0 | 41 | 12 | 37.39 | 38.74 | 37 | 34.96 | 32.38 | 29.98 | 26.52 | 25.44 | 23.01 | 24.63 | 26.58 | 26.79 | 27.49 | 31.44 | 38.87 | 47.69 |
| 0 | 6 | 0 | 30 | 50 | 38.91 | 40.86 | 36.61 | 30.88 | 25.09 | 21.43 | 17.98 | 18.48 | 17.38 | 21.84 | 25.74 | 24.08 | 22.46 | 22.54 | 23.29 | 26.56 |
| 0 | 6 | 0 | 21 | 24 | 43.4 | 46.87 | 43.67 | 38.6 | 32.87 | 28.89 | 24.84 | 25.23 | 23.73 | 28.78 | 33.4 | 32.23 | 31 | 32.06 | 34.24 | 38.86 |
| 0 | 6 | 0 | 23 | 137 | 31.92 | 33.04 | 28.78 | 22.58 | 16.7 | 12.64 | 9.36 | 8.09 | 7 | 8.07 | 10.59 | 13.2 | 17.12 | 19.79 | 20.44 | 23.04 |
| 0 | 6 | 0 | 8 | 50 | 45.75 | 50.17 | 44.11 | 35.36 | 27.47 | 22.95 | 19.13 | 20.2 | 19.46 | 26.42 | 33.1 | 29.9 | 26.69 | 25.2 | 24.3 | 26.74 |
| 0 | 24 | 0 | 8 | 137 | 33.35 | 34.68 | 29.46 | 22.27 | 16.01 | 11.97 | 8.84 | 7.79 | 6.8 | 8.15 | 11.07 | 14 | 18.31 | 20.84 | 20.84 | 23.05 |
| 0 | 13 | 0 | 15 | 137 | 32.23 | 33.4 | 28.77 | 22.15 | 16.15 | 12.12 | 8.91 | 7.76 | 6.72 | 7.88 | 10.59 | 13.36 | 17.88 | 20.12 | 20.45 | 22.85 |
| 0 | 13 | 0 | 8 | 110 | 39.26 | 41.66 | 35 | 26.74 | 19.93 | 16.01 | 12.83 | 12.88 | 12.01 | 15.67 | 20.02 | 19.7 | 19.02 | 18.33 | 17.5 | 19.28 |
| 0 | 6 | 0 | 15 | 110 | 37.41 | 39.45 | 33.57 | 26.06 | 19.63 | 15.83 | 12.67 | 12.6 | 11.67 | 14.96 | 18.91 | 18.77 | 18.35 | 17.96 | 17.39 | 19.32 |
| 0 | 13 | 0 | 21 | 24 | 43.17 | 46.01 | 42.34 | 36.78 | 30.84 | 26.89 | 22.96 | 23.51 | 22.22 | 27.66 | 32.91 | 31.84 | 30.6 | 31.61 | 33.74 | 38.34 |
| 0 | 13 | 0 | 0 | 110 | 40.59 | 43.62 | 36.05 | 26.83 | 19.6 | 15.54 | 12.33 | 12.38 | 11.57 | 15.43 | 20.25 | 19.96 | 19.22 | 18.3 | 17.17 | 18.82 |
| 0 | 24 | 0 | 8 | 50 | 44.96 | 48.49 | 41.53 | 32.4 | 24.69 | 20.43 | 16.9 | 18.03 | 17.5 | 24.83 | 32.97 | 30.16 | 26.93 | 25.41 | 24.46 | 26.86 |
| 0 | 24 | 0 | 0 | 110 | 40.28 | 42.9 | 35.25 | 26.18 | 19.18 | 15.3 | 12.23 | 12.41 | 11.68 | 15.75 | 20.77 | 20.36 | 19.45 | 18.47 | 17.31 | 18.95 |
| 0 | 24 | 0 | 0 | 137 | 34.57 | 36.4 | 30.49 | 22.5 | 15.86 | 11.71 | 8.58 | 7.55 | 6.59 | 7.96 | 11.01 | 14.14 | 18.82 | 21.34 | 20.95 | 22.99 |
| 0 | 24 | 0 | 8 | 110 | 38.76 | 40.82 | 33.79 | 25.44 | 18.79 | 15.04 | 12 | 12.12 | 11.36 | 15.18 | 19.98 | 19.87 | 19.23 | 18.53 | 17.69 | 19.51 |
| 0 | 13 | 0 | 8 | 50 | 45.01 | 48.88 | 42.34 | 33.43 | 25.68 | 21.34 | 17.72 | 18.8 | 18.17 | 25.26 | 32.66 | 29.67 | 26.44 | 24.95 | 24.01 | 26.47 |
| 0 | 24 | 0 | 30 | 24 | 39.17 | 40.88 | 36.97 | 31.76 | 26.38 | 22.83 | 19.32 | 19.78 | 18.65 | 23.56 | 28.65 | 28.25 | 27.65 | 29.33 | 32.46 | 37.72 |
| 0 | 24 | 0 | 30 | 50 | 37.9 | 39.14 | 34.2 | 27.93 | 22.12 | 18.63 | 15.48 | 16.13 | 15.34 | 20.38 | 25.49 | 24.12 | 22.54 | 22.56 | 23.2 | 26.33 |
| 0 | 58 | 0 | 23 | 110 | 35.94 | 36.42 | 30.25 | 23.29 | 17.59 | 14.31 | 11.59 | 11.77 | 11.1 | 14.84 | 19.6 | 19.79 | 19.42 | 19.17 | 18.83 | 20.87 |
| 0 | 58 | 0 | 23 | 137 | 31.31 | 31.53 | 26.51 | 20.19 | 14.73 | 11.2 | 8.39 | 7.55 | 6.65 | 8.13 | 11.21 | 14.09 | 18.08 | 20.62 | 21.21 | 23.79 |
| 0 | 40 | 0 | 15 | 50 | 41.41 | 43.11 | 36.47 | 28.44 | 21.76 | 18.04 | 14.91 | 15.85 | 15.36 | 21.8 | 29.33 | 27.51 | 25.06 | 24.2 | 23.87 | 26.51 |
| 0 | 40 | 0 | 15 | 137 | 32.56 | 33 | 27.86 | 21.11 | 15.28 | 11.5 | 8.53 | 7.57 | 6.61 | 8.01 | 11.02 | 13.95 | 18.1 | 20.59 | 20.86 | 23.26 |
| 0 | 40 | 0 | 15 | 110 | 38.47 | 40.17 | 33.73 | 26.01 | 19.61 | 15.89 | 12.81 | 12.95 | 12.16 | 15.96 | 20.55 | 20.47 | 19.95 | 19.48 | 18.87 | 20.85 |
| 0 | 24 | 0 | 18 | 255 | 15.18 | 14.98 | 12.47 | 8.68 | 5.44 | 3.52 | 2.55 | 2.2 | 2.07 | 2.14 | 2.49 | 3.59 | 8.98 | 24.98 | 48.52 | 67.21 |
| 0 | 58 | 0 | 18 | 255 | 15.78 | 15.57 | 12.92 | 9 | 5.67 | 3.68 | 2.63 | 2.25 | 2.08 | 2.17 | 2.58 | 3.86 | 9.67 | 25.88 | 49.15 | 67.46 |
| 0 | 40 | 0 | 10 | 255 | 15 | 14.82 | 12.26 | 8.42 | 5.24 | 3.42 | 2.49 | 2.17 | 2.04 | 2.12 | 2.46 | 3.54 | 8.94 | 25.51 | 50 | 67.77 |
| 0 | 24 | 0 | 23 | 137 | 31.12 | 31.86 | 27.33 | 21.05 | 15.37 | 11.59 | 8.59 | 7.53 | 6.55 | 7.75 | 10.35 | 12.95 | 16.81 | 19.37 | 20.01 | 22.62 |
| 0 | 255 | 0 | 105 | 0 | 21.14 | 19.19 | 14.83 | 10.8 | 7.8 | 6.23 | 5.01 | 5.36 | 5.24 | 8.4 | 14.62 | 16.91 | 18.29 | 22.42 | 32.56 | 49.33 |
| 0 | 40 | 0 | 88 | 0 | 22.54 | 21.68 | 20.28 | 19.49 | 18.53 | 17.37 | 15.21 | 13.9 | 12.03 | 12.13 | 12.92 | 13.57 | 14.83 | 19.39 | 31.26 | 50.93 |
| 0 | 255 | 0 | 58 | 50 | 25.94 | 23.71 | 17.26 | 11.75 | 8.13 | 6.39 | 5.13 | 5.63 | 5.63 | 9.98 | 20.64 | 23.87 | 23.81 | 24.94 | 27.1 | 31.01 |
| 0 | 13 | 0 | 54 | 0 | 32.24 | 33.05 | 31.82 | 31.17 | 30.32 | 29.07 | 26.19 | 24.14 | 21.22 | 21.17 | 22.19 | 23.13 | 24.93 | 31.29 | 45.83 | 63.59 |
| 0 | 13 | 0 | 77 | 0 | 24.9 | 24.29 | 23.15 | 22.83 | 22.55 | 21.8 | 19.59 | 17.5 | 14.98 | 14.38 | 14.8 | 15.44 | 16.8 | 21.79 | 34.54 | 54.57 |
| 0 | 40 | 0 | 47 | 12 | 34.89 | 35.61 | 32.48 | 28.68 | 24.6 | 21.69 | 18.55 | 18.65 | 17.38 | 21.09 | 25.22 | 25.87 | 26.6 | 30.53 | 38.06 | 47.23 |
| 0 | 255 | 0 | 26 | 137 | 25.41 | 23.34 | 16.68 | 11.06 | 7.43 | 5.67 | 4.45 | 4.61 | 4.46 | 7.07 | 13.44 | 17.79 | 22.03 | 24.63 | 25.32 | 27.77 |
| 0 | 255 | 0 | 44 | 137 | 24.76 | 22.77 | 16.52 | 11.08 | 7.5 | 5.74 | 4.49 | 4.65 | 4.47 | 7.05 | 13.13 | 17.11 | 20.91 | 23.58 | 24.85 | 27.71 |
| 0 | 93 | 0 | 35 | 50 | 36.32 | 36.24 | 29.7 | 22.89 | 17.46 | 14.48 | 11.96 | 12.77 | 12.48 | 18.31 | 26.33 | 26.21 | 24.92 | 25.12 | 26 | 29.2 |
| 0 | 255 | 0 | 44 | 0 | 25.32 | 22.68 | 15.7 | 10.2 | 6.84 | 5.31 | 4.27 | 4.72 | 4.76 | 9.1 | 23.78 | 33.16 | 36.19 | 41.84 | 53.74 | 67.57 |

TABLE 1-continued

First set of 969 patches
(reference condition)

| Colorant digital count (0-255) | | | | | Percent reflectance at wavelength | | | | | | | | | | | | | | | |
| --- | --- | --- | --- | --- | --- | --- | --- | --- | --- | --- | --- | --- | --- | --- | --- | --- | --- | --- | --- | --- |
| C | M | Y | K | V | 400 | 420 | 440 | 460 | 480 | 500 | 520 | 540 | 560 | 580 | 600 | 620 | 640 | 660 | 680 | 700 |
| 0 | 93 | 0 | 35 | 0 | 37.4 | 37.32 | 31.04 | 24.31 | 18.78 | 15.71 | 13.05 | 13.95 | 13.73 | 20.71 | 32.43 | 36.23 | 38.27 | 44.6 | 57.39 | 70.41 |
| 0 | 255 | 0 | 26 | 12 | 26.65 | 23.94 | 16.49 | 10.73 | 7.21 | 5.64 | 4.56 | 5.04 | 5.1 | 9.72 | 25.98 | 36.66 | 38.57 | 41.2 | 45.64 | 51.62 |
| 0 | 93 | 0 | 53 | 0 | 32.89 | 32.19 | 27.47 | 22.27 | 17.71 | 14.97 | 12.47 | 13.09 | 12.66 | 17.89 | 25.44 | 27.84 | 29.69 | 35.67 | 49.03 | 65.11 |
| 0 | 255 | 0 | 44 | 12 | 25.39 | 22.74 | 15.85 | 10.34 | 6.94 | 5.41 | 4.36 | 4.8 | 4.85 | 9.19 | 23.21 | 31.04 | 32.81 | 36.2 | 42.36 | 50.1 |
| 0 | 93 | 0 | 35 | 12 | 36.78 | 36.42 | 30.16 | 23.46 | 18.01 | 14.99 | 12.4 | 13.27 | 13.04 | 19.65 | 30.2 | 32.51 | 33.04 | 36.26 | 42.02 | 49.26 |
| 0 | 40 | 0 | 66 | 12 | 27.49 | 27 | 24.9 | 22.86 | 20.55 | 18.61 | 16.07 | 15.52 | 14 | 15.58 | 17.54 | 18.17 | 19.2 | 23.31 | 32.2 | 43.99 |
| 0 | 6 | 0 | 0 | 0 | 62.37 | 73.65 | 75.52 | 73.94 | 70.59 | 67.89 | 65.03 | 66.32 | 66.23 | 73.32 | 79.64 | 80.27 | 79.82 | 79.6 | 79.18 | 79.32 |
| 0 | 6 | 0 | 8 | 0 | 54.39 | 62 | 62.67 | 61.79 | 59.8 | 57.83 | 54.8 | 54.11 | 51.9 | 54.79 | 58.07 | 59.12 | 60.47 | 64.76 | 71.15 | 76.05 |
| 0 | 13 | 0 | 0 | 5 | 59.36 | 69.35 | 67.65 | 61.24 | 53.44 | 48.29 | 43.47 | 45.62 | 45.53 | 57.88 | 70.86 | 70.53 | 68.06 | 66.46 | 65.06 | 66.35 |
| 0 | 6 | 0 | 41 | 0 | 37.68 | 39.93 | 39.11 | 38.88 | 38.55 | 37.55 | 34.59 | 31.94 | 28.39 | 27.88 | 28.79 | 29.83 | 31.88 | 38.74 | 52.99 | 68.17 |
| 0 | 6 | 0 | 21 | 0 | 47.01 | 51.67 | 51.45 | 50.84 | 49.69 | 48.18 | 45.03 | 43.13 | 39.93 | 40.74 | 42.52 | 43.61 | 45.53 | 51.72 | 62.82 | 72.72 |
| 0 | 13 | 0 | 21 | 5 | 44.89 | 48.88 | 47.09 | 44.02 | 40.05 | 36.9 | 32.97 | 32.75 | 30.75 | 34.93 | 39.32 | 39.92 | 40.68 | 44.92 | 52.37 | 60.3 |
| 0 | 40 | 0 | 0 | 24 | 51.26 | 57.21 | 49.09 | 37.7 | 28.3 | 23.28 | 19.25 | 20.98 | 20.86 | 32.42 | 49.14 | 47.27 | 42.77 | 39.97 | 37.89 | 40.22 |
| 0 | 24 | 0 | 0 | 12 | 55.87 | 63.85 | 58.52 | 48.58 | 38.93 | 33.3 | 28.52 | 30.61 | 30.55 | 43.82 | 60.61 | 59.46 | 55.52 | 52.95 | 50.93 | 52.99 |
| 0 | 24 | 0 | 8 | 12 | 49.84 | 55.21 | 50.81 | 43.22 | 35.46 | 30.7 | 26.32 | 27.72 | 27.12 | 36.71 | 47.84 | 47.51 | 45.78 | 46.14 | 47.51 | 51.47 |
| 0 | 24 | 0 | 0 | 0 | 59.32 | 68.16 | 65.19 | 57.54 | 49.06 | 43.72 | 38.91 | 41.44 | 41.85 | 57.03 | 76.65 | 80.18 | 79.68 | 79.19 | 78.63 | 78.7 |
| 0 | 24 | 0 | 8 | 0 | 53.29 | 59.29 | 56.67 | 51.01 | 44.59 | 40.23 | 35.81 | 37.11 | 36.4 | 46.18 | 57.79 | 60.37 | 61.65 | 65.64 | 71.85 | 76.75 |
| 0 | 40 | 0 | 0 | 5 | 56.34 | 63.42 | 56.81 | 46.13 | 36.37 | 30.89 | 26.34 | 28.58 | 28.84 | 43.9 | 67.56 | 70.41 | 67.88 | 65.91 | 64.31 | 65.59 |
| 0 | 13 | 0 | 8 | 0 | 54.25 | 61.11 | 60.21 | 56.84 | 52.24 | 48.72 | 44.63 | 45.25 | 43.96 | 51.08 | 58.67 | 60.46 | 61.7 | 65.74 | 71.97 | 76.7 |
| 0 | 24 | 0 | 0 | 5 | 58.55 | 66.53 | 62.44 | 53.59 | 44.48 | 38.92 | 34.03 | 36.37 | 36.52 | 51.01 | 69.71 | 70.87 | 68.4 | 66.66 | 65.16 | 66.46 |
| 0 | 24 | 0 | 8 | 5 | 51.99 | 58.18 | 54.58 | 47.8 | 40.5 | 35.83 | 31.32 | 32.75 | 32.14 | 42.33 | 54.4 | 55.68 | 55.32 | 57.28 | 60.68 | 65.05 |
| 0 | 13 | 0 | 8 | 5 | 53 | 59.58 | 57.7 | 53.04 | 47.16 | 42.99 | 38.59 | 39.46 | 38.31 | 46.21 | 54.46 | 54.93 | 54.62 | 56.66 | 60.13 | 64.48 |
| 0 | 255 | 0 | 0 | 201 | 21.56 | 19.76 | 13.98 | 8.83 | 5.64 | 4.12 | 3.15 | 3.02 | 2.81 | 3.73 | 6.55 | 10.79 | 21.6 | 42.01 | 59.21 | 66.88 |
| 0 | 255 | 0 | 4 | 201 | 21.47 | 19.8 | 13.99 | 8.99 | 5.83 | 4.31 | 3.33 | 3.2 | 3 | 3.97 | 6.87 | 11.22 | 21.94 | 41.43 | 58.44 | 67.05 |
| 0 | 160 | 0 | 0 | 137 | 30.92 | 30.16 | 22.83 | 15.74 | 10.8 | 8.19 | 6.24 | 6.1 | 5.66 | 8.03 | 13.02 | 16.9 | 21.66 | 24.05 | 23.61 | 25.58 |
| 0 | 255 | 0 | 18 | 201 | 21.18 | 19.46 | 13.92 | 8.97 | 5.83 | 4.27 | 3.28 | 3.13 | 2.92 | 3.88 | 6.69 | 10.84 | 20.72 | 37.29 | 53.03 | 63.83 |
| 0 | 255 | 0 | 10 | 201 | 21.66 | 19.78 | 14.07 | 9.03 | 5.86 | 4.31 | 3.31 | 3.16 | 2.97 | 3.88 | 6.67 | 10.94 | 21.32 | 39.4 | 55.72 | 65.37 |
| 0 | 160 | 0 | 10 | 137 | 30.75 | 29.57 | 22.62 | 15.81 | 10.95 | 8.3 | 6.32 | 6.17 | 5.71 | 8.07 | 12.95 | 16.75 | 21.3 | 23.77 | 23.83 | 26.12 |
| 0 | 58 | 0 | 0 | 50 | 45.62 | 48.29 | 38.82 | 28.39 | 20.74 | 16.88 | 13.82 | 15.06 | 14.93 | 23.43 | 36.13 | 33.61 | 29.49 | 27.12 | 25.41 | 27.54 |
| 0 | 93 | 0 | 0 | 110 | 38.93 | 40.41 | 32.1 | 23.24 | 16.69 | 13.23 | 10.49 | 10.81 | 10.28 | 14.62 | 20.71 | 20.74 | 19.88 | 18.88 | 17.73 | 19.41 |
| 0 | 93 | 0 | 4 | 110 | 39.22 | 40.26 | 32.23 | 23.67 | 17.2 | 13.72 | 10.96 | 11.29 | 10.75 | 15.17 | 21.2 | 21.2 | 20.33 | 19.4 | 18.34 | 20.1 |
| 0 | 255 | 0 | 0 | 110 | 29.11 | 27.19 | 19.1 | 12.59 | 8.47 | 6.55 | 5.18 | 5.69 | 5.68 | 10.27 | 21.8 | 25.37 | 25.05 | 24.15 | 23.07 | 24.74 |
| 0 | 255 | 0 | 4 | 110 | 29.02 | 26.94 | 19.09 | 12.63 | 8.55 | 6.62 | 5.27 | 5.75 | 5.74 | 10.2 | 21.24 | 24.57 | 24.26 | 23.51 | 22.57 | 24.35 |
| 0 | 160 | 0 | 0 | 50 | 38.22 | 37.37 | 27.06 | 18.37 | 12.74 | 10.02 | 8.03 | 8.9 | 8.94 | 16.02 | 33.05 | 34.86 | 31.2 | 28.78 | 27.03 | 29.03 |
| 0 | 255 | 0 | 4 | 137 | 27.18 | 25.26 | 18.07 | 11.98 | 8.05 | 6.15 | 4.81 | 4.98 | 4.8 | 7.62 | 14.41 | 19.21 | 24.05 | 26.53 | 26.4 | 28.46 |
| 0 | 160 | 0 | 0 | 110 | 34.7 | 34.03 | 25.15 | 17.28 | 12 | 9.36 | 7.39 | 7.88 | 7.68 | 12.36 | 20.99 | 22.18 | 21.42 | 20.4 | 19.2 | 20.84 |
| 0 | 160 | 0 | 4 | 110 | 34.99 | 34.42 | 25.76 | 17.94 | 12.59 | 9.88 | 7.84 | 8.4 | 8.2 | 13.15 | 22.05 | 23.27 | 22.55 | 21.63 | 20.55 | 22.24 |
| 0 | 160 | 0 | 4 | 137 | 31.21 | 30.5 | 23.11 | 16.01 | 10.97 | 8.29 | 6.31 | 6.22 | 5.78 | 8.26 | 13.31 | 17.05 | 21.58 | 23.9 | 23.62 | 25.69 |
| 0 | 255 | 0 | 4 | 0 | 28.57 | 25.48 | 17.02 | 10.79 | 7.13 | 5.55 | 4.5 | 4.99 | 5.09 | 10.1 | 32.26 | 58.14 | 66.51 | 69.94 | 73.22 | 76.25 |
| 0 | 160 | 0 | 0 | 0 | 40.22 | 38.7 | 27.4 | 18.19 | 12.46 | 9.79 | 7.85 | 8.81 | 8.98 | 17.55 | 50.21 | 75.94 | 79.91 | 79.7 | 78.95 | 78.97 |
| 0 | 255 | 0 | 0 | 5 | 28.58 | 25.48 | 16.93 | 10.62 | 7 | 5.42 | 4.35 | 4.85 | 4.95 | 9.96 | 32.22 | 58.18 | 64.3 | 64.14 | 63.97 | 64.83 |
| 0 | 160 | 0 | 4 | 0 | 38.98 | 37.39 | 26.66 | 17.79 | 12.23 | 9.61 | 7.7 | 8.61 | 8.77 | 16.93 | 45.88 | 66.37 | 70.12 | 72.5 | 75.68 | 78.11 |
| 0 | 255 | 0 | 4 | 5 | 28.35 | 25.17 | 16.74 | 10.55 | 6.95 | 5.38 | 4.34 | 4.81 | 4.92 | 9.82 | 30.99 | 53.18 | 58.41 | 59.84 | 61.17 | 64.35 |
| 0 | 160 | 0 | 0 | 5 | 39.92 | 38.46 | 27.3 | 18.17 | 12.49 | 9.84 | 7.9 | 8.83 | 9.01 | 17.34 | 47.34 | 67.03 | 67.76 | 66.1 | 64.44 | 65.74 |
| 0 | 255 | 0 | 18 | 0 | 26.39 | 23.38 | 15.64 | 9.87 | 6.48 | 4.99 | 3.99 | 4.43 | 4.5 | 9.02 | 27.41 | 44.03 | 49.15 | 54.57 | 63.62 | 72 |
| 0 | 160 | 0 | 18 | 0 | 34.9 | 33.34 | 24.54 | 16.91 | 11.89 | 9.44 | 7.61 | 8.43 | 8.49 | 15.51 | 35.62 | 46.17 | 49.07 | 54.71 | 64.85 | 73.76 |
| 0 | 255 | 0 | 18 | 5 | 27.32 | 24.42 | 16.54 | 10.58 | 7.04 | 5.48 | 4.43 | 4.9 | 4.97 | 9.69 | 28 | 43.05 | 46.71 | 50.38 | 56.21 | 62.83 |
| 0 | 160 | 0 | 10 | 0 | 36.36 | 34.93 | 25.26 | 17.13 | 11.91 | 9.45 | 7.64 | 8.47 | 8.58 | 15.98 | 40 | 54.77 | 58.12 | 62.59 | 69.62 | 75.42 |
| 0 | 255 | 0 | 10 | 5 | 26.5 | 23.51 | 15.58 | 9.77 | 6.45 | 5.01 | 4.05 | 4.49 | 4.58 | 9.04 | 28.24 | 47.04 | 51.63 | 54.43 | 58.14 | 63.03 |
| 0 | 160 | 0 | 10 | 5 | 36.45 | 35.06 | 25.36 | 17.18 | 11.95 | 9.45 | 7.63 | 8.47 | 8.57 | 15.9 | 38.86 | 51.2 | 52.76 | 55.16 | 59.02 | 63.95 |
| 0 | 58 | 0 | 0 | 0 | 54.84 | 59.36 | 50.62 | 38.88 | 29.34 | 24.25 | 20.19 | 22.31 | 22.75 | 38.46 | 70.82 | 80.59 | 80.86 | 80.4 | 79.67 | 79.6 |
| 0 | 58 | 0 | 4 | 0 | 52.26 | 56.17 | 48.23 | 37.54 | 28.71 | 23.91 | 19.98 | 21.89 | 22.15 | 36.05 | 62.53 | 70.36 | 71.47 | 73.58 | 76.5 | 78.61 |
| 0 | 58 | 0 | 0 | 5 | 53.26 | 58.44 | 49.69 | 37.99 | 28.5 | 23.49 | 19.51 | 21.52 | 21.83 | 36.41 | 64.97 | 70.87 | 68.79 | 67.07 | 65.51 | 66.76 |
| 0 | 93 | 0 | 4 | 0 | 47.24 | 48.28 | 37.85 | 27.15 | 19.65 | 15.9 | 13.01 | 14.45 | 14.69 | 26.15 | 56.79 | 70.37 | 72.38 | 74.6 | 77.16 | 78.92 |
| 0 | 93 | 0 | 0 | 5 | 48.83 | 50.81 | 39.43 | 28.01 | 20.15 | 16.27 | 13.26 | 14.76 | 15.03 | 26.95 | 58.67 | 69.87 | 68.35 | 66.38 | 64.64 | 65.92 |
| 0 | 93 | 0 | 4 | 5 | 45.85 | 47.66 | 37.11 | 26.32 | 18.78 | 15.03 | 12.17 | 13.54 | 13.71 | 24.66 | 52.01 | 61.04 | 60.48 | 60.56 | 61.32 | 64.03 |
| 0 | 255 | 0 | 0 | 24 | 29.86 | 26.94 | 18.18 | 11.6 | 7.68 | 5.93 | 4.74 | 5.28 | 5.38 | 10.65 | 30.93 | 45.48 | 45.05 | 43.01 | 41.17 | 43.25 |
| 0 | 255 | 0 | 4 | 24 | 28.68 | 25.96 | 17.56 | 11.2 | 7.38 | 5.67 | 4.5 | 5.04 | 5.13 | 10.2 | 29.26 | 42.24 | 42.08 | 40.77 | 39.73 | 42.2 |
| 0 | 160 | 0 | 0 | 24 | 38.74 | 37.58 | 26.65 | 17.67 | 12.09 | 9.48 | 7.58 | 8.45 | 8.54 | 16.1 | 39.01 | 46.54 | 43.28 | 40.55 | 38.42 | 40.59 |
| 0 | 255 | 0 | 4 | 12 | 28.63 | 25.64 | 17.18 | 10.86 | 7.11 | 5.49 | 4.38 | 4.89 | 4.98 | 10.04 | 30.59 | 48.71 | 51.16 | 51.06 | 50.94 | 53.72 |
| 0 | 160 | 0 | 0 | 12 | 39.64 | 38.67 | 27.52 | 18.35 | 12.63 | 9.93 | 7.98 | 8.91 | 9.05 | 17.21 | 44.42 | 57.85 | 56.04 | 53.5 | 51.36 | 53.32 |
| 0 | 160 | 0 | 4 | 12 | 37.78 | 36.44 | 26.02 | 17.37 | 11.88 | 9.3 | 7.42 | 8.29 | 8.41 | 16.02 | 40.29 | 51.64 | 50.59 | 49.54 | 49.04 | 51.88 |
| 0 | 160 | 0 | 4 | 5 | 38.26 | 36.85 | 26.4 | 17.7 | 12.19 | 9.59 | 7.68 | 8.57 | 8.72 | 16.63 | 43.17 | 58.75 | 59.74 | 60.09 | 61 | 63.84 |
| 0 | 13 | 0 | 41 | 5 | 37.27 | 39.06 | 37.3 | 35.32 | 32.88 | 30.59 | 27.15 | 26.06 | 23.63 | 25.48 | 27.95 | 28.78 | 30.18 | 35.66 | 46.51 | 58.31 |
| 0 | 40 | 0 | 30 | 24 | 38.8 | 40.6 | 35.9 | 29.8 | 23.99 | 20.41 | 17.06 | 17.7 | 16.83 | 22.46 | 29.05 | 28.91 | 28.24 | 29.9 | 33.06 | 38.41 |
| 0 | 24 | 0 | 21 | 12 | 43.59 | 47.41 | 43.81 | 38.22 | 32.27 | 28.27 | 24.23 | 24.86 | 23.64 | 30.01 | 37.09 | 37.33 | 37.08 | 39.67 | 44.34 | 50.7 |
| 0 | 93 | 0 | 23 | 110 | 35.95 | 36.72 | 30.32 | 23.09 | 17.24 | 13.89 | 11.15 | 11.38 | 10.76 | 14.68 | 19.73 | 19.93 | 19.52 | 19.25 | 18.87 | 20.94 |
| 0 | 40 | 0 | 8 | 24 | 47.19 | 51.65 | 44.62 | 35.07 | 26.88 | 22.35 | 18.55 | 19.91 | 19.55 | 28.9 | 41.5 | 40.28 | 37.25 | 36.11 | 35.69 | 38.89 |
| 0 | 93 | 0 | 8 | 24 | 42.38 | 45.23 | 33.51 | 23.95 | 17.24 | 13.89 | 11.28 | 12.43 | 12.45 | 21.14 | 39.05 | 41.34 | 38.79 | 37.68 | 37.23 | 40.23 |
| 0 | 93 | 0 | 15 | 50 | 40.13 | 40.49 | 32.34 | 24.09 | 17.96 | 14.73 | 12.13 | 13.13 | 12.97 | 19.98 | 30.92 | 30.39 | 27.97 | 27.01 | 26.6 | 29.2 |
| 0 | 58 | 0 | 8 | 24 | 45.25 | 48.12 | 40.03 | 30.32 | 22.69 | 18.63 | 15.35 | 16.63 | 16.45 | 25.65 | 40.29 | 40.26 | 37.51 | 36.5 | 36.16 | 39.4 |
| 0 | 58 | 0 | 15 | 50 | 40.51 | 42.33 | 34.96 | 26.61 | 20.04 | 16.53 | 13.66 | 14.61 | 14.27 | 20.98 | 29.9 | 28.38 | 25.86 | 24.89 | 24.49 | 27.17 |
| 0 | 24 | 0 | 21 | 5 | 44.93 | 48.38 | 45.5 | 40.94 | 35.74 | 32.04 | 28 | 28.43 | 27.03 | 32.96 | 39.58 | 40.67 | 41.54 | 45.97 | 53.75 | 61.95 |

TABLE 1-continued

First set of 969 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 58 | 0 | 0 | 24 | 49.14 | 52.86 | 43.13 | 31.66 | 23.1 | 18.74 | 15.36 | 16.87 | 16.89 | 27.76 | 46.93 | 46.5 | 42.06 | 39.25 | 37.12 | 39.52 |
| 0 | 40 | 0 | 8 | 5 | 50.23 | 55.28 | 49.88 | 41.37 | 33.26 | 28.44 | 24.19 | 25.82 | 25.56 | 36.9 | 52.84 | 55.12 | 54.63 | 56.21 | 59.09 | 63.3 |
| 0 | 58 | 0 | 0 | 12 | 51.79 | 56.43 | 47.15 | 35.4 | 26.22 | 21.45 | 17.69 | 19.49 | 19.64 | 32.58 | 56.83 | 59.3 | 55.62 | 53.05 | 50.94 | 53.08 |
| 0 | 93 | 0 | 0 | 24 | 44.83 | 45.84 | 34.75 | 24.17 | 17.05 | 13.58 | 10.95 | 12.18 | 12.28 | 21.85 | 44.08 | 47.06 | 43.06 | 40.32 | 38.2 | 40.48 |
| 0 | 58 | 0 | 8 | 12 | 47.57 | 51.08 | 43.31 | 33.37 | 25.19 | 20.73 | 17.08 | 18.58 | 18.45 | 29.13 | 46.58 | 48.44 | 46.79 | 46.99 | 48.23 | 52.05 |
| 0 | 40 | 0 | 8 | 12 | 49.62 | 54.53 | 48.43 | 39.36 | 30.98 | 26.1 | 21.87 | 23.46 | 23.1 | 33.81 | 48.21 | 48.71 | 46.91 | 47.17 | 48.41 | 52.28 |
| 0 | 24 | 0 | 30 | 0 | 41.37 | 44.17 | 42.06 | 39.09 | 35.54 | 32.67 | 28.99 | 28.69 | 26.78 | 30.64 | 35.23 | 36.84 | 38.85 | 45.47 | 58.34 | 70.73 |
| 0 | 40 | 0 | 30 | 5 | 39.83 | 41.96 | 38.38 | 33.58 | 28.53 | 25.06 | 21.47 | 21.97 | 20.85 | 26.49 | 33.12 | 34.54 | 35.75 | 40.73 | 50.08 | 59.9 |
| 0 | 58 | 0 | 23 | 0 | 41.83 | 44.07 | 38.93 | 32.12 | 25.83 | 21.96 | 18.41 | 19.46 | 18.91 | 27.03 | 38.9 | 42.27 | 44.32 | 50.5 | 62.05 | 72.46 |
| 0 | 93 | 0 | 23 | 5 | 40.07 | 40.29 | 32.75 | 24.67 | 18.45 | 15.11 | 12.38 | 13.45 | 13.34 | 21.48 | 36.75 | 41.09 | 42.21 | 46.41 | 53.93 | 61.8 |
| 0 | 40 | 0 | 15 | 0 | 47.27 | 51.24 | 47.17 | 40.71 | 34.1 | 29.85 | 25.72 | 26.9 | 26.22 | 35.38 | 47.49 | 50.59 | 52.37 | 57.88 | 67.36 | 75.17 |
| 0 | 93 | 0 | 15 | 12 | 42.39 | 42.87 | 34.13 | 25.05 | 18.37 | 14.92 | 12.16 | 13.33 | 13.33 | 22.27 | 40.32 | 44.56 | 44.15 | 45.66 | 48.53 | 53.23 |
| 0 | 58 | 0 | 15 | 5 | 45.01 | 47.59 | 41.07 | 32.7 | 25.37 | 21.19 | 17.6 | 18.93 | 18.67 | 28.34 | 43.26 | 46.23 | 46.64 | 49.88 | 55.55 | 61.77 |
| 0 | 255 | 0 | 18 | 110 | 27.57 | 25.28 | 17.82 | 11.71 | 7.91 | 6.13 | 4.89 | 5.32 | 5.29 | 9.35 | 19.69 | 22.97 | 22.87 | 22.43 | 21.83 | 23.72 |
| 0 | 255 | 0 | 18 | 24 | 27.32 | 24.59 | 16.69 | 10.73 | 7.15 | 5.55 | 4.46 | 4.93 | 5 | 9.67 | 26.34 | 36.35 | 36.75 | 37.2 | 38.36 | 41.96 |
| 0 | 255 | 0 | 10 | 50 | 28.58 | 25.82 | 17.56 | 11.3 | 7.49 | 5.79 | 4.62 | 5.13 | 5.21 | 10.1 | 26.23 | 33.13 | 31.55 | 30.2 | 29.4 | 31.57 |
| 0 | 93 | 0 | 23 | 24 | 38.58 | 38.85 | 31.21 | 23.35 | 17.37 | 14.25 | 11.68 | 12.65 | 12.5 | 19.65 | 31.99 | 33.53 | 32.53 | 33.41 | 35.33 | 39.67 |
| 0 | 255 | 255 | 105 | 0 | 4.42 | 3.3 | 3.09 | 3.58 | 6.07 | 7.8 | 6.62 | 7.1 | 6.94 | 10.62 | 17.54 | 20 | 21.39 | 25.53 | 35.56 | 52.25 |
| 0 | 40 | 15 | 88 | 0 | 13.74 | 11.57 | 10.82 | 11.8 | 15.07 | 16.39 | 14.5 | 13.25 | 11.42 | 11.54 | 12.32 | 12.94 | 14.17 | 18.62 | 30.45 | 50.5 |
| 0 | 255 | 15 | 58 | 0 | 17.38 | 14.49 | 11.21 | 8.75 | 6.81 | 5.53 | 4.47 | 4.9 | 4.92 | 9.01 | 21.12 | 27.42 | 29.69 | 34.88 | 46.94 | 63.19 |
| 0 | 13 | 5 | 54 | 0 | 25.13 | 23.63 | 22.69 | 23.59 | 26.97 | 28.61 | 26.05 | 24.05 | 21.16 | 21.19 | 22.36 | 23.35 | 25.26 | 31.79 | 46.63 | 64.7 |
| 0 | 13 | 5 | 77 | 0 | 19.08 | 17.58 | 16.72 | 17.46 | 19.74 | 20.42 | 18.39 | 16.35 | 13.89 | 13.28 | 13.68 | 14.32 | 15.71 | 20.7 | 33.77 | 54.48 |
| 0 | 40 | 5 | 47 | 0 | 25.9 | 24.29 | 22.61 | 22.47 | 23.74 | 23.42 | 20.48 | 20.27 | 18.73 | 21.91 | 25.86 | 27.38 | 29.32 | 35.94 | 50.54 | 67.08 |
| 0 | 255 | 5 | 26 | 0 | 22.15 | 18.89 | 13.45 | 9.22 | 6.45 | 5.09 | 4.12 | 4.56 | 4.62 | 8.93 | 25.85 | 39.8 | 44.15 | 49.99 | 60.61 | 71.57 |
| 0 | 255 | 5 | 44 | 0 | 21.66 | 18.55 | 13.37 | 9.26 | 6.54 | 5.18 | 4.19 | 4.61 | 4.65 | 8.76 | 23.07 | 32.37 | 35.5 | 41.28 | 53.47 | 67.65 |
| 0 | 93 | 5 | 35 | 0 | 27.07 | 24.54 | 21.24 | 18.55 | 16.37 | 14.29 | 11.78 | 12.68 | 12.47 | 19.35 | 31.67 | 35.85 | 38.16 | 44.77 | 57.87 | 70.79 |
| 0 | 255 | 255 | 44 | 0 | 3.72 | 2.65 | 2.58 | 2.92 | 4.96 | 6.35 | 5.32 | 5.89 | 5.94 | 10.79 | 25.74 | 34.97 | 38.16 | 43.58 | 54.67 | 67.76 |
| 0 | 93 | 37 | 35 | 0 | 12.61 | 9.67 | 8.92 | 10.05 | 14.61 | 16.78 | 14.39 | 15.44 | 15.16 | 22.44 | 34.32 | 38.01 | 40.45 | 46.22 | 58.66 | 71.34 |
| 0 | 255 | 37 | 26 | 0 | 13.49 | 10.4 | 8.64 | 7.75 | 7.2 | 6.21 | 5.03 | 5.58 | 5.64 | 10.72 | 28.13 | 40.67 | 44.75 | 50.46 | 60.88 | 71.38 |
| 0 | 93 | 37 | 53 | 0 | 11.46 | 8.77 | 8.02 | 9.16 | 13.55 | 15.64 | 13.42 | 14.13 | 13.66 | 19.08 | 26.84 | 29.24 | 31.05 | 36.98 | 50.25 | 66.08 |
| 0 | 255 | 37 | 44 | 0 | 12.93 | 10.03 | 8.34 | 7.62 | 7.14 | 6.19 | 5.05 | 5.55 | 5.6 | 10.31 | 25.22 | 34.39 | 37.46 | 43.19 | 55.03 | 68.36 |
| 0 | 93 | 15 | 35 | 0 | 19.97 | 16.85 | 15.14 | 14.95 | 16.19 | 15.6 | 13.05 | 14.03 | 13.78 | 20.93 | 32.92 | 36.71 | 38.83 | 45.17 | 58.1 | 71.21 |
| 0 | 40 | 5 | 66 | 0 | 21.95 | 20.1 | 18.81 | 18.96 | 20.34 | 20.24 | 17.8 | 16.91 | 15.08 | 16.17 | 17.9 | 18.82 | 20.37 | 25.92 | 39.59 | 59.21 |
| 0 | 6 | 2 | 0 | 0 | 52.49 | 58.37 | 59.2 | 60.06 | 63.66 | 66.96 | 65.05 | 66.51 | 66.48 | 73.51 | 79.8 | 80.56 | 80.25 | 80.2 | 79.87 | 79.97 |
| 0 | 6 | 2 | 8 | 0 | 47.94 | 52.54 | 52.74 | 53.51 | 56.22 | 57.99 | 55.39 | 54.86 | 52.74 | 55.99 | 59.51 | 60.59 | 61.94 | 66.13 | 72.47 | 77.26 |
| 0 | 13 | 2 | 0 | 0 | 50.68 | 55.39 | 54.82 | 53.75 | 54.61 | 54.97 | 51.34 | 53.6 | 53.85 | 65.89 | 78.76 | 80.77 | 80.45 | 80.28 | 79.96 | 79.94 |
| 0 | 6 | 2 | 41 | 0 | 33.89 | 34.45 | 33.64 | 34.38 | 36.71 | 37.63 | 34.96 | 32.39 | 28.88 | 28.39 | 29.3 | 30.36 | 32.44 | 39.35 | 53.74 | 69.07 |
| 0 | 6 | 2 | 21 | 0 | 40.03 | 42.47 | 42.17 | 43.12 | 46.06 | 47.53 | 44.78 | 42.94 | 39.73 | 40.57 | 42.5 | 43.68 | 45.77 | 52.3 | 63.99 | 74.19 |
| 0 | 13 | 2 | 21 | 0 | 39.82 | 41.52 | 40.36 | 39.93 | 40.9 | 40.96 | 37.56 | 36.82 | 34.4 | 37.7 | 41.8 | 43.34 | 45.41 | 51.92 | 63.65 | 73.89 |
| 0 | 40 | 2 | 0 | 0 | 47.87 | 51.03 | 47.01 | 41.57 | 37.22 | 33.92 | 29.36 | 31.89 | 32.34 | 48.91 | 75.57 | 81.72 | 81.67 | 81.34 | 80.98 | 80.94 |
| 0 | 24 | 2 | 0 | 0 | 49.68 | 53.96 | 51.59 | 47.92 | 45.41 | 43.46 | 39 | 41.6 | 42.01 | 57.39 | 77.52 | 81.34 | 81.06 | 80.78 | 80.39 | 80.32 |
| 0 | 24 | 2 | 8 | 0 | 44.9 | 47.48 | 45.48 | 43.16 | 41.84 | 40.2 | 36.12 | 37.49 | 36.81 | 46.65 | 58.53 | 61.27 | 62.6 | 66.59 | 72.75 | 77.28 |
| 0 | 24 | 8 | 0 | 0 | 32.28 | 31.1 | 29.82 | 30.9 | 37.59 | 42.81 | 39.26 | 41.99 | 42.42 | 57.82 | 78.09 | 81.99 | 81.77 | 81.56 | 81.24 | 81.18 |
| 0 | 24 | 8 | 8 | 0 | 30.22 | 28.68 | 27.38 | 28.58 | 34.81 | 39.21 | 35.88 | 37.34 | 36.68 | 46.51 | 58.4 | 61.18 | 62.56 | 66.74 | 73.17 | 77.86 |
| 0 | 40 | 8 | 0 | 0 | 30.87 | 28.68 | 26.7 | 27.02 | 31.28 | 33.16 | 29.27 | 31.8 | 32.26 | 48.53 | 75.14 | 81.46 | 81.39 | 81.06 | 80.67 | 80.58 |
| 0 | 13 | 5 | 8 | 0 | 35.75 | 35.78 | 34.98 | 36.55 | 42.93 | 47.58 | 44.61 | 45.3 | 43.96 | 50.81 | 58.22 | 60.06 | 61.52 | 65.93 | 72.65 | 77.65 |
| 0 | 24 | 5 | 0 | 0 | 38.59 | 38.88 | 37.32 | 37.26 | 40.89 | 42.92 | 38.96 | 41.01 | 41.07 | 57.18 | 76.96 | 80.79 | 80.64 | 80.51 | 80.27 | 80.35 |
| 0 | 24 | 5 | 8 | 0 | 36.56 | 36.19 | 34.46 | 34.44 | 37.59 | 39.04 | 35.24 | 36.71 | 36.07 | 46.23 | 58.52 | 61.41 | 62.89 | 67.12 | 73.51 | 78.3 |
| 0 | 13 | 2 | 8 | 0 | 45.53 | 48.26 | 47.25 | 46.64 | 47.74 | 48 | 44.44 | 45.02 | 43.63 | 50.47 | 57.99 | 59.9 | 61.43 | 65.94 | 72.79 | 77.8 |
| 0 | 255 | 2 | 0 | 0 | 25.38 | 21.86 | 14.43 | 9.05 | 5.96 | 4.6 | 3.71 | 4.12 | 4.21 | 8.65 | 31.2 | 64.01 | 76.2 | 78.41 | 78.62 | 79.37 |
| 0 | 255 | 2 | 4 | 0 | 27.1 | 23.97 | 16.32 | 10.52 | 7.02 | 5.43 | 4.35 | 4.85 | 4.95 | 10.09 | 32.57 | 57.9 | 66.12 | 69.82 | 73.43 | 76.63 |
| 0 | 160 | 2 | 0 | 0 | 36.09 | 33.67 | 24.81 | 17.38 | 12.43 | 9.86 | 7.87 | 8.85 | 9.03 | 17.83 | 51.34 | 77.3 | 81.23 | 81.04 | 80.31 | 80.27 |
| 0 | 255 | 2 | 18 | 0 | 26.16 | 23.14 | 16.14 | 10.66 | 7.25 | 5.66 | 4.55 | 5.05 | 5.13 | 10.07 | 29.38 | 46.26 | 51.51 | 56.99 | 65.94 | 74.04 |
| 0 | 255 | 2 | 10 | 0 | 26.48 | 23.46 | 16.25 | 10.64 | 7.24 | 5.66 | 4.57 | 5.07 | 5.16 | 10.11 | 31.12 | 52.85 | 59.56 | 64.21 | 70.52 | 75.82 |
| 0 | 160 | 2 | 10 | 0 | 33.4 | 31.11 | 23.31 | 16.6 | 12.02 | 9.58 | 7.66 | 8.55 | 8.67 | 16.55 | 41.77 | 56.81 | 60.11 | 64.43 | 71.3 | 76.64 |
| 0 | 58 | 2 | 0 | 0 | 45.2 | 46.52 | 40.94 | 34.35 | 29.05 | 25.37 | 21.35 | 23.5 | 23.92 | 39.51 | 71.33 | 80.82 | 81.01 | 80.43 | 79.75 | 79.56 |
| 0 | 93 | 2 | 0 | 0 | 41.33 | 40.88 | 33.02 | 25.26 | 19.5 | 16.12 | 13.17 | 14.68 | 14.98 | 27.29 | 63.13 | 80.06 | 81.41 | 80.96 | 80.33 | 80.15 |
| 0 | 93 | 2 | 4 | 0 | 40.16 | 39.31 | 32.13 | 25.02 | 19.63 | 16.36 | 13.4 | 14.86 | 15.09 | 26.68 | 57.06 | 70.2 | 72.15 | 74.35 | 77.51 | 79.77 |
| 0 | 255 | 8 | 0 | 0 | 22.08 | 18.54 | 13.36 | 9.39 | 6.72 | 5.34 | 4.31 | 4.79 | 4.9 | 9.91 | 33.73 | 66.43 | 77.5 | 79.08 | 78.95 | 79.47 |
| 0 | 255 | 8 | 4 | 0 | 22.15 | 18.63 | 13.41 | 9.33 | 6.63 | 5.25 | 4.23 | 4.69 | 4.79 | 9.63 | 31.94 | 59.47 | 68.5 | 71.92 | 75.12 | 77.84 |
| 0 | 160 | 8 | 0 | 0 | 25.62 | 22.26 | 17.82 | 14.32 | 11.77 | 9.83 | 7.9 | 8.86 | 9.05 | 17.68 | 50.52 | 76.47 | 80.58 | 80.53 | 79.98 | 80.07 |
| 0 | 255 | 5 | 4 | 0 | 23.84 | 20.38 | 14.28 | 9.66 | 6.72 | 5.29 | 4.28 | 4.75 | 4.84 | 9.67 | 32.05 | 59.83 | 68.91 | 72.29 | 75.45 | 78.09 |
| 0 | 160 | 5 | 0 | 0 | 29.82 | 26.87 | 20.67 | 15.44 | 11.78 | 9.6 | 7.77 | 8.7 | 8.88 | 17.23 | 50.05 | 76.38 | 80.62 | 80.52 | 79.84 | 79.84 |
| 0 | 160 | 5 | 4 | 0 | 29.26 | 26.4 | 20.45 | 15.42 | 11.8 | 9.62 | 7.74 | 8.64 | 8.81 | 16.88 | 45.85 | 66.44 | 70.28 | 72.74 | 76 | 78.44 |
| 0 | 160 | 2 | 4 | 0 | 34.74 | 32.24 | 23.99 | 17.01 | 12.37 | 9.96 | 8.06 | 8.97 | 9.13 | 17.27 | 46.2 | 66.71 | 70.61 | 73.28 | 76.83 | 79.38 |
| 0 | 255 | 255 | 4 | 0 | 4.07 | 3.08 | 2.88 | 3.29 | 5.62 | 7.3 | 6.18 | 6.87 | 6.99 | 12.91 | 35.27 | 59.55 | 67.47 | 71.17 | 74.76 | 77.98 |
| 0 | 160 | 73 | 0 | 0 | 7.31 | 5.37 | 4.89 | 5.64 | 9 | 10.76 | 9.03 | 10.09 | 10.28 | 19.01 | 51.11 | 76.97 | 81.29 | 81.27 | 80.59 | 80.59 |
| 0 | 255 | 73 | 0 | 0 | 8.33 | 6.01 | 5.12 | 5.21 | 5.89 | 5.52 | 4.51 | 5.03 | 5.12 | 10.17 | 33.53 | 65.87 | 77.05 | 78.69 | 78.51 | 79.01 |
| 0 | 160 | 73 | 4 | 0 | 7.18 | 5.21 | 4.74 | 5.51 | 9.04 | 10.95 | 9.22 | 10.26 | 10.42 | 18.95 | 47.4 | 66.99 | 70.78 | 73.38 | 76.76 | 79.41 |
| 0 | 255 | 73 | 4 | 0 | 8.54 | 6.17 | 5.27 | 5.38 | 6.04 | 5.62 | 4.58 | 5.1 | 5.19 | 10.25 | 32.22 | 58.28 | 67.15 | 70.87 | 74.48 | 77.66 |
| 0 | 160 | 37 | 0 | 0 | 11.22 | 8.47 | 7.42 | 7.76 | 9.67 | 9.78 | 8.03 | 9 | 9.17 | 17.61 | 50.09 | 76.56 | 81.09 | 81.15 | 80.49 | 80.63 |
| 0 | 255 | 255 | 18 | 0 | 4.01 | 3 | 2.78 | 3.22 | 5.38 | 6.8 | 5.71 | 6.31 | 6.4 | 11.86 | 30.89 | 46.62 | 51.58 | 56.84 | 65.47 | 73.66 |
| 0 | 160 | 73 | 18 | 0 | 7.57 | 5.55 | 5.01 | 5.81 | 9.19 | 10.9 | 9.16 | 10.12 | 10.18 | 17.69 | 38.01 | 48.46 | 51.41 | 57 | 66.98 | 75.74 |

TABLE 1-continued

First set of 969 patches
(reference condition)

| Colorant digital count (0-255) | | | | | Percent reflectance at wavelength | | | | | | | | | | | | | | |
|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 255 | 73 | 18 | 0 | 9.01 | 6.63 | 5.75 | 5.88 | 6.66 | 6.23 | 5.05 | 5.63 | 5.73 | 11.03 | 29.4 | 43.19 | 47.88 | 53.44 | 62.57 | 71.74 |
| 0 | 160 | 73 | 10 | 0 | 7.57 | 5.56 | 5.03 | 5.82 | 9.31 | 11.12 | 9.32 | 10.35 | 10.49 | 18.74 | 43.15 | 57.02 | 60.09 | 64.42 | 71.17 | 76.48 |
| 0 | 255 | 73 | 10 | 0 | 9.03 | 6.69 | 5.77 | 5.9 | 6.66 | 6.25 | 5.1 | 5.69 | 5.79 | 11.15 | 31.59 | 50.24 | 56.25 | 61.19 | 68.06 | 74.24 |
| 0 | 160 | 37 | 10 | 0 | 12.17 | 9.32 | 8.21 | 8.67 | 10.71 | 10.79 | 8.89 | 9.87 | 9.99 | 18.14 | 42.9 | 57.4 | 60.59 | 64.88 | 71.61 | 76.85 |
| 0 | 58 | 22 | 0 | 0 | 16.6 | 13.68 | 12.71 | 14.09 | 20.41 | 24.57 | 21.44 | 23.62 | 24.03 | 39.28 | 70.96 | 80.48 | 80.73 | 80.09 | 79.13 | 79.29 |
| 0 | 58 | 22 | 4 | 0 | 17.17 | 14.14 | 13.18 | 14.5 | 20.64 | 24.57 | 21.47 | 23.46 | 23.65 | 37.15 | 62.29 | 69.53 | 70.65 | 73.04 | 76.5 | 78.99 |
| 0 | 58 | 15 | 0 | 0 | 21.8 | 18.92 | 17.44 | 18.16 | 22.73 | 24.85 | 21.43 | 23.63 | 24.05 | 39.56 | 71.64 | 81.31 | 81.55 | 81.02 | 80.34 | 80.14 |
| 0 | 93 | 37 | 4 | 0 | 12.06 | 9.19 | 8.41 | 9.65 | 14.63 | 17.09 | 14.58 | 16.11 | 16.33 | 27.73 | 56.95 | 69.45 | 71.35 | 73.71 | 77.01 | 79.39 |
| 0 | 93 | 22 | 0 | 0 | 17.77 | 14.41 | 12.98 | 13.56 | 16.57 | 17.01 | 14.29 | 15.89 | 16.19 | 28.54 | 63.7 | 80.34 | 81.82 | 81.52 | 81 | 80.94 |
| 0 | 93 | 22 | 4 | 0 | 17.05 | 13.64 | 12.27 | 12.95 | 16.04 | 16.49 | 13.84 | 15.32 | 15.52 | 26.91 | 56.5 | 69.33 | 71.24 | 73.5 | 76.68 | 78.97 |
| 0 | 255 | 22 | 0 | 0 | 16.72 | 13.32 | 10.38 | 8.35 | 6.79 | 5.59 | 4.53 | 5.04 | 5.14 | 10.25 | 33.8 | 65.47 | 76.32 | 78.17 | 78.33 | 79.09 |
| 0 | 255 | 22 | 4 | 0 | 16.44 | 13.22 | 10.35 | 8.34 | 6.83 | 5.64 | 4.56 | 5.08 | 5.17 | 10.27 | 32.56 | 58.89 | 67.45 | 70.93 | 74.28 | 77.19 |
| 0 | 160 | 15 | 0 | 0 | 20.11 | 16.86 | 13.98 | 12.24 | 11.37 | 10.03 | 8.17 | 9.13 | 9.32 | 17.86 | 50.53 | 76.04 | 80.16 | 80.18 | 79.67 | 79.8 |
| 0 | 255 | 37 | 4 | 0 | 12.79 | 9.76 | 7.95 | 7.07 | 6.52 | 5.41 | 4.54 | 5.05 | 5.14 | 10.26 | 32.96 | 60.28 | 69.13 | 72.51 | 75.72 | 78.42 |
| 0 | 160 | 22 | 0 | 0 | 15.9 | 12.55 | 10.71 | 10.17 | 10.57 | 9.74 | 7.92 | 8.86 | 9.03 | 17.42 | 49.88 | 76.09 | 80.37 | 80.37 | 79.82 | 79.79 |
| 0 | 160 | 22 | 4 | 0 | 16.67 | 13.39 | 11.44 | 10.85 | 11.21 | 10.34 | 8.46 | 9.44 | 9.59 | 17.99 | 47.09 | 67.29 | 71.13 | 73.71 | 77.11 | 79.64 |
| 0 | 160 | 37 | 4 | 0 | 11.67 | 8.85 | 7.77 | 8.16 | 10.06 | 10.11 | 8.31 | 9.27 | 9.42 | 17.54 | 45.86 | 65.67 | 69.43 | 72.03 | 75.42 | 77.99 |
| 0 | 13 | 2 | 41 | 0 | 33.2 | 33.22 | 31.88 | 31.78 | 32.7 | 32.54 | 29.55 | 28.01 | 25.29 | 26.29 | 28.24 | 29.41 | 31.43 | 38.26 | 52.86 | 68.69 |
| 0 | 40 | 2 | 30 | 0 | 36.78 | 36.76 | 34.09 | 31.61 | 29.51 | 27.33 | 23.8 | 24.26 | 23.08 | 28.71 | 35.52 | 37.64 | 39.73 | 46.49 | 59.69 | 72.39 |
| 0 | 24 | 2 | 21 | 0 | 39.74 | 40.32 | 38.36 | 36.92 | 36.32 | 35 | 31.29 | 31.57 | 30.05 | 35.56 | 41.94 | 43.9 | 45.94 | 52.36 | 64.09 | 74.41 |
| 0 | 93 | 2 | 23 | 0 | 35.42 | 33.73 | 28.1 | 22.6 | 18.18 | 15.34 | 12.66 | 13.77 | 13.72 | 22.16 | 39.05 | 45.15 | 47.58 | 53.79 | 64.93 | 74.64 |
| 0 | 40 | 2 | 8 | 0 | 44.62 | 45.85 | 42.26 | 37.98 | 34.47 | 31.55 | 27.39 | 29.13 | 28.91 | 40.62 | 57.1 | 61.24 | 62.79 | 67.09 | 73.74 | 78.45 |
| 0 | 93 | 8 | 8 | 0 | 27.2 | 23.71 | 20.61 | 18.81 | 17.83 | 16.01 | 13.28 | 14.65 | 14.82 | 25.35 | 51.44 | 62.55 | 64.99 | 69.04 | 74.87 | 78.96 |
| 0 | 93 | 5 | 15 | 0 | 31.24 | 28.72 | 24.77 | 21.57 | 19 | 16.55 | 13.72 | 14.99 | 15.01 | 24.59 | 44.54 | 51.63 | 53.77 | 59.02 | 68.08 | 75.42 |
| 0 | 58 | 5 | 8 | 0 | 35.2 | 33.86 | 30.51 | 27.82 | 26.48 | 24.52 | 20.83 | 22.6 | 22.65 | 35.06 | 56.6 | 62.58 | 64.04 | 67.73 | 73.52 | 77.78 |
| 0 | 58 | 2 | 15 | 0 | 39.8 | 40.18 | 35.77 | 30.93 | 26.75 | 23.62 | 20.01 | 21.38 | 21.13 | 31.08 | 46.61 | 50.89 | 52.73 | 58.12 | 67.47 | 75.18 |
| 0 | 24 | 5 | 21 | 0 | 31.91 | 31.44 | 30.03 | 30.27 | 33.27 | 34.53 | 31.15 | 31.51 | 30.05 | 35.69 | 42.14 | 44.01 | 45.91 | 51.98 | 62.99 | 72.72 |
| 0 | 58 | 5 | 0 | 0 | 36.82 | 35.79 | 32.15 | 29.03 | 27.36 | 25.24 | 21.43 | 23.58 | 23.99 | 39.37 | 70.72 | 80.06 | 80.32 | 79.9 | 79.4 | 79.38 |
| 0 | 40 | 8 | 8 | 0 | 29.35 | 27.44 | 25.67 | 25.91 | 29.68 | 31.25 | 27.56 | 29.33 | 29.11 | 40.79 | 57.22 | 61.2 | 62.58 | 66.6 | 72.88 | 77.56 |
| 0 | 58 | 8 | 0 | 0 | 29.7 | 27.33 | 24.85 | 23.87 | 25.25 | 24.74 | 21.08 | 23.22 | 23.62 | 38.88 | 70.22 | 79.61 | 79.9 | 79.63 | 79.3 | 79.31 |
| 0 | 93 | 8 | 0 | 0 | 29.04 | 25.9 | 22.43 | 20.12 | 18.79 | 16.81 | 13.9 | 15.47 | 15.75 | 28.05 | 63.21 | 79.86 | 81.28 | 80.87 | 80.26 | 80.13 |
| 0 | 58 | 8 | 8 | 0 | 29.38 | 26.89 | 24.51 | 23.68 | 25.08 | 24.63 | 21.11 | 22.84 | 22.83 | 34.84 | 55.65 | 61.54 | 63.1 | 67.05 | 73.23 | 77.9 |
| 0 | 40 | 5 | 8 | 0 | 35.36 | 34.76 | 32.5 | 31.48 | 32.65 | 32.14 | 28.16 | 29.91 | 29.66 | 41.32 | 57.55 | 61.47 | 62.87 | 66.93 | 73.25 | 77.88 |
| 0 | 24 | 8 | 30 | 0 | 25.7 | 23.98 | 22.92 | 24.21 | 29.41 | 32.42 | 29.41 | 29.17 | 27.24 | 30.98 | 35.44 | 37.04 | 39.1 | 45.82 | 59.04 | 71.88 |
| 0 | 40 | 8 | 30 | 0 | 25.58 | 23.42 | 21.93 | 22.5 | 25.87 | 27.01 | 23.83 | 24.27 | 23.06 | 28.4 | 34.86 | 36.85 | 38.86 | 45.47 | 58.54 | 71.3 |
| 0 | 58 | 22 | 23 | 0 | 16 | 13.19 | 12.25 | 13.67 | 19.33 | 22.83 | 20.13 | 21.22 | 20.73 | 28.43 | 39.39 | 42.52 | 44.49 | 50.66 | 62.24 | 72.86 |
| 0 | 93 | 22 | 23 | 0 | 16.85 | 13.74 | 12.5 | 13.25 | 16.4 | 16.99 | 14.47 | 15.63 | 15.51 | 23.79 | 39.19 | 44.4 | 46.56 | 52.56 | 63.88 | 74.11 |
| 0 | 40 | 15 | 15 | 0 | 19.7 | 16.92 | 15.87 | 17.38 | 23.95 | 28.53 | 25.46 | 26.7 | 26.04 | 34.74 | 46.17 | 49.18 | 51.04 | 56.79 | 66.74 | 74.85 |
| 0 | 93 | 15 | 15 | 0 | 20.29 | 16.96 | 15.16 | 15.16 | 16.65 | 16.11 | 13.5 | 14.71 | 14.72 | 23.84 | 43.35 | 50.6 | 52.86 | 58.31 | 67.67 | 75.32 |
| 0 | 58 | 15 | 15 | 0 | 19.62 | 16.7 | 15.35 | 16.36 | 20.95 | 22.88 | 19.81 | 21.19 | 20.94 | 30.6 | 45.8 | 50.13 | 52.05 | 57.67 | 67.39 | 75.37 |
| 0 | 255 | 8 | 18 | 0 | 20.44 | 17.04 | 12.39 | 8.78 | 6.34 | 5.04 | 4.08 | 4.52 | 4.57 | 8.95 | 27.16 | 43.9 | 49.22 | 54.65 | 64.25 | 72.93 |
| 0 | 255 | 22 | 18 | 0 | 15.24 | 12.13 | 9.46 | 7.79 | 6.45 | 5.37 | 4.35 | 4.82 | 4.89 | 9.51 | 28.18 | 44.82 | 50.05 | 55.69 | 65.02 | 73.64 |
| 0 | 255 | 15 | 10 | 0 | 17.61 | 14.2 | 10.82 | 8.24 | 6.39 | 5.18 | 4.21 | 4.66 | 4.74 | 9.33 | 29.35 | 50.75 | 57.76 | 62.82 | 69.77 | 75.83 |
| 0 | 93 | 8 | 23 | 0 | 25.88 | 22.52 | 19.76 | 18.2 | 17.42 | 15.78 | 13.14 | 14.25 | 14.15 | 22.4 | 38.52 | 44.22 | 46.6 | 52.81 | 64.21 | 74.29 |
| 0 | 40 | 255 | 58 | 0 | 3.32 | 2.69 | 2.58 | 3.02 | 7.54 | 22.67 | 24.82 | 24.55 | 22.77 | 24.33 | 26.6 | 27.74 | 29.42 | 34.96 | 47.7 | 64.64 |
| 0 | 13 | 15 | 47 | 0 | 16.85 | 14.18 | 13.46 | 15.57 | 23.58 | 30.52 | 28.66 | 26.98 | 24.14 | 24.51 | 25.91 | 26.97 | 28.91 | 35.59 | 50.18 | 66.8 |
| 0 | 13 | 255 | 26 | 0 | 3.24 | 2.6 | 2.54 | 2.91 | 7.58 | 30.97 | 40.51 | 41.03 | 38.8 | 40.57 | 43.07 | 44.37 | 46.32 | 52.18 | 63.11 | 73.45 |
| 0 | 13 | 255 | 44 | 0 | 3.31 | 2.71 | 2.61 | 3.02 | 7.65 | 28.58 | 35.53 | 34.93 | 32.33 | 32.67 | 34.07 | 35.17 | 37.07 | 42.98 | 55.26 | 68.86 |
| 0 | 13 | 37 | 35 | 0 | 10.46 | 8.38 | 7.95 | 9.72 | 19.35 | 33.88 | 33.51 | 32.42 | 29.77 | 31.06 | 33.19 | 34.41 | 36.43 | 43.02 | 56.33 | 69.98 |
| 0 | 93 | 255 | 26 | 0 | 3.68 | 2.9 | 2.78 | 3.29 | 8.08 | 19.48 | 19.29 | 20.62 | 20.47 | 28.4 | 41.68 | 46.05 | 48.05 | 53.51 | 63.73 | 73.27 |
| 0 | 93 | 255 | 44 | 0 | 3.78 | 3.02 | 2.86 | 3.42 | 8.31 | 19.23 | 18.93 | 19.96 | 19.55 | 25.8 | 34.87 | 37.75 | 39.59 | 45.25 | 57.1 | 70.12 |
| 0 | 40 | 37 | 35 | 0 | 11.19 | 8.71 | 8.28 | 9.9 | 17.88 | 26.3 | 24.33 | 24.71 | 23.38 | 28.02 | 33.45 | 35.24 | 37.22 | 43.68 | 56.89 | 70.43 |
| 0 | 13 | 15 | 66 | 0 | 15.59 | 13.36 | 12.6 | 14.34 | 20.14 | 24.24 | 22.4 | 20.35 | 17.66 | 17.1 | 17.68 | 18.41 | 19.94 | 25.51 | 39.15 | 58.73 |
| 0 | 6 | 5 | 0 | 0 | 42.38 | 44.42 | 44.55 | 47.05 | 56.26 | 65.54 | 64.53 | 66.11 | 66.08 | 73.12 | 79.35 | 80.11 | 79.86 | 79.9 | 79.7 | 79.91 |
| 0 | 6 | 5 | 21 | 0 | 33.13 | 33.6 | 33.08 | 35.14 | 41.9 | 47.06 | 44.93 | 43.1 | 39.93 | 40.6 | 42.35 | 43.51 | 45.52 | 51.93 | 63.33 | 73.36 |
| 0 | 6 | 15 | 0 | 0 | 23.3 | 21.58 | 21.15 | 24.37 | 39.27 | 61.83 | 63.81 | 65.85 | 65.96 | 73.35 | 79.9 | 80.71 | 80.47 | 80.5 | 80.28 | 80.35 |
| 0 | 6 | 8 | 0 | 0 | 34.52 | 34.24 | 33.96 | 37.05 | 49.33 | 63.54 | 63.36 | 65.15 | 65.17 | 72.79 | 79.63 | 80.52 | 80.27 | 80.3 | 80.07 | 80.24 |
| 0 | 6 | 8 | 8 | 0 | 30.89 | 30.03 | 29.66 | 32.54 | 43.71 | 55.22 | 54.2 | 54.03 | 52.06 | 55.61 | 59.4 | 60.57 | 61.91 | 66.1 | 72.38 | 77.08 |
| 0 | 24 | 15 | 0 | 0 | 22.32 | 20.06 | 19.26 | 21.39 | 31.43 | 41.76 | 39.09 | 41.86 | 42.32 | 57.53 | 77.47 | 81.3 | 81.09 | 80.81 | 80.33 | 80.35 |
| 0 | 13 | 8 | 0 | 0 | 32.96 | 32.16 | 31.5 | 33.8 | 43.79 | 53.6 | 51.43 | 53.8 | 54.06 | 65.86 | 78.37 | 80.33 | 80.06 | 79.91 | 79.53 | 79.6 |
| 0 | 13 | 8 | 8 | 0 | 29.9 | 28.64 | 27.89 | 30.03 | 39 | 47.03 | 44.6 | 45.34 | 44.02 | 50.81 | 58.07 | 59.87 | 61.27 | 65.66 | 72.4 | 77.31 |
| 0 | 6 | 5 | 8 | 0 | 37.19 | 37.59 | 37.21 | 39.68 | 48.3 | 56.08 | 54.39 | 54.03 | 51.95 | 55.23 | 58.89 | 60.05 | 61.5 | 65.89 | 72.49 | 77.46 |
| 0 | 6 | 255 | 0 | 0 | 3.13 | 2.52 | 2.52 | 2.78 | 7.19 | 36.19 | 58.49 | 64.79 | 66.04 | 73.58 | 79.86 | 80.75 | 80.62 | 80.64 | 80.35 | 80.55 |
| 0 | 6 | 255 | 4 | 0 | 3.16 | 2.51 | 2.5 | 2.84 | 7.29 | 35.39 | 55.22 | 59.8 | 59.65 | 64.54 | 68.98 | 70.04 | 70.91 | 73.45 | 76.71 | 79.26 |
| 0 | 6 | 73 | 0 | 0 | 6.18 | 4.87 | 4.61 | 5.79 | 15.16 | 49.77 | 61.76 | 65.42 | 65.99 | 73.84 | 80.59 | 81.45 | 81.21 | 81.18 | 80.81 | 80.86 |
| 0 | 6 | 255 | 18 | 0 | 2.89 | 2.42 | 2.31 | 2.66 | 6.9 | 32.1 | 46.52 | 47.71 | 45.41 | 46.29 | 48.06 | 49.25 | 51.16 | 56.83 | 66.58 | 75.04 |
| 0 | 6 | 255 | 10 | 0 | 3.19 | 2.52 | 2.52 | 2.83 | 7.3 | 34.15 | 51.09 | 53.92 | 52.58 | 55.25 | 58.19 | 59.36 | 60.97 | 65.51 | 72.47 | 78.01 |
| 0 | 6 | 73 | 10 | 0 | 5.95 | 4.45 | 4.28 | 5.37 | 14.46 | 43.61 | 51.31 | 51.89 | 49.78 | 52.29 | 55.22 | 56.41 | 58.1 | 63.12 | 71.01 | 77.05 |
| 0 | 6 | 22 | 0 | 0 | 16.24 | 13.45 | 13 | 15.81 | 30.96 | 59.2 | 63.09 | 65.51 | 65.7 | 73.46 | 80.22 | 81.08 | 80.83 | 80.89 | 80.75 | 80.83 |
| 0 | 6 | 37 | 0 | 0 | 11.38 | 9.29 | 8.94 | 10.98 | 24.04 | 56.25 | 63.12 | 65.81 | 66.08 | 73.35 | 79.55 | 80.3 | 80.01 | 79.92 | 79.75 | 79.58 |
| 0 | 6 | 37 | 4 | 0 | 11.06 | 9.1 | 8.75 | 10.79 | 23.57 | 53.08 | 58.31 | 59.72 | 58.71 | 63.71 | 68.32 | 69.33 | 70.12 | 72.7 | 76.17 | 78.64 |
| 0 | 24 | 255 | 0 | 0 | 3.11 | 2.53 | 2.44 | 2.81 | 7.24 | 31.34 | 41.57 | 45.71 | 46.45 | 60.14 | 77.03 | 80.12 | 79.94 | 79.72 | 79.2 | 79.31 |
| 0 | 24 | 255 | 4 | 0 | 3.12 | 2.63 | 2.52 | 2.92 | 7.45 | 31.01 | 40.41 | 43.79 | 43.95 | 54.7 | 67.32 | 70.03 | 70.87 | 73.2 | 76.26 | 78.66 |

TABLE 1-continued

First set of 969 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 24 | 73 | 0 | 0 | 6.21 | 4.57 | 4.39 | 5.5 | 14.27 | 37.25 | 39.53 | 42.77 | 43.29 | 58.13 | 77.14 | 80.68 | 80.48 | 80.21 | 79.78 | 79.81 |
| 0 | 13 | 255 | 4 | 0 | 3.32 | 2.7 | 2.67 | 3.03 | 7.73 | 34.12 | 48.67 | 52.59 | 52.54 | 60.66 | 68.75 | 70.42 | 71.24 | 73.59 | 76.65 | 79.02 |
| 0 | 13 | 73 | 0 | 0 | 6.72 | 5.16 | 4.98 | 6.08 | 15.21 | 43.7 | 50 | 53.54 | 54.07 | 66.12 | 78.51 | 80.43 | 80.19 | 80.01 | 79.6 | 79.69 |
| 0 | 13 | 73 | 4 | 0 | 6.43 | 5.02 | 4.74 | 5.93 | 14.9 | 41.84 | 47.19 | 49.68 | 49.33 | 58.4 | 67.75 | 69.58 | 70.34 | 72.77 | 76.03 | 78.46 |
| 0 | 6 | 73 | 4 | 0 | 6.42 | 4.88 | 4.75 | 5.87 | 15.12 | 46.92 | 56.74 | 58.87 | 58.04 | 63.02 | 67.56 | 68.62 | 69.46 | 72.1 | 75.67 | 78.29 |
| 0 | 160 | 255 | 0 | 0 | 3.46 | 2.65 | 2.58 | 2.97 | 6.73 | 13.28 | 12.12 | 13.39 | 13.61 | 22.96 | 53.77 | 76.17 | 79.61 | 79.66 | 79.1 | 79.24 |
| 0 | 160 | 255 | 4 | 0 | 3.49 | 2.73 | 2.54 | 3.02 | 6.75 | 13.19 | 12.02 | 13.26 | 13.45 | 22.43 | 50.22 | 68.35 | 71.64 | 73.88 | 76.59 | 78.84 |
| 0 | 93 | 73 | 0 | 0 | 7.39 | 5.34 | 5.01 | 6.06 | 11.84 | 17.36 | 15.3 | 16.91 | 17.19 | 29.04 | 62.74 | 78.99 | 80.5 | 80.24 | 79.75 | 79.78 |
| 0 | 160 | 255 | 18 | 0 | 3.73 | 2.76 | 2.66 | 3.12 | 6.89 | 13.32 | 12.15 | 13.3 | 13.36 | 21.34 | 40.88 | 50.29 | 52.91 | 57.9 | 66.75 | 74.66 |
| 0 | 160 | 255 | 10 | 0 | 3.77 | 2.96 | 2.85 | 3.3 | 7.09 | 13.61 | 12.46 | 13.79 | 13.79 | 22.37 | 45.89 | 59.09 | 62.09 | 66.17 | 72.46 | 77.56 |
| 0 | 93 | 73 | 10 | 0 | 7.35 | 5.38 | 5.02 | 6.11 | 11.82 | 17.08 | 15.06 | 16.46 | 16.56 | 26.47 | 48.91 | 57.75 | 59.9 | 64.3 | 71.34 | 76.75 |
| 0 | 40 | 22 | 0 | 0 | 17.28 | 14.4 | 13.59 | 15.39 | 24.28 | 33.08 | 30.19 | 32.83 | 33.3 | 49.49 | 75.78 | 81.94 | 81.9 | 81.57 | 81.09 | 81.04 |
| 0 | 58 | 37 | 0 | 0 | 10.71 | 8.06 | 7.47 | 9.02 | 16.53 | 23.87 | 21.24 | 23.42 | 23.81 | 38.83 | 70.43 | 80.22 | 80.6 | 80.25 | 79.72 | 79.64 |
| 0 | 58 | 37 | 4 | 0 | 10.94 | 8.26 | 7.73 | 9.3 | 16.84 | 24.07 | 21.55 | 23.52 | 23.73 | 36.9 | 62.01 | 69.51 | 70.76 | 73.23 | 76.8 | 79.34 |
| 0 | 58 | 255 | 0 | 0 | 3.33 | 2.63 | 2.56 | 2.97 | 7.67 | 24.66 | 27.12 | 29.69 | 30.19 | 44.13 | 72.63 | 81.57 | 82.05 | 81.79 | 81.21 | 81.21 |
| 0 | 58 | 255 | 4 | 0 | 3.22 | 2.51 | 2.5 | 2.86 | 7.28 | 23.7 | 26.07 | 28.43 | 28.74 | 41.16 | 63.99 | 70.85 | 72.05 | 74.25 | 77.25 | 79.52 |
| 0 | 40 | 73 | 0 | 0 | 6.07 | 4.5 | 4.29 | 5.31 | 13.01 | 29.79 | 29.58 | 32.38 | 32.91 | 48.83 | 75.11 | 81.45 | 81.48 | 81.18 | 80.72 | 80.61 |
| 0 | 93 | 255 | 4 | 0 | 3.54 | 2.71 | 2.61 | 3.1 | 7.74 | 19.1 | 18.86 | 20.58 | 20.82 | 31.53 | 57.83 | 69.54 | 71.52 | 73.83 | 76.85 | 79.24 |
| 0 | 58 | 73 | 0 | 0 | 6.4 | 4.66 | 4.38 | 5.48 | 12.52 | 23.89 | 22.37 | 24.64 | 25.08 | 39.98 | 71.72 | 81.79 | 82.24 | 81.82 | 81.21 | 81.01 |
| 0 | 58 | 73 | 4 | 0 | 6.85 | 5.01 | 4.7 | 5.88 | 13.3 | 24.87 | 23.32 | 25.4 | 25.59 | 38.72 | 62.62 | 69.4 | 70.51 | 72.86 | 76.14 | 78.51 |
| 0 | 93 | 73 | 4 | 0 | 7.74 | 5.7 | 5.26 | 6.43 | 12.5 | 18.31 | 16.18 | 17.79 | 18.01 | 29.46 | 57.97 | 69.9 | 71.73 | 73.94 | 76.97 | 79.2 |
| 0 | 6 | 5 | 41 | 0 | 28.84 | 27.98 | 27.26 | 28.89 | 34.2 | 37.68 | 35.38 | 32.82 | 29.3 | 28.76 | 29.63 | 30.68 | 32.73 | 39.56 | 53.79 | 68.94 |
| 0 | 6 | 15 | 30 | 0 | 19.26 | 17.02 | 16.43 | 18.91 | 29.31 | 40.91 | 39.93 | 37.8 | 34.35 | 34.18 | 35.35 | 36.43 | 38.52 | 45.31 | 58.48 | 71.21 |
| 0 | 6 | 8 | 21 | 0 | 28.76 | 27.43 | 26.88 | 29.41 | 38.67 | 47.18 | 45.61 | 43.82 | 40.6 | 41.14 | 42.79 | 43.94 | 45.98 | 52.36 | 63.92 | 74.14 |
| 0 | 6 | 37 | 23 | 0 | 11.06 | 8.87 | 8.5 | 10.49 | 21.67 | 42.4 | 44.13 | 42.61 | 39.37 | 39.65 | 41.1 | 42.22 | 44.3 | 50.8 | 62.77 | 73.7 |
| 0 | 6 | 15 | 8 | 0 | 21.72 | 19.76 | 19.34 | 22.3 | 35.73 | 54.13 | 54.82 | 54.71 | 52.68 | 55.71 | 59.01 | 60.08 | 61.45 | 65.69 | 72.04 | 76.87 |
| 0 | 24 | 37 | 8 | 0 | 10.77 | 8.52 | 8.08 | 9.98 | 20.46 | 37.04 | 36.27 | 38 | 37.41 | 46.97 | 58.18 | 60.74 | 62.1 | 66.11 | 72.24 | 76.86 |
| 0 | 13 | 37 | 15 | 0 | 11.22 | 9.09 | 8.77 | 10.62 | 21.44 | 40.92 | 41.78 | 42.07 | 40.2 | 44.45 | 49.14 | 50.68 | 52.47 | 58.02 | 67.37 | 75.01 |
| 0 | 13 | 22 | 8 | 0 | 16.76 | 14.26 | 13.73 | 16.23 | 28.48 | 46.06 | 45.8 | 46.86 | 45.62 | 52.3 | 59.23 | 60.94 | 62.31 | 66.51 | 72.9 | 77.74 |
| 0 | 6 | 22 | 15 | 0 | 16.12 | 13.62 | 13.21 | 15.81 | 28.65 | 48.22 | 49.29 | 48.32 | 45.51 | 46.87 | 49.03 | 50.16 | 52.03 | 57.73 | 67.27 | 75.12 |
| 0 | 13 | 8 | 21 | 0 | 27.83 | 26.08 | 25.27 | 27.22 | 34.85 | 40.98 | 38.55 | 37.85 | 35.46 | 38.34 | 41.91 | 43.33 | 45.34 | 51.7 | 63.28 | 73.53 |
| 0 | 13 | 22 | 0 | 0 | 17.65 | 15.27 | 14.79 | 17.31 | 30.12 | 50.5 | 50.96 | 53.72 | 54.08 | 66.03 | 78.66 | 80.62 | 80.33 | 80.15 | 79.75 | 79.76 |
| 0 | 24 | 15 | 8 | 0 | 21.86 | 19.3 | 18.48 | 20.47 | 29.62 | 38.61 | 36.04 | 37.55 | 36.89 | 46.45 | 57.9 | 60.55 | 61.96 | 66.21 | 72.8 | 77.65 |
| 0 | 24 | 22 | 0 | 0 | 16.7 | 13.92 | 13.33 | 15.57 | 26.84 | 41.27 | 39.51 | 42.3 | 42.74 | 57.65 | 77.18 | 80.85 | 80.6 | 80.34 | 79.91 | 79.82 |
| 0 | 24 | 37 | 0 | 0 | 11.24 | 8.88 | 8.47 | 10.33 | 21.23 | 40.02 | 39.65 | 42.61 | 43.11 | 58.09 | 77.79 | 81.51 | 81.25 | 81.2 | 80.86 | 80.92 |
| 0 | 24 | 22 | 8 | 0 | 16.04 | 13.21 | 12.54 | 14.75 | 25.16 | 37.4 | 35.44 | 37.05 | 36.41 | 46.07 | 57.62 | 60.37 | 61.86 | 66.28 | 73.08 | 78.21 |
| 0 | 13 | 15 | 8 | 0 | 21.17 | 18.64 | 17.97 | 20.67 | 32.52 | 46.44 | 45.23 | 46.1 | 44.79 | 51.28 | 58.13 | 59.86 | 61.28 | 65.67 | 72.33 | 77.31 |
| 0 | 24 | 15 | 30 | 0 | 19.28 | 16.57 | 15.73 | 17.68 | 25.39 | 31.64 | 29.12 | 28.92 | 27.01 | 30.71 | 35.09 | 36.71 | 38.8 | 45.54 | 58.79 | 71.61 |
| 0 | 58 | 37 | 23 | 0 | 10.93 | 8.36 | 7.8 | 9.31 | 16.15 | 22.22 | 19.88 | 21.01 | 20.53 | 28.35 | 39.61 | 42.88 | 44.93 | 51.17 | 62.93 | 73.6 |
| 0 | 40 | 37 | 15 | 0 | 10.66 | 8.28 | 7.8 | 9.49 | 18.06 | 28.59 | 26.69 | 28.06 | 27.47 | 36.13 | 47.4 | 50.39 | 52.28 | 57.97 | 67.74 | 75.71 |
| 0 | 40 | 22 | 15 | 0 | 15.57 | 12.71 | 11.95 | 13.85 | 21.98 | 28.96 | 26.25 | 27.56 | 26.92 | 35.68 | 47.07 | 50.1 | 52.06 | 57.89 | 67.98 | 76.22 |
| 0 | 24 | 255 | 18 | 0 | 2.92 | 2.37 | 2.32 | 2.64 | 6.81 | 27.53 | 34.69 | 36.36 | 35.31 | 40.66 | 46.81 | 48.72 | 50.61 | 56.18 | 66.02 | 74.64 |
| 0 | 58 | 255 | 18 | 0 | 3.3 | 2.6 | 2.51 | 2.94 | 7.6 | 24.5 | 26.95 | 28.65 | 28.29 | 36.6 | 48.23 | 51.55 | 53.46 | 58.67 | 67.62 | 75.33 |
| 0 | 40 | 255 | 10 | 0 | 3.09 | 2.45 | 2.36 | 2.79 | 7.16 | 27.25 | 32.67 | 35.05 | 34.8 | 44.37 | 56.83 | 60 | 61.6 | 65.81 | 72.22 | 77.31 |
| 0 | 24 | 37 | 23 | 0 | 10.54 | 8.26 | 7.83 | 9.58 | 18.95 | 32.53 | 31.43 | 31.73 | 30.06 | 34.8 | 40.27 | 42.04 | 44.05 | 50.5 | 62.48 | 73.23 |

TABLE 2

First set of 35 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 0 | 0 | 255 | 0 | 3.35 | 3.13 | 2.93 | 2.91 | 2.87 | 2.75 | 2.46 | 2.18 | 1.99 | 1.92 | 1.94 | 1.98 | 2.06 | 2.4 | 4.14 | 10.85 |
| 0 | 0 | 0 | 0 | 0 | 62.32 | 73.54 | 77.06 | 78.8 | 79.66 | 79.86 | 79.49 | 78.87 | 77.9 | 77.68 | 77.52 | 77.38 | 77.34 | 77.74 | 77.95 | 78.58 |
| 0 | 0 | 255 | 0 | 0 | 3.24 | 2.62 | 2.52 | 2.91 | 7.54 | 39.24 | 70.03 | 77.05 | 78.27 | 78.88 | 79.07 | 79.03 | 78.91 | 79.06 | 78.77 | 79.21 |
| 255 | 0 | 255 | 0 | 0 | 4.01 | 3.17 | 3.07 | 3.72 | 9.43 | 25.25 | 24.84 | 19.21 | 13.87 | 9.91 | 7.13 | 5.2 | 4.22 | 3.8 | 3.51 | 3.94 |
| 255 | 0 | 0 | 0 | 0 | 21.87 | 29.58 | 35.39 | 42.51 | 36.99 | 28.41 | 20.9 | 14.75 | 9.9 | 6.65 | 4.61 | 3.35 | 2.79 | 2.55 | 2.41 | 2.66 |
| 255 | 0 | 0 | 0 | 255 | 15.23 | 16.83 | 15.68 | 12.44 | 8.4 | 5.49 | 3.68 | 2.86 | 2.47 | 2.47 | 2.69 | 2.94 | 3.21 | 3.25 | 3.1 | 3.46 |
| 0 | 0 | 0 | 0 | 255 | 14.61 | 14.55 | 12.1 | 8.22 | 5.05 | 3.23 | 2.37 | 2.08 | 1.97 | 2.03 | 2.3 | 3.3 | 8.59 | 26.35 | 53.31 | 70.27 |
| 0 | 255 | 0 | 0 | 255 | 17.29 | 16.22 | 12.09 | 7.87 | 5.03 | 3.59 | 2.73 | 2.49 | 2.33 | 2.59 | 3.58 | 5.82 | 13.28 | 29.99 | 50.99 | 66.51 |
| 0 | 255 | 0 | 0 | 0 | 28.47 | 25.36 | 16.91 | 10.68 | 7.07 | 5.51 | 4.46 | 4.94 | 5.04 | 9.98 | 31.6 | 57.25 | 66.65 | 70.23 | 72.99 | 76.05 |
| 0 | 255 | 255 | 0 | 0 | 4.27 | 3.15 | 2.93 | 3.39 | 5.81 | 6.22 | 6.92 | 7.05 | 13.01 | 32.08 | 46.39 | 51.52 | 55.91 | 62.11 | 70.12 |
| 0 | 0 | 0 | 62 | 0 | 27.92 | 27.96 | 27.15 | 27.48 | 28.15 | 27.98 | 25.7 | 22.45 | 19.01 | 17.43 | 17.44 | 18.17 | 19.79 | 25.64 | 39.88 | 59.45 |
| 0 | 0 | 255 | 26 | 0 | 3.05 | 2.5 | 2.45 | 2.77 | 7.04 | 32.1 | 47.01 | 46.53 | 42.99 | 41.07 | 41.06 | 41.96 | 43.88 | 49.82 | 60.85 | 71.6 |
| 255 | 0 | 255 | 26 | 0 | 3.71 | 2.94 | 2.82 | 3.42 | 8.76 | 23.22 | 22.84 | 17.72 | 12.76 | 9.11 | 6.57 | 4.79 | 3.88 | 3.49 | 3.26 | 3.67 |
| 0 | 0 | 15 | 0 | 0 | 23.84 | 21.69 | 21.51 | 25.03 | 42.2 | 72.74 | 79.78 | 80.49 | 80 | 79.67 | 79.07 | 78.32 | 77.59 | 77.36 | 76.89 | 77.47 |
| 58 | 0 | 15 | 0 | 0 | 19.86 | 17.4 | 17.13 | 21.06 | 38.47 | 63.54 | 61.97 | 53.23 | 42.82 | 33.66 | 26.23 | 20.25 | 16.77 | 15 | 13.8 | 15.56 |

TABLE 2-continued

First set of 35 patches
(reference condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 58 | 0 | 255 | 0 | 0 | 3.1 | 2.59 | 2.46 | 2.83 | 7.58 | 36.64 | 57.16 | 54.23 | 45.73 | 37.5 | 30.56 | 24.8 | 21.3 | 19.47 | 18.16 | 19.94 |
| 255 | 0 | 0 | 26 | 0 | 21.04 | 26.97 | 30.81 | 35.38 | 32.05 | 25.83 | 19.5 | 13.94 | 9.42 | 6.4 | 4.51 | 3.34 | 2.82 | 2.62 | 2.51 | 2.73 |
| 58 | 0 | 0 | 0 | 0 | 51.17 | 64.2 | 70.32 | 75.16 | 74.06 | 69.47 | 62.05 | 52.53 | 41.9 | 32.66 | 25.15 | 19.16 | 15.7 | 13.93 | 12.76 | 14.56 |
| 255 | 0 | 15 | 0 | 0 | 14.63 | 14.58 | 15.05 | 18.75 | 26.9 | 27.82 | 20.99 | 14.8 | 9.9 | 6.63 | 4.6 | 3.38 | 2.83 | 2.6 | 2.5 | 2.74 |
| 255 | 0 | 0 | 26 | 255 | 13.86 | 15.19 | 13.94 | 10.9 | 7.3 | 4.73 | 3.2 | 2.56 | 2.29 | 2.28 | 2.45 | 2.67 | 2.91 | 2.95 | 2.83 | 3.2 |
| 58 | 0 | 0 | 0 | 50 | 42.96 | 49.6 | 45.45 | 37.32 | 28.81 | 23.82 | 19.67 | 19.91 | 18.14 | 20.69 | 20.48 | 16.29 | 13.5 | 12.08 | 11.13 | 12.52 |
| 255 | 0 | 0 | 0 | 50 | 23 | 29.41 | 32.04 | 32.37 | 26.25 | 20.81 | 16.02 | 12.91 | 9.42 | 7.09 | 5.17 | 3.74 | 3.07 | 2.78 | 2.62 | 2.92 |
| 0 | 0 | 0 | 26 | 255 | 13.93 | 13.52 | 11.26 | 7.79 | 4.84 | 3.14 | 2.34 | 2.07 | 1.98 | 2.03 | 2.28 | 3.18 | 7.95 | 22.64 | 45.18 | 65.07 |
| 0 | 0 | 0 | 0 | 50 | 49.84 | 56.02 | 49.24 | 38.94 | 29.95 | 24.98 | 20.89 | 22.18 | 21.52 | 29.6 | 37.36 | 33.01 | 28.8 | 26.42 | 24.72 | 26.85 |
| 58 | 0 | 0 | 0 | 255 | 16.15 | 16.23 | 13.85 | 9.78 | 6.17 | 3.93 | 2.74 | 2.31 | 2.13 | 2.2 | 2.56 | 3.66 | 7.73 | 14.33 | 16.94 | 19.35 |
| 0 | 255 | 0 | 26 | 255 | 17.88 | 16.74 | 12.67 | 8.4 | 5.44 | 3.88 | 2.95 | 2.67 | 2.49 | 2.79 | 3.86 | 6.18 | 13.42 | 27.69 | 44.55 | 60.64 |
| 0 | 40 | 0 | 0 | 50 | 47.19 | 51.15 | 42.17 | 31.5 | 23.34 | 19.08 | 15.71 | 16.97 | 16.67 | 25.15 | 36.37 | 33.2 | 29.04 | 26.66 | 24.93 | 27.05 |
| 0 | 40 | 0 | 0 | 255 | 15.89 | 15.67 | 13.02 | 8.93 | 5.53 | 3.55 | 2.53 | 2.17 | 2.03 | 2.11 | 2.49 | 3.7 | 9.6 | 27.65 | 54.19 | 70.93 |
| 0 | 255 | 0 | 26 | 0 | 26.78 | 23.94 | 16.42 | 10.59 | 7.05 | 5.45 | 4.37 | 4.84 | 4.9 | 9.47 | 25.7 | 37.17 | 41.04 | 46.59 | 56.89 | 68.19 |
| 0 | 40 | 0 | 0 | 0 | 57.66 | 64.6 | 58.83 | 48.74 | 39.22 | 33.7 | 29.05 | 31.45 | 31.86 | 47.94 | 73.86 | 79.54 | 79.05 | 78.36 | 77.6 | 77.85 |
| 0 | 255 | 0 | 0 | 50 | 29.05 | 26.33 | 18.03 | 11.67 | 7.76 | 6.01 | 4.81 | 5.35 | 5.42 | 10.45 | 26.57 | 33.47 | 32.11 | 30.74 | 29.66 | 31.81 |
| 0 | 255 | 255 | 26 | 0 | 3.93 | 2.92 | 2.74 | 3.16 | 5.49 | 7.06 | 5.92 | 6.56 | 6.63 | 11.94 | 26.88 | 35.33 | 38.36 | 43.01 | 51.71 | 63.13 |
| 0 | 40 | 15 | 0 | 0 | 22.55 | 19.82 | 18.52 | 19.77 | 26.77 | 32.37 | 28.97 | 31.55 | 31.97 | 47.99 | 73.36 | 78.8 | 78.36 | 77.72 | 77.04 | 77.31 |
| 0 | 255 | 15 | 0 | 0 | 18.52 | 15.01 | 11.27 | 8.51 | 6.51 | 5.23 | 4.22 | 4.69 | 4.78 | 9.64 | 31.09 | 56.15 | 64.83 | 68.05 | 70.56 | 73.82 |
| 0 | 40 | 255 | 0 | 0 | 3.27 | 2.63 | 2.58 | 2.95 | 7.48 | 27.57 | 33.16 | 36.37 | 36.93 | 50.85 | 72.62 | 77.37 | 77.12 | 76.9 | 76.61 | 77.43 |

TABLE 3

Second set of 35 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 0 | 0 | 255 | 0 | 3.76 | 3.47 | 3.33 | 3.28 | 3.25 | 3.11 | 2.76 | 2.42 | 2.18 | 2.1 | 2.11 | 2.17 | 2.25 | 2.67 | 4.7 | 12.36 |
| 0 | 0 | 0 | 0 | 0 | 62.73 | 74.31 | 77.94 | 79.63 | 80.34 | 80.5 | 80.16 | 79.56 | 78.62 | 78.36 | 78.1 | 78 | 77.97 | 78.38 | 78.47 | 78.95 |
| 0 | 0 | 255 | 0 | 0 | 3.63 | 2.89 | 2.79 | 3.26 | 8.85 | 42.86 | 71.43 | 77.67 | 78.62 | 79.04 | 79.03 | 78.9 | 78.75 | 78.87 | 78.53 | 78.87 |
| 255 | 0 | 255 | 0 | 0 | 4.16 | 3.24 | 3.12 | 3.86 | 9.91 | 27.5 | 27.36 | 20.92 | 14.9 | 10.53 | 7.49 | 5.39 | 4.35 | 3.88 | 3.59 | 4.06 |
| 255 | 0 | 0 | 0 | 0 | 25.69 | 34.72 | 41.41 | 49.47 | 44.11 | 34.64 | 25.68 | 18.24 | 12.32 | 8.32 | 5.72 | 4.06 | 3.27 | 2.94 | 2.75 | 3.09 |
| 255 | 0 | 0 | 0 | 255 | 16.59 | 18.36 | 17.09 | 13.47 | 9.01 | 5.81 | 3.81 | 2.92 | 2.5 | 2.5 | 2.76 | 3.04 | 3.35 | 3.4 | 3.23 | 3.66 |
| 0 | 0 | 0 | 0 | 255 | 18.19 | 18.42 | 15.59 | 10.9 | 6.82 | 4.31 | 2.98 | 2.48 | 2.27 | 2.37 | 2.87 | 4.47 | 11.89 | 33.51 | 60.5 | 73.96 |
| 0 | 255 | 0 | 0 | 255 | 18.81 | 17.51 | 12.98 | 8.38 | 5.32 | 3.76 | 2.82 | 2.54 | 2.35 | 2.68 | 3.86 | 6.45 | 15.13 | 35.53 | 59.99 | 72.6 |
| 0 | 255 | 0 | 0 | 0 | 31.22 | 27.98 | 18.57 | 11.71 | 7.74 | 6.03 | 4.87 | 5.42 | 5.53 | 11.16 | 37.31 | 69.22 | 78.01 | 78.91 | 78.47 | 78.82 |
| 0 | 255 | 255 | 0 | 0 | 4.68 | 3.45 | 3.21 | 3.74 | 6.33 | 8.04 | 6.81 | 7.59 | 7.72 | 14.41 | 40.36 | 69.5 | 77.36 | 78.44 | 78.26 | 78.76 |
| 0 | 0 | 0 | 62 | 0 | 33.37 | 34.28 | 33.72 | 34.34 | 35.18 | 35.08 | 32.6 | 28.95 | 24.96 | 23.11 | 23.12 | 23.99 | 25.93 | 32.6 | 47.39 | 64.76 |
| 0 | 0 | 255 | 26 | 0 | 3.59 | 2.78 | 2.75 | 3.2 | 8.47 | 36.25 | 52.07 | 52.09 | 48.67 | 46.82 | 46.79 | 47.64 | 49.59 | 55.44 | 65.27 | 73.82 |
| 255 | 0 | 255 | 26 | 0 | 4.01 | 3.1 | 2.96 | 3.73 | 9.56 | 25.6 | 25.29 | 19.44 | 13.9 | 9.87 | 7.06 | 5.1 | 4.1 | 3.68 | 3.41 | 3.87 |
| 0 | 0 | 15 | 0 | 0 | 31.26 | 29.82 | 29.87 | 33.88 | 50.55 | 74.82 | 80.28 | 80.75 | 80.04 | 79.64 | 78.93 | 78.11 | 77.51 | 77.3 | 76.82 | 77.4 |
| 58 | 0 | 15 | 0 | 0 | 26.03 | 24.46 | 24.52 | 29.03 | 46.05 | 67.16 | 66.52 | 59.4 | 49.98 | 40.98 | 33.08 | 26.41 | 22.4 | 20.29 | 18.81 | 21.03 |
| 58 | 0 | 255 | 0 | 0 | 3.59 | 2.68 | 2.63 | 3.15 | 8.84 | 40.78 | 61.2 | 59.09 | 51.22 | 42.96 | 35.53 | 29.16 | 25.25 | 23.2 | 21.7 | 23.79 |
| 255 | 0 | 0 | 26 | 0 | 24.42 | 31.24 | 35.72 | 41.14 | 37.94 | 31.11 | 23.65 | 17.01 | 11.58 | 7.9 | 5.49 | 3.93 | 3.2 | 2.92 | 2.75 | 3.1 |
| 58 | 0 | 0 | 0 | 0 | 55.11 | 67.35 | 72.82 | 76.84 | 76.32 | 73.19 | 67.61 | 59.78 | 50.19 | 41.21 | 33.22 | 26.47 | 22.38 | 20.22 | 18.76 | 21.06 |
| 255 | 0 | 15 | 0 | 0 | 17.82 | 18.59 | 19.59 | 24.08 | 32.72 | 33.56 | 25.44 | 17.96 | 12.04 | 8.08 | 5.56 | 3.97 | 3.24 | 2.94 | 2.77 | 3.09 |
| 255 | 0 | 0 | 26 | 255 | 15.43 | 16.73 | 15.46 | 12.12 | 8.04 | 5.15 | 3.38 | 2.63 | 2.29 | 2.3 | 2.53 | 2.77 | 3.08 | 3.14 | 3.01 | 3.44 |
| 58 | 0 | 0 | 0 | 50 | 46.64 | 54.38 | 51.11 | 43.14 | 34.08 | 28.53 | 23.71 | 23.97 | 21.85 | 24.88 | 24.61 | 19.58 | 16.25 | 14.51 | 13.31 | 15.09 |
| 255 | 0 | 0 | 0 | 50 | 25.51 | 32.92 | 35.93 | 36.26 | 29.21 | 23.06 | 17.66 | 14.29 | 10.43 | 7.89 | 5.71 | 4.04 | 3.25 | 2.92 | 2.72 | 3.07 |
| 0 | 0 | 0 | 26 | 255 | 17.08 | 16.83 | 14.26 | 10.09 | 6.36 | 4.04 | 2.82 | 2.38 | 2.21 | 2.29 | 2.72 | 4.12 | 10.62 | 28.45 | 52.11 | 69.23 |
| 0 | 0 | 0 | 0 | 50 | 52.82 | 60.35 | 54.88 | 45.15 | 35.79 | 30.39 | 25.81 | 27.32 | 26.59 | 35.83 | 44.15 | 39.59 | 35.04 | 32.41 | 30.47 | 32.98 |
| 58 | 0 | 0 | 0 | 255 | 18 | 18.22 | 15.56 | 10.98 | 6.88 | 4.31 | 2.91 | 2.37 | 2.15 | 2.24 | 2.71 | 4.08 | 9.06 | 16.98 | 20.11 | 23.1 |
| 0 | 255 | 0 | 26 | 255 | 18.08 | 16.95 | 12.79 | 8.47 | 5.45 | 3.87 | 2.93 | 2.63 | 2.43 | 2.73 | 3.83 | 6.25 | 14.15 | 31.33 | 52.48 | 67.75 |
| 0 | 40 | 0 | 0 | 50 | 51.3 | 56.9 | 48.9 | 37.85 | 28.71 | 23.79 | 19.81 | 21.4 | 21.1 | 31.39 | 44.08 | 40.73 | 36.19 | 33.49 | 31.54 | 34.05 |
| 0 | 40 | 0 | 0 | 255 | 18.32 | 18.3 | 15.3 | 10.63 | 6.63 | 4.23 | 2.93 | 2.46 | 2.25 | 2.35 | 2.86 | 4.49 | 11.89 | 33.19 | 59.82 | 73.1 |
| 0 | 255 | 0 | 26 | 0 | 29.64 | 26.65 | 18.33 | 11.93 | 8.03 | 6.29 | 5.07 | 5.61 | 5.69 | 11.03 | 30.64 | 45.62 | 49.89 | 55.45 | 64.9 | 73.38 |
| 0 | 40 | 0 | 0 | 0 | 59.66 | 68.36 | 64.77 | 56.35 | 47.44 | 41.97 | 37.11 | 39.63 | 40 | 55.62 | 76.31 | 80.04 | 79.47 | 78.85 | 78.14 | 78.22 |
| 0 | 255 | 0 | 0 | 50 | 31.18 | 28.39 | 19.3 | 12.44 | 8.35 | 6.51 | 5.23 | 5.81 | 5.88 | 11.43 | 30.84 | 40.34 | 38.07 | 35.64 | 33.76 | 35.9 |
| 0 | 255 | 255 | 26 | 0 | 4.63 | 3.33 | 3.08 | 3.59 | 6.11 | 7.79 | 6.57 | 7.3 | 7.39 | 13.49 | 33.06 | 46.95 | 50.8 | 55.71 | 63.91 | 71.68 |
| 0 | 40 | 15 | 0 | 0 | 28.42 | 26.47 | 25.31 | 26.88 | 34.45 | 40.46 | 37.24 | 39.95 | 40.34 | 55.79 | 76.15 | 79.75 | 79.13 | 78.5 | 77.75 | 77.83 |
| 0 | 255 | 15 | 0 | 0 | 21.18 | 17.75 | 13.25 | 9.86 | 7.5 | 6.08 | 4.93 | 5.49 | 5.59 | 11.24 | 37.41 | 68.65 | 76.95 | 77.67 | 77.1 | 77.6 |
| 0 | 40 | 255 | 0 | 0 | 3.39 | 2.66 | 2.54 | 3 | 8.21 | 30.64 | 37.13 | 40.86 | 41.5 | 56.12 | 75.39 | 78.95 | 78.53 | 78.14 | 77.5 | 77.86 |

TABLE 4

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 0 | 0 | 255 | 0 | 3.76 | 3.47 | 3.33 | 3.28 | 3.25 | 3.11 | 2.76 | 2.42 | 2.18 | 2.1 | 2.11 | 2.17 | 2.25 | 2.67 | 4.7 | 12.36 |
| 0 | 0 | 0 | 0 | 0 | 62.73 | 74.31 | 77.94 | 79.63 | 80.34 | 80.5 | 80.16 | 79.56 | 78.62 | 78.36 | 78.1 | 78 | 77.97 | 78.38 | 78.47 | 78.95 |
| 0 | 0 | 255 | 0 | 0 | 3.63 | 2.89 | 2.79 | 3.26 | 8.85 | 42.86 | 71.43 | 77.67 | 78.62 | 79.04 | 79.03 | 78.9 | 78.75 | 78.87 | 78.53 | 78.87 |
| 255 | 0 | 255 | 0 | 0 | 4.16 | 3.24 | 3.12 | 3.86 | 9.91 | 27.5 | 27.36 | 20.92 | 14.9 | 10.53 | 7.49 | 5.39 | 4.35 | 3.88 | 3.59 | 4.06 |
| 255 | 0 | 0 | 0 | 0 | 25.69 | 34.72 | 41.41 | 49.47 | 44.11 | 34.64 | 25.68 | 18.24 | 12.32 | 8.32 | 5.72 | 4.06 | 3.27 | 2.94 | 2.75 | 3.09 |
| 255 | 0 | 0 | 0 | 255 | 16.59 | 18.36 | 17.09 | 13.47 | 9.01 | 5.81 | 3.81 | 2.92 | 2.5 | 2.5 | 2.76 | 3.04 | 3.35 | 3.4 | 3.23 | 3.66 |
| 0 | 0 | 0 | 0 | 255 | 18.19 | 18.42 | 15.59 | 10.9 | 6.82 | 4.31 | 2.98 | 2.48 | 2.27 | 2.37 | 2.87 | 4.47 | 11.89 | 33.51 | 60.5 | 73.96 |
| 0 | 255 | 0 | 0 | 255 | 18.81 | 17.51 | 12.98 | 8.38 | 5.32 | 3.76 | 2.82 | 2.54 | 2.35 | 2.68 | 3.86 | 6.45 | 15.13 | 35.53 | 59.99 | 72.6 |
| 0 | 255 | 0 | 0 | 0 | 31.22 | 27.98 | 18.57 | 11.71 | 7.74 | 6.03 | 4.87 | 5.42 | 5.53 | 11.16 | 37.31 | 69.22 | 78.01 | 78.91 | 78.47 | 78.82 |
| 0 | 255 | 255 | 0 | 0 | 4.68 | 3.45 | 3.21 | 3.74 | 6.33 | 8.04 | 6.81 | 7.59 | 7.72 | 14.41 | 40.36 | 69.5 | 77.36 | 78.44 | 78.26 | 78.76 |
| 0 | 0 | 0 | 62 | 0 | 33.37 | 34.28 | 33.72 | 34.34 | 35.18 | 35.08 | 32.6 | 28.95 | 24.96 | 23.11 | 23.12 | 23.99 | 25.93 | 32.6 | 47.39 | 64.76 |
| 0 | 0 | 255 | 26 | 0 | 3.59 | 2.78 | 2.75 | 3.2 | 8.47 | 36.25 | 52.07 | 52.09 | 48.67 | 46.82 | 46.79 | 47.64 | 49.59 | 55.44 | 65.27 | 73.82 |
| 255 | 0 | 255 | 26 | 0 | 4.01 | 3.1 | 2.96 | 3.73 | 9.56 | 25.6 | 25.29 | 19.44 | 13.9 | 9.87 | 7.06 | 5.1 | 4.1 | 3.68 | 3.41 | 3.87 |
| 0 | 0 | 15 | 0 | 0 | 31.26 | 29.82 | 29.87 | 33.88 | 50.55 | 74.82 | 80.28 | 80.75 | 80.04 | 79.64 | 78.93 | 78.17 | 77.51 | 77.3 | 76.82 | 77.4 |
| 58 | 0 | 15 | 0 | 0 | 26.03 | 24.46 | 24.52 | 29.03 | 46.05 | 67.16 | 66.52 | 59.4 | 49.98 | 40.98 | 33.08 | 26.41 | 22.4 | 20.29 | 18.81 | 21.03 |
| 58 | 0 | 255 | 0 | 0 | 3.59 | 2.68 | 2.63 | 3.15 | 8.84 | 40.78 | 61.2 | 59.09 | 51.22 | 42.96 | 35.53 | 29.16 | 25.25 | 23.2 | 21.7 | 23.79 |
| 255 | 0 | 0 | 26 | 0 | 24.42 | 31.24 | 35.72 | 41.14 | 37.94 | 31.11 | 23.65 | 17.01 | 11.58 | 7.9 | 5.49 | 3.93 | 3.2 | 2.92 | 2.75 | 3.1 |
| 58 | 0 | 0 | 0 | 0 | 55.11 | 67.35 | 72.82 | 76.84 | 76.32 | 73.19 | 67.61 | 59.78 | 50.19 | 41.21 | 33.22 | 26.47 | 22.38 | 20.22 | 18.76 | 21.06 |
| 255 | 0 | 15 | 0 | 0 | 17.82 | 18.59 | 19.59 | 24.08 | 32.72 | 33.56 | 25.44 | 17.96 | 12.04 | 8.08 | 5.56 | 3.97 | 3.24 | 2.94 | 2.77 | 3.09 |
| 255 | 0 | 0 | 26 | 255 | 15.43 | 16.73 | 15.46 | 12.12 | 8.04 | 5.15 | 3.38 | 2.63 | 2.29 | 2.3 | 2.53 | 2.77 | 3.08 | 3.14 | 3.01 | 3.44 |
| 58 | 0 | 0 | 0 | 50 | 46.64 | 54.38 | 51.11 | 43.14 | 34.08 | 28.53 | 23.71 | 23.97 | 21.85 | 24.88 | 24.61 | 19.58 | 16.25 | 14.51 | 13.31 | 15.09 |
| 255 | 0 | 0 | 0 | 50 | 25.51 | 32.92 | 35.93 | 36.26 | 29.21 | 23.06 | 17.66 | 14.29 | 10.43 | 7.89 | 5.71 | 4.04 | 3.25 | 2.92 | 2.72 | 3.07 |
| 0 | 0 | 0 | 26 | 255 | 17.08 | 16.83 | 14.26 | 10.09 | 6.36 | 4.04 | 2.82 | 2.38 | 2.21 | 2.29 | 2.72 | 4.12 | 10.62 | 28.45 | 52.11 | 69.23 |
| 0 | 0 | 0 | 0 | 50 | 52.82 | 60.35 | 54.88 | 45.15 | 35.79 | 30.39 | 25.81 | 27.32 | 26.59 | 35.83 | 44.15 | 39.59 | 35.04 | 32.41 | 30.47 | 32.98 |
| 58 | 0 | 0 | 0 | 255 | 18 | 18.22 | 15.56 | 10.98 | 6.88 | 4.31 | 2.91 | 2.37 | 2.15 | 2.24 | 2.71 | 4.08 | 9.06 | 16.98 | 20.11 | 23.1 |
| 0 | 255 | 0 | 26 | 255 | 18.08 | 16.95 | 12.79 | 8.47 | 5.45 | 3.87 | 2.93 | 2.63 | 2.43 | 2.73 | 3.89 | 6.25 | 14.15 | 31.33 | 52.48 | 65.75 |
| 0 | 40 | 0 | 0 | 50 | 51.3 | 56.9 | 48.9 | 37.85 | 28.71 | 23.79 | 19.81 | 21.4 | 21.1 | 31.39 | 44.08 | 40.73 | 36.19 | 33.49 | 31.54 | 34.05 |
| 0 | 40 | 0 | 0 | 255 | 18.32 | 18.3 | 15.3 | 10.63 | 6.63 | 4.23 | 2.93 | 2.46 | 2.25 | 2.35 | 2.86 | 4.49 | 11.89 | 33.19 | 59.82 | 73.1 |
| 0 | 255 | 0 | 26 | 0 | 29.64 | 26.65 | 18.33 | 11.93 | 8.03 | 6.29 | 5.07 | 5.61 | 5.69 | 11.03 | 30.64 | 45.62 | 49.89 | 55.45 | 64.9 | 73.38 |
| 0 | 40 | 0 | 0 | 0 | 59.66 | 68.36 | 64.77 | 56.35 | 47.44 | 41.97 | 37.11 | 39.63 | 40 | 55.62 | 76.31 | 80.04 | 79.47 | 78.85 | 78.14 | 78.22 |
| 0 | 255 | 0 | 0 | 50 | 31.18 | 28.39 | 19.3 | 12.44 | 8.35 | 6.51 | 5.23 | 5.81 | 5.88 | 11.43 | 30.84 | 40.34 | 38.07 | 35.64 | 33.76 | 35.9 |
| 0 | 255 | 255 | 26 | 0 | 4.63 | 3.33 | 3.08 | 3.59 | 6.11 | 7.79 | 6.57 | 7.3 | 7.39 | 13.49 | 33.06 | 46.95 | 50.8 | 55.71 | 63.91 | 71.68 |
| 0 | 40 | 15 | 0 | 0 | 28.42 | 26.47 | 25.31 | 26.88 | 34.45 | 40.46 | 37.24 | 39.95 | 40.34 | 55.79 | 76.15 | 79.75 | 79.13 | 78.5 | 77.75 | 77.83 |
| 0 | 255 | 15 | 0 | 0 | 21.18 | 17.75 | 13.25 | 9.86 | 7.5 | 6.08 | 4.93 | 5.49 | 5.59 | 11.24 | 37.41 | 68.65 | 76.95 | 77.67 | 77.1 | 77.6 |
| 0 | 40 | 255 | 0 | 0 | 3.39 | 2.66 | 2.54 | 3 | 8.21 | 30.64 | 37.13 | 40.86 | 41.5 | 56.12 | 75.39 | 78.95 | 78.53 | 78.14 | 77.5 | 77.86 |
| 0 | 0 | 0 | 139 | 0 | 15.88 | 15.01 | 14.26 | 14.33 | 14.61 | 14.35 | 12.77 | 10.7 | 8.71 | 7.86 | 7.88 | 8.28 | 9.19 | 12.65 | 22.55 | 41.51 |
| 0 | 0 | 255 | 58 | 0 | 3.27 | 2.64 | 2.54 | 3 | 8.09 | 29.41 | 36.84 | 34.74 | 31 | 29.13 | 29.07 | 29.87 | 31.69 | 37.71 | 50.57 | 65.56 |
| 255 | 0 | 255 | 58 | 0 | 4.21 | 3.26 | 3.11 | 3.88 | 9.78 | 23.87 | 23.28 | 18.24 | 13.33 | 9.72 | 7.15 | 5.28 | 4.3 | 3.89 | 3.63 | 4.16 |
| 0 | 0 | 15 | 47 | 0 | 23.88 | 21.91 | 21.44 | 24.08 | 33.54 | 43.21 | 42.44 | 38.79 | 34.34 | 32.2 | 32.09 | 32.97 | 35.04 | 41.88 | 55.16 | 68.46 |
| 58 | 0 | 15 | 47 | 0 | 22.16 | 20.2 | 19.85 | 22.99 | 33.4 | 42.58 | 40.26 | 35.07 | 29.18 | 24.99 | 21.93 | 19.11 | 17.4 | 17.29 | 17.69 | 20.77 |
| 58 | 0 | 255 | 26 | 0 | 3.47 | 2.65 | 2.61 | 3.05 | 8.6 | 35.3 | 47.29 | 44.2 | 38.09 | 32.99 | 28.78 | 24.9 | 22.45 | 21.52 | 21.69 | 23.68 |
| 0 | 0 | 0 | 21 | 0 | 50.71 | 56.35 | 57.55 | 58.84 | 59.8 | 59.87 | 57.87 | 54.52 | 50.35 | 48.27 | 48.04 | 48.82 | 50.72 | 56.6 | 66.02 | 73.82 |
| 0 | 0 | 5 | 0 | 0 | 47.24 | 50.18 | 51.52 | 55.54 | 66.84 | 78.42 | 80.37 | 80.24 | 79.53 | 79.24 | 78.76 | 78.29 | 77.84 | 77.65 | 77.13 | 77.6 |
| 17 | 0 | 5 | 0 | 0 | 45.38 | 47.71 | 49.07 | 53.48 | 65.28 | 76.52 | 76.77 | 73.87 | 68.98 | 63.44 | 57.2 | 50.77 | 46.28 | 43.67 | 41.63 | 44.5 |
| 0 | 0 | 5 | 21 | 0 | 39.81 | 40.53 | 40.64 | 43.57 | 51.69 | 58.57 | 57.76 | 54.58 | 50.38 | 48.3 | 48.02 | 48.75 | 50.59 | 56.36 | 65.7 | 73.45 |
| 17 | 0 | 5 | 21 | 0 | 37.65 | 38.23 | 38.44 | 41.71 | 50.28 | 56.85 | 55.21 | 50.95 | 45.45 | 41.56 | 38.8 | 36.27 | 34.87 | 35.86 | 37.82 | 42.68 |
| 17 | 0 | 15 | 0 | 0 | 31.21 | 30.46 | 30.56 | 34.61 | 50.56 | 72.69 | 76.09 | 73.76 | 69.18 | 63.91 | 57.94 | 51.8 | 47.39 | 44.87 | 42.93 | 45.58 |
| 0 | 0 | 255 | 10 | 0 | 3.54 | 2.82 | 2.76 | 3.24 | 8.87 | 40.12 | 62.3 | 64.92 | 63 | 61.7 | 61.51 | 62.02 | 63.27 | 66.95 | 72.02 | 76.11 |
| 0 | 0 | 37 | 0 | 0 | 17.07 | 14.74 | 14.43 | 17.25 | 32.97 | 67.81 | 78.6 | 80.01 | 79.58 | 79.41 | 78.98 | 78.6 | 78.23 | 78.07 | 77.59 | 78 |
| 17 | 0 | 255 | 0 | 0 | 3.71 | 3 | 2.85 | 3.42 | 9.27 | 42.43 | 68.72 | 72.08 | 69.01 | 64.25 | 58.54 | 52.53 | 48.19 | 45.77 | 43.82 | 46.37 |
| 0 | 0 | 37 | 10 | 0 | 15.53 | 13.16 | 12.79 | 15.49 | 29.98 | 59.85 | 67.1 | 66.1 | 63.19 | 61.57 | 61.17 | 61.43 | 62.5 | 66.12 | 71.28 | 75.4 |
| 17 | 0 | 255 | 10 | 0 | 3.54 | 2.71 | 2.66 | 3.13 | 8.76 | 39.14 | 59.86 | 60.76 | 56.64 | 52.57 | 48.85 | 45.07 | 42.54 | 41.92 | 41.87 | 45.3 |
| 17 | 0 | 37 | 0 | 0 | 15.84 | 13.25 | 12.97 | 15.87 | 31.83 | 66.34 | 75.03 | 73.49 | 68.92 | 63.61 | 57.61 | 51.36 | 46.97 | 44.44 | 42.87 | 45.16 |
| 255 | 0 | 255 | 10 | 0 | 4.2 | 3.25 | 3.1 | 3.9 | 10.16 | 27.53 | 27.34 | 21.05 | 15.08 | 10.72 | 7.65 | 5.5 | 4.42 | 3.94 | 3.65 | 4.15 |
| 137 | 0 | 37 | 0 | 0 | 14.06 | 11.82 | 11.54 | 14.61 | 29.21 | 52.18 | 48.73 | 38.81 | 28.98 | 21.46 | 15.9 | 11.75 | 9.48 | 8.39 | 7.65 | 8.78 |
| 137 | 0 | 255 | 0 | 0 | 3.8 | 2.91 | 2.76 | 3.44 | 9.83 | 36.99 | 47.04 | 40.18 | 31.31 | 24.17 | 18.66 | 14.35 | 11.88 | 10.61 | 9.73 | 10.99 |
| 137 | 0 | 37 | 10 | 0 | 13.75 | 11.46 | 11.19 | 14.17 | 27.9 | 47.53 | 44.08 | 35.25 | 26.5 | 19.85 | 14.89 | 11.14 | 9.06 | 8.07 | 7.43 | 8.56 |
| 137 | 0 | 255 | 10 | 0 | 3.84 | 2.99 | 2.84 | 3.5 | 9.68 | 35.56 | 44.05 | 37.68 | 29.58 | 23.12 | 18.1 | 14.1 | 11.77 | 10.61 | 9.8 | 11.12 |
| 58 | 0 | 37 | 0 | 0 | 13.78 | 11.16 | 10.79 | 13.73 | 29.54 | 61.46 | 65.4 | 58.99 | 49.7 | 40.79 | 32.91 | 26.25 | 22.23 | 20.14 | 18.64 | 20.83 |
| 17 | 0 | 15 | 21 | 0 | 25.86 | 24.04 | 23.79 | 27.26 | 40.22 | 55.38 | 55.6 | 51.58 | 46.12 | 42.23 | 39.43 | 36.82 | 35.37 | 36.24 | 38.02 | 42.79 |
| 255 | 0 | 0 | 58 | 0 | 22.15 | 26.79 | 29.32 | 32.51 | 30.84 | 26.43 | 20.76 | 15.29 | 10.62 | 7.46 | 5.34 | 3.93 | 3.23 | 2.96 | 2.82 | 3.19 |
| 58 | 0 | 0 | 47 | 0 | 38.43 | 42.04 | 42.85 | 44.35 | 44.9 | 43.74 | 39.8 | 34.44 | 28.57 | 24.46 | 21.44 | 18.66 | 16.97 | 16.85 | 17.22 | 20.28 |
| 255 | 0 | 15 | 26 | 0 | 17.3 | 17.69 | 18.38 | 22.21 | 29.58 | 30.45 | 23.83 | 17.28 | 11.83 | 8.09 | 5.64 | 4.04 | 3.27 | 2.96 | 2.78 | 3.13 |
| 17 | 0 | 0 | 0 | 0 | 60.85 | 72.46 | 76.85 | 79.33 | 79.62 | 78.78 | 76.79 | 73.52 | 68.61 | 63.19 | 57.08 | 50.74 | 46.25 | 43.66 | 41.66 | 44.5 |
| 17 | 0 | 0 | 21 | 0 | 49.48 | 55.33 | 56.83 | 58.41 | 59.12 | 58.56 | 55.68 | 51.23 | 45.7 | 41.83 | 39.01 | 36.36 | 34.87 | 35.71 | 37.55 | 42.42 |
| 58 | 0 | 5 | 0 | 0 | 39.23 | 41.31 | 42.71 | 47.98 | 60.69 | 69.89 | 66.23 | 58.83 | 49.42 | 40.64 | 32.81 | 26.15 | 22.13 | 20.03 | 18.56 | 20.78 |
| 255 | 0 | 37 | 0 | 0 | 12 | 10.51 | 10.51 | 13.52 | 24.43 | 32.59 | 25.75 | 18.36 | 12.35 | 8.28 | 5.66 | 3.98 | 3.22 | 2.88 | 2.7 | 3.04 |
| 255 | 0 | 37 | 10 | 0 | 12.12 | 10.61 | 10.54 | 13.47 | 23.84 | 31.46 | 25.14 | 18.13 | 12.33 | 8.35 | 5.75 | 4.06 | 3.3 | 2.98 | 2.79 | 3.12 |
| 137 | 0 | 15 | 0 | 0 | 21.62 | 20.13 | 20.28 | 24.88 | 40.72 | 54.71 | 47.94 | 37.57 | 27.67 | 20.18 | 14.7 | 10.67 | 8.51 | 7.47 | 6.8 | 7.85 |
| 255 | 0 | 0 | 10 | 0 | 25.09 | 33.47 | 39.29 | 46.29 | 41.8 | 33.35 | 24.96 | 17.8 | 12.05 | 8.15 | 5.63 | 4 | 3.24 | 2.92 | 2.75 | 3.07 |
| 137 | 0 | 0 | 0 | 0 | 42.36 | 55.23 | 62.5 | 69.25 | 66.65 | 59.32 | 49.34 | 38.67 | 28.67 | 21.06 | 15.44 | 11.29 | 9.04 | 7.97 | 7.25 | 8.36 |
| 255 | 0 | 5 | 0 | 0 | 23.02 | 27.52 | 30.71 | 36.86 | 40.11 | 35.24 | 26.61 | 19.06 | 12.98 | 8.83 | 6.1 | 4.36 | 3.52 | 3.18 | 2.96 | 3.33 |
| 137 | 0 | 0 | 10 | 0 | 40.22 | 50.7 | 56.12 | 61.45 | 59.81 | 54.06 | 45.45 | 36.04 | 27.17 | 20.45 | 15.42 | 11.55 | 9.41 | 8.39 | 7.74 | 8.94 |

TABLE 4-continued

Second set of 969 patches
(target condition)

| Colorant digital count (0-255) | | | | | Percent reflectance at wavelength | | | | | | | | | | | | | | |
|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 255 | 0 | 5 | 10 | 0 | 22.54 | 26.9 | 29.86 | 35.39 | 37.77 | 33.16 | 25.21 | 18.13 | 12.36 | 8.43 | 5.86 | 4.2 | 3.42 | 3.08 | 2.91 | 3.23 |
| 137 | 0 | 5 | 0 | 0 | 33.47 | 37.65 | 40.1 | 46 | 55.28 | 57.87 | 49.17 | 38.72 | 28.82 | 21.33 | 15.77 | 11.61 | 9.34 | 8.24 | 7.5 | 8.64 |
| 58 | 0 | 5 | 21 | 0 | 36.5 | 38.36 | 39.05 | 42.49 | 50.05 | 54.72 | 50.98 | 44.61 | 37.21 | 31.36 | 26.57 | 22.25 | 19.59 | 18.62 | 18.11 | 20.72 |
| 255 | 0 | 0 | 58 | 255 | 15.79 | 17.11 | 15.95 | 12.91 | 8.94 | 5.89 | 3.88 | 2.96 | 2.51 | 2.5 | 2.76 | 3.05 | 3.39 | 3.46 | 3.35 | 3.84 |
| 58 | 0 | 0 | 47 | 50 | 36.3 | 39.41 | 37.24 | 33.53 | 28.65 | 25.06 | 21.22 | 20.69 | 18.47 | 19.84 | 19.78 | 17.13 | 15.26 | 14.66 | 14.47 | 16.69 |
| 255 | 0 | 0 | 26 | 50 | 25.01 | 31.19 | 33.32 | 33.73 | 28.38 | 23.21 | 18.23 | 14.95 | 11.15 | 8.63 | 6.43 | 4.7 | 3.82 | 3.45 | 3.23 | 3.64 |
| 17 | 0 | 0 | 0 | 12 | 57.89 | 68.91 | 69.89 | 66.72 | 60.72 | 55.98 | 50.87 | 50.76 | 47.87 | 51.03 | 50.59 | 44.38 | 39.63 | 36.91 | 34.86 | 37.59 |
| 17 | 0 | 0 | 21 | 12 | 47.66 | 53.64 | 53.41 | 51.68 | 48.39 | 45.26 | 40.9 | 39.33 | 35.78 | 36.58 | 36.4 | 33.59 | 31.66 | 31.85 | 32.79 | 36.94 |
| 58 | 0 | 0 | 0 | 12 | 52.49 | 63.72 | 66.12 | 64.55 | 58.36 | 52.62 | 46.17 | 43.38 | 37.69 | 35.11 | 30.28 | 24.03 | 20.17 | 18.12 | 16.71 | 18.78 |
| 255 | 0 | 0 | 0 | 12 | 25.52 | 34.22 | 39.82 | 45.12 | 38.8 | 30.49 | 22.77 | 16.78 | 11.5 | 7.94 | 5.49 | 3.88 | 3.12 | 2.81 | 2.62 | 2.95 |
| 255 | 0 | 0 | 10 | 12 | 25.13 | 32.96 | 37.81 | 42.41 | 37.05 | 29.57 | 22.31 | 16.54 | 11.39 | 7.91 | 5.5 | 3.88 | 3.13 | 2.81 | 2.62 | 2.96 |
| 137 | 0 | 0 | 0 | 12 | 40.81 | 52.3 | 57.05 | 58.92 | 52.46 | 45.02 | 36.82 | 30.9 | 23.78 | 18.85 | 14.27 | 10.37 | 8.25 | 7.22 | 6.54 | 7.59 |
| 255 | 0 | 0 | 10 | 255 | 15.54 | 17.1 | 15.73 | 12.23 | 8.04 | 5.1 | 3.36 | 2.6 | 2.27 | 2.26 | 2.49 | 2.77 | 3.1 | 3.18 | 3.04 | 3.45 |
| 137 | 0 | 0 | 0 | 137 | 31.83 | 36.62 | 34.16 | 27.95 | 20.6 | 15.46 | 11.36 | 9.52 | 7.83 | 8.05 | 8.56 | 8.07 | 7.65 | 7.13 | 6.56 | 7.6 |
| 255 | 0 | 0 | 0 | 137 | 23.89 | 29.27 | 29.82 | 26.97 | 20.45 | 15.31 | 11.13 | 8.81 | 6.73 | 5.87 | 5.1 | 4.1 | 3.5 | 3.18 | 2.97 | 3.36 |
| 137 | 0 | 0 | 10 | 137 | 31.04 | 35.23 | 32.9 | 27.25 | 20.35 | 15.37 | 11.31 | 9.46 | 7.77 | 7.96 | 8.47 | 8.02 | 7.65 | 7.19 | 6.67 | 7.73 |
| 255 | 0 | 0 | 10 | 137 | 23.2 | 28.07 | 28.45 | 25.85 | 19.73 | 14.77 | 10.73 | 8.46 | 6.46 | 5.63 | 4.9 | 3.99 | 3.44 | 3.13 | 2.95 | 3.32 |
| 137 | 0 | 0 | 0 | 50 | 38.62 | 47.31 | 47.14 | 42.34 | 33.92 | 28.09 | 22.88 | 21.42 | 17.94 | 16.78 | 14.01 | 10.41 | 8.34 | 7.36 | 6.67 | 7.7 |
| 58 | 0 | 0 | 21 | 12 | 44.39 | 50.58 | 51.24 | 50.51 | 46.95 | 43.09 | 37.86 | 34.88 | 29.92 | 27.73 | 24.59 | 20.31 | 17.59 | 16.45 | 15.76 | 18.15 |
| 0 | 0 | 0 | 58 | 255 | 16.59 | 16.2 | 13.96 | 10.22 | 6.72 | 4.36 | 3.04 | 2.52 | 2.29 | 2.39 | 2.85 | 4.3 | 10.11 | 24.05 | 43.43 | 62.46 |
| 0 | 0 | 0 | 47 | 50 | 38.53 | 40.83 | 37.66 | 33.35 | 28.48 | 25.04 | 21.39 | 21.42 | 19.8 | 23.38 | 26.42 | 25.19 | 24.13 | 25.06 | 26.95 | 31.44 |
| 58 | 0 | 0 | 26 | 255 | 17.57 | 17.79 | 15.27 | 11.03 | 7.07 | 4.48 | 3.02 | 2.45 | 2.23 | 2.31 | 2.79 | 4.15 | 8.87 | 16.17 | 19.53 | 22.87 |
| 0 | 0 | 0 | 0 | 12 | 59.93 | 70.54 | 70.84 | 66.83 | 60.79 | 56.3 | 51.71 | 52.87 | 51.78 | 59.75 | 65.75 | 63.02 | 59.77 | 57.69 | 55.9 | 58.02 |
| 0 | 0 | 0 | 21 | 12 | 49.13 | 54.54 | 53.95 | 52 | 48.85 | 46.06 | 42.17 | 41.38 | 38.75 | 41.59 | 44.17 | 43.58 | 43.43 | 46.09 | 50.53 | 56.38 |
| 17 | 0 | 0 | 0 | 50 | 51.48 | 59.62 | 54.64 | 45.18 | 35.63 | 30.09 | 25.33 | 26.51 | 25.3 | 32.41 | 36.91 | 31.51 | 27.16 | 24.73 | 23.03 | 25.36 |
| 137 | 0 | 0 | 0 | 255 | 18.47 | 19.24 | 16.87 | 12.45 | 8.03 | 5.09 | 3.32 | 2.61 | 2.28 | 2.36 | 2.87 | 3.93 | 6.44 | 8.4 | 8.45 | 9.8 |
| 137 | 0 | 0 | 10 | 255 | 18.08 | 18.64 | 16.39 | 12.08 | 7.83 | 4.95 | 3.31 | 2.61 | 2.32 | 2.39 | 2.85 | 3.87 | 6.23 | 8.16 | 8.27 | 9.56 |
| 58 | 0 | 0 | 0 | 137 | 36.78 | 40.94 | 36.64 | 28.69 | 20.89 | 15.67 | 11.57 | 9.98 | 8.53 | 9.62 | 11.75 | 12.97 | 14.36 | 14.48 | 13.72 | 15.43 |
| 0 | 0 | 0 | 10 | 255 | 17.38 | 17.62 | 14.89 | 10.45 | 6.52 | 4.15 | 2.9 | 2.42 | 2.23 | 2.3 | 2.77 | 4.24 | 11.14 | 30.88 | 55.64 | 70.02 |
| 0 | 0 | 0 | 0 | 137 | 38.28 | 41.8 | 36.28 | 27.48 | 19.62 | 14.58 | 10.69 | 9.36 | 8.12 | 9.73 | 13.16 | 16.55 | 21.65 | 24.23 | 23.72 | 26.23 |
| 17 | 0 | 0 | 0 | 255 | 17.36 | 17.47 | 14.83 | 10.29 | 6.36 | 3.98 | 2.71 | 2.26 | 2.05 | 2.14 | 2.58 | 3.98 | 10.2 | 24.89 | 36.27 | 42.64 |
| 0 | 0 | 0 | 10 | 137 | 36.84 | 39.56 | 34.4 | 26.57 | 19.26 | 14.44 | 10.59 | 9.24 | 8 | 9.55 | 12.93 | 16.29 | 21.3 | 24.23 | 24.34 | 27.25 |
| 17 | 0 | 0 | 10 | 255 | 17.06 | 17.13 | 14.5 | 10.12 | 6.33 | 3.98 | 2.78 | 2.32 | 2.12 | 2.2 | 2.63 | 3.98 | 9.89 | 23.93 | 35.41 | 42.49 |
| 17 | 0 | 0 | 0 | 137 | 38.37 | 41.56 | 36.29 | 27.82 | 20.05 | 14.94 | 10.95 | 9.52 | 8.22 | 9.72 | 12.86 | 15.68 | 19.43 | 20.93 | 20.22 | 22.46 |
| 17 | 0 | 0 | 21 | 50 | 43.74 | 48.27 | 44.56 | 38.17 | 31.16 | 26.7 | 22.48 | 22.98 | 21.46 | 26.22 | 29.29 | 26.02 | 23.33 | 22.31 | 21.8 | 24.62 |
| 0 | 255 | 0 | 58 | 255 | 17.46 | 16.08 | 12.2 | 8.05 | 5.2 | 3.64 | 2.74 | 2.45 | 2.27 | 2.58 | 3.63 | 5.94 | 12.98 | 26.88 | 44.57 | 61.98 |
| 0 | 40 | 0 | 47 | 50 | 36.85 | 38.31 | 34.08 | 28.41 | 22.91 | 19.43 | 16.19 | 16.65 | 15.7 | 20.61 | 25.82 | 25.16 | 24.16 | 25 | 26.67 | 30.96 |
| 0 | 40 | 0 | 26 | 255 | 16.88 | 16.56 | 13.85 | 9.6 | 5.97 | 3.81 | 2.68 | 2.3 | 2.12 | 2.21 | 2.61 | 4 | 10.52 | 28.59 | 52.23 | 69.01 |
| 0 | 13 | 0 | 0 | 12 | 59.07 | 67.82 | 66 | 59.44 | 51.5 | 46.25 | 41.35 | 43.26 | 42.83 | 54.25 | 65.2 | 63.25 | 59.8 | 57.54 | 55.58 | 57.86 |
| 0 | 13 | 0 | 21 | 12 | 48.43 | 52.87 | 50.95 | 47.12 | 42.26 | 38.58 | 34.33 | 34.49 | 32.61 | 37.89 | 42.92 | 42.78 | 42.61 | 45.31 | 49.76 | 55.82 |
| 0 | 13 | 0 | 0 | 50 | 52.21 | 58.3 | 51.57 | 40.94 | 31.46 | 26.21 | 21.87 | 23.43 | 22.9 | 32.68 | 42.87 | 38.72 | 34.14 | 31.5 | 29.53 | 32.12 |
| 0 | 13 | 0 | 0 | 255 | 17.26 | 17.29 | 14.42 | 9.91 | 6.07 | 3.87 | 2.76 | 2.36 | 2.22 | 2.28 | 2.69 | 4.04 | 10.97 | 32.39 | 59.78 | 73.84 |
| 0 | 13 | 0 | 10 | 255 | 17.94 | 17.84 | 15.09 | 10.58 | 6.63 | 4.23 | 2.93 | 2.48 | 2.27 | 2.37 | 2.84 | 4.36 | 11.42 | 31.34 | 56.76 | 71.73 |
| 0 | 13 | 0 | 0 | 137 | 38.95 | 41.96 | 36.08 | 27.3 | 19.63 | 14.72 | 10.95 | 9.72 | 8.55 | 10.41 | 14.22 | 17.9 | 23.37 | 26.31 | 25.84 | 28.36 |
| 0 | 255 | 0 | 10 | 255 | 19.1 | 17.87 | 13.4 | 8.79 | 5.62 | 3.97 | 2.97 | 2.67 | 2.46 | 2.82 | 4.06 | 6.75 | 15.4 | 34.55 | 57.64 | 71.7 |
| 0 | 93 | 0 | 0 | 137 | 37.85 | 39.19 | 31.75 | 22.93 | 16.18 | 12.25 | 9.23 | 8.7 | 7.88 | 10.45 | 15.25 | 19.18 | 24.5 | 27.15 | 26.6 | 29.03 |
| 0 | 93 | 0 | 0 | 255 | 19.57 | 19.33 | 15.96 | 11.12 | 7.08 | 4.64 | 3.25 | 2.71 | 2.46 | 2.62 | 3.32 | 5.3 | 13.35 | 34.54 | 60.05 | 72.82 |
| 0 | 93 | 0 | 10 | 137 | 36.44 | 37.45 | 30.78 | 22.69 | 16.25 | 12.41 | 9.41 | 8.86 | 8 | 10.45 | 15.02 | 18.69 | 23.62 | 26.39 | 26.43 | 29.13 |
| 0 | 93 | 0 | 10 | 255 | 19.49 | 19.17 | 15.9 | 11.13 | 7.15 | 4.69 | 3.24 | 2.72 | 2.44 | 2.61 | 3.31 | 5.32 | 13.24 | 33.25 | 57.89 | 72.13 |
| 0 | 40 | 0 | 0 | 137 | 37.82 | 40.36 | 33.93 | 25.04 | 17.72 | 13.23 | 9.82 | 8.9 | 7.89 | 9.95 | 13.98 | 17.54 | 22.6 | 25.14 | 24.59 | 27.05 |
| 0 | 13 | 0 | 21 | 50 | 44.1 | 48.2 | 43.31 | 36.03 | 28.88 | 24.57 | 20.62 | 21.52 | 20.55 | 27.15 | 33.44 | 31.2 | 28.76 | 28.15 | 28.2 | 31.66 |
| 0 | 255 | 0 | 58 | 0 | 26.01 | 23.48 | 16.75 | 11.18 | 7.61 | 5.96 | 4.78 | 5.26 | 5.27 | 9.84 | 23.33 | 30.44 | 32.95 | 38.72 | 51.24 | 65.87 |
| 0 | 40 | 0 | 47 | 0 | 40.14 | 42.04 | 39.76 | 36.79 | 33.27 | 30.48 | 26.9 | 26.61 | 24.75 | 28.48 | 32.87 | 34.51 | 36.62 | 43.46 | 56.82 | 69.94 |
| 0 | 255 | 0 | 26 | 50 | 29.94 | 27.29 | 19.17 | 12.68 | 8.62 | 6.74 | 5.41 | 6 | 6.04 | 11.34 | 27.22 | 33.38 | 32.42 | 32.13 | 32.37 | 35.53 |
| 0 | 13 | 0 | 0 | 0 | 62.03 | 72.47 | 73.49 | 70.76 | 66.17 | 62.76 | 59.21 | 60.87 | 60.85 | 70.09 | 78.79 | 79.95 | 79.62 | 79.47 | 79.09 | 79.25 |
| 0 | 13 | 0 | 21 | 0 | 49.9 | 55 | 54.68 | 53.31 | 50.99 | 48.78 | 45.28 | 44.22 | 41.74 | 44.67 | 48.18 | 49.56 | 51.47 | 57.23 | 66.64 | 74.33 |
| 0 | 40 | 0 | 0 | 12 | 56.41 | 63.53 | 58.38 | 48.75 | 39.32 | 33.8 | 29.05 | 31.27 | 31.32 | 45.43 | 63.9 | 64 | 60.69 | 58.39 | 56.42 | 58.53 |
| 0 | 255 | 0 | 0 | 137 | 27.84 | 25.48 | 17.61 | 11.3 | 7.41 | 5.58 | 4.34 | 4.5 | 4.34 | 7.2 | 14.76 | 20.31 | 25.79 | 28.32 | 27.75 | 29.98 |
| 0 | 255 | 0 | 10 | 137 | 28.56 | 26.19 | 18.52 | 12.12 | 8.07 | 6.13 | 4.76 | 4.97 | 4.79 | 7.88 | 15.65 | 21.02 | 26.18 | 28.88 | 28.84 | 31.39 |
| 0 | 93 | 0 | 0 | 50 | 46.11 | 48.03 | 38.03 | 27.46 | 19.89 | 16.1 | 13.13 | 14.48 | 14.47 | 24.03 | 41.12 | 40.33 | 36.09 | 33.51 | 31.57 | 34.05 |
| 0 | 255 | 0 | 10 | 0 | 29.64 | 26.54 | 17.56 | 11 | 7.19 | 5.55 | 4.44 | 4.96 | 5.04 | 10.32 | 33.64 | 56.91 | 63.3 | 67.32 | 72.28 | 76.62 |
| 0 | 93 | 0 | 0 | 0 | 51.43 | 54.06 | 43.57 | 31.74 | 23.04 | 18.7 | 15.32 | 17.1 | 17.46 | 31.51 | 66.3 | 79.32 | 80.19 | 80.39 | 79.88 | 79.93 |
| 0 | 255 | 0 | 0 | 12 | 30.21 | 27.06 | 17.77 | 11.08 | 7.28 | 5.66 | 4.55 | 5.08 | 5.16 | 10.46 | 34.35 | 57.2 | 59.68 | 58.07 | 56.11 | 58.16 |
| 0 | 93 | 0 | 10 | 0 | 48.23 | 49.86 | 40.77 | 30.28 | 22.28 | 18.15 | 14.87 | 16.46 | 16.66 | 28.97 | 55.98 | 65.58 | 67.55 | 70.9 | 75.03 | 78.09 |
| 0 | 255 | 0 | 10 | 12 | 29.25 | 25.89 | 17.01 | 10.55 | 6.83 | 5.25 | 4.18 | 4.67 | 4.74 | 9.75 | 31.11 | 48.59 | 50.92 | 51.79 | 53.09 | 56.85 |
| 0 | 93 | 0 | 0 | 12 | 50.67 | 53.32 | 42.66 | 31.07 | 22.72 | 18.53 | 15.26 | 16.91 | 17.14 | 29.72 | 57.94 | 64.19 | 61.42 | 59.05 | 57.07 | 59.02 |
| 0 | 40 | 0 | 21 | 12 | 47.82 | 51.65 | 47.6 | 41.35 | 34.82 | 30.62 | 26.51 | 27.5 | 26.54 | 34.44 | 43.42 | 43.99 | 43.74 | 46.22 | 50.49 | 56.17 |
| 0 | 255 | 255 | 58 | 0 | 4.59 | 3.32 | 3.1 | 3.66 | 6.3 | 8.07 | 6.84 | 7.54 | 7.56 | 13.18 | 27.44 | 34.38 | 36.81 | 42.25 | 53.77 | 67.37 |
| 0 | 40 | 15 | 47 | 0 | 23.6 | 21.34 | 20.21 | 21.44 | 26.51 | 29.62 | 26.83 | 26.65 | 24.83 | 28.65 | 33.15 | 34.79 | 36.9 | 43.67 | 56.99 | 70.08 |
| 0 | 255 | 15 | 26 | 0 | 21.1 | 17.8 | 13.52 | 10.17 | 7.76 | 6.31 | 5.11 | 5.67 | 5.74 | 11.12 | 30.69 | 45.56 | 49.82 | 55.35 | 64.6 | 72.81 |
| 0 | 13 | 5 | 0 | 0 | 46.78 | 49.9 | 49.78 | 50.67 | 55.45 | 59.81 | 57.57 | 59.52 | 59.58 | 69.06 | 78 | 79.3 | 79.04 | 78.95 | 78.59 | 78.8 |
| 0 | 13 | 5 | 21 | 0 | 39.85 | 40.6 | 39.93 | 40.96 | 45.16 | 48.06 | 45.35 | 44.58 | 42.06 | 45.04 | 48.54 | 49.92 | 51.84 | 57.6 | 67.06 | 74.64 |
| 0 | 40 | 5 | 0 | 0 | 43.9 | 45.39 | 43.12 | 41.05 | 41.19 | 40.67 | 36.44 | 39.09 | 39.51 | 55.23 | 76.09 | 80.13 | 79.89 | 79.51 | 78.95 | 78.94 |

TABLE 4-continued

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 255 | 5 | 0 | 0 | 26.01 | 22.6 | 15.56 | 10.32 | 7.1 | 5.58 | 4.47 | 4.99 | 5.11 | 10.54 | 36.52 | 68.51 | 77.17 | 78.05 | 77.6 | 77.96 |
| 0 | 255 | 5 | 10 | 0 | 26.6 | 23.29 | 16.33 | 10.97 | 7.6 | 5.99 | 4.82 | 5.37 | 5.47 | 10.98 | 34.24 | 57.11 | 63.27 | 67.18 | 72.18 | 76.24 |
| 0 | 93 | 5 | 0 | 0 | 40.63 | 39.65 | 33.52 | 27.35 | 22.77 | 19.67 | 16.34 | 18.17 | 18.53 | 32.61 | 67.08 | 79.84 | 80.53 | 80.24 | 79.68 | 79.56 |
| 0 | 255 | 255 | 10 | 0 | 4.55 | 3.31 | 3.1 | 3.62 | 6.22 | 8.02 | 6.8 | 7.56 | 7.68 | 14.13 | 37.32 | 58.47 | 64.21 | 68.11 | 72.93 | 76.95 |
| 0 | 93 | 37 | 0 | 0 | 15.09 | 11.91 | 10.87 | 12 | 16.85 | 19.16 | 16.37 | 18.23 | 18.56 | 32.4 | 66.77 | 79.88 | 80.72 | 80.34 | 79.69 | 79.63 |
| 0 | 255 | 37 | 0 | 0 | 14.79 | 11.57 | 9.28 | 8.06 | 7.27 | 6.28 | 5.12 | 5.7 | 5.82 | 11.57 | 37.82 | 69.19 | 77.69 | 78.57 | 78.09 | 78.56 |
| 0 | 93 | 37 | 10 | 0 | 14.57 | 11.56 | 10.57 | 11.69 | 16.28 | 18.45 | 15.8 | 17.41 | 17.54 | 29.26 | 54.3 | 63.03 | 64.89 | 68.38 | 73.34 | 77.17 |
| 0 | 255 | 37 | 10 | 0 | 14.21 | 11.02 | 8.84 | 7.66 | 6.81 | 5.82 | 4.71 | 5.25 | 5.33 | 10.67 | 33.81 | 56.64 | 62.89 | 66.95 | 71.99 | 76.25 |
| 0 | 93 | 15 | 0 | 0 | 25.75 | 22.56 | 19.98 | 19.08 | 19.85 | 18.91 | 15.82 | 17.63 | 17.98 | 31.88 | 66.14 | 79.09 | 80.04 | 79.99 | 79.4 | 79.53 |
| 0 | 40 | 5 | 21 | 0 | 36.85 | 36.39 | 34.44 | 33.71 | 34.75 | 34.41 | 30.64 | 31.59 | 30.53 | 38.41 | 47.53 | 49.95 | 51.84 | 57.54 | 66.89 | 74.51 |
| 0 | 40 | 255 | 26 | 0 | 3.38 | 2.66 | 2.54 | 3.05 | 8.32 | 28.04 | 32.35 | 33.95 | 32.99 | 39.21 | 46.17 | 48.25 | 50.21 | 55.97 | 65.84 | 74.56 |
| 0 | 13 | 15 | 0 | 0 | 28.81 | 26.7 | 26.19 | 29.38 | 42.4 | 57.52 | 57.29 | 59.66 | 59.88 | 69.73 | 78.89 | 80.24 | 80.03 | 79.9 | 79.39 | 79.65 |
| 0 | 13 | 255 | 0 | 0 | 3.37 | 2.69 | 2.58 | 3.02 | 8.42 | 37.29 | 52.81 | 57.96 | 58.91 | 68.92 | 77.94 | 79.31 | 79.22 | 79.21 | 78.7 | 79.18 |
| 0 | 13 | 255 | 10 | 0 | 3.15 | 2.5 | 2.46 | 2.87 | 8 | 35.13 | 48.2 | 51.14 | 50.3 | 55.54 | 60.51 | 61.91 | 63.27 | 67.12 | 72.47 | 76.9 |
| 0 | 13 | 37 | 0 | 0 | 14.09 | 11.33 | 10.88 | 13.44 | 27.43 | 53.12 | 56.32 | 59.17 | 59.5 | 69.41 | 78.59 | 79.84 | 79.54 | 79.37 | 78.79 | 79.05 |
| 0 | 93 | 255 | 0 | 0 | 4.1 | 3.1 | 2.92 | 3.59 | 9.02 | 21.52 | 21.53 | 23.67 | 24.04 | 37.07 | 67.75 | 79.09 | 79.6 | 79.11 | 78.35 | 78.65 |
| 0 | 93 | 255 | 10 | 0 | 4.06 | 3.06 | 2.92 | 3.57 | 8.86 | 20.72 | 20.68 | 22.55 | 22.69 | 33.73 | 55.56 | 62.62 | 63.95 | 66.91 | 71.2 | 74.91 |
| 0 | 40 | 37 | 0 | 0 | 15.16 | 12.53 | 11.88 | 13.98 | 24.44 | 38.11 | 36.64 | 39.57 | 40 | 55.41 | 75.7 | 79.18 | 78.52 | 77.88 | 77.1 | 77.44 |
| 0 | 13 | 15 | 21 | 0 | 26.77 | 24.8 | 24.2 | 26.8 | 36.81 | 46.97 | 45.67 | 44.99 | 42.39 | 45.04 | 48.2 | 49.37 | 51.14 | 56.73 | 65.86 | 73.52 |
| 0 | 0 | 0 | 178 | 0 | 9.63 | 8.92 | 8.41 | 8.41 | 8.55 | 8.31 | 7.26 | 5.95 | 4.81 | 4.34 | 4.34 | 4.54 | 5 | 6.94 | 13.87 | 29.62 |
| 0 | 0 | 255 | 105 | 0 | 3.64 | 2.77 | 2.67 | 3.23 | 8.12 | 21 | 22.73 | 20.4 | 17.54 | 16.2 | 16.24 | 16.87 | 18.24 | 22.88 | 34.46 | 53.15 |
| 255 | 0 | 255 | 105 | 0 | 4.63 | 3.49 | 3.33 | 4.23 | 9.93 | 20.13 | 19.26 | 15.55 | 11.77 | 9.03 | 7.05 | 5.47 | 4.6 | 4.25 | 4.07 | 4.73 |
| 0 | 0 | 15 | 88 | 0 | 17.41 | 15.46 | 14.82 | 16.35 | 21.07 | 24.16 | 22.5 | 19.55 | 16.44 | 14.99 | 14.97 | 15.6 | 17.04 | 22.27 | 35.49 | 55.17 |
| 58 | 0 | 15 | 88 | 0 | 17.41 | 15.52 | 14.97 | 16.74 | 21.9 | 25.01 | 22.98 | 19.7 | 16.23 | 14.27 | 13.36 | 12.68 | 12.52 | 13.95 | 16.57 | 20.99 |
| 58 | 0 | 255 | 58 | 0 | 3.48 | 2.61 | 2.48 | 3.07 | 8.59 | 29.17 | 35.46 | 32.41 | 27.78 | 24.61 | 22.47 | 20.49 | 19.32 | 19.65 | 20.6 | 23.81 |
| 0 | 0 | 0 | 92 | 0 | 24.19 | 23.85 | 23.04 | 23.33 | 23.91 | 23.73 | 21.62 | 18.69 | 15.64 | 14.28 | 14.3 | 14.94 | 16.39 | 21.67 | 35.08 | 55.37 |
| 0 | 0 | 5 | 54 | 0 | 31.03 | 30.72 | 30.26 | 32.12 | 37.3 | 40.87 | 38.93 | 35.18 | 30.87 | 28.84 | 28.79 | 29.73 | 31.81 | 38.75 | 53.03 | 68.13 |
| 17 | 0 | 5 | 54 | 0 | 30.62 | 30.42 | 29.99 | 32.01 | 37.15 | 40.25 | 37.93 | 33.79 | 29.13 | 26.49 | 25.41 | 24.79 | 25.03 | 28.15 | 33.67 | 41.16 |
| 0 | 0 | 5 | 77 | 0 | 23.77 | 22.49 | 21.75 | 22.94 | 26.1 | 27.7 | 25.68 | 22.48 | 19.06 | 17.5 | 17.49 | 18.21 | 19.83 | 25.63 | 39.75 | 59.23 |
| 17 | 0 | 5 | 77 | 0 | 23.91 | 22.87 | 22.17 | 23.39 | 26.37 | 27.78 | 25.58 | 22.21 | 18.64 | 16.86 | 16.45 | 16.52 | 17.31 | 21.02 | 28.62 | 38.76 |
| 17 | 0 | 15 | 47 | 0 | 22.76 | 20.63 | 20.2 | 23.01 | 33.07 | 42.98 | 41.85 | 37.73 | 32.76 | 29.82 | 28.45 | 27.51 | 27.5 | 30.29 | 35.17 | 42.05 |
| 0 | 0 | 255 | 44 | 0 | 3.35 | 2.61 | 2.56 | 3.02 | 8.24 | 32.92 | 43.91 | 42.54 | 38.79 | 36.85 | 36.83 | 37.76 | 39.82 | 46.15 | 58.29 | 70.57 |
| 0 | 0 | 37 | 35 | 0 | 12.72 | 10.2 | 9.85 | 12.24 | 24.62 | 45.26 | 47.69 | 44.7 | 40.42 | 38.32 | 38.25 | 39.22 | 41.39 | 48.12 | 60.29 | 71.64 |
| 17 | 0 | 255 | 26 | 0 | 3.36 | 2.65 | 2.57 | 3.04 | 8.45 | 36.08 | 50.43 | 49.29 | 44.8 | 41.47 | 39.32 | 37.38 | 36.39 | 37.61 | 39.79 | 44.64 |
| 0 | 0 | 37 | 53 | 0 | 12.9 | 10.43 | 10.03 | 12.3 | 23.12 | 38.35 | 38.92 | 35.51 | 31.23 | 29.18 | 29.14 | 30.07 | 32.17 | 39.17 | 53.43 | 68.55 |
| 17 | 0 | 255 | 44 | 0 | 3.24 | 2.56 | 2.5 | 2.93 | 8.18 | 32.75 | 43.01 | 41.05 | 36.73 | 33.96 | 32.57 | 31.54 | 31.32 | 33.53 | 37.32 | 43.26 |
| 17 | 0 | 37 | 35 | 0 | 13.25 | 10.67 | 10.26 | 12.73 | 25.2 | 45.02 | 46.6 | 42.82 | 37.67 | 34.4 | 32.56 | 31.07 | 30.55 | 32.64 | 36.21 | 42.13 |
| 255 | 0 | 255 | 44 | 0 | 3.75 | 2.85 | 2.75 | 3.4 | 9.1 | 24.43 | 23.92 | 18.42 | 13.15 | 9.32 | 6.65 | 4.8 | 3.87 | 3.47 | 3.23 | 3.67 |
| 137 | 0 | 37 | 35 | 0 | 13.99 | 11.61 | 11.28 | 14.06 | 25.98 | 40.72 | 37.91 | 31.1 | 24.15 | 18.92 | 14.93 | 11.69 | 9.83 | 9.01 | 8.51 | 9.83 |
| 137 | 0 | 255 | 26 | 0 | 4.15 | 3.14 | 3.01 | 3.75 | 10.11 | 33.6 | 40.41 | 34.89 | 27.89 | 22.34 | 17.94 | 14.31 | 12.14 | 11.11 | 10.43 | 11.82 |
| 137 | 0 | 37 | 53 | 0 | 13.58 | 11.34 | 11.02 | 13.6 | 24.2 | 35.81 | 33.04 | 27.16 | 21.13 | 16.71 | 13.39 | 10.63 | 9.03 | 8.41 | 8.05 | 9.4 |
| 137 | 0 | 255 | 44 | 0 | 4.16 | 3.18 | 3.03 | 3.78 | 9.87 | 31.46 | 36.8 | 31.76 | 25.48 | 20.56 | 16.7 | 13.43 | 11.48 | 10.61 | 10.05 | 11.47 |
| 58 | 0 | 37 | 35 | 0 | 14.02 | 11.49 | 11.07 | 13.7 | 26.04 | 44.42 | 44.68 | 39.52 | 33.19 | 28.42 | 24.77 | 21.45 | 19.42 | 18.96 | 19.02 | 21.89 |
| 17 | 0 | 15 | 66 | 0 | 19.85 | 17.86 | 17.32 | 19.45 | 26.58 | 32.36 | 30.76 | 27.19 | 23.19 | 21.08 | 20.44 | 20.31 | 20.95 | 24.52 | 31.41 | 40.4 |
| 0 | 0 | 0 | 8 | 0 | 58.04 | 66.7 | 69.08 | 70.51 | 71.29 | 71.39 | 70.25 | 68.13 | 65.29 | 63.83 | 63.43 | 63.77 | 64.84 | 68.17 | 72.72 | 76.27 |
| 0 | 0 | 2 | 0 | 0 | 57.61 | 65.61 | 68.15 | 70.89 | 76.19 | 80.99 | 81.72 | 81.44 | 80.75 | 80.43 | 79.96 | 79.58 | 79.22 | 79.24 | 79 | 79.27 |
| 7 | 0 | 2 | 0 | 0 | 55.91 | 63.67 | 66.32 | 69.5 | 75.45 | 80.39 | 80.47 | 78.98 | 76.36 | 73.41 | 69.78 | 65.72 | 62.58 | 60.77 | 59.21 | 61.2 |
| 0 | 0 | 2 | 8 | 0 | 52.4 | 58.38 | 59.95 | 62.4 | 67.49 | 71.71 | 71.36 | 69.39 | 66.57 | 65.1 | 64.71 | 65.05 | 66.1 | 69.5 | 74.17 | 77.65 |
| 7 | 0 | 2 | 8 | 0 | 51.72 | 58.02 | 59.78 | 62.42 | 67.22 | 70.82 | 69.77 | 66.9 | 62.82 | 59.68 | 57.14 | 54.75 | 53.38 | 54.16 | 55.72 | 59.54 |
| 7 | 0 | 5 | 0 | 0 | 46.82 | 50.34 | 51.7 | 55.65 | 66.71 | 78.17 | 79.52 | 78.17 | 75.51 | 72.52 | 68.83 | 64.73 | 61.55 | 59.72 | 58.13 | 60.2 |
| 0 | 0 | 0 | 41 | 0 | 43.47 | 46.73 | 46.83 | 47.69 | 48.71 | 48.7 | 46.25 | 42.35 | 37.78 | 35.59 | 35.48 | 36.44 | 38.64 | 45.67 | 58.95 | 71.33 |
| 0 | 0 | 2 | 41 | 0 | 39.61 | 41.3 | 41.19 | 42.82 | 46.39 | 48.49 | 46.38 | 42.54 | 37.98 | 35.81 | 35.74 | 36.74 | 38.97 | 46.04 | 59.28 | 71.64 |
| 7 | 0 | 2 | 41 | 0 | 38.61 | 40.26 | 40.28 | 42.04 | 45.72 | 47.68 | 45.33 | 41.21 | 36.36 | 33.72 | 32.88 | 32.72 | 33.62 | 38.16 | 46.18 | 55.14 |
| 0 | 0 | 2 | 21 | 0 | 46.17 | 49.41 | 50.07 | 52.17 | 56.53 | 59.57 | 58.09 | 54.8 | 50.61 | 48.53 | 48.33 | 49.21 | 51.24 | 57.3 | 67.03 | 74.93 |
| 7 | 0 | 2 | 21 | 0 | 45.11 | 48.54 | 49.3 | 51.65 | 56.36 | 59.45 | 57.64 | 53.9 | 49.07 | 46.05 | 44.48 | 43.44 | 43.4 | 46.38 | 51.2 | 57.36 |
| 7 | 0 | 5 | 21 | 0 | 39.4 | 40.23 | 40.45 | 43.47 | 51.54 | 58.07 | 56.87 | 53.26 | 48.53 | 45.66 | 44.23 | 43.33 | 43.44 | 46.51 | 51.41 | 57.57 |
| 0 | 0 | 8 | 0 | 0 | 41.39 | 42.39 | 43.01 | 47.29 | 61.32 | 77.46 | 80.52 | 80.61 | 80.02 | 79.81 | 79.47 | 79.17 | 78.9 | 78.93 | 78.62 | 79.02 |
| 0 | 0 | 8 | 8 | 0 | 37.58 | 37.77 | 38.01 | 41.75 | 54.16 | 67.79 | 69.24 | 67.53 | 64.73 | 63.32 | 63.04 | 63.51 | 64.7 | 68.28 | 73.09 | 76.81 |
| 7 | 0 | 15 | 0 | 0 | 28.44 | 26.43 | 26.32 | 30.62 | 48.29 | 73.27 | 77.93 | 77.11 | 74.54 | 71.68 | 68.12 | 64.07 | 60.9 | 59.06 | 57.44 | 59.74 |
| 0 | 0 | 5 | 8 | 0 | 42.85 | 44.63 | 45.32 | 48.97 | 59.32 | 69.31 | 69.97 | 68.15 | 65.32 | 63.92 | 63.67 | 64.17 | 65.4 | 68.99 | 73.79 | 77.52 |
| 7 | 0 | 8 | 0 | 0 | 39.01 | 39.18 | 39.79 | 44.33 | 59.35 | 76.27 | 78.8 | 77.73 | 75.18 | 72.23 | 68.52 | 64.3 | 61.02 | 59.11 | 57.44 | 59.72 |
| 7 | 0 | 8 | 8 | 0 | 37.96 | 38.93 | 39.41 | 43.19 | 55.17 | 68.02 | 68.92 | 66.33 | 62.31 | 59.16 | 56.54 | 54.06 | 52.54 | 53.14 | 54.46 | 58.23 |
| 33 | 0 | 8 | 0 | 0 | 38.72 | 40.32 | 41.23 | 45.88 | 59.66 | 73.78 | 73.51 | 68.8 | 61.69 | 54.08 | 46.48 | 39.34 | 34.7 | 32.19 | 30.33 | 32.97 |
| 33 | 0 | 8 | 8 | 0 | 37.25 | 38 | 38.5 | 42.57 | 54.58 | 66.1 | 65.04 | 60.05 | 53.2 | 46.92 | 41.17 | 35.73 | 32.19 | 30.73 | 29.83 | 32.95 |
| 33 | 0 | 15 | 0 | 0 | 28.34 | 26.91 | 26.98 | 31.38 | 48.33 | 70.72 | 72.78 | 68.47 | 61.45 | 53.84 | 46.19 | 39.01 | 34.32 | 31.77 | 29.89 | 32.57 |
| 17 | 0 | 5 | 8 | 0 | 42.73 | 45.22 | 46.15 | 49.7 | 59.14 | 67.8 | 67.14 | 63.46 | 58.14 | 53.41 | 49.09 | 44.81 | 42 | 41.28 | 41.21 | 44.78 |
| 17 | 0 | 8 | 0 | 0 | 39.23 | 40.21 | 40.89 | 45.36 | 59.55 | 75.23 | 76.67 | 74.03 | 69.3 | 63.86 | 57.76 | 51.5 | 47.05 | 44.55 | 42.59 | 45.26 |
| 17 | 0 | 8 | 8 | 0 | 37.3 | 37.91 | 38.34 | 42.32 | 54.45 | 66.9 | 67.03 | 63.5 | 58.26 | 53.63 | 49.43 | 45.21 | 42.42 | 41.69 | 41.54 | 45.09 |
| 7 | 0 | 5 | 8 | 0 | 43.93 | 46.63 | 47.5 | 50.82 | 59.99 | 68.69 | 68.56 | 65.77 | 61.66 | 58.5 | 55.95 | 53.5 | 52.06 | 52.77 | 54.25 | 58.1 |
| 0 | 0 | 255 | 4 | 0 | 3.55 | 2.76 | 2.71 | 3.21 | 8.95 | 41.23 | 67.32 | 72.27 | 71.85 | 71.32 | 71.1 | 71.22 | 71.7 | 73.58 | 75.75 | 77.67 |
| 0 | 0 | 73 | 0 | 0 | 8.49 | 6.55 | 6.31 | 8 | 20.07 | 59.82 | 76.84 | 79.45 | 79.34 | 79.21 | 78.84 | 78.47 | 78.14 | 78.18 | 77.89 | 78.25 |
| 7 | 0 | 255 | 0 | 0 | 3.41 | 2.68 | 2.64 | 3.11 | 8.63 | 41.85 | 69.69 | 74.83 | 73.77 | 71.2 | 67.59 | 63.35 | 60 | 58.09 | 56.38 | 58.56 |
| 0 | 0 | 73 | 4 | 0 | 8.27 | 6.34 | 6.06 | 7.73 | 19.47 | 56.91 | 71.69 | 72.92 | 71.39 | 70.32 | 69.76 | 69.5 | 69.75 | 71.5 | 73.71 | 75.84 |

TABLE 4-continued

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 7 | 0 | 255 | 4 | 0 | 3.47 | 2.7 | 2.64 | 3.13 | 8.77 | 41.29 | 66.39 | 70 | 67.96 | 65.25 | 62.34 | 59.15 | 56.84 | 56.18 | 55.85 | 58.69 |
| 7 | 0 | 73 | 0 | 0 | 8.3 | 6.37 | 6.16 | 7.85 | 19.89 | 59.36 | 75.28 | 76.43 | 74.2 | 71.19 | 67.36 | 63.02 | 59.66 | 57.75 | 56.06 | 58.31 |
| 0 | 0 | 255 | 18 | 0 | 3.5 | 2.76 | 2.69 | 3.16 | 8.58 | 37.84 | 56.17 | 57.1 | 54.08 | 52.24 | 52 | 52.62 | 54.24 | 59.22 | 66.95 | 73.62 |
| 0 | 0 | 73 | 18 | 0 | 7.8 | 5.91 | 5.65 | 7.23 | 18.39 | 49.43 | 58.4 | 56.93 | 53.21 | 51.23 | 50.98 | 51.69 | 53.47 | 58.88 | 67.32 | 74.33 |
| 7 | 0 | 255 | 18 | 0 | 3.3 | 2.63 | 2.56 | 3.05 | 8.65 | 37.98 | 55.48 | 55.78 | 52.13 | 49.44 | 47.89 | 46.68 | 46.37 | 48.58 | 52.04 | 57.36 |
| 0 | 0 | 73 | 10 | 0 | 7.45 | 5.63 | 5.4 | 6.95 | 18.32 | 53.4 | 65.2 | 64.96 | 62.21 | 60.68 | 60.36 | 60.75 | 61.95 | 65.74 | 71.07 | 75.45 |
| 7 | 0 | 255 | 10 | 0 | 3.24 | 2.6 | 2.52 | 2.96 | 8.45 | 39.64 | 60.88 | 62.59 | 59.56 | 56.79 | 54.61 | 52.46 | 51.16 | 51.93 | 55.33 | 57.34 |
| 7 | 0 | 73 | 10 | 0 | 7.44 | 5.62 | 5.38 | 6.93 | 18.3 | 52.58 | 63.49 | 62.37 | 58.47 | 55.45 | 53.21 | 51.11 | 49.97 | 51.06 | 52.94 | 57.28 |
| 0 | 0 | 22 | 0 | 0 | 23.21 | 20.69 | 20.48 | 24.21 | 41.73 | 71.5 | 78.77 | 79.54 | 79.01 | 78.81 | 78.39 | 78 | 77.67 | 77.6 | 77.14 | 77.71 |
| 0 | 0 | 22 | 4 | 0 | 22.39 | 19.7 | 19.4 | 23 | 39.73 | 67.3 | 73.3 | 72.99 | 71.19 | 70.27 | 69.94 | 70.03 | 70.56 | 72.55 | 74.88 | 77.14 |
| 7 | 0 | 22 | 0 | 0 | 22.27 | 19.47 | 19.19 | 22.99 | 40.77 | 70.82 | 77.48 | 76.99 | 74.44 | 71.37 | 67.49 | 63.1 | 59.7 | 57.75 | 56 | 58.38 |
| 0 | 0 | 37 | 4 | 0 | 15.9 | 13.31 | 12.97 | 15.81 | 31.17 | 64.13 | 73.61 | 73.96 | 72.38 | 71.48 | 71.12 | 71.2 | 71.71 | 73.68 | 76.12 | 78.12 |
| 7 | 0 | 37 | 0 | 0 | 15.39 | 12.92 | 12.62 | 15.46 | 31.23 | 66.28 | 76.52 | 76.71 | 74.39 | 71.54 | 67.95 | 63.91 | 60.79 | 59.04 | 57.56 | 59.75 |
| 7 | 0 | 37 | 4 | 0 | 15.79 | 13.27 | 12.96 | 15.8 | 31.09 | 63.59 | 72.19 | 71.32 | 67.96 | 64.68 | 61.36 | 57.9 | 55.44 | 54.82 | 54.66 | 57.73 |
| 33 | 0 | 255 | 0 | 0 | 3.6 | 2.79 | 2.71 | 3.23 | 9.04 | 41.16 | 65.71 | 67.07 | 61.63 | 54.68 | 47.49 | 40.68 | 36.23 | 33.83 | 32 | 34.45 |
| 33 | 0 | 255 | 4 | 0 | 3.56 | 2.77 | 2.64 | 3.22 | 9.08 | 39.98 | 62.12 | 62.65 | 57.16 | 50.89 | 44.69 | 38.79 | 34.93 | 32.99 | 31.58 | 34.19 |
| 33 | 0 | 73 | 0 | 0 | 8.81 | 6.71 | 6.45 | 8.3 | 20.69 | 57.84 | 70.67 | 68.21 | 61.58 | 54.1 | 46.59 | 39.55 | 34.95 | 32.47 | 30.63 | 33.26 |
| 17 | 0 | 255 | 4 | 0 | 3.7 | 2.87 | 2.8 | 3.34 | 9.18 | 40.85 | 64.9 | 67.28 | 63.65 | 59.16 | 54.36 | 49.37 | 45.87 | 44.24 | 43.07 | 45.97 |
| 17 | 0 | 73 | 0 | 0 | 8.7 | 6.68 | 6.43 | 8.24 | 20.53 | 59.03 | 74.08 | 73.82 | 69.62 | 64.31 | 58.27 | 51.99 | 47.54 | 45.06 | 43.12 | 45.78 |
| 17 | 0 | 73 | 4 | 0 | 8.24 | 6.33 | 6.05 | 7.75 | 19.44 | 55.74 | 68.86 | 67.74 | 63.02 | 57.97 | 52.83 | 47.56 | 43.93 | 42.28 | 41.15 | 44.23 |
| 7 | 0 | 73 | 4 | 0 | 8.15 | 6.27 | 5.98 | 7.67 | 19.37 | 56.28 | 70.32 | 70.5 | 67.49 | 64.5 | 61.53 | 58.39 | 56.19 | 55.77 | 55.76 | 58.8 |
| 255 | 0 | 255 | 4 | 0 | 4.04 | 3.08 | 2.96 | 3.71 | 9.77 | 27.25 | 20.77 | 14.73 | 10.33 | 7.29 | 5.2 | 4.14 | 3.69 | 3.41 | 3.86 |
| 205 | 0 | 73 | 0 | 0 | 8.34 | 6.55 | 6.34 | 8.26 | 19.26 | 40.79 | 37.82 | 28.86 | 20.69 | 14.74 | 10.53 | 7.53 | 5.97 | 5.24 | 4.78 | 5.52 |
| 205 | 0 | 255 | 0 | 0 | 3.66 | 2.86 | 2.78 | 3.4 | 9.29 | 32.96 | 38.01 | 30.54 | 22.61 | 16.58 | 12.18 | 8.94 | 7.17 | 6.33 | 5.77 | 6.6 |
| 205 | 0 | 73 | 4 | 0 | 8.15 | 6.33 | 6.12 | 7.98 | 18.75 | 39.5 | 36.62 | 27.97 | 20.04 | 14.28 | 10.21 | 7.33 | 5.83 | 5.12 | 4.7 | 5.42 |
| 205 | 0 | 255 | 4 | 0 | 3.47 | 2.65 | 2.59 | 3.17 | 8.95 | 32.3 | 37.06 | 29.84 | 22.15 | 16.31 | 12.02 | 8.82 | 7.08 | 6.25 | 5.71 | 6.54 |
| 137 | 0 | 73 | 0 | 0 | 8.46 | 6.38 | 6.11 | 7.99 | 19.73 | 47.57 | 48.03 | 38.66 | 28.98 | 21.56 | 16.05 | 11.93 | 9.66 | 8.54 | 7.78 | 8.94 |
| 255 | 0 | 255 | 18 | 0 | 3.73 | 2.88 | 2.77 | 3.48 | 9.44 | 26.41 | 26.22 | 20.1 | 14.29 | 10.05 | 7.1 | 5.05 | 4.04 | 3.59 | 3.31 | 3.78 |
| 205 | 0 | 73 | 18 | 0 | 7.96 | 6.15 | 5.93 | 7.72 | 18.03 | 36.38 | 33.6 | 25.99 | 18.84 | 13.64 | 9.91 | 7.2 | 5.78 | 5.13 | 4.71 | 5.47 |
| 205 | 0 | 255 | 18 | 0 | 3.55 | 2.76 | 2.63 | 3.25 | 9.04 | 30.66 | 34.36 | 27.84 | 20.83 | 15.48 | 11.51 | 8.49 | 6.85 | 6.09 | 5.59 | 6.45 |
| 205 | 0 | 73 | 10 | 0 | 7.33 | 5.65 | 5.43 | 7.19 | 17.62 | 37.45 | 34.65 | 26.53 | 19.01 | 13.55 | 9.69 | 6.93 | 5.51 | 4.86 | 4.47 | 5.15 |
| 205 | 0 | 255 | 10 | 0 | 3.47 | 2.64 | 2.61 | 3.13 | 8.76 | 31.31 | 35.51 | 28.6 | 21.2 | 15.58 | 11.45 | 8.38 | 6.7 | 5.93 | 5.4 | 6.24 |
| 137 | 0 | 73 | 10 | 0 | 8.21 | 6.09 | 5.79 | 7.71 | 19.18 | 44.1 | 44.08 | 35.88 | 27.31 | 20.71 | 15.72 | 11.85 | 9.68 | 8.64 | 7.94 | 9.17 |
| 90 | 0 | 22 | 0 | 0 | 18.95 | 16.19 | 15.88 | 19.71 | 36.64 | 59.85 | 57.58 | 48.49 | 38.28 | 29.72 | 22.97 | 17.67 | 14.63 | 13.08 | 12.03 | 13.66 |
| 90 | 0 | 22 | 4 | 0 | 20.75 | 18.41 | 18.19 | 22.07 | 37.95 | 58.56 | 56.18 | 47.5 | 37.76 | 29.71 | 23.28 | 18.16 | 15.18 | 13.71 | 12.69 | 14.38 |
| 58 | 0 | 22 | 0 | 0 | 21.25 | 18.97 | 18.78 | 22.63 | 39.65 | 65.46 | 66.74 | 59.98 | 50.65 | 41.69 | 33.8 | 27.11 | 23.08 | 20.97 | 19.47 | 21.69 |
| 137 | 0 | 37 | 4 | 0 | 14.74 | 12.35 | 12.08 | 15.22 | 29.58 | 51.21 | 47.97 | 38.5 | 29.03 | 21.73 | 16.26 | 12.09 | 9.81 | 8.7 | 7.97 | 9.18 |
| 90 | 0 | 37 | 0 | 0 | 13.98 | 11.36 | 10.99 | 13.99 | 29.38 | 57.71 | 58.12 | 49.22 | 38.8 | 30.04 | 23.12 | 17.71 | 14.63 | 13.07 | 12.01 | 13.61 |
| 90 | 0 | 37 | 4 | 0 | 14.12 | 11.4 | 11.03 | 14.01 | 28.95 | 55.01 | 55.12 | 46.9 | 37.31 | 29.32 | 22.96 | 17.91 | 14.96 | 13.47 | 12.48 | 14.14 |
| 90 | 0 | 255 | 0 | 0 | 4.19 | 3.17 | 3.03 | 3.78 | 10.55 | 40.19 | 55.83 | 51.02 | 42.09 | 34.08 | 27.53 | 22.21 | 19.03 | 17.36 | 16.18 | 17.9 |
| 90 | 0 | 255 | 4 | 0 | 4.07 | 3.08 | 2.96 | 3.7 | 10.34 | 39.35 | 53.63 | 48.79 | 40.27 | 32.74 | 26.59 | 21.51 | 18.45 | 16.9 | 15.82 | 17.53 |
| 58 | 0 | 73 | 0 | 0 | 8.48 | 6.39 | 6.13 | 7.95 | 20.14 | 55.27 | 64.77 | 59.48 | 50.61 | 41.94 | 34.32 | 27.82 | 23.87 | 21.82 | 20.35 | 22.51 |
| 137 | 0 | 255 | 4 | 0 | 3.94 | 3.02 | 2.92 | 3.58 | 9.9 | 36.27 | 46.14 | 39.59 | 31.01 | 24.1 | 18.76 | 14.54 | 12.1 | 10.89 | 10.01 | 11.33 |
| 90 | 0 | 73 | 0 | 0 | 8.82 | 6.65 | 6.33 | 8.26 | 20.39 | 52.63 | 57.51 | 49.48 | 39.48 | 31.02 | 24.3 | 18.97 | 15.87 | 14.28 | 13.17 | 14.8 |
| 90 | 0 | 73 | 4 | 0 | 8.1 | 6.02 | 5.74 | 7.56 | 19.4 | 50.22 | 54.33 | 46.53 | 36.94 | 28.93 | 22.6 | 17.54 | 14.62 | 13.15 | 12.19 | 13.78 |
| 137 | 0 | 73 | 4 | 0 | 8.85 | 6.78 | 6.51 | 8.45 | 20.13 | 46.62 | 46.77 | 37.8 | 28.52 | 21.38 | 16.03 | 11.98 | 9.74 | 8.64 | 7.9 | 9.09 |
| 7 | 0 | 5 | 41 | 0 | 34.11 | 34.21 | 34 | 36.35 | 42.64 | 47.16 | 45.21 | 41.09 | 36.19 | 33.48 | 32.6 | 32.4 | 33.26 | 37.74 | 45.59 | 54.5 |
| 0 | 0 | 8 | 30 | 0 | 32.2 | 31.51 | 31.25 | 34.15 | 43.29 | 52.25 | 51.54 | 48.02 | 43.52 | 41.29 | 41.06 | 41.91 | 43.97 | 50.45 | 61.78 | 71.8 |
| 7 | 0 | 15 | 30 | 0 | 25.9 | 23.96 | 23.56 | 26.68 | 38.31 | 51.37 | 51.35 | 47.68 | 42.87 | 40.06 | 38.9 | 38.32 | 38.79 | 42.54 | 48.81 | 56.22 |
| 7 | 0 | 8 | 21 | 0 | 34.61 | 34.49 | 34.55 | 37.81 | 47.75 | 57.17 | 56.51 | 52.89 | 48.1 | 45.09 | 43.58 | 42.56 | 42.54 | 45.51 | 50.22 | 56.37 |
| 0 | 0 | 22 | 23 | 0 | 21.31 | 18.9 | 18.49 | 21.64 | 35.21 | 53.96 | 55.85 | 52.96 | 48.77 | 46.64 | 46.42 | 47.24 | 49.23 | 55.26 | 65.21 | 73.65 |
| 7 | 0 | 37 | 23 | 0 | 13.05 | 10.5 | 10.15 | 12.66 | 26.03 | 50.18 | 53.78 | 50.77 | 46.08 | 43.14 | 41.58 | 40.63 | 40.84 | 43.83 | 48.61 | 54.93 |
| 0 | 0 | 15 | 15 | 0 | 26.15 | 24 | 23.72 | 27.34 | 41.57 | 59.4 | 61.35 | 58.97 | 55.25 | 53.35 | 53.06 | 53.71 | 55.34 | 60.37 | 67.93 | 74.2 |
| 7 | 0 | 15 | 8 | 0 | 27.25 | 24.97 | 24.76 | 28.67 | 44.31 | 64.77 | 67.28 | 64.85 | 60.74 | 57.59 | 55.07 | 52.65 | 51.21 | 51.85 | 53.16 | 57.27 |
| 33 | 0 | 37 | 8 | 0 | 13.95 | 11.24 | 10.9 | 13.7 | 28.6 | 57.83 | 62.54 | 58.44 | 51.79 | 45.59 | 39.88 | 34.43 | 30.89 | 29.32 | 28.3 | 31.41 |
| 17 | 0 | 37 | 15 | 0 | 13.04 | 10.34 | 9.94 | 12.61 | 26.92 | 54.07 | 58.66 | 55.42 | 50.07 | 45.83 | 42.5 | 39.31 | 37.35 | 37.59 | 38.55 | 42.88 |
| 17 | 0 | 22 | 8 | 0 | 20.59 | 17.8 | 17.45 | 20.99 | 37.15 | 62.45 | 66.12 | 63.06 | 57.78 | 53.07 | 48.71 | 44.39 | 41.49 | 40.71 | 40.49 | 44.22 |
| 7 | 0 | 22 | 15 | 0 | 22.56 | 20.25 | 19.92 | 23.18 | 37.49 | 58.87 | 61.94 | 59.28 | 54.92 | 51.92 | 50.05 | 48.51 | 48.01 | 50.09 | 53.43 | 58.44 |
| 17 | 0 | 8 | 21 | 0 | 34.55 | 34.77 | 34.84 | 38.19 | 48.19 | 57.4 | 56.38 | 52.21 | 46.73 | 42.76 | 39.89 | 37.26 | 35.79 | 36.7 | 38.61 | 43.42 |
| 17 | 0 | 22 | 0 | 0 | 23.42 | 21.55 | 21.44 | 25.14 | 41.96 | 70.03 | 75.55 | 73.49 | 68.82 | 63.32 | 57.19 | 50.84 | 46.41 | 43.89 | 41.9 | 44.61 |
| 33 | 0 | 15 | 8 | 0 | 27.18 | 25.55 | 25.48 | 29.43 | 44.51 | 63.28 | 64.06 | 59.33 | 52.5 | 46.18 | 40.4 | 34.94 | 31.4 | 29.9 | 29.99 | 32.13 |
| 33 | 0 | 22 | 0 | 0 | 22.66 | 20.43 | 20.24 | 24.12 | 41.12 | 68.08 | 71.85 | 67.78 | 60.81 | 53.26 | 45.73 | 38.66 | 34.06 | 31.58 | 29.73 | 32.4 |
| 33 | 0 | 37 | 0 | 0 | 15.4 | 12.87 | 12.57 | 15.55 | 31.24 | 64.11 | 71.18 | 67.73 | 60.99 | 53.6 | 46.14 | 39.15 | 34.59 | 32.12 | 30.24 | 32.91 |
| 33 | 0 | 22 | 8 | 0 | 21.53 | 19.24 | 18.9 | 22.52 | 38.13 | 61.38 | 63.66 | 59.19 | 52.46 | 46.22 | 40.5 | 35.11 | 31.62 | 30.12 | 29.16 | 32.14 |
| 17 | 0 | 15 | 8 | 0 | 29.06 | 27.69 | 27.62 | 31.4 | 45.83 | 64.66 | 66.5 | 63.17 | 57.88 | 53.12 | 48.72 | 44.33 | 41.4 | 40.55 | 40.29 | 43.86 |
| 33 | 0 | 8 | 30 | 0 | 31.33 | 31.13 | 31.11 | 34.3 | 43.53 | 51.05 | 49 | 44.04 | 38.04 | 33.7 | 30.55 | 27.64 | 25.91 | 26.21 | 27.24 | 31.31 |
| 33 | 0 | 15 | 30 | 0 | 24.2 | 22.38 | 22.1 | 25.32 | 36.99 | 49.28 | 48.24 | 43.45 | 37.53 | 33.26 | 30.17 | 27.31 | 25.61 | 25.91 | 26.92 | 30.96 |
| 90 | 0 | 22 | 23 | 0 | 19.27 | 17.24 | 17 | 20.38 | 33.52 | 48.1 | 45.26 | 38.09 | 30.29 | 24.2 | 19.42 | 15.43 | 13.08 | 12.04 | 11.39 | 13.12 |
| 90 | 0 | 37 | 23 | 0 | 13.87 | 11.19 | 10.81 | 13.59 | 26.78 | 46.4 | 45.37 | 38.65 | 31.09 | 25.15 | 20.46 | 16.49 | 14.12 | 13.06 | 12.4 | 14.17 |
| 58 | 0 | 15 | 15 | 0 | 23.62 | 21.66 | 21.48 | 25.32 | 39.49 | 55.26 | 53.69 | 47.31 | 39.49 | 32.96 | 27.54 | 22.77 | 19.84 | 18.59 | 17.83 | 20.26 |
| 58 | 0 | 37 | 15 | 0 | 14.02 | 11.36 | 10.98 | 13.77 | 27.96 | 52.57 | 54.22 | 48.31 | 40.59 | 34.09 | 28.67 | 23.87 | 20.92 | 19.66 | 18.9 | 21.37 |
| 58 | 0 | 22 | 15 | 0 | 19.85 | 17.53 | 17.19 | 20.63 | 35.2 | 54.43 | 53.88 | 47.63 | 39.86 | 33.35 | 27.94 | 23.14 | 20.18 | 18.94 | 18.17 | 20.62 |
| 33 | 0 | 255 | 18 | 0 | 3.56 | 2.75 | 2.67 | 3.18 | 8.91 | 37.69 | 53.46 | 52.03 | 46.69 | 42.02 | 38.06 | 34.22 | 31.7 | 31.01 | 30.81 | 34.08 |

TABLE 4-continued

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 90 | 0 | 255 | 18 | 0 | 3.67 | 2.83 | 2.71 | 3.3 | 9.27 | 36.01 | 46.8 | 42.17 | 34.89 | 28.78 | 23.8 | 19.54 | 16.93 | 15.7 | 14.86 | 16.66 |
| 58 | 0 | 255 | 10 | 0 | 3.54 | 2.79 | 2.69 | 3.24 | 9.21 | 39.03 | 55.12 | 52.4 | 45.39 | 38.82 | 33.08 | 27.94 | 24.71 | 23.16 | 22.12 | 24.42 |
| 33 | 0 | 37 | 23 | 0 | 13.29 | 10.71 | 10.3 | 12.91 | 26.32 | 49.6 | 51.86 | 47.38 | 41.18 | 36.39 | 32.62 | 29.08 | 26.86 | 26.61 | 26.97 | 30.75 |
| 255 | 0 | 0 | 105 | 0 | 18.52 | 20.43 | 21.1 | 22.36 | 21.8 | 19.65 | 16.07 | 12.25 | 8.83 | 6.54 | 4.99 | 3.85 | 3.27 | 3.08 | 2.98 | 3.43 |
| 58 | 0 | 0 | 88 | 0 | 24.77 | 24.88 | 24.32 | 24.81 | 25.23 | 24.7 | 22.25 | 19.01 | 15.68 | 13.82 | 12.96 | 12.28 | 12.11 | 13.45 | 15.85 | 20.08 |
| 255 | 0 | 15 | 58 | 0 | 16.5 | 16.41 | 16.77 | 19.93 | 25.68 | 26.16 | 20.95 | 15.49 | 10.77 | 7.53 | 5.37 | 3.93 | 3.25 | 2.97 | 2.82 | 3.2 |
| 17 | 0 | 0 | 54 | 0 | 36.74 | 38.22 | 37.98 | 38.89 | 39.79 | 39.57 | 36.82 | 32.68 | 28.04 | 25.44 | 24.41 | 23.83 | 24.15 | 27.34 | 32.96 | 40.57 |
| 17 | 0 | 0 | 77 | 0 | 28.6 | 28.7 | 28.01 | 28.46 | 29.17 | 28.93 | 26.53 | 23.1 | 19.46 | 17.63 | 17.2 | 17.28 | 18.1 | 21.88 | 29.58 | 39.72 |
| 58 | 0 | 5 | 47 | 0 | 30.78 | 31.15 | 31.15 | 33.82 | 39.81 | 42.93 | 39.7 | 34.48 | 28.69 | 24.62 | 21.67 | 19 | 17.4 | 17.36 | 17.83 | 20.9 |
| 255 | 0 | 37 | 26 | 0 | 12.14 | 10.72 | 10.69 | 13.45 | 23.06 | 29.62 | 24.04 | 17.66 | 12.25 | 8.5 | 6 | 4.33 | 3.53 | 3.19 | 2.99 | 3.38 |
| 255 | 0 | 37 | 44 | 0 | 12.45 | 11.12 | 11.04 | 13.76 | 22.68 | 28.31 | 23.12 | 17.1 | 11.92 | 8.32 | 5.92 | 4.3 | 3.52 | 3.18 | 3 | 3.41 |
| 137 | 0 | 15 | 35 | 0 | 21.7 | 20.76 | 20.82 | 24.24 | 34.15 | 41.21 | 36.53 | 29.51 | 22.58 | 17.45 | 13.59 | 10.52 | 8.76 | 8.01 | 7.55 | 8.79 |
| 255 | 0 | 0 | 44 | 0 | 24.01 | 29.94 | 33.43 | 37.74 | 35.36 | 29.76 | 23.18 | 17.08 | 11.91 | 8.35 | 5.98 | 4.39 | 3.61 | 3.3 | 3.11 | 3.51 |
| 137 | 0 | 0 | 35 | 0 | 34.97 | 41.33 | 44.08 | 47.29 | 46.77 | 43.27 | 36.94 | 29.66 | 22.63 | 17.4 | 13.47 | 10.35 | 8.59 | 7.83 | 7.41 | 8.66 |
| 255 | 0 | 5 | 26 | 0 | 21.66 | 25.44 | 27.83 | 32.53 | 34.75 | 30.83 | 23.72 | 17.18 | 11.8 | 8.15 | 5.72 | 4.16 | 3.4 | 3.1 | 2.92 | 3.27 |
| 137 | 0 | 0 | 53 | 0 | 31.52 | 35.81 | 37.38 | 39.63 | 39.49 | 36.97 | 31.77 | 25.67 | 19.73 | 15.43 | 12.25 | 9.64 | 8.14 | 7.57 | 7.28 | 8.54 |
| 255 | 0 | 5 | 44 | 0 | 20.81 | 24.08 | 26.01 | 30.06 | 32.1 | 28.84 | 22.41 | 16.33 | 11.22 | 7.72 | 5.42 | 3.91 | 3.19 | 2.88 | 2.73 | 3.08 |
| 137 | 0 | 5 | 35 | 0 | 28.66 | 30.49 | 31.5 | 35.3 | 41.18 | 42.28 | 36.48 | 29.24 | 22.21 | 16.99 | 13.1 | 10.01 | 8.27 | 7.52 | 7.07 | 8.26 |
| 58 | 0 | 5 | 66 | 0 | 26.48 | 25.95 | 25.57 | 27.31 | 31.16 | 32.76 | 30.07 | 26.04 | 21.72 | 19.04 | 17.43 | 16.02 | 15.3 | 16.13 | 17.73 | 21.4 |
| 7 | 0 | 0 | 0 | 0 | 62.84 | 74.13 | 78.13 | 80.24 | 80.75 | 80.49 | 79.54 | 77.73 | 74.85 | 71.58 | 67.61 | 63.18 | 59.76 | 57.8 | 56.11 | 58.37 |
| 7 | 0 | 0 | 8 | 0 | 57.36 | 65.83 | 68.4 | 70.15 | 70.96 | 70.77 | 69.04 | 65.98 | 61.78 | 58.53 | 55.88 | 53.38 | 51.87 | 52.54 | 53.9 | 57.77 |
| 17 | 0 | 2 | 0 | 0 | 54.37 | 61.52 | 64.38 | 68.02 | 73.93 | 78.25 | 77.19 | 74 | 68.99 | 63.32 | 57.02 | 50.52 | 45.91 | 43.31 | 41.26 | 44.1 |
| 7 | 0 | 0 | 41 | 0 | 42.7 | 45.61 | 45.79 | 46.84 | 47.86 | 47.77 | 45.16 | 41.04 | 36.22 | 33.58 | 32.72 | 32.54 | 33.39 | 37.81 | 45.55 | 54.42 |
| 7 | 0 | 0 | 21 | 0 | 50.18 | 55.86 | 57.17 | 58.64 | 59.61 | 59.51 | 57.17 | 53.31 | 48.46 | 45.47 | 43.92 | 42.9 | 42.88 | 45.83 | 50.6 | 56.77 |
| 17 | 0 | 2 | 21 | 0 | 44.13 | 47.49 | 48.41 | 50.82 | 55.03 | 57.38 | 55.01 | 50.64 | 45.15 | 41.29 | 38.57 | 36.06 | 34.7 | 35.71 | 37.73 | 42.65 |
| 58 | 0 | 8 | 0 | 0 | 33.82 | 34.19 | 34.92 | 40.08 | 55.28 | 69.22 | 66.55 | 58.99 | 49.31 | 40.16 | 32.15 | 25.44 | 21.42 | 19.3 | 17.83 | 20.03 |
| 33 | 0 | 5 | 0 | 0 | 43.6 | 46.44 | 47.97 | 52.76 | 64.33 | 73.91 | 72.4 | 67.28 | 59.83 | 51.94 | 44.08 | 36.74 | 31.99 | 29.38 | 27.48 | 30.26 |
| 33 | 0 | 5 | 8 | 0 | 40.8 | 42.31 | 43.17 | 47.3 | 57.57 | 65.9 | 64 | 58.76 | 51.7 | 45.23 | 39.31 | 33.71 | 30.11 | 28.52 | 27.53 | 30.65 |
| 33 | 0 | 0 | 0 | 0 | 59.92 | 70.87 | 75.57 | 78.56 | 78.63 | 77 | 73.61 | 68.29 | 60.88 | 53.09 | 45.32 | 38.03 | 33.29 | 30.72 | 28.82 | 31.61 |
| 33 | 0 | 0 | 8 | 0 | 54.6 | 62.8 | 65.86 | 68.29 | 68.65 | 67.39 | 63.65 | 58.39 | 51.32 | 44.92 | 39.07 | 33.53 | 29.97 | 28.43 | 27.45 | 30.59 |
| 58 | 0 | 2 | 0 | 0 | 48.25 | 55.37 | 58.48 | 63.21 | 69.71 | 72.32 | 67.69 | 60.03 | 50.56 | 41.64 | 33.78 | 27.14 | 23.14 | 21.04 | 19.56 | 21.85 |
| 17 | 0 | 0 | 8 | 0 | 56.42 | 65.7 | 68.53 | 70.4 | 70.95 | 70.3 | 67.91 | 63.91 | 58.52 | 53.77 | 49.39 | 45.08 | 42.22 | 41.46 | 41.3 | 44.94 |
| 33 | 0 | 2 | 0 | 0 | 52.75 | 60.68 | 63.78 | 67.5 | 72.81 | 76.12 | 73.7 | 68.65 | 61.48 | 53.84 | 46.19 | 39.02 | 34.34 | 31.8 | 29.9 | 32.65 |
| 33 | 0 | 2 | 8 | 0 | 46.98 | 52.78 | 54.93 | 58.36 | 63.7 | 66.66 | 64 | 58.88 | 52.1 | 45.84 | 40.12 | 34.7 | 31.2 | 29.69 | 28.76 | 31.9 |
| 17 | 0 | 2 | 8 | 0 | 49.91 | 55.51 | 57.43 | 60.27 | 65.03 | 68.28 | 66.58 | 62.78 | 57.47 | 52.79 | 48.51 | 44.22 | 41.39 | 40.62 | 40.44 | 44.05 |
| 255 | 0 | 73 | 0 | 0 | 8.61 | 6.9 | 6.76 | 8.76 | 18.61 | 31.35 | 26.35 | 19.23 | 13.24 | 9.08 | 6.32 | 4.5 | 3.64 | 3.25 | 3.05 | 3.42 |
| 255 | 0 | 73 | 4 | 0 | 8.89 | 7.27 | 7.05 | 9.16 | 18.98 | 31.26 | 26.35 | 19.37 | 13.42 | 9.28 | 6.49 | 4.63 | 3.73 | 3.35 | 3.13 | 3.52 |
| 205 | 0 | 37 | 0 | 0 | 12.86 | 10.89 | 10.77 | 13.7 | 26.85 | 43.52 | 37.74 | 28.44 | 20.26 | 14.36 | 10.23 | 7.33 | 5.83 | 5.12 | 4.69 | 5.38 |
| 255 | 0 | 73 | 18 | 0 | 8.67 | 6.96 | 6.79 | 8.81 | 18.28 | 29.63 | 25 | 18.43 | 12.77 | 8.82 | 6.18 | 4.42 | 3.57 | 3.21 | 2.99 | 3.38 |
| 255 | 0 | 73 | 10 | 0 | 8.55 | 6.86 | 6.69 | 8.7 | 18.36 | 30.27 | 25.43 | 18.62 | 12.84 | 8.8 | 6.13 | 4.35 | 3.5 | 3.14 | 2.92 | 3.31 |
| 205 | 0 | 37 | 10 | 0 | 13.03 | 11.2 | 11.06 | 13.94 | 26.22 | 40.74 | 35.34 | 26.78 | 19.14 | 13.61 | 9.73 | 6.97 | 5.55 | 4.91 | 4.5 | 5.23 |
| 90 | 0 | 15 | 0 | 0 | 24.82 | 23.29 | 23.48 | 27.98 | 44.5 | 62.26 | 58.31 | 48.87 | 38.47 | 29.78 | 22.92 | 17.56 | 14.49 | 12.95 | 11.88 | 13.48 |
| 137 | 0 | 22 | 0 | 0 | 18.91 | 17.01 | 17 | 20.98 | 36.61 | 54.34 | 48.55 | 38.29 | 28.32 | 20.75 | 15.23 | 11.15 | 8.96 | 7.88 | 7.18 | 8.25 |
| 137 | 0 | 22 | 4 | 0 | 18.82 | 16.88 | 16.82 | 20.67 | 35.66 | 52.16 | 46.62 | 36.75 | 27.19 | 19.95 | 14.64 | 10.69 | 8.57 | 7.54 | 6.88 | 7.97 |
| 255 | 0 | 22 | 0 | 0 | 15.43 | 15.01 | 15.39 | 19.2 | 29.46 | 33.62 | 26.07 | 18.62 | 12.59 | 8.49 | 5.83 | 4.12 | 3.33 | 3.01 | 2.81 | 3.17 |
| 255 | 0 | 22 | 4 | 0 | 15.24 | 14.75 | 15.09 | 18.84 | 28.97 | 32.96 | 25.55 | 18.22 | 12.29 | 8.27 | 5.68 | 4.02 | 3.24 | 2.94 | 2.75 | 3.08 |
| 205 | 0 | 15 | 0 | 0 | 21.04 | 21.19 | 21.98 | 26.68 | 39.03 | 46.31 | 37.88 | 28.14 | 19.76 | 13.79 | 9.65 | 6.79 | 5.35 | 4.7 | 4.29 | 4.96 |
| 255 | 0 | 37 | 4 | 0 | 12.47 | 11 | 10.94 | 13.95 | 24.9 | 33.26 | 26.59 | 19.18 | 13.07 | 8.87 | 6.12 | 4.36 | 3.53 | 3.2 | 3 | 3.36 |
| 205 | 0 | 22 | 0 | 0 | 17.46 | 16.21 | 16.39 | 20.38 | 34.14 | 45.81 | 38.11 | 28.34 | 19.91 | 13.89 | 9.73 | 6.88 | 5.43 | 4.79 | 4.38 | 5.04 |
| 205 | 0 | 22 | 4 | 0 | 17.58 | 16.6 | 16.87 | 20.75 | 33.51 | 44.21 | 36.89 | 27.52 | 19.36 | 13.56 | 9.53 | 6.75 | 5.34 | 4.7 | 4.31 | 4.99 |
| 205 | 0 | 37 | 4 | 0 | 12.05 | 10.03 | 9.88 | 12.74 | 25.75 | 41.93 | 36.21 | 27.16 | 19.15 | 13.44 | 9.47 | 6.69 | 5.28 | 4.66 | 4.27 | 4.94 |
| 255 | 0 | 0 | 4 | 0 | 25.78 | 34.5 | 40.85 | 48.59 | 43.67 | 34.53 | 25.59 | 18.03 | 12.06 | 8.05 | 5.48 | 3.86 | 3.13 | 2.84 | 2.65 | 2.98 |
| 205 | 0 | 0 | 0 | 0 | 34.17 | 45.59 | 53.28 | 61.63 | 57.59 | 48.2 | 37.4 | 27.32 | 18.89 | 12.97 | 8.97 | 6.25 | 4.93 | 4.33 | 3.95 | 4.57 |
| 255 | 0 | 2 | 0 | 0 | 24.52 | 31.39 | 36.31 | 43.55 | 42.53 | 34.93 | 25.96 | 18.33 | 12.27 | 8.21 | 5.61 | 3.99 | 3.24 | 2.94 | 2.76 | 3.1 |
| 205 | 0 | 0 | 4 | 0 | 33.55 | 44.06 | 50.92 | 58.39 | 54.82 | 46.22 | 36.15 | 26.66 | 18.64 | 13 | 9.14 | 6.51 | 5.2 | 4.61 | 4.25 | 4.87 |
| 255 | 0 | 2 | 4 | 0 | 24.14 | 30.54 | 34.94 | 41.79 | 41.45 | 34.36 | 25.64 | 18.15 | 12.2 | 8.21 | 5.64 | 4.02 | 3.28 | 2.97 | 2.78 | 3.12 |
| 205 | 0 | 2 | 0 | 0 | 31.77 | 40.5 | 46.09 | 53.5 | 54.21 | 47.9 | 37.59 | 27.7 | 19.35 | 13.43 | 9.38 | 6.61 | 5.21 | 4.58 | 4.19 | 4.83 |
| 255 | 0 | 0 | 18 | 0 | 24.82 | 32.32 | 37.33 | 43.35 | 39.69 | 32.25 | 24.4 | 17.53 | 11.92 | 8.11 | 5.62 | 4.01 | 3.24 | 2.93 | 2.74 | 3.11 |
| 205 | 0 | 0 | 18 | 0 | 32.01 | 40.7 | 45.66 | 51.18 | 48.89 | 42.41 | 33.94 | 25.57 | 18.26 | 13.03 | 9.37 | 6.77 | 5.44 | 4.84 | 4.48 | 5.18 |
| 255 | 0 | 2 | 18 | 0 | 23.97 | 29.77 | 33.55 | 39.23 | 38.75 | 32.75 | 24.97 | 18.02 | 12.33 | 8.45 | 5.92 | 4.24 | 3.47 | 3.15 | 2.97 | 3.33 |
| 205 | 0 | 0 | 10 | 0 | 32.68 | 42.69 | 48.66 | 55.09 | 52.19 | 44.74 | 35.48 | 26.49 | 18.73 | 13.21 | 9.38 | 6.73 | 5.37 | 4.76 | 4.39 | 5.06 |
| 255 | 0 | 2 | 10 | 0 | 24.17 | 30.56 | 34.69 | 40.92 | 40.46 | 33.91 | 25.64 | 18.34 | 12.44 | 8.43 | 5.8 | 4.11 | 3.31 | 2.98 | 2.81 | 3.16 |
| 205 | 0 | 2 | 10 | 0 | 30.35 | 37.98 | 42.48 | 48.56 | 49.25 | 44.07 | 35.09 | 26.17 | 18.47 | 12.99 | 9.19 | 6.56 | 5.21 | 4.61 | 4.25 | 4.93 |
| 90 | 0 | 0 | 0 | 0 | 49.37 | 62.41 | 68.89 | 74.12 | 72.76 | 67.74 | 59.75 | 49.84 | 39.3 | 30.46 | 23.45 | 17.93 | 14.78 | 13.19 | 12.11 | 13.77 |
| 90 | 0 | 0 | 4 | 0 | 47.51 | 59.02 | 64.53 | 69.19 | 68.07 | 63.53 | 56.06 | 46.8 | 37 | 28.9 | 22.44 | 17.31 | 14.35 | 12.87 | 11.9 | 13.55 |
| 90 | 0 | 2 | 0 | 0 | 42.94 | 50.64 | 54.39 | 60.14 | 66.11 | 66.31 | 58.97 | 49.14 | 38.59 | 29.75 | 22.76 | 17.29 | 14.16 | 12.59 | 11.53 | 13.16 |
| 137 | 0 | 0 | 4 | 0 | 40.95 | 52.38 | 58.75 | 64.94 | 62.89 | 56.34 | 47.04 | 36.96 | 27.54 | 20.38 | 15.09 | 11.13 | 8.96 | 7.92 | 7.23 | 8.37 |
| 90 | 0 | 2 | 4 | 0 | 38.3 | 46.33 | 50.92 | 57.48 | 61.39 | 58.42 | 49.02 | 38.44 | 28.57 | 21.05 | 15.51 | 11.41 | 9.2 | 8.12 | 7.41 | 8.56 |
| 137 | 0 | 2 | 4 | 0 | 37.17 | 44.39 | 48.37 | 54.31 | 58.33 | 55.94 | 47.2 | 37.19 | 27.71 | 20.49 | 15.11 | 11.09 | 8.91 | 7.87 | 7.17 | 8.33 |
| 255 | 0 | 8 | 0 | 0 | 20.93 | 23.91 | 26.07 | 31.62 | 37.53 | 34.82 | 26.31 | 18.7 | 12.61 | 8.48 | 5.8 | 4.09 | 3.31 | 2.99 | 2.8 | 3.16 |
| 255 | 0 | 8 | 4 | 0 | 20.34 | 22.88 | 24.81 | 30.1 | 36.05 | 33.6 | 25.4 | 18.01 | 12.12 | 8.14 | 5.58 | 3.98 | 3.23 | 2.92 | 2.76 | 3.1 |
| 205 | 0 | 8 | 0 | 0 | 25.51 | 28.3 | 30.35 | 36.07 | 45.47 | 47.01 | 37.81 | 28.1 | 19.77 | 13.8 | 9.66 | 6.81 | 5.37 | 4.72 | 4.34 | 5.02 |
| 255 | 0 | 5 | 4 | 0 | 22.14 | 26.24 | 29.09 | 34.89 | 38.1 | 33.56 | 25.31 | 18 | 12.12 | 8.13 | 5.54 | 3.9 | 3.14 | 2.82 | 2.64 | 2.98 |

TABLE 4-continued

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 205 | 0 | 5 | 0 | 0 | 27.5 | 31.69 | 34.66 | 41.1 | 48.04 | 46.58 | 36.99 | 27.35 | 19.2 | 13.4 | 9.41 | 6.66 | 5.27 | 4.65 | 4.27 | 4.92 |
| 205 | 0 | 5 | 4 | 0 | 28.15 | 32.8 | 35.78 | 41.86 | 47.52 | 45.51 | 36.28 | 26.98 | 19.03 | 13.36 | 9.42 | 6.69 | 5.3 | 4.67 | 4.3 | 4.96 |
| 205 | 0 | 2 | 4 | 0 | 30.83 | 38.31 | 43.13 | 49.83 | 50.92 | 45.3 | 35.76 | 26.55 | 18.73 | 13.15 | 9.29 | 6.58 | 5.23 | 4.6 | 4.22 | 4.9 |
| 17 | 0 | 2 | 41 | 0 | 38.56 | 39.89 | 39.91 | 41.77 | 45.38 | 47.23 | 44.66 | 40.28 | 35.13 | 31.99 | 30.33 | 29.08 | 28.81 | 31.25 | 35.52 | 41.89 |
| 58 | 0 | 8 | 30 | 0 | 29.8 | 29.18 | 29.15 | 32.65 | 42.2 | 49.29 | 46.16 | 40.2 | 33.41 | 28.23 | 24.16 | 20.49 | 18.24 | 17.62 | 17.48 | 20.23 |
| 33 | 0 | 5 | 21 | 0 | 36.9 | 37.92 | 38.4 | 41.72 | 49.98 | 56.02 | 53.59 | 48.42 | 42 | 37.01 | 33 | 29.22 | 26.9 | 26.56 | 26.89 | 30.62 |
| 137 | 0 | 22 | 23 | 0 | 17.41 | 15.53 | 15.37 | 18.79 | 31.52 | 44.08 | 39.38 | 31.43 | 23.64 | 17.77 | 13.43 | 10.1 | 8.23 | 7.4 | 6.87 | 7.99 |
| 58 | 0 | 8 | 8 | 0 | 33.33 | 33.45 | 33.97 | 38.59 | 51.94 | 63.24 | 60.32 | 53.41 | 44.88 | 37.33 | 30.84 | 25.15 | 21.68 | 20.01 | 18.91 | 21.3 |
| 137 | 0 | 8 | 8 | 0 | 28.3 | 29.53 | 30.69 | 35.61 | 46.84 | 52.56 | 45.29 | 35.87 | 26.83 | 19.97 | 14.88 | 11.02 | 8.93 | 7.92 | 7.26 | 8.42 |
| 137 | 0 | 15 | 15 | 0 | 22.5 | 21.47 | 21.74 | 25.91 | 38.75 | 48.65 | 42.83 | 34.23 | 25.84 | 19.46 | 14.72 | 11.03 | 8.99 | 8.06 | 7.43 | 8.59 |
| 90 | 0 | 8 | 8 | 0 | 31.33 | 32.12 | 32.92 | 37.65 | 49.99 | 58.46 | 53.29 | 44.78 | 35.56 | 27.99 | 21.97 | 17.08 | 14.24 | 12.84 | 11.95 | 13.62 |
| 90 | 0 | 15 | 15 | 0 | 23.93 | 22.16 | 22.13 | 26.21 | 40.11 | 53.44 | 49.71 | 41.98 | 33.5 | 26.63 | 21.19 | 16.67 | 14 | 12.78 | 11.95 | 13.71 |
| 33 | 0 | 2 | 21 | 0 | 43.24 | 47.26 | 48.43 | 51.1 | 55.45 | 57.5 | 54.51 | 49.37 | 43.07 | 38.16 | 34.2 | 30.46 | 28.12 | 27.77 | 28.11 | 31.8 |
| 90 | 0 | 8 | 0 | 0 | 31.45 | 31.98 | 32.77 | 38.11 | 52.83 | 63.84 | 58.4 | 49 | 38.77 | 30.18 | 23.35 | 17.96 | 14.86 | 13.31 | 12.23 | 13.88 |
| 58 | 0 | 2 | 8 | 0 | 45.59 | 51.72 | 54.18 | 58.05 | 62.9 | 64.44 | 59.96 | 52.91 | 44.42 | 36.94 | 30.47 | 24.83 | 21.4 | 19.74 | 18.68 | 21.09 |
| 90 | 0 | 5 | 0 | 0 | 36.04 | 38.74 | 40.47 | 46.07 | 57.87 | 64.34 | 58.02 | 48.46 | 38.12 | 29.5 | 22.67 | 17.27 | 14.2 | 12.64 | 11.58 | 13.21 |
| 137 | 0 | 8 | 0 | 0 | 29.99 | 31.76 | 33.29 | 38.7 | 50.38 | 56.55 | 48.69 | 38.4 | 28.55 | 21.02 | 15.48 | 11.34 | 9.1 | 8.01 | 7.29 | 8.44 |
| 90 | 0 | 5 | 8 | 0 | 35.11 | 37.76 | 39.2 | 44.13 | 53.92 | 58.62 | 52.85 | 44.32 | 35.17 | 27.67 | 21.7 | 16.85 | 14.04 | 12.68 | 11.75 | 13.43 |
| 58 | 0 | 5 | 8 | 0 | 37.61 | 39.66 | 40.72 | 45.25 | 55.74 | 62.98 | 59.48 | 52.75 | 44.46 | 37.14 | 30.8 | 25.2 | 21.78 | 20.15 | 19.06 | 21.46 |
| 33 | 0 | 0 | 30 | 0 | 44.65 | 49.9 | 51.12 | 52.77 | 53.47 | 52.69 | 49.19 | 44.08 | 38.03 | 33.72 | 30.51 | 27.48 | 25.67 | 25.92 | 26.9 | 31.02 |
| 58 | 0 | 2 | 30 | 0 | 38.04 | 41.34 | 42.34 | 45.09 | 49.07 | 50.19 | 46.16 | 40.21 | 33.47 | 28.35 | 24.26 | 20.52 | 18.24 | 17.54 | 17.34 | 20.15 |
| 90 | 0 | 0 | 23 | 0 | 41.98 | 49.48 | 52.43 | 55.41 | 55.04 | 52 | 46.09 | 38.76 | 31.03 | 24.96 | 20.1 | 15.98 | 13.53 | 12.45 | 11.79 | 13.62 |
| 137 | 0 | 2 | 23 | 0 | 34.11 | 39.14 | 41.56 | 45.75 | 48.52 | 46.61 | 39.75 | 31.78 | 24.1 | 18.34 | 13.98 | 10.58 | 8.68 | 7.82 | 7.3 | 8.51 |
| 58 | 0 | 0 | 15 | 0 | 47.57 | 55.32 | 58.31 | 61 | 61.12 | 59.05 | 54.2 | 47.5 | 39.72 | 33.22 | 27.76 | 22.88 | 19.9 | 18.6 | 17.83 | 20.33 |
| 137 | 0 | 5 | 15 | 0 | 30.5 | 32.98 | 34.52 | 39.31 | 47.06 | 48.87 | 41.88 | 33.26 | 25 | 18.79 | 14.15 | 10.59 | 8.62 | 7.71 | 7.13 | 8.28 |
| 90 | 0 | 2 | 15 | 0 | 39.39 | 44.42 | 46.75 | 50.93 | 55.16 | 55.14 | 49.22 | 41.39 | 33.08 | 26.42 | 21.07 | 16.63 | 14.02 | 12.8 | 11.99 | 13.7 |
| 255 | 0 | 22 | 18 | 0 | 15.33 | 14.81 | 15.16 | 18.75 | 27.83 | 30.94 | 24.2 | 17.43 | 11.87 | 8.08 | 5.63 | 4.03 | 3.27 | 2.99 | 2.8 | 3.14 |
| 255 | 0 | 8 | 18 | 0 | 20.46 | 22.67 | 24.37 | 29.09 | 34.15 | 31.77 | 24.35 | 17.5 | 11.9 | 8.1 | 5.65 | 4.04 | 3.31 | 3.01 | 2.81 | 3.17 |
| 255 | 0 | 15 | 10 | 0 | 17.81 | 18.38 | 19.22 | 23.41 | 31.66 | 32.62 | 25.08 | 17.92 | 12.1 | 8.17 | 5.62 | 4.01 | 3.25 | 2.94 | 2.77 | 3.11 |
| 137 | 0 | 8 | 23 | 0 | 27.32 | 27.93 | 28.66 | 32.87 | 42.19 | 46.37 | 40.27 | 32.34 | 24.6 | 18.77 | 14.36 | 10.92 | 9 | 8.09 | 7.54 | 8.78 |
| 255 | 0 | 0 | 105 | 255 | 14.97 | 15.6 | 14.56 | 12.14 | 8.76 | 5.9 | 3.9 | 2.93 | 2.46 | 2.45 | 2.71 | 3.01 | 3.35 | 3.5 | 3.44 | 4.03 |
| 58 | 0 | 0 | 88 | 50 | 26.42 | 26.48 | 24.99 | 23.69 | 21.77 | 19.85 | 17.1 | 15.82 | 13.65 | 13.62 | 13.5 | 12.55 | 12 | 12.69 | 14.07 | 17.17 |
| 255 | 0 | 0 | 58 | 50 | 23.06 | 27.35 | 28.57 | 28.91 | 25.21 | 21.16 | 16.84 | 13.77 | 10.29 | 8 | 6.02 | 4.43 | 3.63 | 3.3 | 3.09 | 3.54 |
| 17 | 0 | 0 | 54 | 12 | 37.21 | 39.43 | 38.53 | 37.82 | 36.48 | 34.68 | 31.19 | 28.88 | 25.36 | 24.88 | 24.77 | 23.8 | 23.51 | 25.7 | 29.63 | 35.69 |
| 17 | 0 | 0 | 77 | 12 | 27.99 | 28.17 | 27.22 | 26.97 | 26.6 | 25.59 | 22.92 | 20.52 | 17.51 | 16.63 | 16.58 | 16.47 | 16.93 | 19.98 | 25.84 | 33.78 |
| 58 | 0 | 0 | 47 | 12 | 37.81 | 41.5 | 41.29 | 40.9 | 39.05 | 36.53 | 32.34 | 29.37 | 25.11 | 23.28 | 21.3 | 18.55 | 16.81 | 16.55 | 16.78 | 19.6 |
| 255 | 0 | 0 | 26 | 12 | 25.17 | 31.96 | 35.72 | 39.41 | 35.23 | 28.98 | 22.42 | 16.96 | 11.94 | 8.49 | 6.02 | 4.32 | 3.5 | 3.16 | 2.95 | 3.37 |
| 255 | 0 | 0 | 44 | 12 | 23.8 | 29.46 | 32.32 | 35.26 | 32.07 | 26.87 | 21.02 | 16 | 11.34 | 8.15 | 5.88 | 4.26 | 3.5 | 3.17 | 2.98 | 3.39 |
| 137 | 0 | 0 | 35 | 12 | 34.01 | 40.04 | 41.68 | 42.65 | 39.85 | 35.74 | 30.06 | 25.42 | 19.97 | 16.32 | 13.02 | 10.01 | 8.3 | 7.54 | 7.1 | 8.32 |
| 255 | 0 | 0 | 44 | 255 | 16.27 | 17.59 | 16.34 | 13.06 | 8.93 | 5.85 | 3.88 | 2.98 | 2.56 | 2.56 | 2.83 | 3.14 | 3.51 | 3.59 | 3.44 | 3.92 |
| 137 | 0 | 0 | 35 | 137 | 29.21 | 32.33 | 30.33 | 25.86 | 20.04 | 15.53 | 11.66 | 9.81 | 8.1 | 8.24 | 8.72 | 8.32 | 8.01 | 7.65 | 7.22 | 8.36 |
| 255 | 0 | 0 | 26 | 137 | 23.07 | 27.57 | 27.91 | 25.65 | 20.08 | 15.35 | 11.33 | 9.01 | 6.91 | 6.02 | 5.25 | 4.24 | 3.64 | 3.32 | 3.12 | 3.56 |
| 137 | 0 | 0 | 53 | 137 | 27.69 | 30.19 | 28.36 | 24.51 | 19.33 | 15.09 | 11.34 | 9.51 | 7.8 | 7.88 | 8.31 | 7.95 | 7.68 | 7.41 | 7.09 | 8.32 |
| 255 | 0 | 0 | 44 | 137 | 22.31 | 26.33 | 26.55 | 24.6 | 19.58 | 15.15 | 11.26 | 8.95 | 6.85 | 5.93 | 5.11 | 4.11 | 3.52 | 3.21 | 3.02 | 3.43 |
| 137 | 0 | 0 | 35 | 50 | 33.3 | 38.26 | 37.72 | 35.02 | 29.7 | 25.42 | 21.08 | 19.48 | 16.29 | 15.18 | 12.99 | 10.08 | 8.34 | 7.54 | 7.05 | 8.22 |
| 58 | 0 | 0 | 66 | 12 | 30.32 | 31.53 | 30.98 | 30.84 | 29.97 | 28.38 | 25.12 | 22.4 | 18.9 | 17.41 | 16.27 | 14.74 | 13.87 | 14.42 | 15.6 | 18.9 |
| 7 | 0 | 0 | 0 | 5 | 60.79 | 71.3 | 73.7 | 73 | 69.99 | 67.25 | 63.93 | 63.67 | 61.36 | 63.2 | 62.44 | 57.55 | 53.5 | 51.13 | 49.2 | 51.74 |
| 7 | 0 | 0 | 8 | 5 | 55.64 | 63.89 | 65.43 | 65.07 | 63 | 60.86 | 57.51 | 56.07 | 52.74 | 53.14 | 52.5 | 49.38 | 47.07 | 46.9 | 47.43 | 51.21 |
| 17 | 0 | 0 | 0 | 5 | 59.75 | 70.54 | 73.33 | 72.94 | 69.81 | 66.68 | 62.76 | 61.53 | 57.83 | 57.32 | 54.05 | 47.63 | 42.9 | 40.23 | 38.19 | 40.95 |
| 7 | 0 | 0 | 41 | 5 | 43.06 | 45.84 | 45.61 | 45.53 | 45.11 | 43.88 | 40.63 | 37.64 | 33.52 | 32.43 | 32.24 | 31.75 | 32.13 | 35.67 | 41.93 | 49.57 |
| 7 | 0 | 0 | 21 | 5 | 49.75 | 54.9 | 55.38 | 55.19 | 54 | 52.28 | 48.88 | 46.49 | 42.54 | 42 | 41.64 | 40.07 | 39.32 | 41.24 | 44.65 | 50.12 |
| 17 | 0 | 0 | 21 | 5 | 49.3 | 55.19 | 55.89 | 55.99 | 54.73 | 52.84 | 49.1 | 46.19 | 41.64 | 40.01 | 38.29 | 35.41 | 33.58 | 34.07 | 35.42 | 39.92 |
| 58 | 0 | 0 | 0 | 5 | 53.48 | 65.11 | 69.04 | 70.23 | 66.56 | 61.91 | 55.75 | 51.04 | 43.74 | 38.22 | 31.81 | 25.28 | 21.31 | 19.25 | 17.75 | 19.94 |
| 33 | 0 | 0 | 0 | 5 | 56.93 | 68.01 | 71.29 | 71.37 | 67.98 | 64.2 | 59.33 | 56.58 | 51.15 | 48.08 | 42.87 | 36.02 | 31.46 | 28.93 | 27.11 | 29.75 |
| 33 | 0 | 0 | 8 | 5 | 52.95 | 62.1 | 64.29 | 64.41 | 62.02 | 58.98 | 54.41 | 51.27 | 45.84 | 42.97 | 38.84 | 33.4 | 29.77 | 28.17 | 27.2 | 30.18 |
| 33 | 0 | 0 | 0 | 24 | 53.75 | 63.71 | 62.77 | 56.94 | 48.56 | 42.68 | 37.02 | 37.23 | 34.47 | 38.06 | 37.58 | 31.25 | 26.75 | 24.3 | 22.6 | 25.02 |
| 33 | 0 | 0 | 8 | 24 | 50.14 | 58.28 | 57.24 | 52.57 | 45.64 | 40.51 | 35.26 | 35.03 | 32.16 | 34.84 | 34.41 | 29.27 | 25.58 | 23.79 | 22.63 | 25.23 |
| 58 | 0 | 0 | 0 | 24 | 50.43 | 60.72 | 60.88 | 56.12 | 47.91 | 41.77 | 35.76 | 34.91 | 31.11 | 31.75 | 29.04 | 23.14 | 19.38 | 17.38 | 16.03 | 18.02 |
| 17 | 0 | 0 | 8 | 12 | 52.72 | 60.99 | 61.26 | 58.83 | 54.09 | 50.13 | 45.38 | 44.62 | 41.43 | 43.47 | 43.21 | 38.63 | 35.14 | 33.75 | 32.92 | 36.19 |
| 33 | 0 | 0 | 0 | 12 | 55.43 | 66.16 | 67.61 | 64.99 | 59.04 | 54.01 | 48.5 | 47.46 | 43.42 | 43.92 | 40.96 | 34.25 | 29.63 | 27.11 | 25.33 | 27.88 |
| 33 | 0 | 0 | 8 | 12 | 51.3 | 59.88 | 60.64 | 58.68 | 54 | 49.82 | 44.74 | 43.18 | 39.05 | 38.95 | 36.51 | 31.18 | 27.51 | 25.84 | 24.77 | 27.64 |
| 17 | 0 | 0 | 8 | 5 | 53.71 | 62.52 | 64.34 | 64.31 | 62.25 | 59.79 | 55.99 | 53.82 | 49.61 | 48.54 | 46.24 | 41.86 | 38.72 | 37.63 | 37.11 | 40.52 |
| 255 | 0 | 0 | 0 | 5 | 25.93 | 34.65 | 40.8 | 47.41 | 41.86 | 33.13 | 24.76 | 17.93 | 12.19 | 8.31 | 5.71 | 4.02 | 3.24 | 2.89 | 2.71 | 3.06 |
| 255 | 0 | 0 | 4 | 5 | 25.6 | 34.26 | 40.04 | 46.43 | 41.17 | 32.74 | 24.55 | 17.77 | 12.1 | 8.24 | 5.67 | 4.02 | 3.23 | 2.93 | 2.72 | 3.07 |
| 205 | 0 | 0 | 0 | 5 | 33.63 | 44.66 | 51.19 | 57.08 | 52.07 | 43.66 | 34.33 | 26.2 | 18.69 | 13.36 | 9.45 | 6.64 | 5.23 | 4.59 | 4.19 | 4.85 |
| 255 | 0 | 0 | 18 | 5 | 24.37 | 31.8 | 36.42 | 41.51 | 37.39 | 30.31 | 22.97 | 16.75 | 11.47 | 7.87 | 5.48 | 3.9 | 3.15 | 2.84 | 2.67 | 3.01 |
| 255 | 0 | 0 | 10 | 5 | 24.96 | 32.95 | 38.16 | 43.84 | 39.13 | 31.34 | 23.6 | 17.14 | 11.7 | 8 | 5.53 | 3.93 | 3.18 | 2.89 | 2.71 | 3.03 |
| 205 | 0 | 0 | 10 | 5 | 32.1 | 41.42 | 46.54 | 51.24 | 47.31 | 40.2 | 31.89 | 24.52 | 17.61 | 12.74 | 9.14 | 6.51 | 5.18 | 4.56 | 4.18 | 4.89 |
| 90 | 0 | 0 | 0 | 5 | 47.72 | 59.49 | 64.41 | 66.96 | 62.98 | 57.19 | 49.69 | 43.13 | 34.87 | 28.49 | 22.48 | 17.21 | 14.17 | 12.62 | 11.58 | 13.19 |
| 137 | 0 | 0 | 0 | 5 | 41.3 | 52.85 | 58.82 | 63.1 | 58.61 | 51.35 | 42.45 | 34.49 | 26.05 | 19.82 | 14.74 | 10.74 | 8.57 | 7.52 | 6.84 | 7.94 |
| 137 | 0 | 0 | 4 | 5 | 40.01 | 50.56 | 55.81 | 59.75 | 55.85 | 49.19 | 40.78 | 33.16 | 25.12 | 19.18 | 14.34 | 10.48 | 8.39 | 7.38 | 6.71 | 7.81 |
| 255 | 0 | 0 | 0 | 24 | 25.84 | 33.88 | 38.44 | 41.66 | 35.07 | 27.81 | 21.16 | 16.35 | 11.57 | 8.3 | 5.85 | 4.14 | 3.34 | 3 | 2.8 | 3.16 |
| 255 | 0 | 0 | 4 | 24 | 25.46 | 33.29 | 37.73 | 40.94 | 34.49 | 27.29 | 20.69 | 15.88 | 11.21 | 8.07 | 5.74 | 4.12 | 3.36 | 3.03 | 2.86 | 3.18 |

TABLE 4-continued

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 205 | 0 | 0 | 0 | 24 | 33.91 | 43.8 | 47.94 | 48.98 | 41.48 | 34.04 | 26.87 | 22.25 | 16.73 | 13.05 | 9.69 | 6.93 | 5.5 | 4.87 | 4.48 | 5.12 |
| 255 | 0 | 0 | 4 | 12 | 25.94 | 34.28 | 39.51 | 44.44 | 38.54 | 30.62 | 23.14 | 17.24 | 11.95 | 8.35 | 5.84 | 4.16 | 3.37 | 3.04 | 2.84 | 3.2 |
| 205 | 0 | 0 | 0 | 12 | 33.74 | 44.22 | 49.69 | 53.38 | 46.96 | 38.91 | 30.63 | 24.29 | 17.75 | 13.18 | 9.54 | 6.77 | 5.37 | 4.74 | 4.32 | 4.99 |
| 205 | 0 | 0 | 4 | 12 | 33.06 | 43.02 | 48.07 | 51.56 | 45.77 | 38.17 | 30.14 | 23.86 | 17.43 | 12.97 | 9.42 | 6.73 | 5.34 | 4.73 | 4.35 | 5 |
| 205 | 0 | 0 | 4 | 5 | 33.77 | 44.25 | 50.25 | 55.63 | 51.03 | 43.08 | 34.14 | 26.3 | 18.96 | 13.75 | 9.87 | 7.02 | 5.56 | 4.9 | 4.49 | 5.18 |
| 255 | 0 | 0 | 4 | 255 | 15.69 | 17.35 | 15.99 | 12.41 | 8.18 | 5.22 | 3.44 | 2.66 | 2.3 | 2.31 | 2.54 | 2.82 | 3.15 | 3.21 | 3.08 | 3.45 |
| 205 | 0 | 0 | 0 | 201 | 23.74 | 27.22 | 26.2 | 21.65 | 15.27 | 10.25 | 6.74 | 4.92 | 3.92 | 3.85 | 4.29 | 4.67 | 5.12 | 5.12 | 4.8 | 5.54 |
| 255 | 0 | 0 | 0 | 201 | 20.73 | 24.73 | 24.85 | 21.74 | 15.68 | 10.72 | 7.15 | 5.2 | 4.06 | 3.77 | 3.79 | 3.6 | 3.46 | 3.29 | 3.13 | 3.48 |
| 205 | 0 | 0 | 4 | 201 | 23.38 | 26.66 | 25.62 | 21.15 | 14.89 | 9.95 | 6.51 | 4.72 | 3.75 | 3.7 | 4.14 | 4.54 | 5 | 5.01 | 4.7 | 5.44 |
| 255 | 0 | 0 | 4 | 201 | 20.7 | 24.59 | 24.65 | 21.63 | 15.67 | 10.71 | 7.09 | 5.11 | 3.94 | 3.65 | 3.5 | 3.37 | 3.2 | 2.99 | 3.43 | |
| 205 | 0 | 0 | 0 | 137 | 29 | 34.23 | 33.07 | 28.19 | 21.15 | 15.97 | 11.78 | 9.73 | 7.83 | 7.52 | 7.29 | 6.36 | 5.72 | 5.24 | 4.83 | 5.56 |
| 255 | 0 | 0 | 18 | 255 | 16.15 | 17.67 | 16.37 | 12.9 | 8.63 | 5.55 | 3.65 | 2.8 | 2.41 | 2.41 | 2.68 | 2.97 | 3.32 | 3.39 | 3.25 | 3.7 |
| 205 | 0 | 0 | 18 | 201 | 22.84 | 25.7 | 24.59 | 20.45 | 14.57 | 9.81 | 6.43 | 4.68 | 3.74 | 3.69 | 4.15 | 4.59 | 5.09 | 5.16 | 4.89 | 5.68 |
| 255 | 0 | 0 | 18 | 201 | 19.65 | 23.2 | 23.23 | 20.31 | 14.74 | 10.03 | 6.61 | 4.75 | 3.68 | 3.42 | 3.47 | 3.32 | 3.21 | 3.04 | 2.89 | 3.26 |
| 205 | 0 | 0 | 10 | 201 | 22.82 | 25.87 | 24.81 | 20.53 | 14.48 | 9.7 | 6.35 | 4.63 | 3.68 | 3.62 | 4.05 | 4.42 | 4.84 | 4.83 | 4.54 | 5.26 |
| 255 | 0 | 0 | 10 | 201 | 20.04 | 23.73 | 23.8 | 20.8 | 14.98 | 10.14 | 6.66 | 4.77 | 3.69 | 3.44 | 3.47 | 3.33 | 3.2 | 3.05 | 2.9 | 3.24 |
| 205 | 0 | 0 | 10 | 137 | 27.7 | 32.36 | 31.15 | 26.62 | 20.02 | 15.08 | 11.06 | 9.09 | 7.27 | 7 | 6.81 | 5.94 | 5.32 | 4.9 | 4.53 | 5.23 |
| 90 | 0 | 0 | 0 | 110 | 38.99 | 44.52 | 40.22 | 32.41 | 24.6 | 19.89 | 15.96 | 15.56 | 13.93 | 15.88 | 16.54 | 14.06 | 12.22 | 11.07 | 10.21 | 11.6 |
| 90 | 0 | 0 | 4 | 110 | 38.4 | 43.47 | 39.37 | 31.98 | 24.47 | 19.83 | 15.94 | 15.4 | 13.74 | 15.46 | 16.08 | 13.83 | 12.18 | 11.15 | 10.33 | 11.7 |
| 90 | 0 | 0 | 0 | 50 | 43.32 | 51.69 | 49.97 | 43.62 | 34.99 | 29.43 | 24.49 | 24.01 | 21.22 | 21.94 | 19.93 | 15.54 | 12.83 | 11.43 | 10.5 | 11.93 |
| 137 | 0 | 0 | 4 | 137 | 32.07 | 36.62 | 34.22 | 28.35 | 21.3 | 16.25 | 12.13 | 10.25 | 8.48 | 8.67 | 9.13 | 8.61 | 8.16 | 7.64 | 7.06 | 8.12 |
| 137 | 0 | 0 | 0 | 110 | 35.73 | 41.69 | 38.87 | 32.34 | 24.79 | 20.03 | 16.02 | 15.09 | 13.02 | 13.48 | 12.75 | 10.31 | 8.72 | 7.8 | 7.15 | 8.2 |
| 137 | 0 | 0 | 4 | 110 | 35.33 | 40.96 | 38.28 | 31.97 | 24.51 | 19.72 | 15.69 | 14.68 | 12.58 | 12.92 | 12.15 | 9.75 | 8.2 | 7.34 | 6.73 | 7.75 |
| 255 | 0 | 0 | 0 | 110 | 26.17 | 32.43 | 33.32 | 30.92 | 24.27 | 19.27 | 14.98 | 12.79 | 9.95 | 8.36 | 6.61 | 4.88 | 3.97 | 3.56 | 3.31 | 3.74 |
| 255 | 0 | 0 | 4 | 110 | 25.59 | 31.73 | 32.6 | 30.27 | 23.79 | 18.83 | 14.56 | 12.36 | 9.54 | 7.98 | 6.29 | 4.67 | 3.82 | 3.43 | 3.19 | 3.61 |
| 205 | 0 | 0 | 0 | 50 | 32.52 | 41.28 | 42.76 | 40.04 | 31.9 | 25.8 | 20.36 | 17.93 | 14.03 | 11.88 | 9.17 | 6.55 | 5.19 | 4.56 | 4.19 | 4.82 |
| 255 | 0 | 0 | 4 | 137 | 23.83 | 29.07 | 29.71 | 27.18 | 20.88 | 15.8 | 11.61 | 9.21 | 7.06 | 6.11 | 5.27 | 4.22 | 3.61 | 3.28 | 3.08 | 3.46 |
| 205 | 0 | 0 | 0 | 110 | 31.44 | 37.94 | 36.71 | 31.59 | 24.26 | 19.35 | 15.21 | 13.76 | 11.33 | 10.74 | 9.33 | 7.17 | 5.89 | 5.25 | 4.82 | 5.53 |
| 205 | 0 | 0 | 4 | 110 | 30.82 | 37.09 | 35.88 | 31.07 | 23.95 | 19.14 | 15.04 | 13.57 | 11.12 | 10.45 | 9.01 | 6.86 | 5.61 | 4.97 | 4.57 | 5.26 |
| 205 | 0 | 0 | 4 | 137 | 28.71 | 33.9 | 32.71 | 27.84 | 20.84 | 15.67 | 11.5 | 9.43 | 7.55 | 7.24 | 7.05 | 6.19 | 5.59 | 5.14 | 4.75 | 5.47 |
| 17 | 0 | 0 | 41 | 5 | 42.03 | 45.49 | 45.37 | 45.45 | 44.9 | 43.53 | 40.02 | 36.71 | 32.22 | 30.9 | 29.57 | 28.13 | 27.55 | 29.58 | 33.17 | 39.09 |
| 58 | 0 | 0 | 30 | 5 | 41.77 | 47.53 | 48.58 | 49.29 | 48.05 | 45.56 | 40.85 | 36.38 | 30.6 | 26.95 | 23.54 | 19.85 | 17.57 | 16.87 | 16.63 | 19.3 |
| 33 | 0 | 0 | 21 | 5 | 47.54 | 54.21 | 55.22 | 55.54 | 54.17 | 51.89 | 47.62 | 43.92 | 38.53 | 35.68 | 32.67 | 28.83 | 26.33 | 25.82 | 25.97 | 29.52 |
| 137 | 0 | 0 | 23 | 5 | 36.42 | 44.12 | 47.16 | 49.82 | 47.49 | 42.74 | 35.83 | 29.21 | 22.29 | 17.32 | 13.33 | 10.05 | 8.23 | 7.42 | 6.91 | 8.03 |
| 58 | 0 | 0 | 8 | 5 | 49.98 | 59.84 | 62.64 | 63.58 | 60.86 | 56.93 | 51.13 | 46.27 | 39.36 | 34.51 | 29.24 | 23.7 | 20.27 | 18.61 | 17.49 | 19.76 |
| 137 | 0 | 0 | 8 | 24 | 38.4 | 47.73 | 49.94 | 48.91 | 42.27 | 36.11 | 29.71 | 26.21 | 21.02 | 17.89 | 14.22 | 10.61 | 8.58 | 7.62 | 6.99 | 8.06 |
| 137 | 0 | 0 | 15 | 12 | 37.45 | 46.13 | 49.06 | 50.31 | 45.8 | 40.09 | 33.18 | 27.94 | 21.69 | 17.44 | 13.51 | 10.07 | 8.17 | 7.27 | 6.7 | 7.78 |
| 90 | 0 | 0 | 8 | 12 | 44.83 | 54.62 | 57.17 | 57.05 | 51.92 | 46.35 | 39.71 | 35.52 | 29.34 | 25.39 | 20.81 | 16.16 | 13.4 | 12.04 | 11.15 | 12.75 |
| 90 | 0 | 0 | 15 | 5 | 43.56 | 52.46 | 55.39 | 57.14 | 54.52 | 50.06 | 43.56 | 37.58 | 30.38 | 25.14 | 20.3 | 15.88 | 13.29 | 12.08 | 11.3 | 12.99 |
| 33 | 0 | 0 | 21 | 12 | 46.69 | 52.75 | 52.72 | 51.19 | 47.71 | 44.28 | 39.58 | 37.56 | 33.47 | 33.11 | 31.48 | 27.72 | 25.12 | 24.43 | 24.28 | 27.55 |
| 90 | 0 | 0 | 0 | 12 | 46.98 | 58.73 | 62.03 | 61.64 | 55.21 | 48.73 | 41.55 | 37.36 | 30.83 | 26.65 | 21.56 | 16.42 | 13.45 | 11.95 | 10.91 | 12.45 |
| 58 | 0 | 0 | 8 | 24 | 47.32 | 55.4 | 55.07 | 50.94 | 43.9 | 38.46 | 32.92 | 31.87 | 28.25 | 28.69 | 26.44 | 21.45 | 18.22 | 16.62 | 15.55 | 17.6 |
| 90 | 0 | 0 | 0 | 24 | 46.3 | 56.74 | 58.1 | 54.84 | 46.82 | 40.44 | 34.14 | 31.97 | 27.25 | 25.41 | 21.54 | 16.65 | 13.71 | 12.21 | 11.2 | 12.7 |
| 137 | 0 | 0 | 0 | 24 | 39.88 | 50.43 | 53.17 | 51.84 | 43.98 | 37.07 | 30.27 | 26.74 | 21.37 | 18.11 | 14.23 | 10.47 | 8.38 | 7.36 | 6.71 | 7.74 |
| 90 | 0 | 0 | 8 | 24 | 44.13 | 52.72 | 53.49 | 50.71 | 43.8 | 38.07 | 32.17 | 29.98 | 25.51 | 23.75 | 20.3 | 15.86 | 13.17 | 11.83 | 10.95 | 12.46 |
| 58 | 0 | 0 | 8 | 12 | 49.59 | 58.29 | 59.75 | 58.38 | 53.32 | 48.38 | 42.47 | 39.74 | 34.47 | 32.23 | 28.27 | 22.93 | 19.56 | 17.95 | 16.87 | 19.09 |
| 33 | 0 | 0 | 30 | 24 | 42.74 | 46.83 | 45.58 | 42.8 | 38.48 | 34.77 | 30.3 | 29.23 | 26.15 | 27.18 | 26.81 | 23.73 | 21.58 | 21.22 | 21.42 | 24.64 |
| 58 | 0 | 0 | 30 | 24 | 40.89 | 45.76 | 45.04 | 42.66 | 38.2 | 34.24 | 29.52 | 27.85 | 24.26 | 23.92 | 22.24 | 18.73 | 16.42 | 15.61 | 15.25 | 17.62 |
| 90 | 0 | 0 | 23 | 110 | 36.53 | 40.1 | 36.65 | 30.62 | 24.13 | 19.94 | 16.23 | 15.65 | 13.95 | 15.41 | 15.86 | 13.77 | 12.24 | 11.35 | 10.7 | 12.14 |
| 137 | 0 | 0 | 23 | 110 | 33.58 | 37.95 | 35.57 | 30.47 | 24.12 | 19.78 | 15.94 | 14.9 | 12.79 | 13.08 | 12.36 | 10.11 | 8.62 | 7.84 | 7.28 | 8.38 |
| 58 | 0 | 0 | 15 | 50 | 43.18 | 48.93 | 46.06 | 39.89 | 32.83 | 28.13 | 23.15 | 20.99 | 23.45 | 23.27 | 19.14 | 16.34 | 14.98 | 14.11 | 16.03 | |
| 137 | 0 | 0 | 15 | 50 | 36.97 | 43.79 | 43.38 | 39.72 | 32.86 | 27.78 | 22.9 | 21.35 | 17.93 | 16.81 | 14.27 | 10.89 | 8.91 | 7.98 | 7.37 | 8.48 |
| 90 | 0 | 0 | 15 | 50 | 40.87 | 47.3 | 45.67 | 40.72 | 33.68 | 28.81 | 24.19 | 23.48 | 20.71 | 21.16 | 19.43 | 15.55 | 13.08 | 11.88 | 11.09 | 12.62 |
| 255 | 0 | 0 | 18 | 24 | 25.1 | 32.12 | 35.67 | 38.27 | 33.02 | 26.76 | 20.62 | 15.97 | 11.39 | 8.26 | 5.9 | 4.22 | 3.41 | 3.06 | 2.87 | 3.24 |
| 255 | 0 | 0 | 18 | 110 | 24.95 | 30.4 | 31.05 | 28.96 | 23.14 | 18.52 | 14.41 | 12.24 | 9.49 | 7.98 | 6.33 | 4.71 | 3.83 | 3.44 | 3.19 | 3.64 |
| 255 | 0 | 0 | 10 | 50 | 25.78 | 32.75 | 35.39 | 35.75 | 29.47 | 23.73 | 18.48 | 15.15 | 11.21 | 8.6 | 6.33 | 4.53 | 3.66 | 3.29 | 3.07 | 3.46 |
| 137 | 0 | 0 | 23 | 24 | 35.58 | 42.58 | 43.84 | 43.03 | 37.98 | 32.94 | 27.26 | 23.92 | 19.17 | 16.41 | 13.27 | 10.06 | 8.22 | 7.38 | 6.85 | 7.98 |
| 0 | 0 | 0 | 105 | 255 | 14.55 | 13.97 | 12.19 | 9.55 | 6.65 | 4.49 | 3.1 | 2.52 | 2.27 | 2.35 | 2.83 | 4.14 | 8.44 | 17.01 | 30.52 | 50.12 |
| 0 | 0 | 0 | 88 | 50 | 25.76 | 25.44 | 23.74 | 22.23 | 20.34 | 18.57 | 16.02 | 15.08 | 13.25 | 13.99 | 14.94 | 14.92 | 15.28 | 17.78 | 22.57 | 29.34 |
| 58 | 0 | 0 | 58 | 255 | 16.12 | 15.97 | 13.74 | 10.1 | 6.55 | 4.18 | 2.82 | 2.29 | 2.08 | 2.15 | 2.6 | 3.82 | 7.92 | 14.21 | 17.95 | 21.82 |
| 0 | 0 | 0 | 54 | 12 | 37 | 38.54 | 37.39 | 36.52 | 35.26 | 33.62 | 30.37 | 28.36 | 25.22 | 25.42 | 26.39 | 26.67 | 27.69 | 32.36 | 41.14 | 51.29 |
| 0 | 0 | 0 | 77 | 12 | 27.77 | 27.68 | 26.56 | 26.21 | 25.82 | 24.85 | 22.28 | 20.03 | 17.19 | 16.61 | 17 | 17.46 | 18.65 | 23.31 | 33.56 | 47.06 |
| 17 | 0 | 0 | 47 | 50 | 36.93 | 39.17 | 36.19 | 31.89 | 26.9 | 23.37 | 19.69 | 19.55 | 17.82 | 20.7 | 22.68 | 20.9 | 19.51 | 19.69 | 20.44 | 23.86 |
| 137 | 0 | 0 | 26 | 255 | 17.26 | 17.61 | 15.47 | 11.44 | 7.45 | 4.79 | 3.25 | 2.63 | 2.36 | 2.44 | 2.86 | 3.8 | 6.06 | 7.98 | 8.21 | 9.59 |
| 137 | 0 | 0 | 44 | 255 | 17.11 | 17.48 | 15.35 | 11.51 | 7.61 | 4.93 | 3.34 | 2.67 | 2.39 | 2.45 | 2.9 | 3.86 | 6.09 | 7.97 | 8.25 | 9.66 |
| 58 | 0 | 0 | 35 | 137 | 32.11 | 33.96 | 30.63 | 25.1 | 19.09 | 14.66 | 10.93 | 9.35 | 7.91 | 8.78 | 10.65 | 11.9 | 13.33 | 13.91 | 13.78 | 15.78 |
| 0 | 0 | 0 | 44 | 255 | 16.13 | 15.8 | 13.39 | 9.5 | 5.98 | 3.78 | 2.6 | 2.19 | 2.01 | 2.09 | 2.48 | 3.79 | 9.72 | 25.4 | 46.86 | 64.96 |
| 0 | 0 | 0 | 35 | 137 | 33.16 | 34.23 | 30.25 | 24.24 | 18.25 | 13.96 | 10.36 | 8.97 | 7.73 | 9.02 | 11.88 | 14.74 | 18.83 | 21.78 | 23.03 | 26.46 |
| 17 | 0 | 0 | 26 | 255 | 16.62 | 16.5 | 13.95 | 9.83 | 6.22 | 4 | 2.82 | 2.38 | 2.22 | 2.29 | 2.69 | 3.95 | 9.43 | 22.29 | 33.54 | 41.33 |
| 0 | 0 | 0 | 53 | 137 | 30.46 | 30.98 | 27.6 | 22.63 | 17.41 | 13.49 | 10.11 | 8.75 | 7.51 | 8.58 | 10.97 | 13.32 | 16.8 | 19.85 | 21.92 | 25.89 |
| 17 | 0 | 0 | 44 | 255 | 16.42 | 16.32 | 13.88 | 9.93 | 6.35 | 4.12 | 2.9 | 2.45 | 2.27 | 2.35 | 2.76 | 4.02 | 9.41 | 21.55 | 32.76 | 41.4 |
| 17 | 0 | 0 | 35 | 137 | 32.43 | 33.72 | 29.93 | 24.1 | 18.15 | 13.92 | 10.4 | 9.07 | 7.8 | 8.95 | 11.34 | 13.35 | 16.14 | 18.02 | 18.59 | 21.45 |
| 17 | 0 | 0 | 66 | 50 | 30.21 | 30.71 | 28.62 | 26.26 | 23.3 | 20.85 | 17.8 | 17.12 | 15.21 | 16.48 | 17.46 | 16.58 | 16.06 | 17.26 | 19.49 | 23.78 |

TABLE 4-continued

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 0 | 0 | 0 | 5 | 62.69 | 73.02 | 75.19 | 74.3 | 71.49 | 69.09 | 66.35 | 66.95 | 66 | 70.49 | 73.38 | 71.64 | 69.63 | 68.46 | 67.32 | 68.65 |
| 0 | 0 | 0 | 8 | 5 | 57.31 | 65.42 | 66.72 | 66.21 | 64.35 | 62.41 | 59.46 | 58.65 | 56.26 | 58.41 | 60.24 | 59.58 | 59.27 | 61.08 | 63.85 | 67.51 |
| 7 | 0 | 0 | 0 | 12 | 59.4 | 69.72 | 70.36 | 66.91 | 61.08 | 56.63 | 51.97 | 52.73 | 50.94 | 56.58 | 58.95 | 53.95 | 49.55 | 46.94 | 44.91 | 47.47 |
| 0 | 0 | 0 | 41 | 5 | 43.11 | 46.17 | 45.78 | 45.72 | 45.39 | 44.37 | 41.31 | 38.5 | 34.61 | 33.93 | 34.54 | 35.06 | 36.57 | 42.23 | 52.53 | 62.9 |
| 0 | 0 | 0 | 21 | 5 | 49.75 | 55.11 | 55.47 | 55.12 | 53.95 | 52.36 | 49.17 | 47.2 | 43.8 | 44.39 | 45.59 | 45.69 | 46.52 | 50.62 | 57.27 | 63.95 |
| 7 | 0 | 0 | 21 | 12 | 48.28 | 53.62 | 53.23 | 51.36 | 48.17 | 45.23 | 41.11 | 39.9 | 36.74 | 38.48 | 39.53 | 37.63 | 36.35 | 37.51 | 39.83 | 44.79 |
| 33 | 0 | 0 | 0 | 50 | 48.58 | 56.63 | 52.51 | 43.86 | 34.63 | 29.15 | 24.38 | 25.17 | 23.58 | 28.8 | 30.9 | 25.56 | 21.66 | 19.58 | 18.08 | 20.18 |
| 17 | 0 | 0 | 0 | 24 | 55.07 | 64.43 | 62.95 | 56.74 | 48.39 | 42.71 | 37.27 | 38.04 | 36 | 41.88 | 44.07 | 38.04 | 33.31 | 30.66 | 28.68 | 31.37 |
| 17 | 0 | 0 | 8 | 24 | 51.45 | 58.95 | 57.41 | 52.28 | 45.39 | 40.39 | 35.36 | 35.59 | 33.28 | 37.8 | 39.6 | 35.02 | 31.38 | 29.68 | 28.64 | 31.62 |
| 0 | 0 | 0 | 0 | 24 | 57.99 | 66.82 | 64.45 | 57.42 | 48.88 | 43.32 | 38.12 | 39.76 | 38.82 | 48.71 | 56.62 | 52.42 | 47.95 | 45.23 | 43.1 | 45.77 |
| 0 | 0 | 0 | 8 | 24 | 52.56 | 59.52 | 57.46 | 52 | 45.25 | 40.5 | 35.74 | 36.63 | 35.14 | 42.3 | 47.97 | 45.21 | 42.33 | 41.47 | 41.3 | 44.82 |
| 7 | 0 | 0 | 0 | 50 | 52.23 | 59.74 | 54.38 | 44.58 | 35.11 | 29.61 | 24.93 | 26.3 | 25.37 | 33.8 | 40.51 | 35.35 | 30.7 | 28.07 | 26.19 | 28.68 |
| 0 | 0 | 0 | 8 | 12 | 55.5 | 63.34 | 62.95 | 59.97 | 55.29 | 51.6 | 47.27 | 47.46 | 45.5 | 50.81 | 54.96 | 53.31 | 51.66 | 52.06 | 53.18 | 56.96 |
| 7 | 0 | 0 | 0 | 24 | 56.64 | 65.75 | 63.72 | 57.05 | 48.63 | 43.03 | 37.77 | 38.98 | 37.57 | 45.57 | 50.82 | 45.73 | 41.09 | 38.38 | 36.32 | 39.05 |
| 7 | 0 | 0 | 8 | 24 | 52.25 | 59.24 | 57.35 | 52.05 | 45.15 | 40.29 | 35.36 | 35.92 | 34.07 | 39.96 | 43.74 | 40.13 | 36.9 | 35.62 | 34.95 | 38.3 |
| 7 | 0 | 0 | 8 | 12 | 54.08 | 61.75 | 61.57 | 58.63 | 53.72 | 49.66 | 44.88 | 44.38 | 41.69 | 45.43 | 47.63 | 44.75 | 42.32 | 41.7 | 41.61 | 45.26 |
| 205 | 0 | 0 | 0 | 255 | 16.33 | 17.35 | 15.39 | 11.37 | 7.27 | 4.57 | 3.06 | 2.45 | 2.2 | 2.24 | 2.56 | 3.18 | 4.35 | 5.02 | 4.88 | 5.65 |
| 205 | 0 | 0 | 4 | 255 | 16.53 | 17.45 | 15.52 | 11.52 | 7.39 | 4.63 | 3.09 | 2.47 | 2.22 | 2.27 | 2.6 | 3.23 | 4.42 | 5.13 | 5.02 | 5.79 |
| 137 | 0 | 0 | 0 | 201 | 26.02 | 28.83 | 26.97 | 21.51 | 14.91 | 9.93 | 6.5 | 4.77 | 3.84 | 3.91 | 4.67 | 5.67 | 7.11 | 7.59 | 7.22 | 8.34 |
| 205 | 0 | 0 | 18 | 255 | 16.57 | 17.39 | 15.45 | 11.52 | 7.42 | 4.68 | 3.1 | 2.47 | 2.19 | 2.24 | 2.56 | 3.18 | 4.33 | 5.01 | 4.92 | 5.71 |
| 205 | 0 | 0 | 10 | 255 | 15.95 | 16.87 | 14.96 | 11.02 | 7.04 | 4.45 | 3.01 | 2.44 | 2.19 | 2.23 | 2.53 | 3.11 | 4.22 | 4.9 | 4.8 | 5.57 |
| 137 | 0 | 0 | 10 | 201 | 25.3 | 27.96 | 26.12 | 21 | 14.68 | 9.78 | 6.4 | 4.68 | 3.8 | 3.85 | 4.59 | 5.58 | 7.01 | 7.56 | 7.27 | 8.42 |
| 58 | 0 | 0 | 0 | 110 | 41.35 | 46.67 | 41.09 | 32.21 | 24.02 | 19.26 | 15.38 | 15.22 | 13.84 | 16.71 | 18.58 | 16.32 | 14.53 | 13.36 | 12.33 | 13.92 |
| 90 | 0 | 0 | 0 | 137 | 35.22 | 39.6 | 36.15 | 28.93 | 21.27 | 16.03 | 11.86 | 10.15 | 8.54 | 9.23 | 10.52 | 10.7 | 10.89 | 10.52 | 9.79 | 11.15 |
| 90 | 0 | 0 | 4 | 137 | 34.73 | 38.91 | 35.65 | 28.81 | 21.44 | 16.32 | 12.19 | 10.46 | 8.85 | 9.54 | 10.83 | 11.07 | 11.31 | 10.99 | 10.3 | 11.68 |
| 90 | 0 | 0 | 0 | 255 | 18.4 | 18.82 | 16.25 | 11.67 | 7.42 | 4.66 | 3.3 | 2.53 | 2.27 | 2.37 | 2.84 | 4.13 | 7.92 | 12.26 | 13.2 | 15.14 |
| 90 | 0 | 0 | 4 | 255 | 18.49 | 18.84 | 16.25 | 11.68 | 7.46 | 4.7 | 3.18 | 2.57 | 2.32 | 2.41 | 2.9 | 4.17 | 7.94 | 12.3 | 13.28 | 15.22 |
| 58 | 0 | 0 | 0 | 201 | 28.42 | 30.62 | 27.79 | 21.32 | 14.5 | 9.51 | 6.18 | 4.58 | 3.77 | 4 | 5.28 | 7.83 | 13.59 | 18.48 | 19.04 | 21.51 |
| 137 | 0 | 0 | 4 | 255 | 17.89 | 18.44 | 16.17 | 11.78 | 7.54 | 4.77 | 3.2 | 2.57 | 2.31 | 2.38 | 2.81 | 3.79 | 6.15 | 8.13 | 8.27 | 9.58 |
| 90 | 0 | 0 | 0 | 201 | 27.55 | 29.94 | 27.57 | 21.47 | 14.77 | 9.74 | 6.34 | 4.64 | 3.8 | 3.95 | 5.03 | 6.82 | 10 | 11.83 | 11.58 | 13.22 |
| 90 | 0 | 0 | 4 | 201 | 26.98 | 29.4 | 26.97 | 21.17 | 14.65 | 9.74 | 6.39 | 4.71 | 3.86 | 4.01 | 5.13 | 6.96 | 10.22 | 12.11 | 11.89 | 13.64 |
| 137 | 0 | 0 | 4 | 201 | 25.3 | 28.18 | 26.28 | 21.02 | 14.6 | 9.72 | 6.33 | 4.59 | 3.71 | 3.75 | 4.53 | 5.54 | 6.96 | 7.48 | 7.09 | 8.28 |
| 0 | 0 | 0 | 4 | 255 | 17.12 | 17.24 | 14.53 | 10.06 | 6.21 | 3.87 | 2.67 | 2.21 | 2.05 | 2.13 | 2.57 | 4.01 | 10.85 | 31.32 | 57.33 | 71.33 |
| 0 | 0 | 0 | 0 | 201 | 28.75 | 30.68 | 27.22 | 20.36 | 13.47 | 8.65 | 5.55 | 4.16 | 3.49 | 3.74 | 5.19 | 8.84 | 21.72 | 47.09 | 63.91 | 69.86 |
| 7 | 0 | 0 | 0 | 255 | 17.25 | 17.46 | 14.65 | 10.13 | 6.17 | 3.88 | 2.66 | 2.24 | 2.07 | 2.15 | 2.58 | 3.95 | 10.59 | 28.89 | 47.18 | 56.51 |
| 0 | 0 | 0 | 4 | 201 | 28.69 | 30.34 | 27.12 | 20.42 | 13.76 | 8.92 | 5.75 | 4.27 | 3.55 | 3.84 | 5.33 | 9.05 | 21.6 | 45.94 | 63.18 | 70 |
| 7 | 0 | 0 | 4 | 255 | 17.17 | 17.28 | 14.59 | 10.1 | 6.24 | 3.9 | 2.71 | 2.26 | 2.11 | 2.18 | 2.61 | 4.01 | 10.56 | 28.22 | 46.02 | 55.72 |
| 7 | 0 | 0 | 0 | 201 | 28.67 | 30.4 | 27.15 | 20.27 | 13.47 | 8.62 | 5.47 | 4.03 | 3.32 | 3.61 | 5.04 | 8.61 | 20.19 | 39.72 | 49.76 | 54.75 |
| 0 | 0 | 0 | 18 | 255 | 16.65 | 16.63 | 14.02 | 9.79 | 6.11 | 3.82 | 2.66 | 2.21 | 2.05 | 2.13 | 2.54 | 3.95 | 10.48 | 29.15 | 53.65 | 69.68 |
| 0 | 0 | 0 | 18 | 201 | 26.79 | 27.85 | 24.81 | 19.05 | 12.99 | 8.49 | 5.48 | 4.06 | 3.39 | 3.61 | 5.02 | 8.42 | 19.39 | 39.77 | 57.2 | 67.42 |
| 7 | 0 | 0 | 18 | 255 | 17.09 | 16.97 | 14.47 | 10.13 | 6.38 | 4.01 | 2.77 | 2.3 | 2.11 | 2.2 | 2.63 | 4.08 | 10.44 | 26.69 | 43.65 | 54.25 |
| 0 | 0 | 0 | 10 | 201 | 28.15 | 29.36 | 26.21 | 19.82 | 13.43 | 8.75 | 5.73 | 4.29 | 3.62 | 3.88 | 5.29 | 8.82 | 20.6 | 43.25 | 60.76 | 69.13 |
| 7 | 0 | 0 | 10 | 255 | 17.11 | 17 | 14.35 | 9.9 | 6.16 | 3.89 | 2.75 | 2.33 | 2.16 | 2.25 | 2.63 | 3.95 | 10.23 | 27.49 | 45.33 | 55.53 |
| 7 | 0 | 0 | 10 | 201 | 27.73 | 29.19 | 25.93 | 19.69 | 13.23 | 8.6 | 5.59 | 4.19 | 3.54 | 3.76 | 5.12 | 8.4 | 18.97 | 36.65 | 47.43 | 53.94 |
| 0 | 0 | 0 | 0 | 110 | 44.63 | 48.82 | 41.43 | 31.47 | 23.13 | 18.45 | 14.71 | 14.87 | 13.94 | 18.77 | 24.38 | 23.66 | 22.54 | 21.4 | 20.04 | 22.21 |
| 0 | 0 | 0 | 4 | 110 | 43.65 | 47.32 | 40.39 | 30.8 | 22.78 | 18.17 | 14.49 | 14.62 | 13.65 | 18.2 | 23.45 | 22.81 | 21.78 | 20.82 | 19.68 | 21.87 |
| 7 | 0 | 0 | 0 | 110 | 44.24 | 48.9 | 41.76 | 31.9 | 23.55 | 18.89 | 15.11 | 15.33 | 14.35 | 19.09 | 24.22 | 23.08 | 21.75 | 20.52 | 19.21 | 21.29 |
| 0 | 0 | 0 | 4 | 137 | 38.46 | 41.16 | 35.73 | 27.3 | 19.61 | 14.62 | 10.71 | 9.39 | 8.16 | 9.78 | 13.24 | 16.6 | 21.67 | 24.45 | 24.22 | 26.89 |
| 7 | 0 | 0 | 0 | 137 | 38.97 | 42.42 | 36.89 | 28.17 | 20.18 | 15.03 | 11.04 | 9.66 | 8.41 | 10.05 | 13.52 | 16.77 | 21.48 | 23.7 | 23.07 | 25.51 |
| 7 | 0 | 0 | 4 | 137 | 38.15 | 41.07 | 35.96 | 27.65 | 20 | 14.92 | 10.94 | 9.53 | 8.24 | 9.81 | 13.14 | 16.28 | 20.69 | 22.84 | 22.43 | 24.87 |
| 33 | 0 | 0 | 0 | 255 | 17.36 | 17.44 | 14.78 | 10.21 | 6.28 | 3.9 | 2.63 | 2.18 | 1.97 | 2.06 | 2.49 | 3.82 | 9.38 | 20.63 | 27.09 | 31.49 |
| 33 | 0 | 0 | 4 | 255 | 18.33 | 18.5 | 15.8 | 11.18 | 7.06 | 4.51 | 3.08 | 2.57 | 2.34 | 2.44 | 2.93 | 4.4 | 10.33 | 21.87 | 28.61 | 33.22 |
| 33 | 0 | 0 | 0 | 201 | 28.8 | 30.71 | 27.73 | 21.1 | 14.34 | 9.37 | 6.05 | 4.46 | 3.67 | 3.92 | 5.32 | 8.4 | 16.41 | 25.41 | 27.74 | 30.96 |
| 17 | 0 | 0 | 4 | 255 | 17.74 | 17.83 | 15.12 | 10.53 | 6.52 | 4.02 | 2.73 | 2.25 | 2.07 | 2.15 | 2.59 | 4.06 | 10.41 | 25.34 | 37.01 | 43.72 |
| 17 | 0 | 0 | 0 | 201 | 28.93 | 30.59 | 27.33 | 20.62 | 13.84 | 9.02 | 5.82 | 4.36 | 3.62 | 3.9 | 5.32 | 8.61 | 18.54 | 32.62 | 38.13 | 42.26 |
| 17 | 0 | 0 | 4 | 201 | 28.25 | 30.01 | 26.74 | 20.2 | 13.46 | 8.69 | 5.57 | 4.12 | 3.44 | 3.67 | 5.06 | 8.28 | 17.97 | 31.67 | 37.34 | 41.83 |
| 7 | 0 | 0 | 4 | 201 | 28.18 | 29.67 | 26.45 | 19.81 | 13.22 | 8.44 | 5.37 | 3.96 | 3.29 | 3.55 | 4.9 | 8.29 | 19.35 | 38.03 | 48.5 | 54.12 |
| 7 | 0 | 0 | 41 | 12 | 41.3 | 44.52 | 43.52 | 42.37 | 40.29 | 38.09 | 34.34 | 32.5 | 29.18 | 29.74 | 30.52 | 29.77 | 29.72 | 32.46 | 37.12 | 43.82 |
| 33 | 0 | 0 | 30 | 50 | 40.95 | 44.66 | 41.53 | 36.14 | 30.05 | 25.92 | 21.89 | 21.95 | 20.12 | 23.28 | 24.67 | 21.6 | 19.27 | 18.45 | 18.16 | 20.71 |
| 17 | 0 | 0 | 21 | 24 | 46.34 | 51.2 | 49.5 | 45.52 | 40.18 | 36.07 | 31.47 | 31.11 | 28.58 | 31.67 | 33.09 | 30.1 | 27.76 | 27.32 | 27.6 | 31.18 |
| 90 | 0 | 0 | 23 | 137 | 32.52 | 35.36 | 32.53 | 26.8 | 20.46 | 15.77 | 11.84 | 10.12 | 8.52 | 9.18 | 10.5 | 10.88 | 11.2 | 11.03 | 10.56 | 12.02 |
| 33 | 0 | 0 | 8 | 50 | 46.12 | 52.4 | 48.43 | 40.7 | 32.39 | 27.34 | 22.82 | 23.43 | 21.83 | 26.57 | 28.66 | 24.19 | 20.86 | 19.13 | 18 | 20.23 |
| 33 | 0 | 0 | 8 | 137 | 36.52 | 39.26 | 34.66 | 27.03 | 19.77 | 14.83 | 10.95 | 9.46 | 8.14 | 9.43 | 12.09 | 14.2 | 16.76 | 17.7 | 17.15 | 19.28 |
| 58 | 0 | 0 | 15 | 137 | 35.11 | 37.94 | 34.17 | 27.47 | 20.65 | 15.8 | 11.84 | 10.24 | 8.76 | 9.82 | 11.92 | 13.17 | 14.48 | 14.79 | 14.23 | 16.1 |
| 33 | 0 | 0 | 8 | 110 | 41.71 | 45.55 | 39.77 | 31.28 | 23.53 | 19.02 | 15.25 | 15.26 | 14.02 | 17.54 | 20.51 | 18.7 | 17.09 | 15.97 | 15.02 | 16.89 |
| 58 | 0 | 0 | 15 | 110 | 38.9 | 42.42 | 37.69 | 30.27 | 23.17 | 18.76 | 15.07 | 14.72 | 13.3 | 15.74 | 17.45 | 15.65 | 14.13 | 13.24 | 12.44 | 14.09 |
| 7 | 0 | 0 | 21 | 24 | 47.74 | 52.36 | 50.42 | 46.42 | 41.09 | 37.06 | 32.54 | 32.46 | 30.23 | 34.28 | 37 | 34.67 | 32.73 | 33.03 | 34.14 | 38.44 |
| 33 | 0 | 0 | 0 | 110 | 42.44 | 47.08 | 40.83 | 31.65 | 23.5 | 18.85 | 15.05 | 15.02 | 13.85 | 17.44 | 20.64 | 18.88 | 17.29 | 16.07 | 14.93 | 16.72 |
| 7 | 0 | 0 | 8 | 50 | 49.66 | 55.16 | 50.46 | 42.09 | 33.71 | 28.62 | 24.16 | 25.25 | 24.12 | 31.29 | 36.83 | 32.81 | 29.17 | 27.39 | 26.31 | 29.06 |
| 17 | 0 | 0 | 0 | 110 | 43.56 | 47.99 | 41.2 | 31.53 | 23.24 | 18.58 | 14.81 | 14.95 | 13.89 | 18.17 | 22.49 | 21.07 | 19.58 | 18.33 | 17.11 | 19.04 |
| 33 | 0 | 0 | 0 | 137 | 38.25 | 41.83 | 36.85 | 28.46 | 20.49 | 15.31 | 11.23 | 9.76 | 8.39 | 9.75 | 12.54 | 14.65 | 17.33 | 18.13 | 17.33 | 19.38 |
| 17 | 0 | 0 | 8 | 110 | 42.07 | 45.95 | 40.07 | 31.55 | 23.98 | 19.48 | 15.76 | 15.78 | 14.65 | 18.58 | 22.41 | 21.15 | 19.81 | 18.83 | 17.83 | 19.87 |
| 17 | 0 | 0 | 8 | 50 | 48.1 | 53.97 | 49.77 | 41.87 | 33.7 | 28.68 | 24.23 | 25.11 | 23.78 | 29.81 | 33.61 | 29.36 | 25.83 | 24.14 | 23.06 | 25.56 |

TABLE 4-continued

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 0 | 0 | 30 | 24 | 44.27 | 47.76 | 45.63 | 42.22 | 37.74 | 34.25 | 30.07 | 29.75 | 27.52 | 31.13 | 34.28 | 33.29 | 32.63 | 34.51 | 37.85 | 43.55 |
| 7 | 0 | 0 | 30 | 50 | 41.92 | 45.03 | 41.48 | 35.97 | 29.85 | 25.84 | 21.86 | 22.25 | 20.75 | 25.28 | 28.7 | 26.41 | 24.41 | 24.16 | 24.61 | 28.12 |
| 0 | 0 | 0 | 23 | 110 | 39.36 | 42.03 | 36.52 | 29.12 | 22.3 | 18.21 | 14.67 | 14.6 | 13.51 | 17.3 | 21.67 | 21.41 | 20.98 | 20.73 | 20.33 | 22.9 |
| 7 | 0 | 0 | 23 | 137 | 35.16 | 36.87 | 32.58 | 25.87 | 19.28 | 14.67 | 10.88 | 9.47 | 8.15 | 9.53 | 12.47 | 15.22 | 19.11 | 21.49 | 22.01 | 24.91 |
| 0 | 0 | 0 | 15 | 50 | 46.87 | 51.58 | 46.99 | 39.56 | 31.93 | 27.21 | 22.94 | 23.89 | 22.81 | 29.72 | 35.72 | 32.81 | 29.9 | 28.88 | 28.41 | 31.63 |
| 17 | 0 | 0 | 15 | 137 | 35.47 | 37.72 | 33.06 | 25.87 | 18.9 | 14.21 | 10.43 | 9.03 | 7.75 | 9.07 | 11.93 | 14.43 | 17.81 | 19.47 | 19.35 | 21.88 |
| 7 | 0 | 0 | 15 | 110 | 40.5 | 43.53 | 37.52 | 29.47 | 22.22 | 17.99 | 14.45 | 14.48 | 13.46 | 17.44 | 21.76 | 21.02 | 20.08 | 19.4 | 18.62 | 20.89 |
| 90 | 0 | 0 | 18 | 255 | 18.21 | 18.51 | 16.03 | 11.72 | 7.51 | 4.76 | 3.16 | 2.53 | 2.26 | 2.34 | 2.87 | 4.15 | 7.93 | 12.11 | 13.17 | 15.28 |
| 33 | 0 | 0 | 18 | 255 | 17.05 | 16.94 | 14.48 | 10.14 | 6.37 | 3.98 | 2.74 | 2.27 | 2.08 | 2.17 | 2.59 | 3.91 | 9.23 | 19.7 | 26.37 | 31.33 |
| 58 | 0 | 0 | 10 | 255 | 17.25 | 17.33 | 14.81 | 10.45 | 6.56 | 4.11 | 2.8 | 2.31 | 2.11 | 2.2 | 2.62 | 3.88 | 8.51 | 15.82 | 18.87 | 21.95 |
| 33 | 0 | 0 | 23 | 137 | 34.71 | 36.89 | 32.92 | 26.45 | 19.89 | 15.22 | 11.37 | 9.86 | 8.48 | 9.72 | 12.28 | 14.28 | 16.68 | 17.82 | 17.63 | 19.98 |
| 0 | 255 | 0 | 105 | 255 | 16.6 | 15.32 | 12.12 | 8.52 | 5.78 | 4.14 | 3.09 | 2.73 | 2.49 | 2.81 | 3.92 | 6.12 | 11.7 | 20.92 | 33.73 | 51.63 |
| 0 | 40 | 0 | 88 | 50 | 26.01 | 25.2 | 23.08 | 20.84 | 18.38 | 16.33 | 13.9 | 13.44 | 12.07 | 13.58 | 15.22 | 15.39 | 15.78 | 18.31 | 23.01 | 29.65 |
| 0 | 40 | 0 | 58 | 255 | 16.55 | 16.14 | 13.62 | 9.9 | 6.41 | 4.12 | 2.81 | 2.29 | 2.1 | 2.17 | 2.7 | 4.21 | 10.17 | 24.16 | 43.53 | 62.92 |
| 0 | 13 | 0 | 54 | 12 | 37.56 | 38.56 | 36.94 | 35.12 | 32.87 | 30.63 | 27.22 | 26.01 | 23.44 | 24.95 | 26.86 | 27.31 | 28.34 | 33.13 | 42.2 | 52.52 |
| 0 | 13 | 0 | 77 | 12 | 27.43 | 27.12 | 25.63 | 24.86 | 23.88 | 22.56 | 19.89 | 18.18 | 15.74 | 15.77 | 16.56 | 17.05 | 18.19 | 22.87 | 33.24 | 47.07 |
| 0 | 13 | 0 | 47 | 50 | 37.2 | 38.86 | 35.27 | 30.45 | 25.32 | 21.88 | 18.45 | 18.69 | 17.39 | 21.42 | 25.05 | 23.95 | 22.9 | 23.86 | 25.8 | 30.27 |
| 0 | 13 | 0 | 26 | 255 | 16.57 | 16.48 | 13.83 | 9.69 | 6.08 | 3.86 | 2.73 | 2.28 | 2.14 | 2.19 | 2.64 | 3.98 | 10.27 | 28.21 | 52.09 | 69.02 |
| 0 | 13 | 0 | 44 | 255 | 16.49 | 16.18 | 13.74 | 9.76 | 6.24 | 4.01 | 2.78 | 2.34 | 2.15 | 2.24 | 2.68 | 4.05 | 10.09 | 26.06 | 47.94 | 66.11 |
| 0 | 13 | 0 | 35 | 137 | 32.66 | 33.56 | 29.46 | 23.33 | 17.44 | 13.29 | 9.88 | 8.65 | 7.48 | 8.81 | 11.64 | 14.43 | 18.51 | 21.61 | 22.99 | 26.46 |
| 0 | 255 | 0 | 44 | 255 | 18.27 | 16.88 | 12.8 | 8.43 | 5.46 | 3.86 | 2.89 | 2.6 | 2.38 | 2.71 | 3.75 | 6.14 | 13.87 | 30.14 | 50.39 | 67.08 |
| 0 | 93 | 0 | 35 | 137 | 32.97 | 33.52 | 27.99 | 21.33 | 15.59 | 12.03 | 9.12 | 8.47 | 7.6 | 9.65 | 13.53 | 16.71 | 21.01 | 24.14 | 25.4 | 28.79 |
| 0 | 93 | 0 | 26 | 255 | 17.78 | 17.47 | 14.35 | 10.01 | 6.33 | 4.11 | 2.84 | 2.35 | 2.14 | 2.25 | 2.88 | 4.61 | 11.6 | 29.4 | 52.44 | 68.84 |
| 0 | 93 | 0 | 53 | 137 | 31.07 | 31.05 | 26.28 | 20.55 | 15.33 | 11.96 | 9.13 | 8.42 | 7.51 | 9.33 | 12.78 | 15.62 | 19.47 | 22.4 | 24.79 | 28.7 |
| 0 | 93 | 0 | 44 | 255 | 18.6 | 18.18 | 15.11 | 10.84 | 7.05 | 4.66 | 3.23 | 2.69 | 2.43 | 2.57 | 3.26 | 5.11 | 12.17 | 28.37 | 49.17 | 66.39 |
| 0 | 40 | 0 | 35 | 137 | 32.34 | 33.09 | 28.52 | 22.13 | 16.3 | 12.36 | 9.21 | 8.19 | 7.14 | 8.64 | 11.69 | 14.61 | 18.77 | 21.87 | 23.18 | 26.57 |
| 0 | 13 | 0 | 66 | 50 | 31.05 | 31.37 | 28.96 | 26.08 | 22.8 | 20.27 | 17.29 | 16.95 | 15.34 | 17.47 | 19.48 | 19.14 | 19.04 | 21.03 | 24.65 | 30.28 |
| 0 | 6 | 0 | 0 | 5 | 61.92 | 72.09 | 72.8 | 69.76 | 64.7 | 60.93 | 57.02 | 58.46 | 57.97 | 66.4 | 73.46 | 72.5 | 70.55 | 69.36 | 68.11 | 69.43 |
| 0 | 6 | 0 | 8 | 5 | 56.42 | 64.09 | 64.28 | 62 | 58.35 | 55.29 | 51.49 | 51.65 | 49.92 | 55.1 | 59.67 | 59.54 | 59.28 | 61.2 | 64.07 | 67.72 |
| 0 | 6 | 0 | 0 | 12 | 60.15 | 69.74 | 68.85 | 63.58 | 56.44 | 51.51 | 46.62 | 48.31 | 47.62 | 57.71 | 66.3 | 63.98 | 60.76 | 58.67 | 56.89 | 58.97 |
| 0 | 6 | 0 | 41 | 5 | 42.13 | 45.02 | 44.08 | 43.2 | 41.72 | 40.02 | 36.57 | 34.66 | 31.38 | 32.13 | 33.7 | 34.43 | 36.04 | 41.74 | 52.12 | 62.53 |
| 0 | 6 | 0 | 21 | 5 | 49.85 | 55.05 | 54.48 | 52.9 | 50.32 | 47.9 | 44.15 | 43.09 | 40.33 | 42.9 | 45.77 | 46.29 | 47.36 | 51.81 | 58.85 | 65.71 |
| 0 | 6 | 0 | 21 | 12 | 48.92 | 53.8 | 52.49 | 49.5 | 45.47 | 42.13 | 37.97 | 37.64 | 35.38 | 39.47 | 43.22 | 42.88 | 42.76 | 45.52 | 50.06 | 56.03 |
| 0 | 6 | 0 | 0 | 50 | 52.88 | 59.11 | 52.88 | 42.52 | 33.05 | 27.62 | 23.14 | 24.72 | 24.13 | 33.91 | 43.37 | 38.94 | 34.31 | 31.64 | 29.71 | 32.24 |
| 0 | 6 | 0 | 0 | 24 | 57.41 | 65.55 | 62.28 | 54.39 | 45.43 | 39.83 | 34.73 | 36.54 | 35.88 | 46.71 | 56.49 | 52.83 | 48.49 | 45.8 | 43.67 | 46.35 |
| 0 | 6 | 0 | 8 | 24 | 52.81 | 59.24 | 56.4 | 49.91 | 42.45 | 37.51 | 32.73 | 33.9 | 32.74 | 41.06 | 48.35 | 45.94 | 43.12 | 42.18 | 41.95 | 45.42 |
| 0 | 24 | 0 | 0 | 24 | 56.22 | 62.86 | 57.7 | 48.19 | 38.93 | 33.49 | 28.74 | 30.73 | 30.44 | 42.62 | 56.07 | 53.14 | 48.63 | 45.77 | 43.6 | 46.2 |
| 0 | 24 | 0 | 8 | 24 | 52.85 | 57.78 | 53.09 | 44.86 | 36.5 | 31.41 | 26.81 | 28.37 | 27.72 | 37.72 | 48.23 | 46.39 | 43.49 | 42.59 | 42.46 | 46.01 |
| 0 | 24 | 0 | 0 | 50 | 52 | 57.19 | 49.67 | 38.77 | 29.32 | 24.23 | 20.05 | 21.66 | 21.28 | 31.39 | 42.59 | 38.48 | 33.81 | 31.11 | 29.14 | 31.76 |
| 0 | 13 | 0 | 8 | 12 | 55 | 61.67 | 59.58 | 54.22 | 47.57 | 43.01 | 38.33 | 39.52 | 38.4 | 46.98 | 55.05 | 54.15 | 52.54 | 52.99 | 54.21 | 57.95 |
| 0 | 13 | 0 | 0 | 24 | 57.59 | 65.18 | 61.19 | 52.46 | 43.16 | 37.45 | 32.42 | 34.33 | 33.81 | 45.35 | 56.68 | 53.33 | 48.89 | 46.21 | 44.11 | 46.72 |
| 0 | 13 | 0 | 8 | 24 | 53.97 | 59.72 | 56.13 | 48.89 | 41 | 35.89 | 31.11 | 32.47 | 31.51 | 40.66 | 49.31 | 47.13 | 44.29 | 43.45 | 43.3 | 46.82 |
| 0 | 6 | 0 | 8 | 12 | 56.17 | 63.24 | 62 | 57.69 | 51.95 | 47.71 | 43.6 | 43.88 | 42.35 | 49.39 | 55.49 | 54.27 | 52.67 | 53.12 | 54.37 | 58.14 |
| 0 | 6 | 0 | 0 | 255 | 17.3 | 17.29 | 14.47 | 9.91 | 6.06 | 3.83 | 2.69 | 2.31 | 2.15 | 2.23 | 2.63 | 3.98 | 10.86 | 32.53 | 60.21 | 73.94 |
| 0 | 6 | 0 | 4 | 255 | 17.56 | 17.63 | 14.87 | 10.3 | 6.38 | 4.01 | 2.78 | 2.33 | 2.16 | 2.25 | 2.69 | 4.15 | 11.2 | 32.19 | 58.87 | 72.89 |
| 0 | 6 | 0 | 0 | 201 | 29.1 | 30.9 | 27.37 | 20.41 | 13.61 | 8.84 | 5.73 | 4.31 | 3.61 | 3.91 | 5.43 | 9.19 | 22.16 | 47.97 | 65.44 | 71.36 |
| 0 | 6 | 0 | 18 | 255 | 16.92 | 16.88 | 14.23 | 9.9 | 6.15 | 3.86 | 2.64 | 2.22 | 2.05 | 2.13 | 2.56 | 3.96 | 10.54 | 29.46 | 54.22 | 70.32 |
| 0 | 6 | 0 | 10 | 255 | 18.16 | 18.12 | 15.31 | 10.8 | 6.76 | 4.3 | 2.98 | 2.49 | 2.3 | 2.39 | 2.87 | 4.43 | 11.62 | 31.81 | 57.24 | 72.07 |
| 0 | 6 | 0 | 10 | 201 | 28.21 | 29.67 | 26.39 | 20.06 | 13.61 | 8.94 | 5.83 | 4.37 | 3.65 | 3.94 | 5.47 | 9.14 | 21.11 | 43.53 | 60.79 | 69.08 |
| 0 | 6 | 0 | 0 | 110 | 44.07 | 48.29 | 40.89 | 30.95 | 22.77 | 18.21 | 14.54 | 14.78 | 13.9 | 18.82 | 24.53 | 23.74 | 22.56 | 21.35 | 20.01 | 22.1 |
| 0 | 6 | 0 | 0 | 137 | 39.3 | 42.23 | 36.47 | 27.65 | 19.84 | 14.85 | 10.98 | 9.67 | 8.45 | 10.2 | 13.84 | 17.36 | 22.53 | 25.15 | 24.61 | 27.17 |
| 0 | 6 | 0 | 4 | 137 | 38.04 | 40.93 | 35.31 | 26.83 | 19.22 | 14.34 | 10.52 | 9.25 | 8.04 | 9.72 | 13.26 | 16.71 | 21.8 | 24.5 | 24.2 | 26.85 |
| 0 | 24 | 0 | 0 | 255 | 17.35 | 17.36 | 14.52 | 9.92 | 6.07 | 3.78 | 2.58 | 2.16 | 1.98 | 2.07 | 2.5 | 3.98 | 11.08 | 32.34 | 59.26 | 72.59 |
| 0 | 24 | 0 | 4 | 255 | 17.92 | 17.99 | 15.07 | 10.43 | 6.45 | 4.07 | 2.81 | 2.36 | 2.18 | 2.26 | 2.74 | 4.28 | 11.59 | 32.82 | 59.44 | 73.44 |
| 0 | 24 | 0 | 0 | 201 | 28.88 | 30.35 | 26.43 | 19.41 | 12.8 | 8.31 | 5.4 | 4.11 | 3.47 | 3.79 | 5.35 | 9.13 | 22.05 | 47.78 | 65.18 | 71.16 |
| 0 | 13 | 0 | 4 | 255 | 18.3 | 18.32 | 15.43 | 10.83 | 6.73 | 4.26 | 2.94 | 2.46 | 2.26 | 2.36 | 2.85 | 4.47 | 11.94 | 33.05 | 59.55 | 73.75 |
| 0 | 13 | 0 | 0 | 201 | 28.81 | 30.32 | 26.6 | 19.65 | 13.02 | 8.42 | 5.45 | 4.08 | 3.43 | 3.73 | 5.25 | 8.99 | 21.83 | 47.47 | 64.96 | 71.05 |
| 0 | 13 | 0 | 4 | 201 | 28.64 | 29.89 | 26.28 | 19.54 | 13 | 8.4 | 5.38 | 4.03 | 3.35 | 3.65 | 5.17 | 8.87 | 21.37 | 45.78 | 63.38 | 70.48 |
| 0 | 6 | 0 | 4 | 201 | 28.32 | 29.65 | 26.19 | 19.57 | 13.06 | 8.46 | 5.45 | 4.08 | 3.39 | 3.67 | 5.14 | 8.75 | 21.09 | 45.28 | 62.78 | 69.85 |
| 0 | 255 | 0 | 4 | 255 | 18.55 | 17.23 | 12.7 | 8.2 | 5.16 | 3.63 | 2.71 | 2.45 | 2.26 | 2.57 | 3.7 | 6.22 | 14.8 | 34.73 | 59.15 | 72.8 |
| 0 | 160 | 0 | 0 | 201 | 27.18 | 26.49 | 20.35 | 13.66 | 8.81 | 6.13 | 4.36 | 3.8 | 3.4 | 4.13 | 6.46 | 10.76 | 23.63 | 48.13 | 64.83 | 70.74 |
| 0 | 160 | 0 | 0 | 255 | 18.75 | 18.04 | 14.35 | 9.62 | 6.12 | 4.11 | 3 | 2.6 | 2.39 | 2.58 | 3.27 | 5.22 | 13.09 | 34.28 | 60.41 | 73.37 |
| 0 | 160 | 0 | 4 | 201 | 26.46 | 25.9 | 20.02 | 13.49 | 8.74 | 6.06 | 4.31 | 3.74 | 3.34 | 4.02 | 6.21 | 10.35 | 22.71 | 46.15 | 63.1 | 69.99 |
| 0 | 160 | 0 | 4 | 255 | 18.58 | 17.79 | 14.12 | 9.4 | 5.89 | 3.89 | 2.79 | 2.37 | 2.17 | 2.35 | 3.04 | 4.98 | 12.72 | 33.29 | 58.95 | 72.6 |
| 0 | 93 | 0 | 0 | 201 | 28.57 | 28.85 | 23.6 | 16.59 | 10.91 | 7.41 | 5.08 | 4.16 | 3.62 | 4.17 | 6.14 | 10.2 | 23.03 | 47.92 | 64.88 | 70.83 |
| 0 | 255 | 0 | 18 | 255 | 18.42 | 17.08 | 12.75 | 8.28 | 5.3 | 3.74 | 2.81 | 2.54 | 2.34 | 2.69 | 3.81 | 6.29 | 14.46 | 32.9 | 55.48 | 70.18 |
| 0 | 160 | 0 | 18 | 201 | 25.86 | 25.18 | 19.75 | 13.59 | 8.97 | 6.26 | 4.46 | 3.85 | 3.41 | 4.1 | 6.28 | 10.23 | 21.44 | 41.37 | 58.21 | 67.92 |
| 0 | 160 | 0 | 18 | 255 | 18.21 | 17.57 | 14.01 | 9.47 | 5.99 | 3.99 | 2.86 | 2.44 | 2.22 | 2.41 | 3.11 | 5.03 | 12.5 | 31.23 | 54.79 | 70.04 |
| 0 | 160 | 0 | 10 | 201 | 26.42 | 25.82 | 20.19 | 13.85 | 9.07 | 6.34 | 4.5 | 3.89 | 3.44 | 4.2 | 6.5 | 10.68 | 22.58 | 44.01 | 60.52 | 68.62 |
| 0 | 160 | 0 | 10 | 255 | 18.45 | 17.85 | 14.19 | 9.52 | 5.97 | 3.96 | 2.83 | 2.43 | 2.23 | 2.4 | 3.11 | 5.04 | 12.74 | 32.54 | 57.02 | 71.32 |
| 0 | 93 | 0 | 10 | 201 | 28.02 | 28.1 | 23.22 | 16.65 | 11.16 | 7.65 | 5.25 | 4.3 | 3.7 | 4.29 | 6.28 | 10.29 | 22.15 | 43.73 | 60.33 | 68.41 |
| 0 | 58 | 0 | 0 | 110 | 41.83 | 44.22 | 35.96 | 26.41 | 19.21 | 15.36 | 12.3 | 12.76 | 12.19 | 17.51 | 24.72 | 24.61 | 23.62 | 22.48 | 21.17 | 23.22 |
| 0 | 58 | 0 | 4 | 110 | 41.61 | 43.77 | 35.59 | 26.2 | 18.98 | 15.07 | 11.97 | 12.38 | 11.76 | 16.9 | 23.86 | 23.89 | 23.08 | 22.14 | 20.98 | 23.12 |

TABLE 4-continued

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 40 | 0 | 0 | 110 | 43.35 | 46.27 | 38.05 | 28.17 | 20.49 | 16.33 | 13.03 | 13.38 | 12.67 | 17.74 | 24.29 | 23.98 | 22.94 | 21.75 | 20.42 | 22.52 |
| 0 | 93 | 0 | 4 | 137 | 37.4 | 38.44 | 31.33 | 22.84 | 16.2 | 12.3 | 9.29 | 8.74 | 7.9 | 10.42 | 15.15 | 18.93 | 23.89 | 26.39 | 26.05 | 28.6 |
| 0 | 58 | 0 | 0 | 137 | 37.68 | 39.37 | 32.42 | 23.64 | 16.57 | 12.36 | 9.16 | 8.34 | 7.42 | 9.45 | 13.55 | 17.29 | 22.61 | 25.31 | 24.82 | 27.32 |
| 0 | 58 | 0 | 4 | 137 | 36.74 | 38.22 | 31.43 | 22.91 | 16.03 | 11.92 | 8.77 | 7.94 | 7.03 | 8.93 | 12.9 | 16.6 | 21.9 | 24.72 | 24.46 | 27.07 |
| 0 | 58 | 0 | 0 | 255 | 17.57 | 17.43 | 14.33 | 9.77 | 6 | 3.83 | 2.69 | 2.29 | 2.12 | 2.21 | 2.68 | 4.18 | 11.32 | 32.61 | 59.83 | 73.45 |
| 0 | 58 | 0 | 4 | 255 | 17.78 | 17.55 | 14.55 | 10.04 | 6.23 | 3.95 | 2.72 | 2.27 | 2.07 | 2.17 | 2.7 | 4.3 | 11.47 | 31.89 | 58.23 | 72.53 |
| 0 | 40 | 0 | 0 | 201 | 28.61 | 29.63 | 25.5 | 18.51 | 12.15 | 7.92 | 5.15 | 3.96 | 3.34 | 3.69 | 5.31 | 9.09 | 21.83 | 47.33 | 64.93 | 71.12 |
| 0 | 93 | 0 | 4 | 255 | 19.09 | 18.62 | 15.28 | 10.57 | 6.68 | 4.35 | 3.03 | 2.52 | 2.3 | 2.45 | 3.11 | 5.02 | 12.8 | 33.47 | 59.53 | 73.5 |
| 0 | 58 | 0 | 0 | 201 | 28.86 | 29.61 | 25.1 | 18.07 | 11.96 | 7.97 | 5.31 | 4.18 | 3.57 | 3.99 | 5.74 | 9.65 | 22.4 | 47.62 | 64.9 | 70.96 |
| 0 | 58 | 0 | 4 | 201 | 28.54 | 29.15 | 24.72 | 17.87 | 11.84 | 7.87 | 5.23 | 4.12 | 3.5 | 3.93 | 5.65 | 9.49 | 21.91 | 45.97 | 63.45 | 70.53 |
| 0 | 93 | 0 | 4 | 201 | 28.93 | 28.99 | 23.87 | 16.94 | 11.24 | 7.67 | 5.24 | 4.29 | 3.69 | 4.31 | 6.4 | 10.56 | 23.19 | 46.66 | 63.32 | 70.12 |
| 0 | 6 | 0 | 41 | 12 | 42.17 | 44.24 | 42.87 | 41.02 | 38.47 | 36.02 | 32.35 | 31.18 | 28.46 | 30.31 | 32.4 | 32.59 | 33.33 | 37.55 | 45.09 | 53.66 |
| 0 | 6 | 0 | 30 | 50 | 42.3 | 45.04 | 40.86 | 34.79 | 28.48 | 24.44 | 20.6 | 21.2 | 19.97 | 25.33 | 30 | 28.11 | 26.28 | 26.38 | 27.25 | 31.17 |
| 0 | 6 | 0 | 21 | 24 | 47.62 | 52.07 | 49.6 | 44.85 | 39.12 | 35.04 | 30.67 | 31.07 | 29.37 | 34.93 | 39.68 | 38.35 | 37.03 | 38.11 | 40.35 | 45.22 |
| 0 | 6 | 0 | 23 | 137 | 35.26 | 36.83 | 32.26 | 25.39 | 18.82 | 14.29 | 10.59 | 9.24 | 8.01 | 9.45 | 12.58 | 15.73 | 20.35 | 23.4 | 24.21 | 27.37 |
| 0 | 6 | 0 | 8 | 50 | 49.33 | 54.46 | 49.13 | 40.4 | 32 | 27.08 | 22.8 | 24.05 | 23.18 | 31.26 | 38.71 | 35.18 | 31.57 | 29.9 | 28.84 | 31.82 |
| 0 | 24 | 0 | 8 | 137 | 37.23 | 39 | 33.34 | 25.22 | 18.09 | 13.57 | 10.04 | 8.94 | 7.84 | 9.59 | 13.14 | 16.46 | 21.33 | 24.14 | 24.17 | 26.87 |
| 0 | 13 | 0 | 15 | 137 | 36.48 | 38.25 | 33.09 | 25.52 | 18.59 | 14.02 | 10.39 | 9.19 | 8.02 | 9.69 | 13.08 | 16.23 | 20.8 | 23.61 | 23.95 | 26.9 |
| 0 | 13 | 0 | 8 | 110 | 41.85 | 44.92 | 38.15 | 29.16 | 21.66 | 17.37 | 13.88 | 14.02 | 13.12 | 17.6 | 22.94 | 22.59 | 21.79 | 21.03 | 20.11 | 22.35 |
| 0 | 6 | 0 | 15 | 110 | 40.59 | 43.26 | 37.12 | 28.9 | 21.78 | 17.6 | 14.13 | 14.21 | 13.25 | 17.4 | 22.07 | 21.64 | 20.91 | 20.38 | 19.77 | 22.13 |
| 0 | 13 | 0 | 21 | 24 | 47.72 | 52.03 | 49.15 | 43.94 | 37.93 | 33.79 | 29.48 | 30.08 | 28.61 | 34.7 | 40.22 | 39 | 37.65 | 38.68 | 40.82 | 45.64 |
| 0 | 13 | 0 | 0 | 110 | 44.21 | 47.98 | 40.4 | 30.46 | 22.39 | 17.93 | 14.33 | 14.61 | 13.75 | 18.73 | 24.57 | 23.77 | 22.54 | 21.31 | 19.95 | 22.05 |
| 0 | 24 | 0 | 8 | 50 | 48.9 | 53.46 | 46.99 | 37.7 | 29.34 | 24.63 | 20.65 | 22 | 21.43 | 30.08 | 39.31 | 36.25 | 32.64 | 30.91 | 29.77 | 32.6 |
| 0 | 24 | 0 | 0 | 110 | 43.65 | 47.15 | 39.23 | 29.32 | 21.46 | 17.13 | 13.67 | 14.01 | 13.24 | 18.33 | 24.56 | 24.05 | 22.96 | 21.82 | 20.5 | 22.55 |
| 0 | 24 | 0 | 0 | 137 | 38.48 | 41.12 | 34.98 | 26.19 | 18.68 | 13.97 | 10.32 | 9.18 | 8.04 | 9.87 | 13.65 | 17.3 | 22.61 | 25.31 | 24.78 | 27.25 |
| 0 | 24 | 0 | 8 | 110 | 42.54 | 45.34 | 38.29 | 29.27 | 21.85 | 17.67 | 14.23 | 14.48 | 13.65 | 18.47 | 24.28 | 23.98 | 23.15 | 22.32 | 21.31 | 23.56 |
| 0 | 13 | 0 | 8 | 50 | 49.09 | 54.05 | 48.2 | 39.18 | 30.78 | 25.93 | 21.74 | 23 | 22.28 | 30.56 | 38.7 | 35.44 | 31.91 | 30.2 | 29.11 | 31.98 |
| 0 | 24 | 0 | 30 | 24 | 43.32 | 46.12 | 42.54 | 37.27 | 31.54 | 27.66 | 23.72 | 24.2 | 22.87 | 28.54 | 34.24 | 33.79 | 33.12 | 34.93 | 38.11 | 43.62 |
| 0 | 24 | 0 | 30 | 50 | 41.32 | 43.47 | 38.57 | 31.91 | 25.47 | 21.57 | 18.01 | 18.75 | 17.84 | 23.68 | 29.52 | 28.02 | 26.24 | 26.26 | 26.94 | 30.63 |
| 0 | 58 | 0 | 23 | 110 | 38.19 | 39.23 | 32.62 | 24.93 | 18.63 | 15.08 | 12.12 | 12.38 | 11.68 | 16.02 | 21.58 | 21.77 | 21.37 | 21.11 | 20.72 | 23.17 |
| 0 | 58 | 0 | 23 | 137 | 34.38 | 34.99 | 29.52 | 22.44 | 16.39 | 12.55 | 9.46 | 8.63 | 7.65 | 9.54 | 13.21 | 16.47 | 20.88 | 23.72 | 24.46 | 27.51 |
| 0 | 40 | 0 | 15 | 50 | 45.74 | 48.85 | 42.2 | 33.38 | 25.68 | 21.38 | 17.73 | 18.92 | 18.39 | 26.39 | 35.52 | 33.35 | 30.4 | 29.2 | 28.59 | 31.7 |
| 0 | 40 | 0 | 15 | 137 | 35.87 | 37.13 | 31.49 | 23.95 | 17.35 | 13.16 | 9.81 | 8.8 | 7.72 | 9.5 | 13.11 | 16.48 | 21.19 | 23.98 | 24.28 | 27.15 |
| 0 | 40 | 0 | 15 | 110 | 40.14 | 42 | 35.37 | 27.06 | 20.25 | 16.35 | 13.13 | 13.4 | 12.65 | 17.29 | 23.11 | 23.16 | 22.59 | 22.07 | 21.34 | 23.68 |
| 0 | 24 | 0 | 18 | 255 | 17.68 | 17.53 | 14.84 | 10.4 | 6.54 | 4.17 | 2.86 | 2.4 | 2.22 | 2.28 | 2.78 | 4.35 | 11.32 | 30.12 | 54.1 | 69.77 |
| 0 | 58 | 0 | 18 | 255 | 17.86 | 17.61 | 14.76 | 10.28 | 6.49 | 4.19 | 2.92 | 2.46 | 2.26 | 2.35 | 2.87 | 4.5 | 11.54 | 30.4 | 54.28 | 69.7 |
| 0 | 40 | 0 | 10 | 255 | 17.77 | 17.71 | 14.8 | 10.29 | 6.41 | 4.03 | 2.81 | 2.35 | 2.16 | 2.25 | 2.75 | 4.3 | 11.47 | 31.37 | 56.28 | 70.93 |
| 0 | 24 | 0 | 23 | 137 | 33.89 | 35.43 | 30.53 | 23.59 | 17.14 | 12.86 | 9.45 | 8.31 | 7.23 | 8.8 | 12.05 | 15.24 | 19.78 | 22.74 | 23.46 | 26.62 |
| 0 | 255 | 0 | 105 | 0 | 21.03 | 19.06 | 14.61 | 10.53 | 7.59 | 6.06 | 4.87 | 5.24 | 5.09 | 8.33 | 14.85 | 17.25 | 18.74 | 23.25 | 34.47 | 52.58 |
| 0 | 40 | 0 | 88 | 0 | 25.42 | 24.88 | 23.45 | 22.59 | 21.61 | 20.35 | 17.96 | 16.55 | 14.41 | 14.69 | 15.67 | 16.45 | 17.96 | 23.32 | 36.58 | 56.23 |
| 0 | 255 | 0 | 58 | 50 | 26.98 | 24.44 | 17.63 | 11.91 | 8.16 | 6.4 | 5.12 | 5.65 | 5.64 | 10.25 | 22.04 | 25.88 | 25.92 | 27.34 | 29.94 | 34.56 |
| 0 | 13 | 0 | 54 | 0 | 37.22 | 39.03 | 38.13 | 37.64 | 36.9 | 35.66 | 32.63 | 30.39 | 27.12 | 27.19 | 28.4 | 29.49 | 31.56 | 38.44 | 52.61 | 67.71 |
| 0 | 13 | 0 | 77 | 0 | 28.17 | 27.96 | 26.96 | 26.73 | 26.64 | 25.92 | 23.47 | 21.07 | 18.17 | 17.46 | 17.91 | 18.68 | 20.29 | 26.08 | 40.07 | 59.47 |
| 0 | 40 | 0 | 47 | 12 | 39.29 | 40.83 | 37.92 | 33.92 | 29.49 | 26.27 | 22.71 | 22.86 | 21.42 | 25.93 | 30.81 | 31.65 | 32.56 | 36.94 | 44.88 | 53.93 |
| 0 | 255 | 0 | 26 | 137 | 28.15 | 25.9 | 18.72 | 12.55 | 8.51 | 6.52 | 5.1 | 5.32 | 5.15 | 8.37 | 15.99 | 20.88 | 25.41 | 28.24 | 29.09 | 32.09 |
| 0 | 255 | 0 | 44 | 137 | 27.17 | 25.08 | 18.39 | 12.54 | 8.6 | 6.64 | 5.21 | 5.39 | 5.18 | 8.2 | 15.04 | 19.4 | 23.58 | 26.64 | 28.2 | 31.62 |
| 0 | 93 | 0 | 35 | 50 | 39.87 | 40.37 | 33.72 | 26.28 | 20.22 | 16.84 | 14 | 15 | 14.69 | 21.68 | 31.11 | 31.02 | 29.56 | 29.81 | 30.78 | 34.56 |
| 0 | 255 | 0 | 44 | 0 | 28.2 | 25.6 | 17.94 | 11.87 | 8.03 | 6.3 | 5.07 | 5.61 | 5.66 | 10.76 | 27.29 | 37.38 | 40.62 | 46.46 | 57.72 | 69.49 |
| 0 | 93 | 0 | 35 | 0 | 41.37 | 42.13 | 35.89 | 28.55 | 22.35 | 18.84 | 15.77 | 16.84 | 16.59 | 24.83 | 38.11 | 42.26 | 44.52 | 50.78 | 62.2 | 72.63 |
| 0 | 255 | 0 | 26 | 12 | 29.75 | 26.9 | 18.65 | 12.17 | 8.22 | 6.44 | 5.18 | 5.75 | 5.83 | 11.21 | 29.68 | 41.25 | 43.25 | 45.98 | 50.46 | 56.4 |
| 0 | 93 | 0 | 53 | 0 | 36.81 | 36.91 | 31.92 | 26.07 | 20.85 | 17.69 | 14.79 | 15.55 | 15.04 | 21.36 | 30.34 | 33.12 | 35.19 | 41.73 | 55.13 | 69.14 |
| 0 | 255 | 0 | 44 | 12 | 28.6 | 25.79 | 18.14 | 12.02 | 8.17 | 6.42 | 5.17 | 5.72 | 5.77 | 10.84 | 26.76 | 35.48 | 37.38 | 41.05 | 47.57 | 55.37 |
| 0 | 93 | 0 | 35 | 12 | 40.65 | 41.21 | 34.81 | 27.42 | 21.26 | 17.81 | 14.85 | 15.9 | 15.67 | 23.55 | 35.77 | 38.35 | 38.93 | 42.29 | 48.17 | 55.28 |
| 0 | 40 | 0 | 66 | 12 | 32.19 | 32.37 | 30.36 | 28.23 | 25.73 | 23.57 | 20.61 | 19.93 | 18.09 | 20.01 | 22.31 | 23.04 | 24.26 | 29.07 | 39.05 | 51.38 |
| 0 | 6 | 0 | 0 | 0 | 63.15 | 73.34 | 75.85 | 75.44 | 73.42 | 71.61 | 69.49 | 70.39 | 70.2 | 75.41 | 79.64 | 80.21 | 80 | 79.97 | 79.53 | 79.79 |
| 0 | 6 | 0 | 8 | 0 | 57.5 | 65.23 | 66.69 | 66.42 | 64.98 | 63.41 | 60.85 | 60.27 | 58.33 | 61.04 | 63.75 | 64.68 | 65.85 | 69.23 | 73.85 | 77.45 |
| 0 | 13 | 0 | 0 | 5 | 60.08 | 69.19 | 68.87 | 64.32 | 57.97 | 53.52 | 49.15 | 51.14 | 51.01 | 62.03 | 72.26 | 71.92 | 69.91 | 68.55 | 67.21 | 68.66 |
| 0 | 6 | 0 | 41 | 0 | 41.92 | 44.65 | 44.41 | 44.48 | 44.29 | 43.45 | 40.56 | 37.85 | 34.1 | 33.56 | 34.41 | 35.48 | 37.66 | 44.59 | 57.56 | 70.02 |
| 0 | 6 | 0 | 21 | 0 | 49.46 | 54.83 | 55.28 | 55.09 | 54.23 | 52.91 | 49.97 | 48.1 | 44.89 | 45.64 | 47.3 | 48.4 | 50.37 | 56.24 | 65.73 | 73.62 |
| 0 | 13 | 0 | 21 | 5 | 49.35 | 54.19 | 53.01 | 50.26 | 46.43 | 43.27 | 39.21 | 39.01 | 36.9 | 41.46 | 45.98 | 46.61 | 47.43 | 51.55 | 58.19 | 65.01 |
| 0 | 40 | 0 | 0 | 24 | 54.51 | 60.87 | 54.55 | 44.13 | 34.6 | 29.23 | 24.72 | 26.74 | 26.65 | 39.39 | 55.48 | 53.61 | 49.34 | 46.61 | 44.48 | 47.09 |
| 0 | 24 | 0 | 0 | 12 | 58.38 | 66.51 | 63.1 | 54.89 | 45.94 | 40.42 | 35.47 | 37.73 | 37.65 | 51.07 | 65.9 | 64.8 | 61.35 | 59.02 | 57.08 | 59.28 |
| 0 | 24 | 0 | 8 | 12 | 53.17 | 59.32 | 56.26 | 49.67 | 42.25 | 37.45 | 32.84 | 34.37 | 33.69 | 43.79 | 54.46 | 54.02 | 52.28 | 52.42 | 53.32 | 57.03 |
| 0 | 24 | 0 | 0 | 0 | 60.44 | 68.94 | 67.7 | 62.1 | 55.07 | 50.35 | 45.85 | 48.21 | 48.5 | 61.94 | 76.9 | 79.48 | 79.23 | 78.95 | 78.38 | 78.65 |
| 0 | 24 | 0 | 8 | 0 | 55.28 | 62.17 | 60.97 | 56.62 | 51.04 | 47.05 | 42.77 | 44.08 | 43.34 | 52.68 | 62.6 | 64.77 | 65.91 | 69.21 | 73.83 | 77.46 |
| 0 | 40 | 0 | 0 | 5 | 58.16 | 65.87 | 61.52 | 52.59 | 43.44 | 37.97 | 33.15 | 35.58 | 35.83 | 50.98 | 70.96 | 73.13 | 71.21 | 69.74 | 68.34 | 69.63 |
| 0 | 13 | 0 | 8 | 0 | 55.96 | 63.45 | 63.77 | 61.6 | 58.03 | 55.17 | 51.59 | 52.07 | 50.78 | 57 | 63.11 | 64.62 | 65.79 | 69.13 | 73.74 | 77.29 |
| 0 | 24 | 0 | 0 | 5 | 58.53 | 66.83 | 64.74 | 58 | 50.09 | 44.94 | 40.2 | 42.55 | 42.67 | 56.21 | 71.16 | 71.95 | 70.08 | 68.7 | 67.32 | 68.73 |
| 0 | 24 | 0 | 8 | 5 | 53.92 | 61 | 59.14 | 53.98 | 47.62 | 43.23 | 38.78 | 40.2 | 39.49 | 49.17 | 59.23 | 60.13 | 59.79 | 61.33 | 63.76 | 67.38 |
| 0 | 13 | 0 | 8 | 5 | 55.08 | 62.35 | 61.86 | 58.35 | 53.39 | 49.67 | 45.48 | 46.29 | 45.06 | 52.49 | 59.58 | 60.03 | 59.91 | 61.75 | 64.42 | 68.18 |
| 0 | 255 | 0 | 0 | 201 | 24.43 | 22.55 | 16.07 | 10.29 | 6.67 | 4.88 | 3.7 | 3.56 | 3.3 | 4.61 | 8.36 | 13.54 | 26.1 | 47.9 | 63.12 | 69.52 |
| 0 | 255 | 0 | 4 | 201 | 24.37 | 22.47 | 16.01 | 10.29 | 6.68 | 4.88 | 3.71 | 3.54 | 3.3 | 4.55 | 8.17 | 13.31 | 25.66 | 46.85 | 62.43 | 69.53 |
| 0 | 160 | 0 | 0 | 137 | 34.79 | 34.36 | 26.33 | 18.34 | 12.77 | 9.73 | 7.45 | 7.37 | 6.85 | 9.93 | 16.04 | 20.46 | 25.83 | 28.44 | 27.88 | 30.31 |

TABLE 4-continued

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 255 | 0 | 18 | 201 | 23.36 | 21.36 | 15.26 | 9.9 | 6.39 | 4.68 | 3.53 | 3.36 | 3.12 | 4.27 | 7.54 | 12.26 | 23.39 | 41.69 | 57.23 | 66.7 |
| 0 | 255 | 0 | 10 | 201 | 24.06 | 22.14 | 15.85 | 10.24 | 6.59 | 4.78 | 3.61 | 3.41 | 3.15 | 4.34 | 7.76 | 12.72 | 24.74 | 44.86 | 60.35 | 68.42 |
| 0 | 160 | 0 | 10 | 137 | 33.41 | 32.72 | 25.21 | 17.65 | 12.29 | 9.37 | 7.19 | 7.07 | 6.56 | 9.42 | 15.07 | 19.18 | 24.13 | 26.8 | 26.78 | 29.48 |
| 0 | 58 | 0 | 0 | 50 | 48.95 | 52.57 | 44.01 | 33.29 | 24.79 | 20.39 | 16.87 | 18.33 | 18.2 | 28.17 | 42.05 | 39.43 | 35.03 | 32.38 | 30.46 | 33 |
| 0 | 93 | 0 | 0 | 110 | 43.35 | 45.54 | 37.18 | 27.43 | 20.09 | 16.11 | 12.96 | 13.45 | 12.87 | 18.37 | 25.74 | 25.66 | 24.66 | 23.49 | 22.14 | 24.24 |
| 0 | 93 | 0 | 4 | 110 | 42.67 | 44.75 | 36.74 | 27.49 | 20.2 | 16.4 | 13.28 | 13.76 | 13.18 | 18.62 | 25.69 | 25.58 | 24.58 | 23.54 | 22.37 | 24.54 |
| 0 | 255 | 0 | 0 | 110 | 30.31 | 27.84 | 19.35 | 12.63 | 8.47 | 6.54 | 5.18 | 5.67 | 5.66 | 10.3 | 22.92 | 27.54 | 27.43 | 26.46 | 25.18 | 27.15 |
| 0 | 255 | 0 | 4 | 110 | 29.89 | 27.41 | 19.1 | 12.49 | 8.42 | 6.52 | 5.19 | 5.67 | 5.63 | 10.15 | 22.15 | 26.43 | 26.33 | 25.45 | 24.3 | 26.33 |
| 0 | 160 | 0 | 0 | 50 | 40.61 | 39.97 | 28.99 | 19.53 | 13.49 | 10.62 | 8.51 | 9.48 | 9.53 | 17.48 | 37.16 | 39.85 | 36.01 | 33.34 | 31.37 | 33.78 |
| 0 | 255 | 0 | 4 | 137 | 27.77 | 25.57 | 17.83 | 11.53 | 7.64 | 5.76 | 4.48 | 4.67 | 4.51 | 7.68 | 15.15 | 20.65 | 26.04 | 28.71 | 28.48 | 30.91 |
| 0 | 160 | 0 | 0 | 110 | 37.27 | 36.81 | 27.25 | 18.72 | 13 | 10.16 | 8.04 | 8.62 | 8.42 | 13.81 | 24.08 | 25.62 | 24.79 | 23.57 | 22.22 | 24.27 |
| 0 | 160 | 0 | 4 | 110 | 36.8 | 36.37 | 27.06 | 18.7 | 13.03 | 10.21 | 8.08 | 8.64 | 8.43 | 13.73 | 23.71 | 25.46 | 24.9 | 23.91 | 22.7 | 24.81 |
| 0 | 160 | 0 | 4 | 137 | 33.9 | 33.21 | 25.23 | 17.43 | 11.98 | 9.07 | 6.9 | 6.78 | 6.3 | 9.09 | 14.87 | 19.21 | 24.49 | 27.15 | 26.83 | 29.36 |
| 0 | 255 | 0 | 4 | 0 | 29.95 | 26.76 | 17.6 | 10.92 | 7.13 | 5.5 | 4.42 | 4.92 | 5.02 | 10.34 | 34.77 | 62.05 | 69.81 | 72.51 | 74.78 | 77.05 |
| 0 | 160 | 0 | 0 | 0 | 43.39 | 42.98 | 31.29 | 21.11 | 14.59 | 11.54 | 9.3 | 10.44 | 10.66 | 20.73 | 55.62 | 77.57 | 80.39 | 80.02 | 79.17 | 79.27 |
| 0 | 255 | 0 | 0 | 5 | 30.74 | 27.73 | 18.37 | 11.53 | 7.6 | 5.91 | 4.77 | 5.31 | 5.41 | 10.96 | 35.86 | 62.23 | 67.66 | 67.47 | 66.43 | 68.09 |
| 0 | 160 | 0 | 4 | 0 | 42.47 | 41.87 | 30.83 | 21.13 | 14.79 | 11.78 | 9.54 | 10.66 | 10.86 | 20.54 | 51.65 | 69.74 | 72.61 | 74.31 | 76.35 | 78.26 |
| 0 | 255 | 0 | 4 | 5 | 30.72 | 27.53 | 18.36 | 11.64 | 7.74 | 6.03 | 4.89 | 5.43 | 5.54 | 11.03 | 34.95 | 58.76 | 63.74 | 64.76 | 65.56 | 68.2 |
| 0 | 160 | 0 | 0 | 5 | 43.3 | 42.96 | 31.54 | 21.52 | 15.04 | 11.97 | 9.71 | 10.84 | 11.05 | 20.95 | 53.16 | 70.35 | 70.83 | 69.42 | 67.91 | 69.05 |
| 0 | 255 | 0 | 18 | 0 | 30.1 | 27.23 | 18.63 | 12.02 | 8.07 | 6.32 | 5.11 | 5.67 | 5.76 | 11.27 | 32.69 | 50.58 | 55.63 | 60.56 | 67.91 | 74.43 |
| 0 | 160 | 0 | 18 | 0 | 39.27 | 38.64 | 29.18 | 20.47 | 14.54 | 11.65 | 9.44 | 10.44 | 10.52 | 19.08 | 42.21 | 53.06 | 55.74 | 60.61 | 68.5 | 75.04 |
| 0 | 255 | 0 | 18 | 5 | 29.42 | 26.65 | 18.1 | 11.6 | 7.78 | 6.06 | 4.89 | 5.43 | 5.5 | 10.79 | 31.18 | 46.91 | 50.54 | 54.14 | 59.56 | 65.53 |
| 0 | 160 | 0 | 10 | 0 | 41.04 | 40.46 | 30.3 | 21.06 | 14.95 | 12 | 9.79 | 10.85 | 10.99 | 20.1 | 47 | 60.91 | 63.67 | 67.21 | 72.37 | 76.54 |
| 0 | 255 | 0 | 10 | 5 | 30.62 | 27.56 | 18.58 | 11.85 | 7.89 | 6.13 | 4.95 | 5.51 | 5.61 | 11.15 | 33.56 | 52.82 | 56.96 | 59.45 | 62.67 | 66.88 |
| 0 | 160 | 0 | 10 | 5 | 41.4 | 40.59 | 30.26 | 20.92 | 14.79 | 11.84 | 9.62 | 10.68 | 10.82 | 19.91 | 46.02 | 58.14 | 59.43 | 61.34 | 64.35 | 68.29 |
| 0 | 58 | 0 | 0 | 0 | 57.45 | 63.15 | 56.62 | 46.12 | 36.53 | 31.17 | 26.69 | 29.12 | 29.63 | 46.24 | 73.96 | 80.77 | 80.69 | 80.15 | 79.36 | 79.38 |
| 0 | 58 | 0 | 4 | 0 | 55.19 | 59.72 | 53.79 | 44.27 | 35.43 | 30.34 | 25.95 | 28.11 | 28.35 | 43.07 | 65.91 | 71.47 | 72.12 | 73.72 | 75.88 | 77.71 |
| 0 | 58 | 0 | 0 | 5 | 57.12 | 62.83 | 55.95 | 45.19 | 35.63 | 30.31 | 25.87 | 28.19 | 28.55 | 44.16 | 69.42 | 73.61 | 71.83 | 70.28 | 68.85 | 70.01 |
| 0 | 93 | 0 | 4 | 0 | 51.23 | 53.49 | 43.81 | 32.66 | 24.26 | 19.96 | 16.53 | 18.29 | 18.57 | 31.92 | 61.9 | 72.42 | 73.64 | 75.21 | 77.35 | 79.05 |
| 0 | 93 | 0 | 0 | 5 | 51.18 | 54.09 | 43.58 | 31.75 | 23.11 | 18.77 | 15.38 | 17.11 | 17.43 | 30.93 | 62.56 | 72.01 | 70.84 | 69.7 | 68.35 | 69.43 |
| 0 | 93 | 0 | 4 | 5 | 49.64 | 52.03 | 42.08 | 30.82 | 22.54 | 18.3 | 14.99 | 16.67 | 16.92 | 29.72 | 58.25 | 66.65 | 66.2 | 66.35 | 66.05 | 68.67 |
| 0 | 255 | 0 | 0 | 24 | 30.23 | 27.16 | 18.02 | 11.29 | 7.4 | 5.72 | 4.59 | 5.12 | 5.22 | 10.53 | 32.32 | 48.88 | 49.01 | 47.04 | 45.17 | 47.55 |
| 0 | 255 | 0 | 4 | 24 | 29.97 | 26.99 | 18.04 | 11.39 | 7.48 | 5.77 | 4.62 | 5.16 | 5.25 | 10.6 | 31.57 | 46.46 | 46.74 | 45.55 | 44.6 | 47.41 |
| 0 | 160 | 0 | 0 | 24 | 41.84 | 41.35 | 30.01 | 20.18 | 13.94 | 11 | 8.84 | 9.88 | 10 | 18.8 | 44.36 | 52.36 | 49.25 | 46.51 | 44.35 | 46.79 |
| 0 | 255 | 0 | 4 | 12 | 30.22 | 27.12 | 17.99 | 11.34 | 7.48 | 5.81 | 4.68 | 5.21 | 5.31 | 10.7 | 33.42 | 52.33 | 55.91 | 55.7 | 55.49 | 58.34 |
| 0 | 160 | 0 | 0 | 12 | 42.97 | 42.78 | 31.21 | 21.09 | 14.62 | 11.55 | 9.3 | 10.42 | 10.59 | 20.17 | 49.8 | 62.5 | 60.81 | 58.42 | 56.34 | 58.41 |
| 0 | 160 | 0 | 4 | 12 | 42.24 | 41.65 | 30.58 | 20.83 | 14.52 | 11.51 | 9.28 | 10.36 | 10.51 | 19.76 | 46.95 | 58.2 | 57.28 | 56.36 | 55.9 | 58.7 |
| 0 | 160 | 0 | 4 | 5 | 42.29 | 41.82 | 30.72 | 20.95 | 14.65 | 11.65 | 9.42 | 10.51 | 10.68 | 20.14 | 49.63 | 64.77 | 65.68 | 65.91 | 66.6 | 68.99 |
| 0 | 13 | 0 | 41 | 5 | 42.42 | 45.32 | 44.07 | 42.41 | 40.12 | 37.88 | 34.27 | 32.99 | 30.2 | 32.09 | 34.53 | 35.36 | 36.87 | 42.51 | 52.78 | 63.22 |
| 0 | 40 | 0 | 30 | 24 | 43.11 | 45.77 | 41.62 | 35.59 | 29.43 | 25.51 | 21.71 | 22.53 | 21.59 | 28.18 | 35.24 | 35.01 | 34.28 | 35.99 | 39.09 | 44.53 |
| 0 | 24 | 0 | 21 | 12 | 48.55 | 52.93 | 50.1 | 44.97 | 39.09 | 35.02 | 30.76 | 31.48 | 30.17 | 37.13 | 44.16 | 44.22 | 43.87 | 46.19 | 50.22 | 55.89 |
| 0 | 93 | 0 | 23 | 110 | 38.71 | 40.13 | 33.53 | 25.73 | 19.35 | 15.71 | 12.69 | 12.99 | 12.28 | 16.78 | 22.47 | 22.63 | 22.2 | 21.93 | 21.54 | 24.03 |
| 0 | 40 | 0 | 8 | 24 | 50.59 | 55.75 | 50.2 | 41.4 | 33.09 | 28.22 | 23.97 | 25.52 | 25.1 | 35.52 | 48.09 | 47.04 | 44.29 | 43.35 | 43.1 | 46.58 |
| 0 | 93 | 0 | 8 | 24 | 46.77 | 48.93 | 39.64 | 29.4 | 21.75 | 17.82 | 14.68 | 16.12 | 16.17 | 26.72 | 46.58 | 49.09 | 46.66 | 45.59 | 45.12 | 48.32 |
| 0 | 93 | 0 | 15 | 50 | 42.64 | 43.92 | 35.41 | 26.26 | 19.4 | 15.86 | 13.01 | 14.15 | 14.02 | 22.21 | 35.11 | 34.62 | 31.87 | 30.73 | 30.22 | 33.29 |
| 0 | 58 | 0 | 8 | 24 | 48.85 | 52.63 | 45.72 | 36.17 | 28.01 | 23.48 | 19.69 | 21.25 | 21.08 | 31.75 | 46.9 | 46.84 | 44.22 | 43.3 | 43.13 | 46.51 |
| 0 | 58 | 0 | 15 | 50 | 44.19 | 46.71 | 39.67 | 30.85 | 23.51 | 19.5 | 16.16 | 17.34 | 16.97 | 25.05 | 35.3 | 33.69 | 30.9 | 29.87 | 29.49 | 32.69 |
| 0 | 24 | 0 | 21 | 5 | 49.87 | 54.26 | 52.29 | 48.4 | 43.59 | 40 | 35.84 | 36.2 | 34.62 | 40.68 | 46.94 | 47.98 | 48.92 | 53.18 | 60.11 | 66.91 |
| 0 | 58 | 0 | 0 | 24 | 53.62 | 58.49 | 50.24 | 38.87 | 29.56 | 24.57 | 20.54 | 22.44 | 22.5 | 35.38 | 55.21 | 54.83 | 50.65 | 47.88 | 45.77 | 48.26 |
| 0 | 40 | 0 | 8 | 5 | 54.64 | 60.46 | 56.5 | 48.97 | 41.08 | 36.14 | 31.52 | 33.33 | 33.02 | 44.89 | 59.37 | 61.2 | 60.82 | 62.34 | 64.88 | 68.32 |
| 0 | 58 | 0 | 0 | 12 | 55.91 | 61.52 | 53.83 | 42.67 | 33.07 | 27.83 | 23.52 | 25.66 | 25.88 | 40.38 | 63.39 | 65.24 | 62 |  | 59.67 | 57.78 | 59.74 |
| 0 | 93 | 0 | 0 | 24 | 49.87 | 51.84 | 41.19 | 29.81 | 21.66 | 17.6 | 14.43 | 15.97 | 16.13 | 27.72 | 51.69 | 54.52 | 50.73 | 48.03 | 45.9 | 48.3 |
| 0 | 58 | 0 | 8 | 12 | 51.35 | 55.6 | 48.89 | 39.17 | 30.58 | 25.79 | 21.7 | 23.49 | 23.44 | 35.56 | 53.59 | 55.44 | 53.79 | 53.78 | 54.4 | 57.75 |
| 0 | 40 | 0 | 8 | 12 | 53.1 | 58.34 | 53.32 | 44.97 | 36.66 | 31.66 | 27.18 | 28.9 | 28.57 | 40 | 54.07 | 54.49 | 52.74 | 52.83 | 53.65 | 57.24 |
| 0 | 24 | 0 | 30 | 0 | 45.9 | 49.07 | 47.41 | 44.78 | 41.33 | 38.5 | 34.67 | 34.31 | 32.23 | 36.34 | 41 | 42.66 | 44.76 | 51.42 | 63.12 | 73.32 |
| 0 | 40 | 0 | 30 | 5 | 44.2 | 47.28 | 44.19 | 39.48 | 34.33 | 30.66 | 26.7 | 27.2 | 25.9 | 32.19 | 39.21 | 40.66 | 41.94 | 46.93 | 55.53 | 64.01 |
| 0 | 58 | 0 | 23 | 0 | 46.69 | 49.86 | 45.22 | 38.42 | 31.75 | 27.56 | 23.57 | 24.81 | 24.22 | 33.48 | 45.82 | 49.16 | 51.19 | 57.01 | 66.73 | 74.57 |
| 0 | 93 | 0 | 23 | 5 | 43.83 | 45.15 | 37.56 | 28.78 | 21.77 | 17.96 | 14.82 | 16.14 | 16.08 | 25.93 | 43.66 | 48.53 | 49.74 | 53.63 | 59.91 | 66.22 |
| 0 | 40 | 0 | 15 | 0 | 51.2 | 55.88 | 52.94 | 47.22 | 40.94 | 36.66 | 32.34 | 33.6 | 32.82 | 42.27 | 53.32 | 56.01 | 57.68 | 62.53 | 70.12 | 76.05 |
| 0 | 93 | 0 | 15 | 12 | 45.03 | 46.6 | 38.19 | 28.6 | 21.2 | 17.38 | 14.24 | 15.62 | 15.64 | 25.91 | 45.38 | 49.58 | 49.1 | 50.44 | 52.77 | 57.08 |
| 0 | 58 | 0 | 15 | 5 | 49.3 | 53.01 | 47.46 | 39.34 | 31.63 | 27.05 | 22.93 | 24.46 | 24.14 | 34.9 | 49.85 | 52.64 | 53.1 | 56.23 | 61.16 | 66.48 |
| 0 | 255 | 0 | 18 | 110 | 29.72 | 27.39 | 19.49 | 12.97 | 8.82 | 6.86 | 5.47 | 5.98 | 5.94 | 10.62 | 22.3 | 26.07 | 25.98 | 25.53 | 24.95 | 27.25 |
| 0 | 255 | 0 | 18 | 24 | 30.03 | 27.18 | 18.61 | 12.01 | 8.03 | 6.28 | 5.03 | 5.61 | 5.69 | 11.04 | 29.85 | 40.92 | 41.58 | 42.31 | 43.75 | 47.83 |
| 0 | 255 | 0 | 10 | 50 | 30.44 | 27.76 | 19.15 | 12.48 | 8.44 | 6.57 | 5.29 | 5.89 | 5.95 | 11.37 | 28.75 | 36.29 | 34.9 | 33.66 | 32.87 | 35.5 |
| 0 | 93 | 0 | 23 | 24 | 42.39 | 43.51 | 35.73 | 27.17 | 20.42 | 16.85 | 13.9 | 15.06 | 14.96 | 23.61 | 38.12 | 40.05 | 38.99 | 39.92 | 41.88 | 46.43 |
| 0 | 255 | 255 | 105 | 0 | 4.71 | 3.48 | 3.18 | 3.81 | 6.51 | 8.37 | 7.15 | 7.66 | 7.5 | 11.51 | 18.71 | 21.23 | 22.74 | 27.22 | 37.88 | 54.84 |
| 0 | 40 | 15 | 88 | 0 | 17.7 | 15.58 | 14.67 | 15.6 | 18.65 | 19.95 | 17.88 | 16.47 | 14.36 | 14.59 | 15.54 | 16.32 | 17.79 | 23.02 | 36.31 | 56.31 |
| 0 | 255 | 15 | 58 | 0 | 19.17 | 15.99 | 12.46 | 9.74 | 7.68 | 6.33 | 5.12 | 5.64 | 5.64 | 10.29 | 23.62 | 30.54 | 33.1 | 39 | 51.8 | 66.84 |
| 0 | 13 | 5 | 54 | 0 | 31.33 | 30.6 | 29.73 | 30.81 | 34.22 | 35.95 | 33.35 | 31.15 | 27.88 | 27.92 | 29.09 | 30.19 | 32.31 | 39.25 | 53.66 | 68.91 |
| 0 | 13 | 5 | 77 | 0 | 23.45 | 22.1 | 21.27 | 22.06 | 24.57 | 25.46 | 23.16 | 20.71 | 17.74 | 16.99 | 17.44 | 18.2 | 19.83 | 25.65 | 39.9 | 59.66 |
| 0 | 40 | 5 | 47 | 0 | 32.36 | 31.43 | 29.85 | 29.53 | 30.59 | 30.27 | 26.97 | 26.71 | 24.86 | 28.59 | 32.91 | 34.53 | 36.66 | 43.58 | 57.17 | 70.59 |
| 0 | 255 | 5 | 26 | 0 | 26.05 | 22.69 | 16.17 | 11.03 | 7.71 | 6.1 | 4.94 | 5.46 | 5.54 | 10.79 | 30.56 | 45.56 | 50.05 | 55.84 | 65.59 | 74.28 |
| 0 | 255 | 5 | 44 | 0 | 24.63 | 21.3 | 15.41 | 10.71 | 7.59 | 6.02 | 4.87 | 5.39 | 5.43 | 10.38 | 27.25 | 38.02 | 41.43 | 47.48 | 59.17 | 70.93 |

TABLE 4-continued

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 93 | 5 | 35 | 0 | 33.08 | 31.28 | 27.28 | 23.69 | 20.8 | 18.3 | 15.31 | 16.39 | 16.1 | 24.33 | 37.67 | 41.79 | 44.03 | 50.48 | 62.44 | 73.14 |
| 0 | 255 | 255 | 44 | 0 | 4.71 | 3.42 | 3.17 | 3.68 | 6.24 | 7.84 | 6.61 | 7.32 | 7.38 | 13.28 | 30.36 | 40.36 | 43.62 | 49.2 | 59.8 | 70.81 |
| 0 | 93 | 37 | 35 | 0 | 14.04 | 11.05 | 10.08 | 11.3 | 15.91 | 18.08 | 15.59 | 16.8 | 16.59 | 25 | 38.61 | 42.76 | 44.91 | 51.06 | 62.35 | 72.49 |
| 0 | 255 | 37 | 26 | 0 | 14.01 | 10.79 | 8.7 | 7.61 | 6.86 | 5.9 | 4.79 | 5.33 | 5.4 | 10.59 | 30.21 | 45.45 | 50.05 | 55.75 | 65.18 | 73.69 |
| 0 | 93 | 37 | 53 | 0 | 13.05 | 10.1 | 9.26 | 10.43 | 14.84 | 16.8 | 14.46 | 15.28 | 14.79 | 20.98 | 29.93 | 32.72 | 34.79 | 41.37 | 54.91 | 69 |
| 0 | 255 | 37 | 44 | 0 | 13.82 | 10.76 | 8.77 | 7.73 | 7.03 | 6.06 | 4.94 | 5.46 | 5.5 | 10.45 | 26.87 | 37.3 | 40.69 | 46.69 | 58.36 | 70.29 |
| 0 | 93 | 15 | 35 | 0 | 22.77 | 19.62 | 17.56 | 17.13 | 18.12 | 17.43 | 14.67 | 15.77 | 15.51 | 23.68 | 37.21 | 41.5 | 43.84 | 50.29 | 61.94 | 72.27 |
| 0 | 40 | 5 | 66 | 0 | 26.45 | 25.09 | 23.66 | 23.57 | 24.42 | 24.02 | 21.28 | 20.28 | 18.15 | 19.49 | 21.46 | 22.53 | 24.34 | 30.67 | 45.18 | 63.22 |
| 0 | 6 | 2 | 0 | 0 | 54.58 | 60.81 | 62.21 | 63.49 | 66.88 | 69.67 | 68.28 | 69.31 | 69.07 | 74.29 | 78.54 | 79.07 | 78.89 | 78.97 | 78.73 | 79.13 |
| 0 | 6 | 2 | 8 | 0 | 51.19 | 56.87 | 57.78 | 58.69 | 61.04 | 62.52 | 60.33 | 59.86 | 57.92 | 60.8 | 63.75 | 64.69 | 65.85 | 69.25 | 73.86 | 77.35 |
| 0 | 13 | 2 | 0 | 0 | 55.32 | 62 | 62.32 | 61.44 | 61.25 | 60.81 | 57.56 | 59.41 | 59.47 | 69.34 | 78.7 | 80.21 | 80.12 | 80.12 | 79.78 | 79.96 |
| 0 | 6 | 2 | 41 | 0 | 39.07 | 40.6 | 40.14 | 40.95 | 43.1 | 43.99 | 41.41 | 38.79 | 35.14 | 34.68 | 35.61 | 36.73 | 38.94 | 45.86 | 58.94 | 71.34 |
| 0 | 6 | 2 | 21 | 0 | 45.18 | 48.68 | 48.85 | 49.89 | 52.51 | 54 | 51.59 | 49.75 | 46.56 | 47.29 | 48.97 | 50.13 | 52.11 | 57.97 | 67.51 | 75.25 |
| 0 | 13 | 2 | 21 | 0 | 44.15 | 47.3 | 46.88 | 46.78 | 47.55 | 47.47 | 44.35 | 43.68 | 41.36 | 44.7 | 48.52 | 49.97 | 51.83 | 57.45 | 66.64 | 74.24 |
| 0 | 40 | 2 | 0 | 0 | 51.46 | 55.99 | 55.32 | 48.52 | 44.08 | 40.8 | 36.35 | 38.91 | 39.36 | 54.88 | 75.51 | 79.69 | 79.57 | 79.27 | 78.7 | 78.82 |
| 0 | 24 | 2 | 0 | 0 | 53.84 | 59.6 | 58.45 | 55.35 | 52.53 | 50.34 | 46.2 | 48.57 | 48.88 | 62.29 | 77.14 | 79.78 | 79.62 | 79.27 | 78.9 | 79.13 |
| 0 | 24 | 2 | 8 | 0 | 49.83 | 54.05 | 52.77 | 50.38 | 48.35 | 46.54 | 42.54 | 43.87 | 43.14 | 52.55 | 62.76 | 65.05 | 66.24 | 69.51 | 74.07 | 77.5 |
| 0 | 24 | 8 | 0 | 0 | 40.05 | 40.05 | 39.03 | 40.03 | 45.64 | 49.61 | 46.34 | 48.9 | 49.24 | 62.84 | 78.03 | 80.65 | 80.46 | 80.27 | 79.82 | 79.97 |
| 0 | 24 | 8 | 8 | 0 | 37.17 | 36.86 | 35.78 | 36.7 | 42.11 | 46.19 | 43.07 | 44.43 | 43.65 | 52.93 | 62.98 | 65.28 | 66.56 | 69.94 | 74.58 | 78.06 |
| 0 | 40 | 8 | 0 | 0 | 38.89 | 38.57 | 36.66 | 36.05 | 38.83 | 40.12 | 36.09 | 38.75 | 39.18 | 55.09 | 76.45 | 80.8 | 80.82 | 80.62 | 80.13 | 80.13 |
| 0 | 13 | 5 | 8 | 0 | 43.85 | 45.41 | 45.09 | 46.47 | 51.81 | 55.62 | 53.11 | 53.69 | 52.38 | 58.42 | 64.38 | 65.8 | 66.9 | 70.27 | 75.01 | 78.5 |
| 0 | 24 | 5 | 0 | 0 | 46.38 | 48.16 | 46.94 | 46.44 | 48.94 | 50.5 | 46.83 | 49.35 | 49.69 | 63.23 | 78.13 | 80.63 | 80.35 | 80.14 | 79.72 | 79.78 |
| 0 | 24 | 5 | 8 | 0 | 43.64 | 44.85 | 43.75 | 43.68 | 46.18 | 47.32 | 43.75 | 45.06 | 44.26 | 53.35 | 63.11 | 65.3 | 66.48 | 69.85 | 74.56 | 78.08 |
| 0 | 13 | 2 | 8 | 0 | 50.87 | 55.28 | 55.16 | 54.88 | 55.7 | 55.9 | 52.82 | 53.3 | 51.96 | 57.94 | 63.83 | 65.26 | 66.41 | 69.87 | 74.63 | 78.24 |
| 0 | 255 | 2 | 0 | 0 | 29.85 | 26.35 | 17.91 | 11.55 | 7.76 | 6.08 | 4.91 | 5.48 | 5.59 | 11.33 | 37.57 | 68.25 | 76.81 | 78.11 | 78.04 | 78.81 |
| 0 | 255 | 2 | 4 | 0 | 27.72 | 24.55 | 16.45 | 10.46 | 6.97 | 5.41 | 4.36 | 4.87 | 4.96 | 10.22 | 34.6 | 61.88 | 69.74 | 72.62 | 75.06 | 77.37 |
| 0 | 160 | 2 | 0 | 0 | 39.36 | 38.02 | 28.23 | 19.73 | 14.15 | 11.32 | 9.13 | 10.25 | 10.48 | 20.47 | 55.35 | 77.4 | 80.36 | 80.19 | 79.57 | 79.67 |
| 0 | 255 | 2 | 18 | 0 | 26.97 | 23.8 | 16.28 | 10.59 | 7.16 | 5.6 | 4.51 | 5.01 | 5.09 | 10.17 | 30.97 | 49.29 | 54.67 | 59.95 | 67.94 | 74.66 |
| 0 | 255 | 2 | 10 | 0 | 27.8 | 24.68 | 16.77 | 10.86 | 7.33 | 5.74 | 4.63 | 5.17 | 5.26 | 10.57 | 33.41 | 55.83 | 62.19 | 66.43 | 71.76 | 76.15 |
| 0 | 160 | 2 | 10 | 0 | 35.24 | 33.83 | 26.02 | 18.84 | 13.83 | 11.23 | 9.16 | 10.18 | 10.32 | 19.01 | 44.74 | 58.32 | 61.2 | 64.83 | 70.15 | 74.33 |
| 0 | 58 | 2 | 0 | 0 | 48.28 | 51.13 | 46.47 | 39.78 | 33.88 | 29.95 | 25.7 | 28.1 | 28.59 | 44.78 | 71.74 | 78.51 | 78.7 | 78.49 | 78.21 | 78.21 |
| 0 | 93 | 2 | 0 | 0 | 44.69 | 45.08 | 37.64 | 29.4 | 23.04 | 19.3 | 15.95 | 17.77 | 18.15 | 32.14 | 65.79 | 78.19 | 79.03 | 79.04 | 78.59 | 78.74 |
| 0 | 93 | 2 | 4 | 0 | 44.22 | 44.58 | 37.03 | 28.67 | 22.2 | 18.43 | 15.11 | 16.83 | 17.12 | 30.41 | 61.01 | 72.1 | 73.58 | 75.22 | 77.03 | 78.45 |
| 0 | 255 | 8 | 0 | 0 | 23.94 | 20.28 | 14.35 | 9.87 | 7.01 | 5.55 | 4.47 | 4.98 | 5.08 | 10.56 | 36.45 | 67.92 | 76.87 | 78.09 | 77.86 | 78.43 |
| 0 | 255 | 8 | 4 | 0 | 24.54 | 21 | 14.91 | 10.21 | 7.19 | 5.68 | 4.56 | 5.08 | 5.18 | 10.65 | 35.24 | 62.27 | 69.96 | 72.77 | 75.2 | 77.47 |
| 0 | 160 | 8 | 0 | 0 | 29.9 | 27.05 | 21.64 | 17.19 | 14.1 | 11.9 | 9.68 | 10.86 | 11.1 | 21.21 | 55.78 | 77.51 | 80.38 | 80.17 | 79.43 | 79.56 |
| 0 | 255 | 5 | 4 | 0 | 25.35 | 21.95 | 15.26 | 10.22 | 7.12 | 5.6 | 4.52 | 5.04 | 5.15 | 10.45 | 34.81 | 61.86 | 69.51 | 72.24 | 74.46 | 76.78 |
| 0 | 160 | 5 | 0 | 0 | 34.12 | 31.88 | 24.82 | 18.66 | 14.36 | 11.85 | 9.66 | 10.79 | 11.03 | 21.03 | 55.56 | 77.23 | 80.06 | 79.78 | 78.99 | 79.07 |
| 0 | 160 | 5 | 4 | 0 | 33.9 | 31.66 | 24.74 | 18.62 | 14.34 | 11.86 | 9.67 | 10.78 | 10.97 | 20.61 | 51.96 | 70.22 | 73.13 | 74.86 | 76.98 | 78.31 |
| 0 | 160 | 2 | 4 | 0 | 38.44 | 36.97 | 28.19 | 20.31 | 14.94 | 12.12 | 9.85 | 10.99 | 11.17 | 20.92 | 51.92 | 69.72 | 72.67 | 74.56 | 76.83 | 78.74 |
| 0 | 255 | 255 | 4 | 0 | 4.57 | 3.38 | 3.12 | 3.65 | 6.14 | 7.79 | 6.6 | 7.36 | 7.49 | 13.96 | 37.82 | 60.43 | 67.1 | 70.45 | 73.69 | 76.81 |
| 0 | 160 | 73 | 0 | 0 | 8.82 | 6.53 | 5.89 | 6.72 | 10.43 | 12.57 | 10.71 | 11.92 | 12.15 | 22.18 | 55.42 | 76.11 | 79.38 | 79.63 | 79.14 | 79.38 |
| 0 | 255 | 73 | 0 | 0 | 9.78 | 7.22 | 6.17 | 6.19 | 6.87 | 6.44 | 5.26 | 5.88 | 6.01 | 11.96 | 38.26 | 68.54 | 76.87 | 78.14 | 78.07 | 78.72 |
| 0 | 160 | 73 | 4 | 0 | 8.97 | 6.59 | 5.93 | 6.79 | 10.53 | 12.62 | 10.75 | 11.98 | 12.18 | 22.06 | 53.1 | 70.9 | 73.77 | 75.45 | 77.45 | 79.14 |
| 0 | 255 | 73 | 4 | 0 | 10.43 | 7.69 | 6.53 | 6.44 | 6.95 | 6.42 | 5.24 | 5.85 | 5.97 | 11.93 | 37.39 | 64.38 | 71.69 | 74.26 | 76.56 | 78.57 |
| 0 | 160 | 37 | 0 | 0 | 15.18 | 12.01 | 10.56 | 10.71 | 12.59 | 12.64 | 10.52 | 11.77 | 12 | 22.41 | 57.13 | 78.42 | 81.28 | 81.11 | 80.47 | 80.51 |
| 0 | 255 | 255 | 18 | 0 | 4.62 | 3.34 | 3.12 | 3.63 | 6.16 | 7.78 | 6.53 | 7.29 | 7.39 | 13.78 | 35.62 | 52.88 | 57.68 | 62.46 | 69.64 | 75.89 |
| 0 | 160 | 73 | 18 | 0 | 9.2 | 6.85 | 6.23 | 7.05 | 10.71 | 12.74 | 10.87 | 11.98 | 12.07 | 20.79 | 43.2 | 53.63 | 56.37 | 61.45 | 69.7 | 76.4 |
| 0 | 255 | 73 | 18 | 0 | 9.4 | 6.91 | 5.9 | 5.89 | 6.48 | 6.02 | 4.9 | 5.48 | 5.55 | 10.98 | 32.08 | 50.14 | 55.41 | 60.63 | 68.43 | 75.11 |
| 0 | 160 | 73 | 10 | 0 | 8.59 | 6.29 | 5.66 | 6.53 | 10.23 | 12.17 | 10.32 | 11.48 | 11.61 | 20.75 | 47 | 60.79 | 63.71 | 67.46 | 72.82 | 77.03 |
| 0 | 255 | 73 | 10 | 0 | 9.93 | 7.28 | 6.21 | 6.22 | 6.8 | 6.36 | 5.22 | 5.82 | 5.91 | 11.56 | 34.4 | 56.5 | 62.91 | 67.16 | 72.46 | 76.89 |
| 0 | 160 | 37 | 10 | 0 | 13.93 | 10.96 | 9.6 | 9.86 | 11.71 | 11.72 | 9.72 | 10.83 | 10.97 | 20.06 | 46.76 | 60.95 | 63.91 | 67.72 | 73.25 | 77.56 |
| 0 | 58 | 22 | 0 | 0 | 20.9 | 17.64 | 16.43 | 17.89 | 24.7 | 29.3 | 25.99 | 28.51 | 28.96 | 45.32 | 72.88 | 79.73 | 79.86 | 79.67 | 79.29 | 79.55 |
| 0 | 58 | 22 | 4 | 0 | 20.26 | 17.17 | 16.04 | 17.62 | 24.44 | 29 | 25.82 | 28.08 | 28.29 | 42.8 | 65.87 | 71.72 | 72.59 | 74.39 | 76.74 | 78.72 |
| 0 | 58 | 15 | 0 | 0 | 27.36 | 24.51 | 22.73 | 23.16 | 27.49 | 29.71 | 26.13 | 28.64 | 29.12 | 45.42 | 72.79 | 79.57 | 79.68 | 79.34 | 78.77 | 78.91 |
| 0 | 93 | 37 | 4 | 0 | 14.42 | 11.3 | 10.38 | 11.65 | 16.55 | 18.88 | 16.27 | 18 | 18.27 | 30.84 | 59.69 | 70.36 | 71.95 | 73.72 | 75.84 | 77.64 |
| 0 | 93 | 22 | 0 | 0 | 20.42 | 17.18 | 15.44 | 15.68 | 18.31 | 18.53 | 15.6 | 17.41 | 17.77 | 31.55 | 65.19 | 77.8 | 78.77 | 78.67 | 78.17 | 78.27 |
| 0 | 93 | 22 | 4 | 0 | 20.51 | 17.14 | 15.41 | 15.7 | 18.41 | 18.71 | 15.77 | 17.51 | 17.78 | 30.9 | 61.39 | 72.51 | 73.97 | 75.69 | 77.76 | 79.33 |
| 0 | 255 | 22 | 0 | 0 | 18.21 | 14.73 | 11.22 | 8.75 | 6.98 | 5.74 | 4.62 | 5.17 | 5.27 | 10.91 | 36.95 | 67.91 | 76.75 | 78.15 | 78.14 | 78.9 |
| 0 | 255 | 22 | 4 | 0 | 18.26 | 14.87 | 11.46 | 9 | 7.23 | 5.97 | 4.84 | 5.5 | 5.5 | 11.06 | 35.73 | 62.75 | 70.39 | 73.15 | 75.51 | 77.76 |
| 0 | 160 | 15 | 0 | 0 | 24.65 | 21.43 | 17.72 | 15.15 | 13.63 | 11.97 | 9.79 | 10.97 | 11.19 | 21.3 | 55.91 | 77.52 | 80.43 | 80.24 | 79.57 | 79.65 |
| 0 | 255 | 37 | 4 | 0 | 14.83 | 11.6 | 9.35 | 8.17 | 7.4 | 6.41 | 5.23 | 5.81 | 5.92 | 11.71 | 36.38 | 62.11 | 69.47 | 72.59 | 75.45 | 78 |
| 0 | 160 | 22 | 0 | 0 | 21.04 | 17.66 | 15.11 | 13.87 | 13.78 | 12.77 | 10.6 | 11.8 | 12.02 | 22.13 | 56.08 | 77.18 | 79.94 | 79.8 | 79.21 | 79.39 |
| 0 | 160 | 22 | 4 | 0 | 20.26 | 16.95 | 14.47 | 13.38 | 13.49 | 12.53 | 10.38 | 11.56 | 11.75 | 21.54 | 52.17 | 69.67 | 72.49 | 74.3 | 76.52 | 78.5 |
| 0 | 160 | 37 | 4 | 0 | 14.89 | 11.71 | 10.35 | 10.6 | 12.55 | 12.61 | 10.52 | 11.71 | 11.9 | 21.74 | 52.75 | 70.39 | 73.22 | 75.03 | 77.29 | 79.15 |
| 0 | 13 | 2 | 41 | 0 | 39.37 | 40.77 | 39.94 | 39.89 | 40.64 | 40.38 | 37.24 | 35.51 | 32.43 | 33.52 | 35.57 | 36.83 | 39 | 45.92 | 59.16 | 71.7 |
| 0 | 40 | 2 | 30 | 0 | 41.37 | 42.87 | 40.64 | 38.03 | 35.63 | 33.32 | 29.53 | 29.87 | 28.41 | 34.37 | 41.23 | 43.32 | 45.42 | 51.9 | 63.46 | 73.53 |
| 0 | 24 | 2 | 21 | 0 | 45.25 | 47.68 | 46.42 | 44.99 | 44.12 | 42.88 | 39.17 | 39.29 | 37.56 | 43.47 | 49.29 | 51.13 | 53 | 58.65 | 67.96 | 75.6 |
| 0 | 93 | 2 | 23 | 0 | 39.93 | 39.42 | 33.57 | 27.15 | 21.87 | 18.59 | 15.47 | 16.77 | 16.66 | 26.41 | 43.88 | 49.37 | 51.54 | 57.3 | 67.17 | 75.34 |
| 0 | 40 | 2 | 8 | 0 | 49.77 | 53.02 | 50.35 | 46.26 | 42.62 | 39.69 | 35.4 | 37.21 | 36.91 | 48.66 | 63.05 | 66.26 | 67.36 | 70.56 | 75.18 | 78.61 |
| 0 | 93 | 8 | 8 | 0 | 32.71 | 30.1 | 26.19 | 23.04 | 20.96 | 18.67 | 15.51 | 17.14 | 17.33 | 29.67 | 56.24 | 65.38 | 67.05 | 70.1 | 74.55 | 77.87 |
| 0 | 93 | 5 | 15 | 0 | 35.58 | 33.96 | 29.2 | 24.79 | 21.33 | 18.6 | 15.47 | 16.97 | 17.06 | 28.18 | 50.62 | 58.32 | 60.49 | 65 | 71.47 | 76.27 |
| 0 | 58 | 5 | 8 | 0 | 40.32 | 40 | 36.58 | 33.32 | 31.35 | 29.22 | 25.22 | 27.2 | 27.25 | 40.56 | 60.68 | 65.81 | 67.16 | 70.29 | 74.63 | 77.84 |

TABLE 4-continued

Second set of 969 patches
(target condition)

| Colorant digital count (0-255) | | | | | Percent reflectance at wavelength | | | | | | | | | | | | | | | |
|---|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 58 | 2 | 15 | 0 | 43.4 | 44.72 | 40.95 | 36.14 | 31.83 | 28.53 | 24.58 | 26.2 | 25.94 | 37.04 | 52.66 | 56.75 | 58.54 | 63.26 | 70.5 | 76.02 |
| 0 | 24 | 5 | 21 | 0 | 37.73 | 38.05 | 36.79 | 37 | 39.56 | 40.48 | 37.04 | 37.31 | 35.63 | 41.31 | 47.4 | 49.25 | 51.18 | 57.09 | 66.86 | 74.81 |
| 0 | 58 | 5 | 0 | 0 | 43.15 | 43.46 | 39.73 | 35.86 | 33.35 | 30.8 | 26.55 | 29.01 | 29.45 | 45.8 | 72.84 | 79.42 | 79.5 | 79.34 | 79.11 | 79.42 |
| 0 | 40 | 8 | 8 | 0 | 35.83 | 35.08 | 33.34 | 33.12 | 36.07 | 37.36 | 33.58 | 35.48 | 35.19 | 47.1 | 61.83 | 65.15 | 66.33 | 69.64 | 74.23 | 77.75 |
| 0 | 58 | 8 | 0 | 0 | 35.1 | 33.83 | 31.34 | 30.04 | 31.04 | 30.38 | 26.41 | 28.86 | 29.31 | 45.6 | 72.96 | 79.81 | 80.01 | 79.77 | 79.27 | 79.45 |
| 0 | 93 | 8 | 0 | 0 | 34 | 31.74 | 27.43 | 23.86 | 21.51 | 19.12 | 15.87 | 17.68 | 18.03 | 32.02 | 65.99 | 78.67 | 79.59 | 79.63 | 79.29 | 79.3 |
| 0 | 58 | 8 | 8 | 0 | 34.76 | 33.69 | 31.1 | 29.77 | 30.52 | 30.05 | 26.21 | 28.22 | 28.24 | 41.51 | 61.4 | 66.34 | 67.53 | 70.6 | 74.94 | 78.16 |
| 0 | 40 | 5 | 8 | 0 | 41.71 | 42.1 | 39.88 | 38.33 | 38.59 | 38.02 | 34.03 | 35.88 | 35.6 | 47.37 | 62.12 | 65.43 | 66.54 | 69.78 | 74.37 | 77.86 |
| 0 | 24 | 8 | 30 | 0 | 31.86 | 30.78 | 29.74 | 30.95 | 36.1 | 39.13 | 36.14 | 35.84 | 33.7 | 37.73 | 42.27 | 43.93 | 46.03 | 52.61 | 64.32 | 74.43 |
| 0 | 40 | 8 | 30 | 0 | 32.02 | 31.09 | 29.44 | 29.54 | 32.18 | 33.17 | 29.82 | 30.26 | 28.84 | 34.83 | 41.65 | 43.72 | 45.77 | 52.24 | 63.79 | 73.84 |
| 0 | 58 | 22 | 23 | 0 | 20.69 | 17.64 | 16.58 | 17.86 | 23.53 | 27.1 | 24.12 | 25.41 | 24.79 | 33.58 | 45.09 | 48.19 | 50.18 | 56.04 | 66.04 | 74.4 |
| 0 | 93 | 22 | 23 | 0 | 20.23 | 16.98 | 15.44 | 15.84 | 18.65 | 19.13 | 16.37 | 17.73 | 17.64 | 27.3 | 44.53 | 49.99 | 52.17 | 57.77 | 67.31 | 75.22 |
| 0 | 40 | 15 | 15 | 0 | 27.66 | 25.64 | 24.44 | 25.71 | 31.78 | 36.26 | 33.21 | 34.54 | 33.79 | 42.93 | 53.75 | 56.48 | 58.15 | 62.97 | 70.41 | 76.27 |
| 0 | 93 | 15 | 15 | 0 | 25.32 | 22.37 | 20.01 | 19.15 | 19.96 | 19.24 | 16.28 | 17.79 | 17.83 | 28.81 | 50.4 | 57.5 | 59.49 | 64 | 71.05 | 76.48 |
| 0 | 58 | 15 | 15 | 0 | 26 | 23.48 | 21.82 | 22.32 | 26.33 | 28.19 | 24.78 | 26.42 | 26.12 | 37.19 | 52.75 | 56.71 | 58.38 | 63.21 | 70.85 | 76.66 |
| 0 | 255 | 8 | 18 | 0 | 24.48 | 21.14 | 15.35 | 10.78 | 7.77 | 6.17 | 4.98 | 5.55 | 5.64 | 11.12 | 32.51 | 50.5 | 55.59 | 60.75 | 68.61 | 75.23 |
| 0 | 255 | 22 | 18 | 0 | 18.57 | 15.01 | 11.63 | 9.13 | 7.35 | 6.05 | 4.88 | 5.45 | 5.51 | 11 | 32.47 | 50.47 | 55.55 | 60.74 | 68.81 | 75.6 |
| 0 | 255 | 15 | 10 | 0 | 21.47 | 17.97 | 13.61 | 10.12 | 7.75 | 6.28 | 5.08 | 5.66 | 5.76 | 11.46 | 35.01 | 57.48 | 63.63 | 67.68 | 72.86 | 77.06 |
| 0 | 93 | 8 | 23 | 0 | 31.39 | 29.01 | 25.38 | 22.71 | 20.94 | 18.88 | 15.84 | 17.17 | 17.11 | 26.94 | 44.62 | 50.19 | 52.31 | 57.92 | 67.39 | 75.26 |
| 0 | 40 | 255 | 58 | 0 | 3.68 | 2.88 | 2.66 | 3.28 | 8.7 | 25.31 | 28.09 | 27.97 | 26.07 | 28.03 | 30.58 | 31.82 | 33.64 | 39.92 | 52.71 | 67.83 |
| 0 | 13 | 15 | 47 | 0 | 23.83 | 21.55 | 20.88 | 22.98 | 30.93 | 37.84 | 35.99 | 34.07 | 30.84 | 31.31 | 32.88 | 34.08 | 36.26 | 43.2 | 56.88 | 70.46 |
| 0 | 13 | 255 | 26 | 0 | 3.38 | 2.68 | 2.58 | 3.08 | 8.3 | 32.41 | 42.57 | 43.71 | 41.68 | 43.79 | 46.38 | 47.7 | 49.65 | 55.48 | 65.39 | 74.07 |
| 0 | 13 | 255 | 44 | 0 | 3.39 | 2.63 | 2.57 | 3.01 | 8.17 | 29.99 | 37.78 | 37.74 | 35.13 | 35.88 | 37.53 | 38.66 | 40.67 | 46.93 | 59.04 | 71.08 |
| 0 | 13 | 37 | 35 | 0 | 12.82 | 10.24 | 9.8 | 12.02 | 23.1 | 38.74 | 38.95 | 37.86 | 34.96 | 36.33 | 38.51 | 39.81 | 42.01 | 48.79 | 61.17 | 72.46 |
| 0 | 93 | 255 | 26 | 0 | 3.81 | 2.88 | 2.78 | 3.34 | 8.15 | 18.99 | 18.75 | 20.28 | 20.2 | 29.11 | 44.17 | 48.89 | 50.93 | 56.32 | 65.75 | 74.04 |
| 0 | 93 | 255 | 44 | 0 | 3.7 | 2.84 | 2.72 | 3.27 | 8.1 | 18.66 | 18.38 | 19.59 | 19.23 | 26.24 | 36.54 | 39.69 | 41.68 | 47.67 | 59.48 | 71.31 |
| 0 | 40 | 37 | 35 | 0 | 14.19 | 11.45 | 10.85 | 12.76 | 21.38 | 30.55 | 28.69 | 29.17 | 27.71 | 33.02 | 39.03 | 40.97 | 43.09 | 49.69 | 61.74 | 72.78 |
| 0 | 13 | 15 | 66 | 0 | 19.61 | 17.5 | 16.75 | 18.55 | 24.5 | 28.8 | 26.9 | 24.57 | 21.45 | 20.87 | 21.51 | 22.41 | 24.23 | 30.64 | 45.36 | 63.61 |
| 0 | 6 | 5 | 0 | 0 | 46.26 | 48.69 | 49.27 | 51.95 | 60.67 | 68.78 | 68.32 | 69.49 | 69.25 | 74.48 | 78.74 | 79.32 | 79.21 | 79.36 | 79.3 | 79.66 |
| 0 | 6 | 5 | 21 | 0 | 39.15 | 40.24 | 40.19 | 42.23 | 48.3 | 52.88 | 50.91 | 49.07 | 45.78 | 46.36 | 47.92 | 49.02 | 51.08 | 57.11 | 67.07 | 75.06 |
| 0 | 6 | 15 | 0 | 0 | 30.49 | 28.91 | 28.77 | 32.14 | 46.37 | 65.22 | 67.28 | 68.86 | 68.7 | 74.06 | 78.37 | 78.94 | 78.87 | 79.06 | 79.06 | 79.43 |
| 0 | 6 | 8 | 0 | 0 | 39.94 | 40.43 | 40.62 | 43.87 | 55.48 | 67.39 | 67.6 | 68.99 | 68.81 | 74.45 | 79.05 | 79.66 | 79.55 | 79.73 | 79.68 | 79.98 |
| 0 | 6 | 8 | 8 | 0 | 38.52 | 39.08 | 38.96 | 41.79 | 51.46 | 61.1 | 60.46 | 60.21 | 58.34 | 61.16 | 64.06 | 65 | 66.18 | 69.72 | 74.54 | 78.08 |
| 0 | 24 | 15 | 0 | 0 | 29.16 | 27.35 | 26.57 | 28.71 | 38.6 | 48.67 | 46.62 | 49.31 | 49.66 | 63.03 | 77.8 | 80.34 | 80.17 | 80.02 | 79.65 | 79.8 |
| 0 | 13 | 8 | 0 | 0 | 41.36 | 42.19 | 41.97 | 43.98 | 51.87 | 59.41 | 57.7 | 59.76 | 59.87 | 69.49 | 78.6 | 80.03 | 79.88 | 79.88 | 79.58 | 79.84 |
| 0 | 13 | 8 | 8 | 0 | 38.71 | 38.92 | 38.49 | 40.42 | 47.83 | 54.21 | 52.18 | 52.82 | 51.5 | 57.43 | 63.31 | 64.81 | 66.04 | 69.5 | 74.25 | 77.92 |
| 0 | 6 | 5 | 8 | 0 | 43.54 | 46.02 | 46.4 | 48.58 | 55.34 | 61.56 | 60.38 | 59.97 | 58.05 | 60.69 | 63.45 | 64.42 | 65.62 | 69.11 | 73.85 | 77.48 |
| 0 | 6 | 255 | 0 | 0 | 3.55 | 2.8 | 2.71 | 3.18 | 8.56 | 39.75 | 61.61 | 67.53 | 68.56 | 74.55 | 79.09 | 79.73 | 79.64 | 79.77 | 79.48 | 79.85 |
| 0 | 6 | 255 | 4 | 0 | 3.58 | 2.8 | 2.73 | 3.25 | 8.87 | 39.5 | 59.28 | 63.75 | 63.63 | 67.67 | 71.04 | 71.88 | 72.6 | 74.66 | 77.04 | 79 |
| 0 | 6 | 73 | 0 | 0 | 8.42 | 6.59 | 6.3 | 7.97 | 19.43 | 53.94 | 65.3 | 68.55 | 68.93 | 74.79 | 79.41 | 80.01 | 79.86 | 79.9 | 79.53 | 79.72 |
| 0 | 6 | 255 | 18 | 0 | 3.59 | 2.86 | 2.74 | 3.27 | 8.79 | 36.13 | 50.82 | 52.32 | 50.13 | 51.25 | 53.05 | 54.16 | 55.95 | 61.11 | 69.28 | 75.86 |
| 0 | 6 | 255 | 10 | 0 | 3.6 | 2.83 | 2.76 | 3.19 | 8.61 | 37.82 | 55.5 | 58.48 | 57.17 | 59.48 | 61.84 | 62.81 | 64.19 | 68.02 | 73.38 | 77.58 |
| 0 | 6 | 73 | 10 | 0 | 8.52 | 6.69 | 6.38 | 8.03 | 19.16 | 49.49 | 57.83 | 58.67 | 56.79 | 59.08 | 61.55 | 62.58 | 63.98 | 68.03 | 73.68 | 77.91 |
| 0 | 6 | 22 | 0 | 0 | 24.4 | 22.16 | 21.79 | 25.12 | 40.27 | 63.8 | 67.41 | 69.27 | 69.26 | 74.68 | 79.04 | 79.59 | 79.47 | 79.61 | 79.42 | 79.74 |
| 0 | 6 | 37 | 0 | 0 | 14.46 | 11.85 | 11.52 | 14.2 | 29.35 | 59.6 | 66.29 | 68.76 | 68.93 | 74.53 | 78.9 | 79.51 | 79.35 | 79.34 | 78.96 | 79.21 |
| 0 | 6 | 37 | 4 | 0 | 14.46 | 11.91 | 11.47 | 14.11 | 28.46 | 56.55 | 62.15 | 63.67 | 62.81 | 66.98 | 70.62 | 71.44 | 72.09 | 74.06 | 76.38 | 78.28 |
| 0 | 24 | 255 | 0 | 0 | 3.38 | 2.68 | 2.6 | 3.02 | 8.24 | 33.48 | 44.3 | 48.92 | 49.8 | 62.94 | 77.24 | 79.78 | 79.7 | 79.25 | 79.57 | |
| 0 | 24 | 255 | 4 | 0 | 3.42 | 2.77 | 2.63 | 3.1 | 8.32 | 32.97 | 43.24 | 47.2 | 47.54 | 58.27 | 69.66 | 72 | 72.72 | 74.63 | 76.84 | 78.78 |
| 0 | 24 | 73 | 0 | 0 | 7.81 | 5.88 | 5.61 | 7.11 | 17.32 | 41.6 | 44.98 | 48.43 | 48.98 | 62.5 | 77.37 | 80.02 | 79.97 | 79.78 | 79.19 | 79.44 |
| 0 | 13 | 255 | 4 | 0 | 3.56 | 2.8 | 2.75 | 3.21 | 8.65 | 36.17 | 50.97 | 55.25 | 55.4 | 62.9 | 69.68 | 71.14 | 71.93 | 73.96 | 76.26 | 78.37 |
| 0 | 13 | 73 | 0 | 0 | 8.04 | 6.12 | 5.86 | 7.43 | 18.56 | 48.34 | 55.48 | 58.94 | 59.4 | 69.31 | 78.39 | 79.83 | 79.75 | 79.73 | 79.35 | 79.62 |
| 0 | 13 | 73 | 4 | 0 | 8.01 | 6.13 | 5.79 | 7.39 | 18.23 | 46.8 | 53.37 | 55.87 | 55.45 | 62.89 | 69.84 | 71.25 | 71.93 | 73.99 | 76.5 | 78.5 |
| 0 | 6 | 73 | 4 | 0 | 8.54 | 6.55 | 6.31 | 7.95 | 19.36 | 52.1 | 62.14 | 64.25 | 63.47 | 67.4 | 70.79 | 71.6 | 72.32 | 74.47 | 77.05 | 79.14 |
| 0 | 160 | 255 | 0 | 0 | 3.84 | 2.9 | 2.76 | 3.25 | 7.16 | 13.8 | 12.7 | 14.11 | 14.34 | 24.53 | 56.87 | 76.9 | 79.61 | 79.62 | 79.1 | 79.36 |
| 0 | 160 | 255 | 4 | 0 | 3.92 | 2.98 | 2.84 | 3.39 | 7.54 | 14.46 | 13.33 | 14.77 | 14.98 | 25 | 54.22 | 70.6 | 73.26 | 75.02 | 77.1 | 78.95 |
| 0 | 93 | 73 | 0 | 0 | 9.73 | 7.25 | 6.7 | 8.07 | 14.49 | 20.18 | 17.93 | 19.86 | 20.21 | 33.92 | 67.47 | 80.34 | 81.25 | 80.89 | 80.27 | 80.35 |
| 0 | 160 | 255 | 18 | 0 | 3.86 | 2.91 | 2.74 | 3.32 | 7.31 | 14.02 | 12.96 | 14.22 | 14.31 | 23.04 | 44.44 | 54.26 | 56.82 | 61.52 | 69.07 | 75.46 |
| 0 | 160 | 255 | 10 | 0 | 4.04 | 3.03 | 2.86 | 3.4 | 7.5 | 14.19 | 13.1 | 14.44 | 14.58 | 23.91 | 49 | 61.74 | 64.41 | 67.96 | 72.95 | 77.11 |
| 0 | 93 | 73 | 10 | 0 | 9.03 | 6.68 | 6.19 | 7.52 | 13.83 | 19.58 | 17.43 | 19.1 | 19.24 | 30.82 | 54.76 | 62.92 | 64.7 | 68.23 | 73.36 | 77.32 |
| 0 | 40 | 22 | 0 | 0 | 22.64 | 19.88 | 18.96 | 21 | 30.25 | 38.96 | 36.24 | 39.06 | 39.54 | 55.33 | 76.43 | 80.67 | 80.57 | 80.27 | 79.65 | 79.76 |
| 0 | 58 | 37 | 0 | 0 | 15.51 | 12.57 | 11.87 | 13.7 | 22.05 | 30.22 | 27.7 | 30.24 | 30.69 | 46.5 | 73.19 | 79.91 | 80.04 | 79.73 | 79.18 | 79.31 |
| 0 | 58 | 37 | 4 | 0 | 15.25 | 12.39 | 11.61 | 13.38 | 21.52 | 29.31 | 26.68 | 29.04 | 29.28 | 43.9 | 67.08 | 72.85 | 73.65 | 75.34 | 77.58 | 79.37 |
| 0 | 58 | 255 | 0 | 0 | 3.71 | 2.86 | 2.76 | 3.31 | 8.66 | 26.91 | 29.94 | 32.96 | 33.52 | 48.41 | 73.24 | 79.46 | 79.65 | 79.43 | 78.91 | 79.13 |
| 0 | 58 | 255 | 4 | 0 | 3.53 | 2.73 | 2.64 | 3.14 | 8.37 | 26.42 | 29.34 | 32.11 | 32.45 | 45.96 | 67.19 | 72.57 | 73.4 | 75.04 | 77.09 | 78.83 |
| 0 | 40 | 73 | 0 | 0 | 8.37 | 6.3 | 6 | 7.49 | 17.09 | 35.96 | 36.49 | 39.68 | 40.25 | 56.03 | 76.99 | 81.15 | 81.01 | 80.68 | 80.1 | 80.16 |
| 0 | 93 | 255 | 4 | 0 | 4.11 | 3.11 | 2.94 | 3.58 | 8.87 | 21.04 | 21.03 | 23.06 | 23.36 | 35.7 | 62.68 | 72.41 | 73.77 | 75.38 | 77.34 | 79.1 |
| 0 | 58 | 73 | 0 | 0 | 8.47 | 6.41 | 5.99 | 7.4 | 15.67 | 28.18 | 26.8 | 29.47 | 29.97 | 46.14 | 73.62 | 80.53 | 80.64 | 80.27 | 79.61 | 79.69 |
| 0 | 58 | 73 | 4 | 0 | 8.26 | 6.09 | 5.72 | 7.21 | 15.74 | 28.41 | 27.23 | 29.69 | 29.97 | 44.2 | 66.75 | 72.34 | 73.36 | 75.13 | 77.39 | 79.25 |
| 0 | 93 | 73 | 4 | 0 | 8.63 | 6.27 | 5.78 | 7.12 | 13.37 | 19.01 | 16.85 | 18.66 | 18.93 | 31.64 | 60.57 | 71.16 | 72.69 | 74.41 | 76.48 | 78.32 |
| 0 | 6 | 5 | 41 | 0 | 32.48 | 32.01 | 31.5 | 33.41 | 39.23 | 42.8 | 40.7 | 38.03 | 34.27 | 33.62 | 34.43 | 35.53 | 37.77 | 44.83 | 58.18 | 70.83 |
| 0 | 6 | 15 | 30 | 0 | 24.71 | 22.56 | 22.07 | 24.99 | 35.79 | 46.86 | 46.21 | 44.06 | 40.49 | 40.27 | 41.36 | 42.5 | 44.71 | 51.43 | 63.15 | 73.4 |
| 0 | 6 | 8 | 21 | 0 | 33.33 | 32.77 | 32.5 | 35.2 | 43.93 | 51.74 | 50.48 | 48.75 | 45.55 | 46.07 | 47.61 | 48.74 | 50.77 | 56.73 | 66.41 | 74.35 |
| 0 | 6 | 37 | 23 | 0 | 14.1 | 11.51 | 11.11 | 13.57 | 25.94 | 46.41 | 48.77 | 47.41 | 44.24 | 44.51 | 45.9 | 47.03 | 49.1 | 55.2 | 65.37 | 73.92 |

TABLE 4-continued

Second set of 969 patches
(target condition)

| Colorant digital count (0-255) | | | | | Percent reflectance at wavelength | | | | | | | | | | | | | | |
|---|---|---|---|---|---|---|---|---|---|---|---|---|---|---|---|---|---|---|---|
| C | M | Y | K | V | 400 | 420 | 440 | 460 | 480 | 500 | 520 | 540 | 560 | 580 | 600 | 620 | 640 | 660 | 680 | 700 |
| 0 | 6 | 15 | 8 | 0 | 29.4 | 27.82 | 27.58 | 30.77 | 43.64 | 59.41 | 60.35 | 60.3 | 58.44 | 61.05 | 63.74 | 64.74 | 66.01 | 69.58 | 74.36 | 78.04 |
| 0 | 24 | 37 | 8 | 0 | 14.16 | 11.56 | 11.07 | 13.36 | 24.96 | 42.37 | 42.4 | 44.25 | 43.59 | 52.84 | 62.67 | 64.88 | 66.08 | 69.53 | 74.31 | 77.86 |
| 0 | 13 | 37 | 15 | 0 | 14.57 | 11.97 | 11.54 | 13.99 | 26.52 | 46.49 | 47.99 | 48.32 | 46.4 | 50.37 | 54.54 | 55.99 | 57.77 | 62.84 | 70.63 | 76.68 |
| 0 | 13 | 22 | 8 | 0 | 22.3 | 19.81 | 19.28 | 22.14 | 34.99 | 51.64 | 51.85 | 52.89 | 51.68 | 57.77 | 63.64 | 65.03 | 66.19 | 69.63 | 74.4 | 77.93 |
| 0 | 6 | 22 | 15 | 0 | 21.16 | 18.49 | 18.02 | 21.12 | 34.92 | 53.86 | 55.43 | 54.49 | 51.72 | 52.81 | 54.68 | 55.76 | 57.56 | 62.83 | 70.94 | 77.13 |
| 0 | 13 | 8 | 21 | 0 | 34.14 | 33.36 | 32.7 | 34.56 | 41.68 | 47.5 | 45.32 | 44.65 | 42.21 | 45.15 | 48.58 | 49.96 | 51.91 | 57.78 | 67.38 | 75.17 |
| 0 | 13 | 22 | 0 | 0 | 24.25 | 22 | 21.52 | 24.51 | 38.09 | 56.79 | 57.84 | 60.28 | 60.5 | 70.02 | 78.92 | 80.32 | 80.18 | 80.2 | 79.85 | 80.16 |
| 0 | 24 | 15 | 8 | 0 | 28.64 | 26.63 | 25.82 | 28.06 | 37.19 | 45.66 | 43.37 | 44.92 | 44.22 | 53.4 | 63.19 | 65.31 | 66.46 | 69.78 | 74.4 | 77.89 |
| 0 | 24 | 22 | 0 | 0 | 24.06 | 21.53 | 20.8 | 23.33 | 34.84 | 48.31 | 46.99 | 49.75 | 50.14 | 63.46 | 78.19 | 80.73 | 80.57 | 80.41 | 79.94 | 80.12 |
| 0 | 24 | 37 | 0 | 0 | 15.03 | 12.33 | 11.79 | 14.22 | 26.56 | 45.58 | 45.88 | 48.89 | 49.33 | 62.9 | 77.89 | 80.53 | 80.38 | 80.28 | 79.9 | 80.07 |
| 0 | 24 | 22 | 8 | 0 | 22.72 | 20.37 | 19.71 | 22.23 | 33.25 | 45.58 | 44.04 | 45.67 | 44.97 | 54.19 | 63.92 | 66.06 | 67.21 | 70.6 | 75.33 | 78.81 |
| 0 | 13 | 15 | 8 | 0 | 28.51 | 26.72 | 26.18 | 28.96 | 40.27 | 52.93 | 52.23 | 52.99 | 51.69 | 57.52 | 63.29 | 64.72 | 65.88 | 69.31 | 74.03 | 77.6 |
| 0 | 24 | 15 | 30 | 0 | 24.55 | 22.28 | 21.46 | 23.5 | 31.46 | 38.28 | 35.97 | 35.76 | 33.67 | 37.57 | 41.97 | 43.58 | 45.67 | 52.15 | 63.61 | 73.69 |
| 0 | 58 | 37 | 23 | 0 | 14.39 | 11.53 | 10.79 | 12.56 | 20.33 | 27.27 | 24.85 | 26.21 | 25.66 | 34.58 | 46.29 | 49.43 | 51.38 | 57.19 | 67.11 | 75.33 |
| 0 | 40 | 37 | 15 | 0 | 14.63 | 11.94 | 11.36 | 13.45 | 23.2 | 34.51 | 32.73 | 34.27 | 33.57 | 42.76 | 53.5 | 56.13 | 57.79 | 62.72 | 70.51 | 76.52 |
| 0 | 40 | 22 | 15 | 0 | 21.56 | 18.75 | 17.85 | 19.8 | 28.23 | 35.71 | 33.11 | 34.51 | 33.76 | 42.93 | 53.68 | 56.36 | 58.04 | 62.98 | 70.75 | 76.72 |
| 0 | 24 | 255 | 18 | 0 | 3.56 | 2.83 | 2.71 | 3.19 | 8.45 | 31.44 | 39.87 | 41.89 | 40.79 | 46.33 | 52.11 | 53.86 | 55.63 | 60.7 | 68.69 | 75.23 |
| 0 | 58 | 255 | 18 | 0 | 3.47 | 2.71 | 2.59 | 3.09 | 8.27 | 25.28 | 27.8 | 29.85 | 29.63 | 39 | 51.65 | 55.08 | 56.91 | 61.87 | 69.71 | 76.1 |
| 0 | 40 | 255 | 10 | 0 | 3.44 | 2.69 | 2.58 | 3.06 | 8.26 | 29.07 | 34.7 | 37.51 | 37.43 | 47.58 | 59.68 | 62.61 | 64.04 | 67.73 | 72.91 | 77.05 |
| 0 | 24 | 37 | 23 | 0 | 13.87 | 11.14 | 10.65 | 12.89 | 23.65 | 37.62 | 36.95 | 37.47 | 35.85 | 41.01 | 46.52 | 48.3 | 50.27 | 56.17 | 66.06 | 74.32 |

What is claimed is:

1. A method for producing a transform useful for predicting a reflectance value producible by a printer while operating under a predetermined target set of operating conditions using a reflectance value produced by the printer while operating under a predetermined reference set of operating conditions, the printer having a predetermined set of colorants available for deposition on the substrate, the method including the steps of:
   i) operating a printer under a predetermined reference set of operating conditions to create a first set of K number of samples, each sample being produced using a predetermined colorant or combination of colorants,
   ii) operating the printer under a predetermined target set of operating conditions to create a second set of K number of samples, each sample in the second set being produced using the same predetermined colorant or combination of colorants used to produce one of the samples in the first set, and
   iii) measuring actual spectral reflectances for each sample in the first and second sets;
   wherein the improvement comprises the step of:
   a) using the actual spectral reflectance for each sample in the first set and the actual spectral reflectance for each sample in the second set, creating a cross-validated, partial-least-squares transform that maps a reflectance from a sample produced under the first set of operating conditions to a reflectance from a sample produced under the target set of operating conditions.

2. The method of claim 1 wherein the improvement comprises the further steps of:
   b) operating a printer under the predetermined reference set of operating conditions to create a set of M number of samples, where M>K, each sample being produced using a predetermined colorant or combination of colorants;
   c) measuring actual spectral reflectances for each sample in the set of M number of samples; and
   d) using the cross-validated, partial-least-squares transform and the set of actual spectral reflectances measured from the set of M number of samples, generating a set of M number of predicted reflectances, each predicted reflectance representing a sample producible by the printer using one of the predetermined colorant or combination of colorants while operating under the target set of operating conditions.

3. The method of claim 2 wherein at least one colorant or combination of colorants used to create one of the K number of samples in the first set is used to create one of the M number of samples.

4. The method of claim 2 wherein each colorant or combination of colorants used to create one of the K number of samples in the first set is used to create one of the M number of samples.

5. The method of claim 2 wherein the improvement comprises the further steps of:
   e) using the set of M number of predicted reflectances and the M number of colorant or combinations of colorants, generating a table able to predict a color value producible by the printer on a substrate while operating under the target set of operating conditions using one of the colorant or combination of colorants.

6. The method of claim 1 wherein the improvement comprises the further step of:
   (b) prior to step (a), scaling the measured actual spectral reflectance for each sample in the first and second sets using a statistical transform so that the measured actual spectral reflectances are close to a normal statistical distribution.

7. The method of claim 6 wherein the statistical transform is Box-Cox transform of the form $R^{\alpha}$.

8. The method of claim 7 wherein $\alpha$ has a value equal to 1/3.

9. A computer-readable medium containing a data structure having the scores, loadings, weights, and regression coefficients of a cross-validated partial least squares model that maps reflectances from corresponding samples in the reference and target sample sets generated by a computer-implemented method including the steps of:
   i) operating a printer under a predetermined reference set of operating conditions to create a first set of K number of samples, each sample being produced using a predetermined colorant or combination of colorants,
ii) operating the printer under a predetermined target set of operating conditions to create a second set of K number of samples, each sample in the second set being produced using the same predetermined colorant or combination of colorants used to produce one of the samples in the first set, and
iii) measuring actual spectral reflectances for each sample in the first and second sets;

wherein the improvement comprises the step of:
a) using the actual spectral reflectance for each sample in the first set and the actual spectral reflectance for each sample in the second set to create the scores, loadings, weights, and regression coefficients of a cross-validated partial-least-squares model.

* * * * *